United States Patent
Akiyama et al.

(10) Patent No.: US 6,661,974 B1
(45) Date of Patent: *Dec. 9, 2003

(54) OPTICAL TRANSMITTER AND OPTICAL TRANSMISSION SYSTEM

(75) Inventors: Yuichi Akiyama, Kawasaki (JP); George Ishikawa, Kawasaki (JP); Hiroki Ooi, Kawasaki (JP); Terumi Chikama, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/407,369

(22) Filed: Sep. 28, 1999

(30) Foreign Application Priority Data

Dec. 18, 1998 (JP) .............................. 10-360083
Jul. 30, 1999 (JP) .............................. 11-216737

(51) Int. Cl.[7] .......................... H04J 14/02; H04B 10/04
(52) U.S. Cl. ......................... 398/95; 398/81; 398/91; 398/158; 398/194
(58) Field of Search ...................... 359/124, 133, 359/134, 187, 161, 172, 188, 189

(56) References Cited

U.S. PATENT DOCUMENTS

| | | | | |
|---|---|---|---|---|
| 5,224,183 A | * | 6/1993 | Dugan | 359/115 |
| 5,524,144 A | * | 6/1996 | Suzuki | 359/176 |
| 5,673,133 A | * | 9/1997 | Imaoka et al. | 356/73.1 |
| 5,745,613 A | * | 4/1998 | Fukuchi et al. | 359/114 |
| 5,953,359 A | * | 9/1999 | Yamaguchi et al. | 372/23 |
| 6,021,235 A | * | 2/2000 | Yamamoto et al. | 359/124 |
| 6,411,416 B1 | * | 6/2002 | Ooi et al. | 359/124 |
| 6,414,774 B1 | * | 7/2002 | Scifres | 359/132 |

FOREIGN PATENT DOCUMENTS

| | | | |
|---|---|---|---|
| EP | 0700178 | * | 3/1996 |
| JP | 411046181 | * | 2/1999 |

OTHER PUBLICATIONS

G. Ishikawa, et al., "2×40 Gb/s Transmission Experiments Over DSF 667 km Using Optical Time–Division Multiplexing and Demultiplexing," Proceedings of the 1997 IEICE General Conference.

M. Tomizawa, et al, "Automatic Dispersion Equalization by Tunable Laser for Installation of High–Speed Optical Transmission System," Optical Fiber Communication Conference and Exhibit.

George Ishikawa, et al. Demonstration of Automatic Dispersion Equalization in 40 Gbit/s OTDM Transmission, European Conference on Optical Communication.

* cited by examiner

Primary Examiner—Leslie Pascal
(74) Attorney, Agent, or Firm—Staas & Halsey LLP

(57) ABSTRACT

An optical transmitter having a function which compensates for wavelength dispersion is provided with a plurality of light sources for outputting light having wavelengths that differ from one another. Before the optical transmission system begins operating, the wavelength of light output to an optical transmission line is varied by changing over the light sources in order to detect a wavelength whose transmission characteristic is optimum with regard to wavelength dispersion exhibited by this optical transmission line. During system operation, the light having the detected optimum wavelength is output to the optical transmission line.

26 Claims, 76 Drawing Sheets

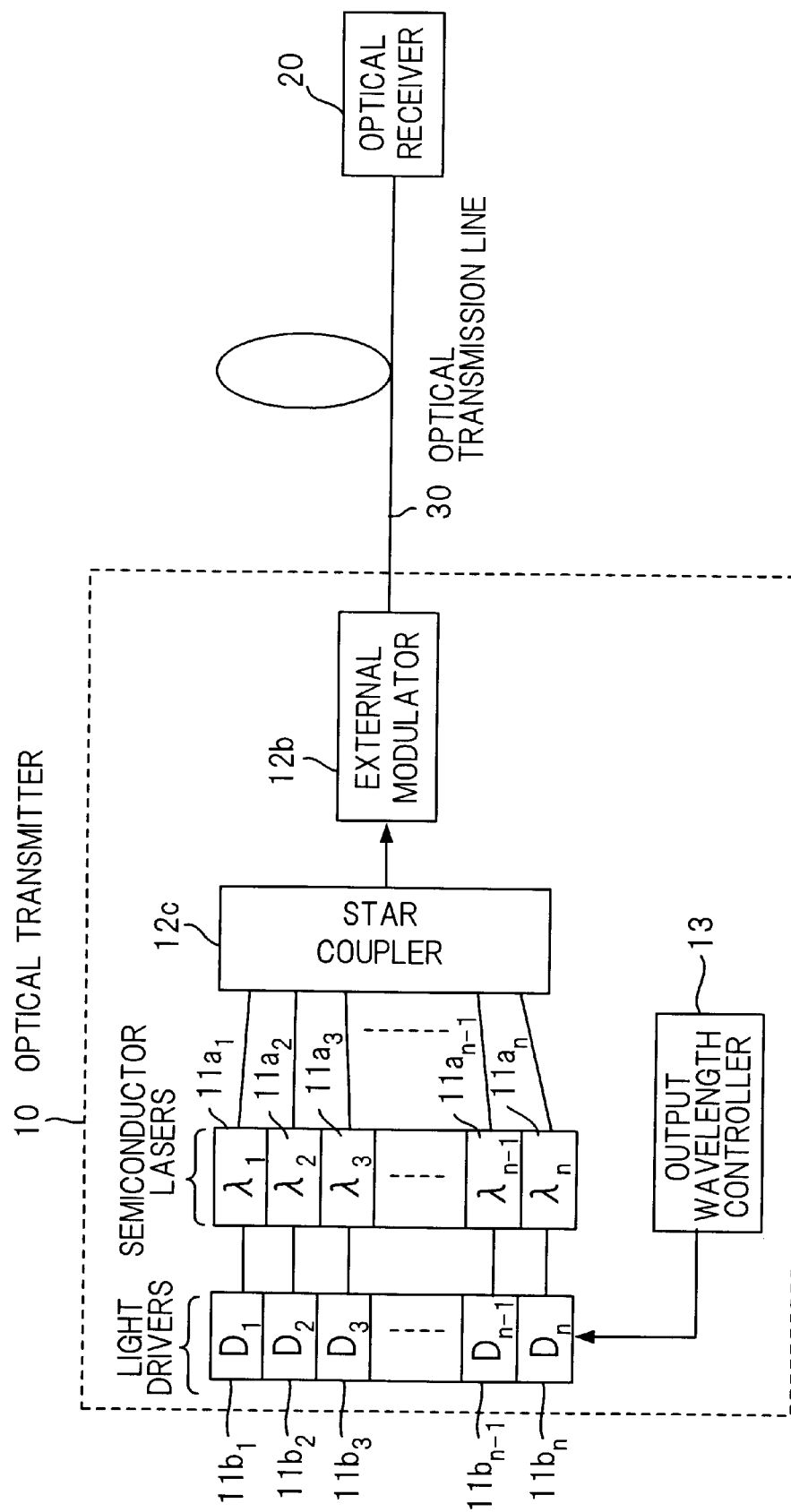

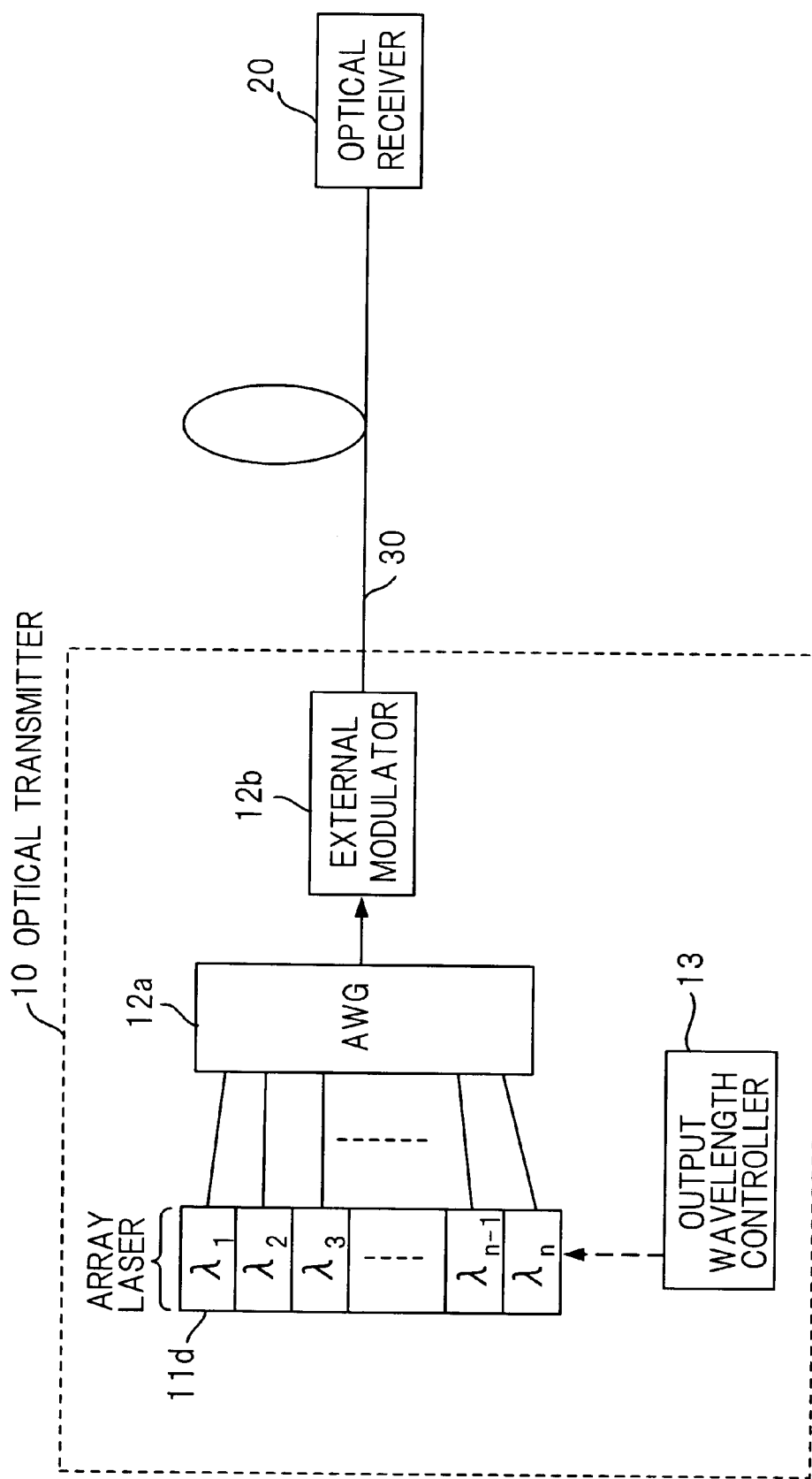

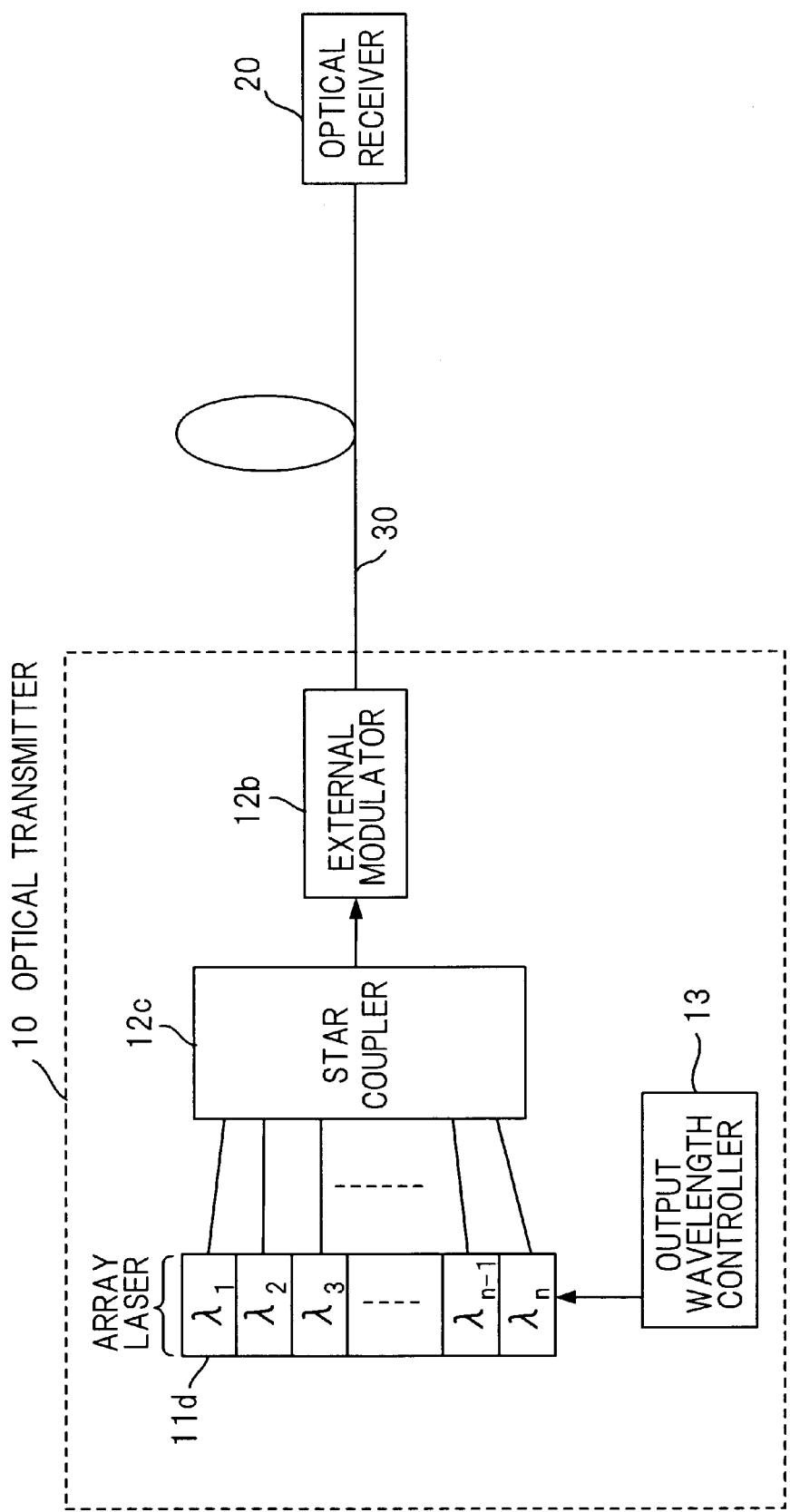

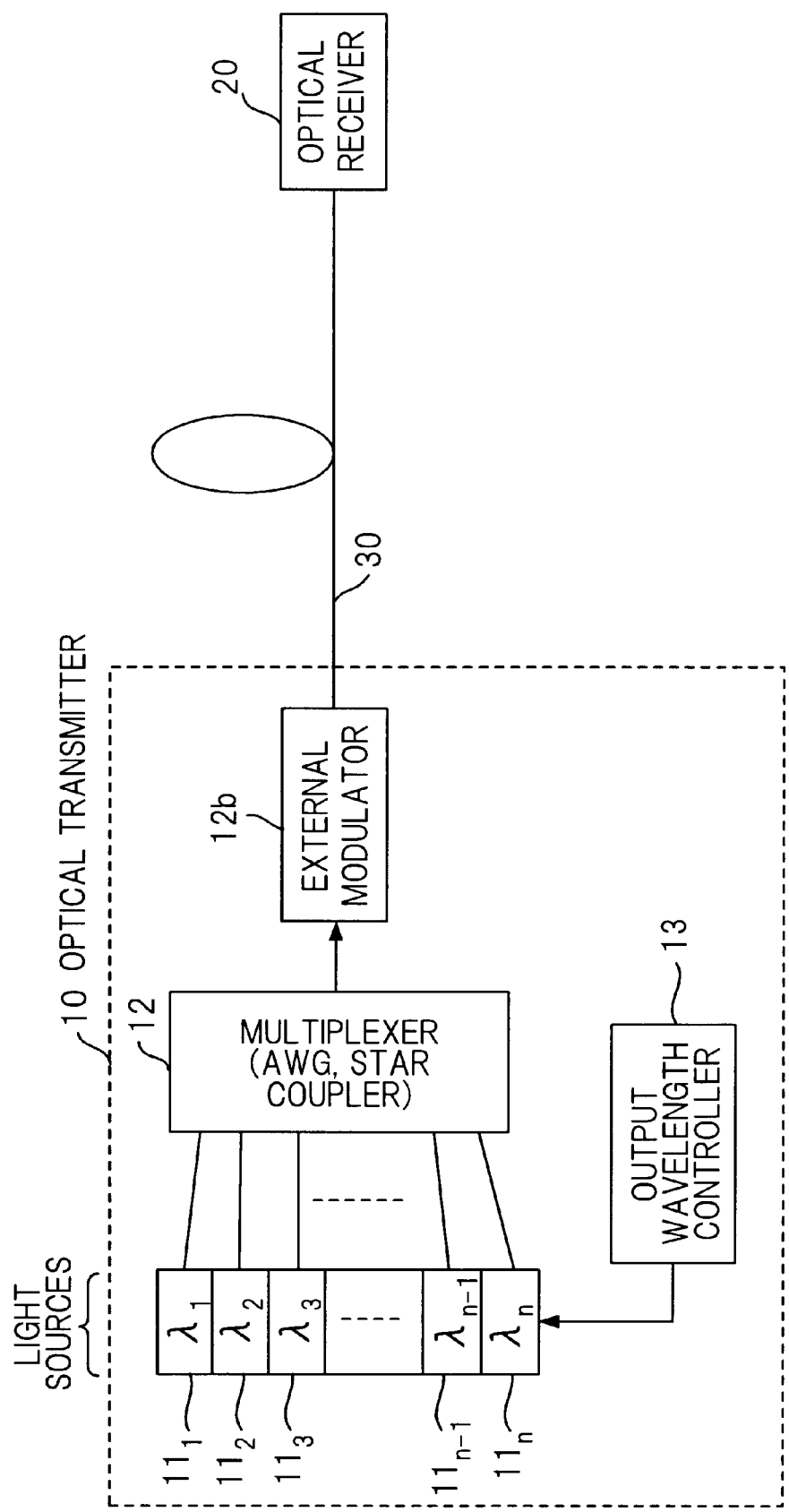

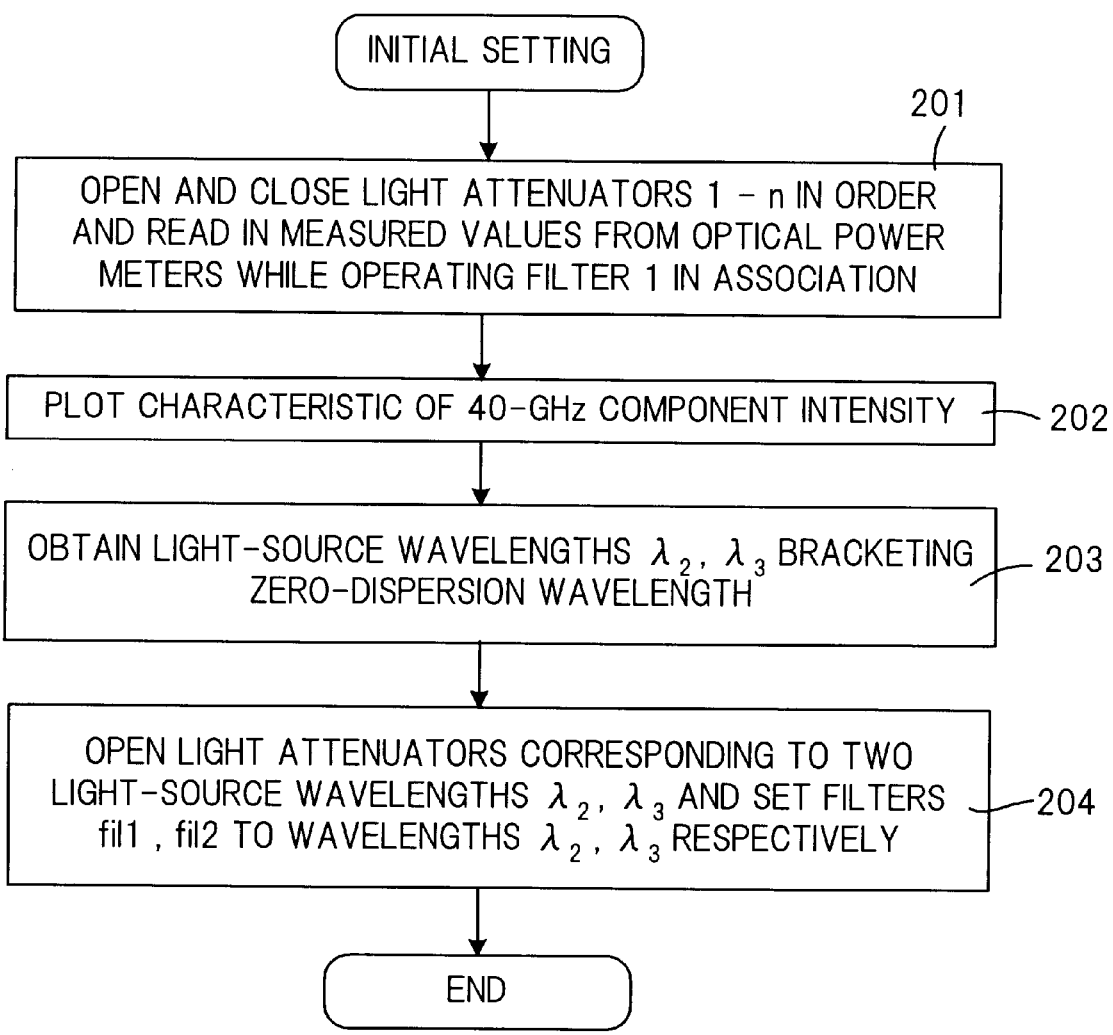

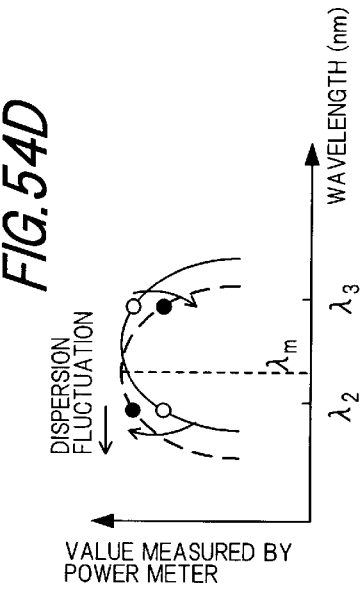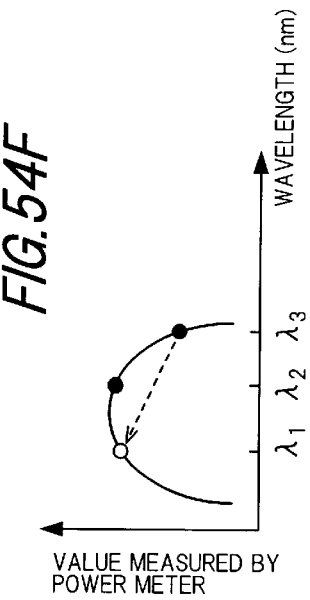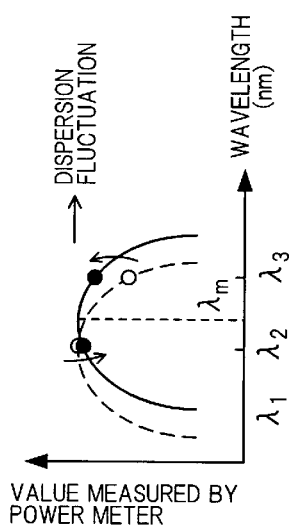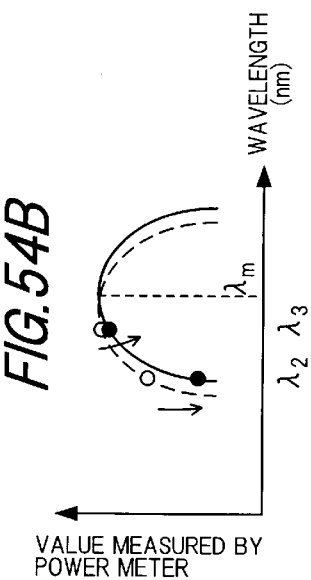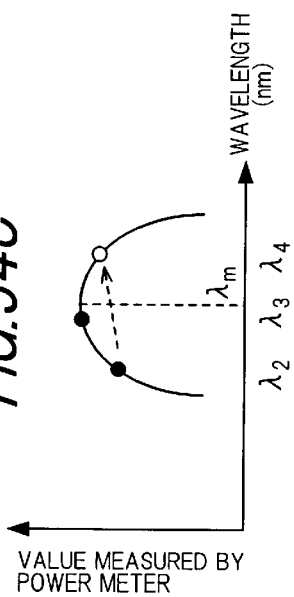

OPTICAL TRANSMITTER AND OPTICAL TRANSMISSION SYSTEM

BACKGROUND OF THE INVENTION

This invention relates to an optical transmitter and optical transmission system. More particularly, the invention relates to an optical transmitter and optical transmission system having a function which compensates for wavelength dispersion in order to realize larger capacity, higher speed and longer transmission distance.

Though 10-Gbps optical transmission systems are currently in practical use, there is growing demand for networks of greater capacity owing to a marked increase in utilization of networks in recent years. In particular, highly precise dispersion compensation is required at transmission speeds above 10 Gbps. This means that measuring the dispersion value of an optical transmission line accurately and then compensating for this value is essential. The present invention relates to monitoring of the dispersion value of an optical transmission line and to a technique for optimum compensation of dispersion.

Signal energy contains a variety of components (different frequency components and different mode components), and signal waveform distortion will occur at the receiving end unless signal propagation delay time is constant. The phenomenon which is the cause of this delay distortion is referred to as "dispersion" and decides the transmission capacity of an optical fiber. In order to realize a further increase in capacity, speed and transmission distance in an optical transmission system, there is need for a technique for measuring dispersion with high precision and for compensating for this dispersion.

In a 40-Gbps optical transmission system, wavelength dispersion is one factor that limits transmission distance. Dispersion tolerance declines at the square of the bit rate, At 40 Gbps, dispersion tolerance is 30 ps/nm, which is much lower in comparison with a dispersion tolerance of about 800 ps/nm at 10 Gbps. FIG. 74A illustrates the relationship between amount of dispersion compensation and power penalty based upon a transmission experiment using 40-Gbps OTDM (optical time division multiplexing), 1.3-μm zero-dispersion SMF (Single-Mode Fiber) having a length of 50 km. FIG. 74B shows the measurement system. The system shown in FIG. 74B includes an optical transmitter TX, a receiver RX, 1.3-μm zero-dispersion SMF having a length of 50 km, and −920-ps/nm fixed-dispersion compensated fiber CB.

Though 1.3-μm zero-dispersion SMF has been used for optical transmission lines, dispersion at high transmission speeds imposes limitations. In recent years, therefore, dispersion-shifted optical fiber for the purpose of reducing dispersion by shifting the zero-dispersion wavelength from 1.3 to 1.55 μm has been developed and laid. The wavelength of light output from the transmitter is 1.55 μm. As a consequence, 1.55-μm light is transmitted via the 1.3-μm zero-dispersion SMF laid originally.

When a 40-Gbps baseband signal is transmitted by a 1.55-μm optical signal via a 1.3-μm zero-dispersion SMF having a length of 50 km, dispersion of 920 ps/nm is produced. Accordingly, if 100% dispersion compensation is applied using the −920-ps/nm fixed-dispersion compensated fiber CB, reception sensitivity degradation will be 0 dB. However, if the amount of dispersion compensation is much larger or smaller than 100% dispersion compensation (=−920 ps/nm), reception sensitivity degradation rises and becomes 1 dB at amounts of dispersion compensation of −905 ps/nm and −935 ps/nm, as shown in FIG. 74A. In other words, if further dispersion in excess of ±15 ps/nm occurs at 100% dispersion compensation (amount of dispersion compensation=−920 ps/nm), reception sensitivity degradation will exceed 1 dB.

Accordingly, dispersion compensation tolerance when a power penalty of less than 1 dB is adopted as a condition for enabling transmission is a low 30 ps/nm, meaning that precise dispersion compensation must be carried out. Further, owing to temperature and stress which acts upon the optical fiber, the amount of change in transmission-line dispersion must be measured and the amount of dispersion compensation must be optimized within this narrow tolerance in conformity with change with the passage of time. Tolerance deviation $D_T$ due to temperature is as follows assuming a transmission line of SMF having a length of 50 km and a temperature change of −50° C. to +100° C.:

$D_T$=0.03 (nm/° C.)×150 (° C.)×0.07 (ps/nm$^2$/km)×50 (km)=15.8 (ps/nm)

Thus there is the danger that the dispersion compensation tolerance of 30 ps/nm will not be met.

FIG. 75 is a characteristic diagram of wavelength dispersion, in which the wavelength (nm) of light output from an optical transmitter is plotted along the horizontal axis and amount of wavelength dispersion is plotted along the vertical axis. When a 40-Gbps baseband signal is transmitted by a 1.55-μm optical signal via a 1.3-μm zero-dispersion SMF, dispersion of 920 ps/nm is produced, as mentioned above. Accordingly, if 100% dispersion compensation is applied using the −920-ps/nm fixed-dispersion compensated fiber CB, wavelength dispersion becomes zero at 1.552 μm. The zero-dispersion wavelength is 1.552 μm (=1552 nm). If the wavelength of light output by the optical transmitter deviates from the zero-dispersion wavelength, wavelength dispersion of an amount indicated by the straight line in FIG. 75 is produced.

A method using 40-GHz component intensity in the baseband spectrum of an OTDM signal and NRZ signal has been considered as a method of wavelength dispersion compensation. This method utilizes a characteristic in which the amount of dispersion becomes zero and the eye pattern openness is maximized at a minimum point between two peaks of the 40-GHz component intensity.

FIGS. 76A and 76B illustrate the results of simulations of 40-GHz component intensity and eye openness with respect to amount of dispersion in case of a 40-Gbps NRZ signal, in which dispersion value (ps/nm) is plotted along the horizontal axis and 40-Gbps component intensity and eye openness are plotted along the vertical axis. FIG. 76A is for a case where α>0 holds and FIG. 76B for a case where α<0 holds, where α is a chirp parameter representing direction (positive- or negative-going) and amount of fluctuation in a transmission waveform. Wavelength fluctuation (chirp) occurs when the voltage applied to an optical modulator increases or decreases owing to a rise and fall in a data pulse. Owing to the effects of chirping, (1) the rising edge of a pulse on the receiving side is delayed and the falling edge of the pulse is advanced (α<0), or (2) the rising edge of a pulse on the receiving side is advanced and the falling edge of the pulse is delayed (α>0). The diameter of the eye opening is reduced by being shrunk along the time axis in the case of the former and is reduced by being stretched along the time axis in the case of the latter.

In accordance with FIGS. 76A and 76B, when α=+0.7, −0.7 holds, the 40-GHz component intensity peaks where the value of dispersion is in the vicinity of −40 ps/nm and +40 ps/nm, respectively, and the minimum value is obtained at the foot of the peak. Here the dispersion value is zero and the eye openness is maximum. The reason why the 40-GHz component intensity becomes zero when the dispersion value is zero (zero-dispersion wavelength=1552 μm) and the eye openness is maximum is that in the case of the NRZ signal, 40 Gbps corresponds to 20 GHz and no 40-GHz component is included. This means that the zero-dispersion wavelength can be detected by detecting the foot of the 40-GHz component intensity.

FIGS. 77A and 77B illustrate the temperature characteristic (experimental values) of wavelength vs. 40-GHz component intensity in the case of the 40-Gbps NRZ signal. These are the results of transmission experiments at temperatures of −35 to +65° C. using a DSF having a length of 100 km, in which FIG. 77A is for a case where α>0 holds and FIG. 77B for a case where α<0 holds. As in the simulation results of FIGS. 76A and 76B, the minimum-value point at the foot of the peak of the 40-GHz component intensity in each Figure indicates the zero-dispersion wavelength (amount of dispersion=0) at plus and minus values of α. It will be understood that the zero-dispersion wavelength changes while following up a fluctuation in temperature. More specifically, when the amount of dispersion of the optical transmission line fluctuates owing to a change in temperature, the zero-dispersion wavelength of the optical transmission line increases or decreases correspondingly.

Accordingly, it will suffice to detect the zero-dispersion wavelength and make the wavelength of light output to the optical transmission line equal to this zero-dispersion wavelength on the sending side. However, since the zero-dispersion wavelength must be detected, it is necessary for the wavelength of light to be varied continuously over a wide range. The state of the art is such that a tunable laser in which wavelength can be varied continuously over a wide range is difficult or impossible to realize because of structural complications and for reasons of cost.

Utilizing a semiconductor array laser (in which a number of laser-diode chips are formed on a single wafer) currently undergoing research or a plurality of discrete semiconductor lasers used in existing optical systems is believed to be closer to actualization. However, in the case of a semiconductor array laser obtained by forming a number of laser-diode chips of different wavelengths on one wafer or a plurality of discrete semiconductor lasers having different wavelengths, light is interrupted when wavelength is switched and, as a result, interruption of the transmitted signal occurs. In addition, a large difference in signal delay time before and after wavelength switching is produced and signal degradation occurs.

SUMMARY OF THE INVENTION

Accordingly, an object of the present invention is to compensate for wavelength dispersion in an optical transmission line by outputting, to this optical transmission line, light having a wavelength for which the transmission characteristic is optimum for this wavelength dispersion, this being accomplished even if a tunable laser is not used.

Another object of the present invention is to so arrange it that neither signal interruption nor signal degradation occurs at the time of wavelength changeover even if a plurality of light sources having different wavelengths are used, as when use is made of a semiconductor array laser or a plurality of discrete semiconductor lasers.

A further object of the present invention is to so arrange it that wavelength can be switched in a simple manner using an arrayed waveguide grating (AWG), a star coupler, a variable-wavelength filter or a light attenuator.

Still another object of the present invention is to so arrange it that dispersion compensation can be carried out accurately by detecting zero-dispersion wavelength even in a case where a plurality of light sources having different wavelengths are used.

Still another object of the present invention is to so arrange it that signal degradation is prevented by eliminating or reducing signal delay before and after wavelength changeover even in a case where a plurality of light sources having different wavelengths are used.

Still another object of the present invention is to compensate for wavelength dispersion in an optical transmission line by multiplexing monitoring light with main-signal light, detecting whether zero-dispersion wavelength has shifted in the direction of long wavelength or short wavelength and whether zero-dispersion wavelength has become an intermediate wavelength between wavelengths of neighboring light sources, and changing over light sources when zero-dispersion wavelength becomes an intermediate wavelength between wavelengths of neighboring light sources.

Yet another object of the present invention is to improve detection precision of, e.g., the direction of fluctuation of zero-dispersion wavelength by making the polarization of main-signal light orthogonal to the polarization of monitoring light in a case where monitoring light is multiplexed with main-signal light and then transmitted.

A further object of the present invention is to make it possible to support any optical modulation scheme, such as NRZ modulation, RZ modulation and OTDM modulation.

Yet another object of the present invention is to compensate for wavelength dispersion of an optical transmission line by multiplexing main-signal light and two monitoring light beams, in which the wavelengths of the main-signal light and monitoring light are different from each other, and changing over the main-signal light when the zero-dispersion wavelength fluctuates and the intensity ratio of two wavelengths between which the zero-dispersion wavelength is sandwiched attains a predetermined value.

Yet another object of the present invention is to so arrange it that wavelength dispersion compensation can be applied to a wavelength multiplexing optical transmission system.

In accordance with the present invention, the foregoing objects are attained by providing an optical transmitter having a wavelength dispersion compensating function, comprising: a plurality of light sources for outputting light having wavelengths that differ from one another; and means for outputting, to an optical transmission line, light of a wavelength whose transmission characteristic is optimum with regard to wavelength dispersion exhibited by this optical transmission line, the output light being obtained from light output by the plurality of light sources.

Further, in accordance with the present invention, the foregoing object is attained by providing an optical transmitter having a wavelength dispersion compensating function, comprising: a plurality of light sources for outputting light having wavelengths that differ from one another; means for outputting, to an optical transmission line, light of a wavelength whose transmission characteristic is optimum with regard to wavelength dispersion exhibited by this optical transmission line, the output light being obtained from light output by the plurality of light sources; and means for changing over the light generated by the light sources and outputting this light to the optical transmission line, thereby changing the wavelength of light output to the optical transmission line; wherein the wavelength of light output to the optical transmission line is changed, before start of operation of an optical transmission system, in order to detect a wavelength whose transmission characteristic is optimum with regard to the wavelength dispersion exhibited by this optical transmission line, and the light having the detected optimum wavelength is output to the optical transmission line during system operation.

Further, in accordance with the present invention, the foregoing object is attained by providing an optical transmitter having a wavelength dispersion compensating function, comprising: a plurality of light sources for outputting light having wavelengths that differ from one another; means for outputting, to an optical transmission line, light of a wavelength whose transmission characteristic is optimum with regard to wavelength dispersion exhibited by this optical transmission line, the output light being obtained from light output by the plurality of light sources; and means for causing fluctuation of the wavelength of the light output to the optical transmission line in order to detect a wavelength whose transmission characteristic is optimum with regard to wavelength dispersion exhibited by this optical transmission line; wherein the light having the detected optimum wavelength is output to the optical transmission line during operation of an optical transmission system.

Further, in accordance with the present invention, the foregoing object is attained by providing an optical transmitter having a wavelength dispersion compensating function, comprising: a plurality of light sources for outputting light having wavelengths that differ from one another; means for outputting, as main-signal light to an optical transmission line, light of a wavelength whose transmission characteristic is optimum with regard to wavelength dispersion exhibited by this optical transmission line, the output light being obtained from light output by the plurality of light sources; and means for multiplexing, with the main-signal light, monitoring light for detecting a wavelength whose transmission characteristic is optimum with regard to wavelength dispersion exhibited by this optical transmission line; wherein the monitoring light is multiplexed with the main-signal light during operation of an optical transmission system and the light having the detected optimum wavelength is output to the optical transmission line as the main-signal light.

Other features and advantages of the present invention will be apparent from the following description taken in conjunction with the accompanying drawings.

BRIEF DESCRIPTION OF THE DRAWINGS

FIG. 9 is a diagram illustrating a second example of the construction of an optical transmitter having a plurality of light sources (in which semiconductor lasers are provided as the light sources and a star coupler is used for multiplexing light);

FIG. 11 is a diagram illustrating a fourth example of the construction of an optical transmitter having a plurality of light sources (in which a semiconductor array laser is provided as the light sources and an arrayed waveguide grating is used for multiplexing light);

FIG. 12 is a diagram illustrating a fourth example of the construction of an optical transmitter having a plurality of light sources (in which a semiconductor array laser is provided as the light sources and a star coupler is used for multiplexing light);

FIG. 13 is a diagram illustrating an embodiment in which dispersion compensation is performed in a case where optimum wavelength is already known;

FIG. 42 shows the flow of processing for wavelength dispersion compensation (initial setting);

FIGS. 54A to 54F are diagrams useful in describing direction of fluctuation of wavelength for which intensity is maximum;

FIGS. 66A, 66B and 66C are diagrams useful in describing a case where wavelength multiplexing is performed, in which FIG. 66A illustrates an initial state, FIG. 66B a case where optimum wavelength has been moved toward the side of shorter wavelength, and FIG. 66C a case where optimum wavelength has been moved toward the side of longer wavelength;

DESCRIPTION OF THE PREFERRED EMBODIMENTS

(A) Overview of the Present Invention
(a) Construction

Figure 1:
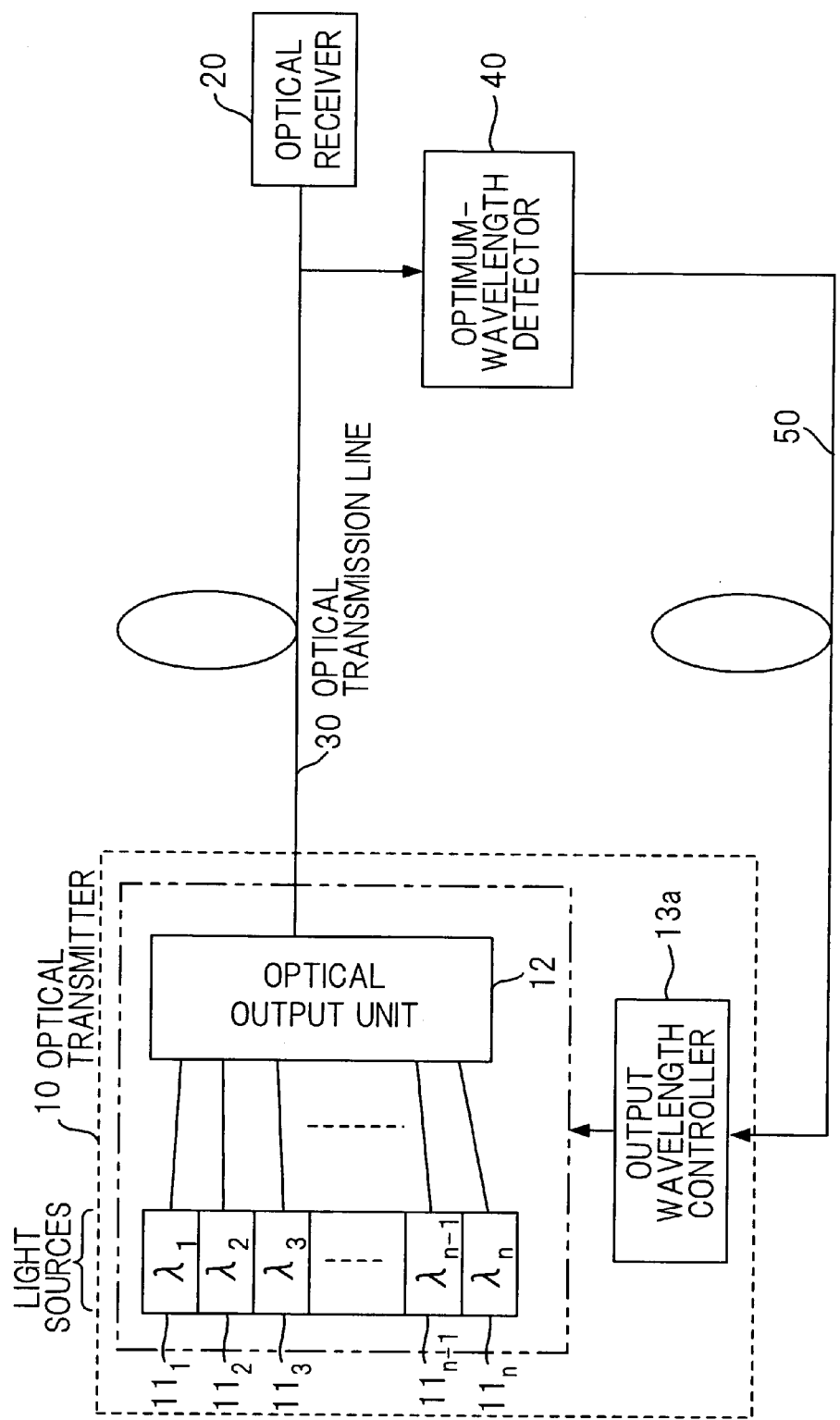
FIG. 1 is a diagram useful in describing an overview of a first aspect of the present invention.
Figure 2:
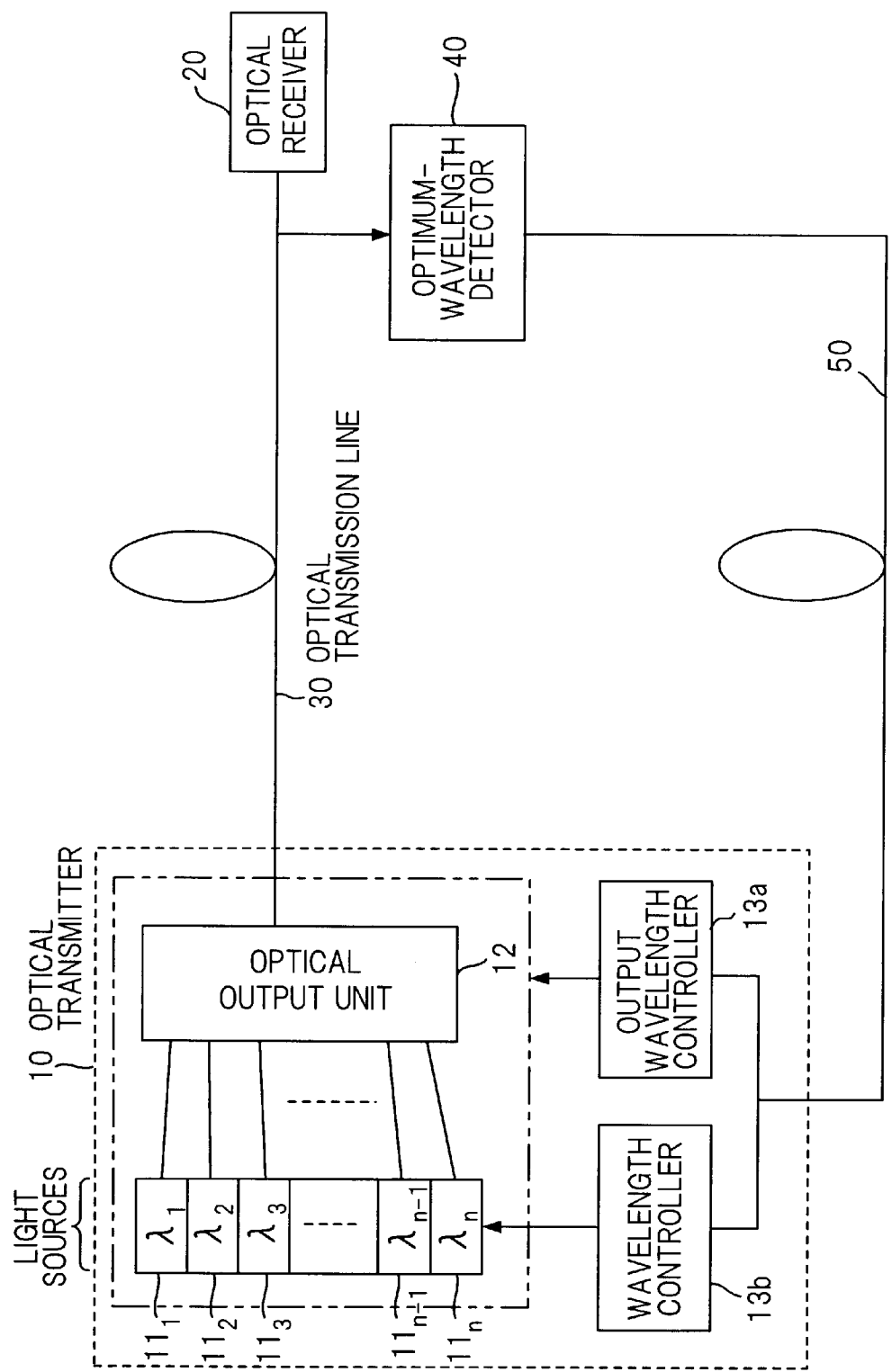
FIG. 2 is a diagram useful in describing an overview of a second aspect of the present invention.
Figure 3:
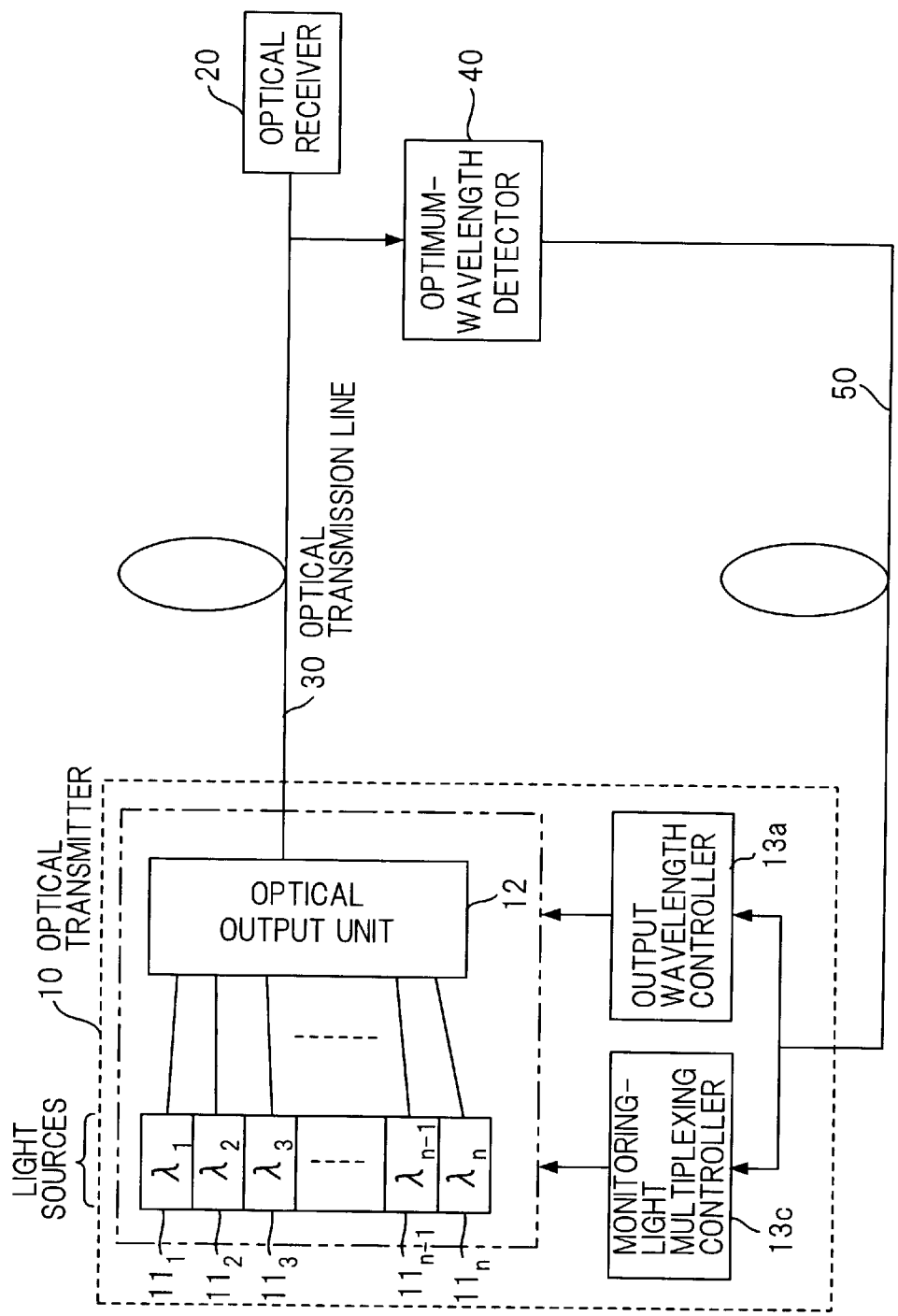
FIG. 3 is a diagram useful in describing an overview of a third aspect of the present invention.

FIGS. 1 to 3 are diagrams useful in describing an overview of first to third aspects of the present invention.

Shown in FIGS. 1 to 3 are an optical transmitter 10, an optical receiver 20, an optical transmission line 30, an optimum-wavelength detector (dispersion monitor) 40 for detecting a wavelength (zero-dispersion wavelength) whose transmission characteristic is optimum in regard to wavelength dispersion of the optical transmission line, and an optical transmission line 50 for sending the result of detection to the optical transmitter 10. If the wavelength of light output to the optical transmission line is the zero-dispersion wavelength, the optimum-wavelength detector 40 utilizes the fact that the intensity of a specific frequency component in a received baseband spectrum signal will have the minimum value.

The optical transmitter 10 includes a plurality of light sources $11_1$–$11_n$ having different wavelengths ($\lambda_1$–$\lambda_n$) and formed by a semiconductor array laser or a plurality of discrete semiconductor lasers; an optical output unit 12 for outputting a prescribed light beam, from among the light beams generated by the plurality of light sources, to the optical transmission line 30; and an output wavelength controller 13a for varying the wavelength of the light output to the optical transmission line 30 and for outputting light of the optimum wavelength to the optical transmission line based upon the detection made by the optimum-wavelength detector 40. In the explanatory view of FIG. 2, the optical transmitter 10 further includes a wavelength controller 13b for minutely changing, at a prescribed frequency, the wavelength of the light output to the optical transmission line. In the explanatory view of FIG. 3, the optical transmitter 10 further includes, instead of the wavelength controller 13b, a monitoring-light multiplexing controller 13c for multiplexing monitoring light with main-signal light.

(b) Overview of First Aspect (FIG. 1)

The plurality of light sources $11_1$–$11_n$ for generating light having different wavelengths $\lambda_1$–$\lambda_n$ are provided. If the wavelength (the zero-dispersion wavelength) that will have the optimum transmission characteristic in regard to wavelength dispersion exhibited by the optical transmission line is already known, the optical output unit 12, under the control of the output wavelength controller 13a, outputs to the optical transmission line 30 the light beam whose wavelength is closest to the optimum wavelength among the light beams produced by the plurality of light sources. If the optimum wavelength is not known, then, before the optical transmission system starts operating, the optical output unit 12, under the control of the output wavelength controller 13a, changes the wavelength of light by successively outputting to the optical transmission line 30 prescribed light beams from among the light beams produced by the plurality of light sources, and the optimum-wavelength detector 40 notifies the output wavelength controller 13a in optical transmitter 10 of the timing at which the intensity of a specific frequency component in a received baseband spectrum signal is minimized. The output wavelength controller 13a recognizes the zero-dispersion wavelength from the wavelength of the light that was being output to the optical transmission line at the above-mentioned timing, i.e., when the intensity of the specific frequency component attained the minimum value. When the system is operating, the optical output unit 12, under the control of the output wavelength controller 13a outputs to the optical transmission line 30 light having the wavelength nearest to the optimum wavelength (the zero-dispersion wavelength) detected by the optimum-wavelength detector 40 among the light beams output by the plurality of light sources $11_1$–$11_n$.

In accordance with the principles of the first aspect of the invention, wavelength dispersion exhibited by an optical transmission line is compensated for by outputting, to this optical transmission line, light having a wavelength for which the transmission characteristic is optimum for this wavelength dispersion, this being accomplished without using a tunable laser.

(c) Overview of Second Aspect (FIG. 2)

The plurality of light sources $11_1$–$11_n$ for generating light having different wavelengths $\lambda_1$–$\lambda_n$ are provided. Before the optical transmission system starts operating, the optical output unit 12, under the control of the output wavelength controller 13a, changes the wavelength of light by successively outputting to the optical transmission line 30 prescribed light beams from among the light beams produced by the plurality of light sources, and the optimum-wavelength detector 40 detects the timing at which the intensity of a specific frequency component in a received baseband spectrum signal is minimized and notifies the output wavelength controller 13a in optical transmitter 10 of this timing. The output wavelength controller 13a recognizes the zero-dispersion wavelength from the wavelength of the light that was being output to the optical transmission line at the above-mentioned timing, i.e., when the intensity of the specific frequency component attained the minimum value. When the system is operating, the optical output unit 12, under the control of the output wavelength controller 13a, outputs to the optical transmission line 30 light having the wavelength nearest to the optimum wavelength detected by the optimum-wavelength detector 40 among the light beams output by the plurality of light sources $11_1$–$11_n$, and the wavelength controller 13b causes the wavelength of the light output to the optical transmission line to fluctuate minutely at a predetermined low frequency.

During system operation also the optimum-wavelength detector 40 controls the detection of optimum wavelength and notifies the output wavelength controller 13a in optical transmitter 10 of the timing at which the intensity of the specific frequency component is minimized. The output wavelength controller 13a recognizes the zero-dispersion wavelength from the wavelength of the light that was being output to the optical transmission line at the above-mentioned timing, i.e., when the intensity of the specific frequency component attained the minimum value. If the zero-dispersion wavelength varies owing to aging or the like and becomes a wavelength intermediate the wavelength of the present light source and the wavelength of the neighboring light source, the optical output unit 12 changes over the light output to the optical transmission line 30 from the light of the present light source to the light of the neighboring light source in response to control performed by the output wavelength controller 13a. Control for wavelength-dispersion compensation is thenceforth performed in similar fashion.

Thus, even if a plurality of light sources having different wavelengths are used, dispersion can be compensated for accurately by detecting the zero-dispersion wavelength before and during system operation.

Further, when the zero-dispersion wavelength has shifted to a wavelength intermediate the wavelength of the present light source and the wavelength of the neighboring light source, the light output to the optical transmission line is switched from the light of the present light source to the light of the neighboring light source. As a result, it is possible to eliminate or reduce signal delay before and after wavelength switching, thereby preventing signal degradation.

Further, when light sources are changed over, wavelength can be changed over without instantaneous interruption of light by gradually reducing the amount of current injected into the present light source and gradually increasing the amount of current injected into the neighboring light source. Similarly, when light sources are changed over, wavelength can be changed over without instantaneous interruption of light and signal interruption can be prevented by outputting light from the present light source and light from the neighboring light source to the optical transmission line simultaneously and then halting the output of light to the optical transmission line from the present light source.

(d) Overview of Third Aspect (FIG. 3)

The plurality of light sources $11_1$–$11_n$ for generating light having different wavelengths $\lambda_1$–$\lambda_n$ are provided. Before the optical transmission system starts operating, the optical output unit 12, under the control of the output wavelength controller 13a, changes the wavelength of light by successively outputting to the optical transmission line 30 prescribed light beams from among the light beams produced by the plurality of light sources, and the optimum-wavelength detector 40 detects the timing at which the intensity of a specific frequency component in a received baseband spectrum signal is minimized and notifies the output wavelength controller 13a in optical transmitter 10 of this timing. The output wavelength controller 13a recognizes the zero-dispersion wavelength from the wavelength of the light that was being output to the optical transmission line at the above-mentioned timing, i.e., when the intensity of the specific frequency component attained the minimum value. When the system is operating, the optical output unit 12, under the control of the output wavelength controller 13a, outputs to the optical transmission line 30 light, which serves as main-signal light, having the wavelength nearest to the optimum wavelength detected by the optimum-wavelength detector 40 among the light beams output by the plurality of light sources $11_1$–$11_n$. The optical output unit 12, under the control of the monitoring-light combination controller 13c in this case, combines monitoring light with the main-signal light and outputs the result to the optical transmission line. By way of example, the monitoring light is light output from a light source neighboring the present light source.

During system operation also the optimum-wavelength detector 40 controls the detection of optimum wavelength, detects (1) the direction in which the zero-dispersion wavelength fluctuates and (2) the fact that the zero-dispersion wavelength has shifted to a wavelength intermediate the wavelength of the main-signal light and the wavelength of the neighboring light source, these being detected from the intensity of a specific frequency component in a baseband spectrum signal of the received main-signal light and the intensity of a specific frequency component in a baseband spectrum signal of monitoring light, and notifies the output wavelength controller 13a in the optical transmitter 10 of the result of detected. As a result, the optical output unit 12, in response to control by the output wavelength controller 13a, switches the light output to the optical transmission line 30 from the light of the present light source to the light of the neighboring light source. Control for wavelength-dispersion compensation is thenceforth performed in similar fashion.

Thus, wavelength dispersion of the optical transmission line can be compensated for accurately by combining monitoring light with main-signal light, detecting whether the zero-dispersion wavelength has fluctuated in the direction of longer wavelength or shorter wavelength and whether the zero-dispersion wavelength has become a wavelength intermediate the wavelengths of the neighboring light sources, and changing over the light source when the zero-dispersion wavelength has become a wavelength intermediate the wavelengths of the neighboring light sources.

Further, when the zero-dispersion wavelength has shifted to a wavelength intermediate the wavelength of the present light source and the wavelength of the neighboring light source, the light output to the optical transmission line is switched from the light of the present light source to the light of the neighboring light source. As a result, it is possible to eliminate or reduce signal delay before and after wavelength switching, thereby preventing signal degradation.

Further, when light sources are changed over, wavelength can be changed over without instantaneous interruption of light by gradually reducing the amount of current injected into the present light source and gradually increasing the amount of current injected into the neighboring light source. Similarly, when light sources are changed over, wavelength can be changed over without instantaneous interruption of light and signal interruption can be prevented by outputting light from the present light source and light from the neighboring light source to the optical transmission line simultaneously and then halting the output of light to the optical transmission line from the present light source.

Further, by making the polarization of main-signal light orthogonal to the polarization of monitoring light and sending the main-signal light and monitoring light to the optical transmission line while maintaining this state of orthogonal polarization, it is possible to prevent beats produced between signals of neighboring wavelengths and to improve detection accuracy in the optimum-wavelength detector.

Further, two waves of monitoring light are used, the intensities of specific frequency components contained in the main-signal light and in these two waves of monitoring light are compared to thereby detect a range of wavelengths in which the optimum wavelength is included, the timing of changeover of the main-signal light is detected as being the moment at which the intensity ratio of two wavelengths bracketing the optimum wavelength has attained a set value, and the main signal is changed upon in response to such detection. If two wave of monitoring-light are thus used, it is unnecessary to constantly monitor an increase or decrease in the intensity of the specific component in each monitoring light beam; it will suffice to compare the absolute values of the intensities of specific components of three waves at a certain time.

(e) Overview of Fourth Aspect (Enabling any Type of Optical Modulation Scheme to be Supported)

(1) An optimum-wavelength detector detects, as optimum wavelength, the wavelength for which the intensity of a specific frequency component contained in a baseband spectrum signal of received light is minimum and outputs the light of this detected optimum wavelength to an optical transmission line during system operation.

(2) Or, in another arrangement, the optimum-wavelength detector detects, as optimum wavelength, the wavelength for which the intensity of a specific frequency component contained in a baseband spectrum signal of received light is maximum and a transmitter outputs the light of this detected optimum wavelength to the optical transmission line during system operation.

(3) Or, in another arrangement, a dispersion add-on unit is provided in front of the optimum-wavelength detector. Prior to system operation, the optimum-wavelength detector detects a wavelength $\lambda$max for which the intensity of a specific frequency component contained in a baseband spectrum signal of received light, which enters via the dispersion add-on unit, is maximum. During system operation, a transmitter outputs, to the optical transmission line, light of a wavelength so that the wavelength of the light that enters the optimum-wavelength detector via the dispersion add-on unit becomes $\lambda$max. In this case, the wavelength of light output to the optical transmission line becomes a wavelength for which the intensity of the specific frequency component contained in the baseband spectrum signal of the receiving light is minimized.

(4) Or, in another arrangement, a dispersion add-on unit is provided in front of the optimum-wavelength detector. Prior to system operation, the optimum-wavelength detector detects a wavelength $\lambda$min for which the intensity of a specific frequency component contained in a baseband spectrum signal of received light, which enters via the dispersion add-on unit, is minimum. During system operation, a transmitter outputs, to the optical transmission line, light of a wavelength so that the wavelength of the light that enters the optimum-wavelength detector via the dispersion add-on unit becomes $\lambda$min. In this case, the wavelength of light output to the optical transmission line becomes a wavelength for which the intensity of the specific frequency component contained in the baseband spectrum signal of the receiving light is maximized.

The characteristic of the intensity of the specific frequency component differs depending upon whether the optical modulation scheme is NRZ modulation, OTDM modulation or RZ modulation. Detection of optimum wavelength is possible with NRZ modulation by detecting the minimum portion at the foot of the peak of the characteristic of the intensity of the specific frequency component, with OTDM modulation by detecting the valley between two peaks and with RZ modulation by detecting a maximum value. Accordingly, by applying any of (1) to (4) above depending upon the optical modulation scheme, light of the zero-dispersion wavelength or light of a wavelength closest to this wavelength can be output to an optical transmission line.

(f) Overview of Fifth Aspect (Wavelength Multiplexing)

A wavelength-dispersion compensating function is provided to a wavelength multiplexing optical transmission system having a plurality of data transmitters, a multiplexer for combining light of different wavelengths output by these transmitters and sending the resulting light to an optical transmission line, a demultiplexer for separating light, which has been received from the optical transmission line, according to wavelength, and a plurality of receivers for identifying the data from the received light of each of the wavelengths output by the demultiplexer. More specifically, each transmitter combines and transmits main-signal light and monitoring light, each receiver detects the timing of main-signal light changeover in dependence upon fluctuation of the respective zero-dispersion wavelength, and each transmitter adopts, as main-signal light and at this timing, light generated by a light source neighboring the light source which generates the main-signal light.

(B) Principles of the Present Invention (a) Use of Multiple Light Sources

The present invention provides an optical transmission system and an optical transmitter in which use is made of multiple light sources for generating light of different wavelengths, and light of a wavelength from a prescribed light source having the optimum transmission characteristic in regard to wavelength dispersion exhibited by an optical transmission line is output to this optical transmission line, thereby compensating for dispersion.

(b) Use of a Semiconductor Array Laser or Discrete Semiconductor Lasers

The light source is a semiconductor array laser (Sasaki et al., "Multi-wavelength MQW-DBR laser array using MOVPE-selected growth", 1994, Electronic Information Communication Society, Autumn Meeting SC-2-2), which includes integrated lasers having a plurality of oscillation wavelengths, or a plurality of juxtaposed discrete semiconductor lasers of different wavelengths used in already existing optical communications systems.

(c) Dispersion Compensation When Optimum Wavelength is Known

If the system is one in which the optimum wavelength (e.g., zero-dispersion wavelength) is already known and a change in wavelength is small in comparison with the dispersion tolerance, light having a wavelength nearest to this optimum wavelength is output to the optical transmission line.

(d) Dispersion Compensation When Optimum Wavelength is Unknown and Change in Wavelength is Small If the system is one in which the optimum wavelength is unknown and a change in wavelength is small in comparison with the dispersion tolerance, then, before the optical transmission system starts operating, the light beams of different wavelengths generated by the plurality of light sources are successively output to the optical transmission line and the optimum wavelength is detected. When the system is in operation, light generated by the light source having a wavelength nearest to this detected optimum wavelength is output to the optical transmission line.

(e) Dispersion Compensation When Optimum Wavelength is Unknown and Change in Wavelength is Large If the system is one in which the optimum wavelength is unknown and a change in wavelength is large in comparison with the dispersion tolerance, then, before the optical transmission system starts operating, the light beams of different wavelengths generated by the plurality of light sources are successively output to the optical transmission line and the optimum wavelength is detected. When the system is in operation, light generated by the light source having a wavelength nearest to this detected optimum wavelength is output to the optical transmission line.

During operation of the system, the wavelength of the light output to the optical transmission line is changed minutely so that a new optimum wavelength (zero-dispersion wavelength) that is the result of aging can be detected. The optical transmitter changes over the light source in such a manner that the light of the optimum wavelength detected during system operation is output to the optical transmission line.

(f) Different Dispersion Compensation When Optimum Wavelength is Unknown and Change in Wavelength is Large If the system is one in which the optimum wavelength is unknown and a change in wavelength is large in comparison with the dispersion tolerance, then, before the optical transmission system starts operating, the light beams of different wavelengths generated by the plurality of light sources are successively output to the optical transmission line and the optimum wavelength is detected. When the system is in operation, light generated by the light source having a wavelength nearest to this detected optimum wavelength is output to the optical transmission line as main-signal light.

Further, during operation of the system, monitoring light is combined with the main-signal light output to the optical transmission line, and the resulting light is output to the optical transmission line so that direction and amount of fluctuation of the optimum wavelength (zero-dispersion wavelength) due to aging can be detected. The optical transmitter changes over the light source from the current light source to a neighboring light source if the zero-dispersion wavelength fluctuates owing to aging or the like and becomes equal to a wavelength intermediate the present light source and the neighboring light source.

(g) Light-source Switching Method

Figure 4:
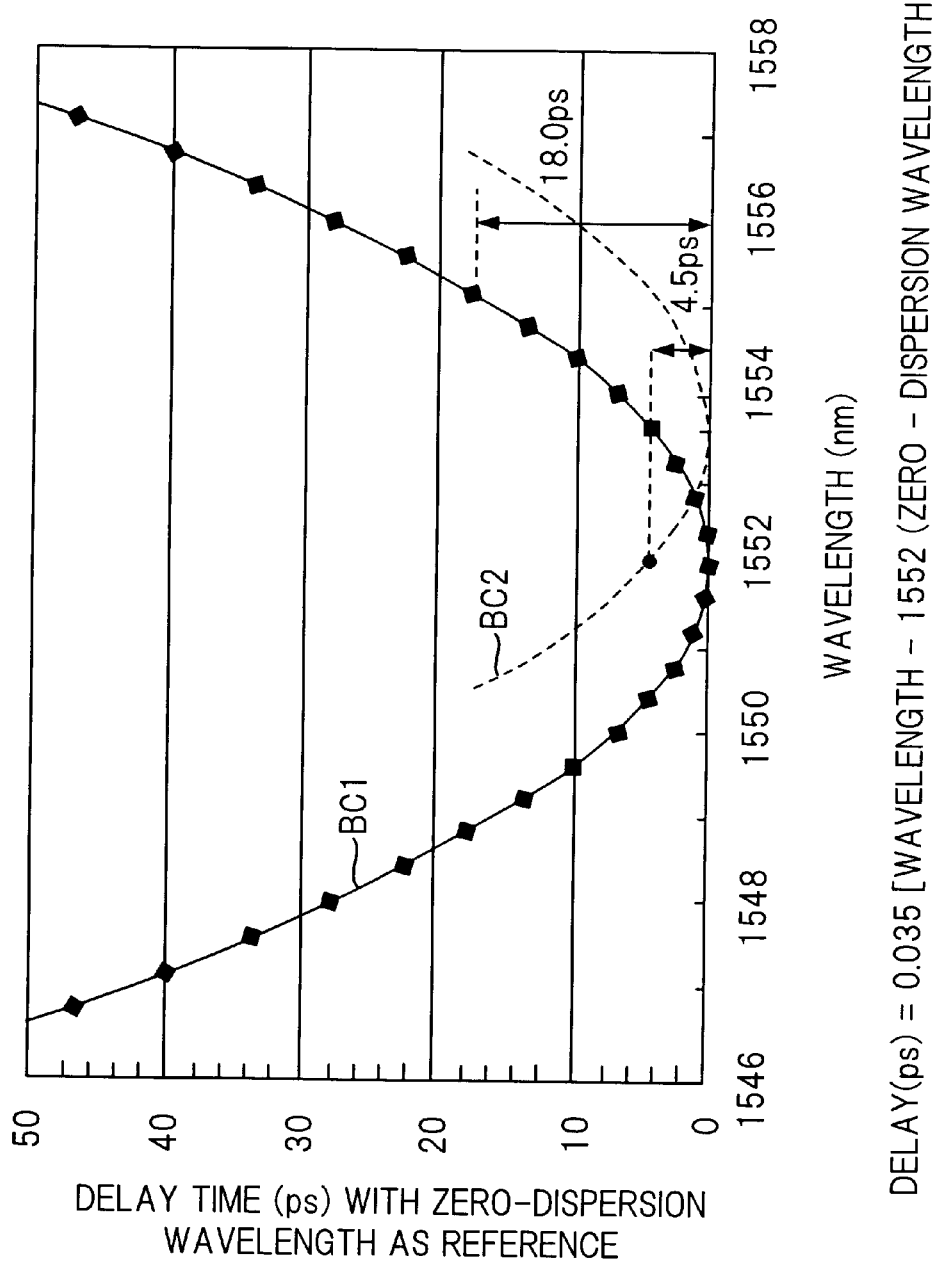
FIG. 4 is a graph showing the relationship between wavelength and delay time.

FIG. 4 illustrates a group delay characteristic when the reference is a zero-dispersion wavelength $\lambda_0$ of 1552 nm over a transmission distance of 50 km. If we let the second-order dispersion of an optical fiber be represented by $$dD/d\lambda = 0.07 \text{ (ps/nm2/km)} \quad (1)$$

then dispersion D will be $$D = 0.07(\lambda - \lambda_0)(\text{ps/nm/km}) \quad (2)$$

If Equation (2) is integrated, then delay $T_D$ becomes as follows:

$$T_D = 0.07/2 \times (\lambda - \lambda_0)^2 + \alpha \quad (3)$$
$$= 0.035(\lambda - \lambda_0)^2 \text{ (ps/km)}$$

The group delay characteristic is obtained from Equation (3). It should be noted that $\alpha = 0$ is assumed to hold.

From Equation (3), the group delay characteristic indicates a curve of second degree centered on the zero-dispersion wavelength $\lambda_0$. If $\lambda_0 = \lambda_1$ holds, the characteristic becomes a quadratic curve BC1. If $\lambda_0 = \lambda_2$ holds, the characteristic becomes a curve BC2 of second degree. A curve of second degree is symmetrical. Therefore, if the wavelength of the output light is switched from $\lambda_1$ to $\lambda_2$ when $\lambda_0$ becomes precisely the center wavelength $[\lambda_0 = (\lambda_1 + \lambda_2)/2]$ between $\lambda_1$ and $\lambda_2$ in a case where the zero-dispersion wavelength $\lambda_0$ is changing from $\lambda_1$ (=1552 nm) to $\lambda_2$ (=1553.6 nm), then the signal delays before and after the wavelength changeover become equal and small, and a discontinuous change in the group delay does not occur before and after the wavelength changeover. It should be noted that $\lambda_1$, $\lambda_2$ represent the wavelengths of light generated by two neighboring light sources. In general, if $\lambda_{n-1}$, $\lambda_n$ represent the wavelengths of neighboring light sources, then the zero-dispersion wavelength $\lambda_0$ when the light sources are changed over is represented by the following:

$$\lambda_0 = \lambda_{n-1} + \Delta\lambda/2 \ (\lambda_0 > \lambda_{n-1})$$
$$= \lambda_n - \Delta\lambda/2 \ (\lambda_0 < \lambda_n)$$

$$\Delta\lambda = |\lambda_{n-1} - \lambda_n|$$

If the above-cited equation is not used and wavelength of the output light is changed over from $\lambda_1$ to $\lambda_2$ when the zero-dispersion wavelength $\lambda_0$ has changed from $\lambda_1$ to the wavelength $\lambda_2$, which is 1.6 nm distant from $\lambda_1$, signal delay before and after the wavelength changeover becomes 4.5 ps, as shown in FIG. 4. This is a value that is not negligible when the transmission speed is 40 Gbps (1 bit=25 ps), and there is the danger that this delay will cause signal degradation.

(h) Prevention of Signal Interruption at Light-source Changeover

Figure 5A:
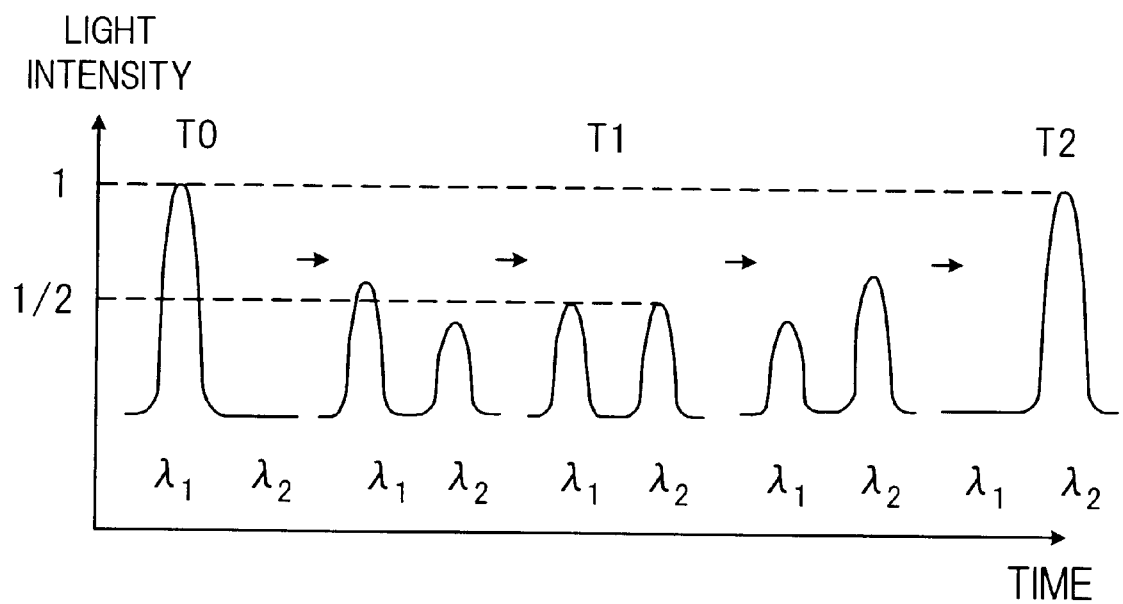
FIGS. 5A and 5B are diagrams useful in describing methods of switching among light sources.
Figure 5B:
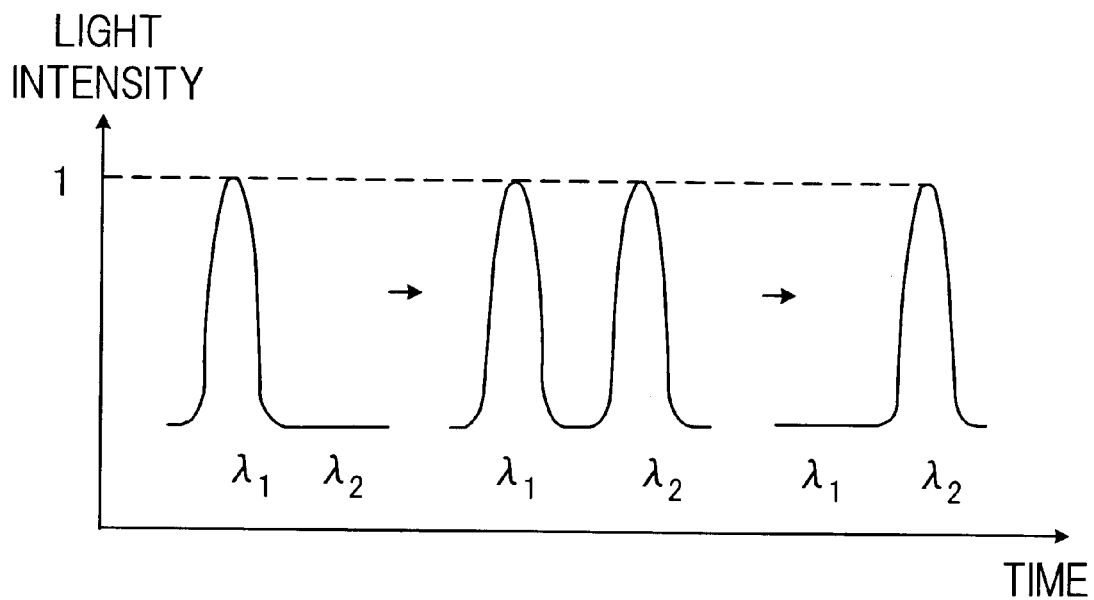

In a case where the wavelength of the optical signal output to the optical transmission line is changed over from $\lambda_1$ to $\lambda_2$, signal interruption will occur if the light sources are merely changed over by a switch or the like. According to the present invention, signal interruption is prevented by specially contriving a method of changing over the light sources. FIGS. 5A and 5B are diagrams useful in describing a method of changing over light sources without causing signal interruption. FIG. 5A shows a first light-source changeover method in which light sources are changed over while holding constant the total light-intensity signal output to the optical transmission line without controlling an optical amplifier. FIG. 5B shows a second light-source changeover method in which light sources are changed over while holding constant the total light-intensity signal output to the optical transmission line using an optical amplifier.

Figure 6:
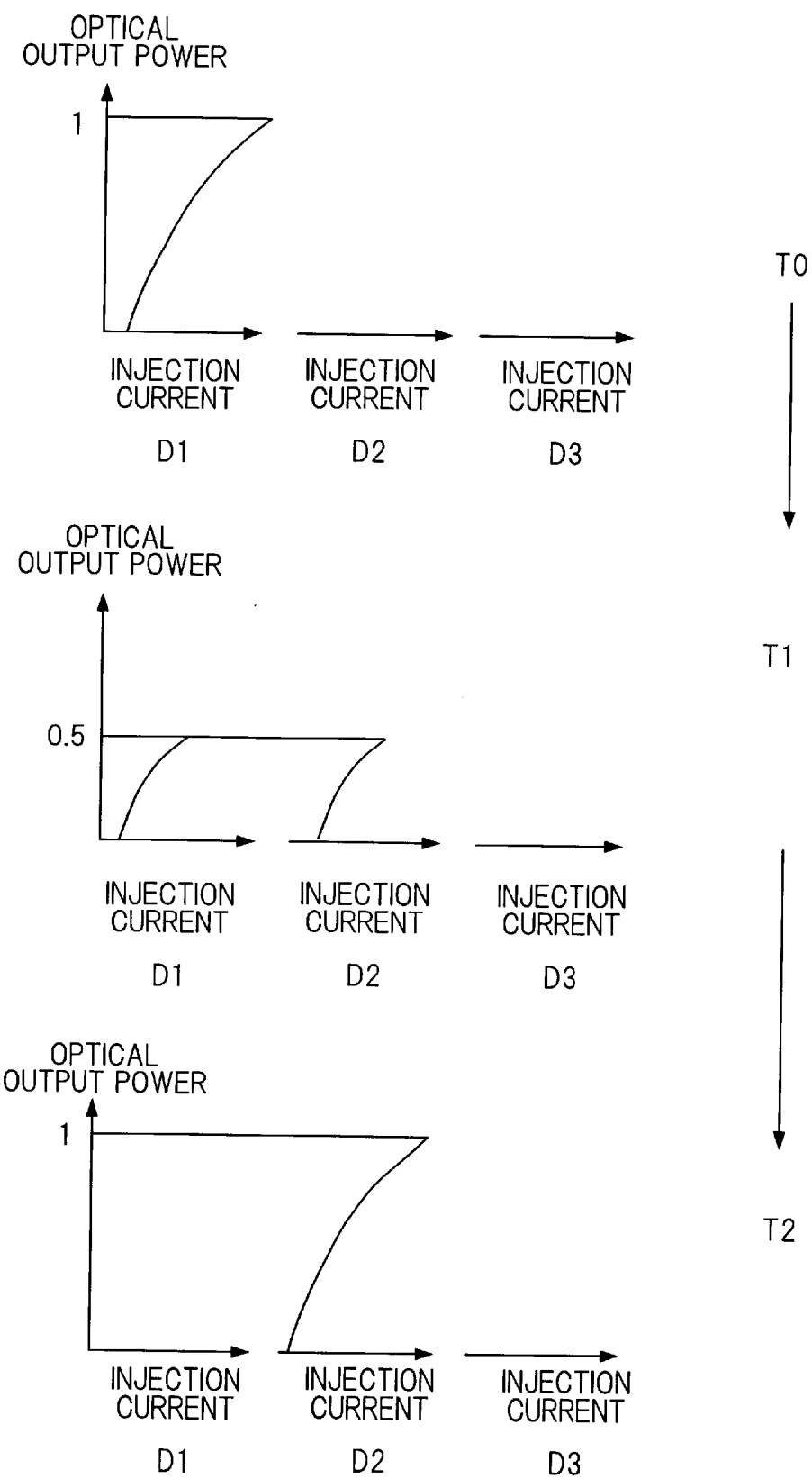
FIG. 6 is a diagram useful in describing a method of controlling laser injection current when switching among light-source wavelengths.

FIG. 6 is a diagram useful in describing control of current injected into each light-source driver in the first light-source changeover method mentioned above. With a light source D1 of wavelength $\lambda_1$ emitting light ($T_0$), current injected into a light source D2 of wavelength $\lambda_2$ is gradually increased to cause this light source to emit light ($T_1$). At this time the light intensity of light source D1 of wavelength $\lambda_1$ is weakened in such a manner that the sum of the light intensities of both light sources D1, D2 of wavelengths $\lambda_1$, $\lambda_2$ will be constant at all times. Thenceforth the light intensity of light source D2 of wavelength $\lambda_2$ is gradually increased and the light intensity of light source D1 of wavelength $\lambda_1$ gradually decreased, whereby wavelength changeover from $\lambda_1$ to $\lambda_2$ can be performed without signal interruption (T2).

The second light-source changeover method is such that when an optical amplifier is used, a sudden change in input light intensity to the optical amplifier can be avoided. In addition, it is possible to prevent the occurrence of a light surge caused by the optical amplifier. More specifically, as shown in FIG. 5B, the light source of wavelength $\lambda_2$ is cause to emit light at the same time that the light source of wavelength $\lambda_1$ is emitting light, then the light source of wavelength $\lambda_1$ is extinguished. In the case of this light-source changeover, the ratio of the intensities of $\lambda_1$, $\lambda_1+\lambda_2$, $\lambda_2$ is 1:2:1. Accordingly, the gain of the optical amplifier is regulated to perform feedback control in such a manner that the output light intensity is rendered constant.

(i) Maximum Wavelength Spacing of Light Sources

Figure 7:
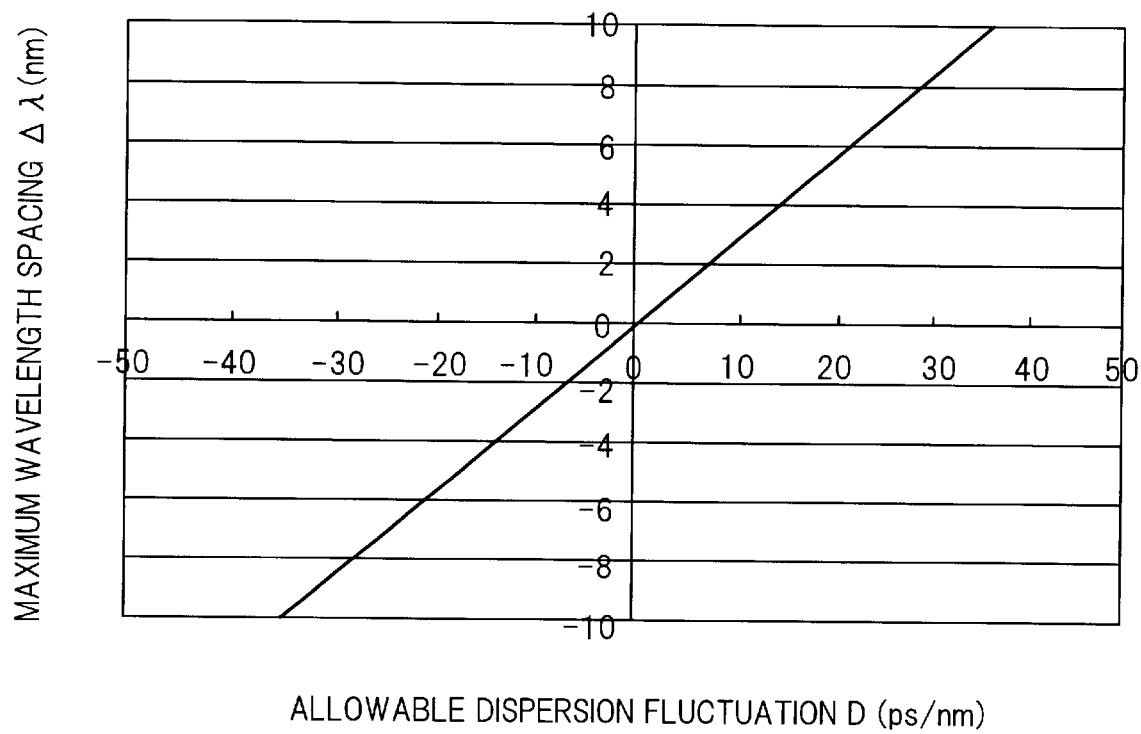
FIG. 7 is a graph showing the relationship between maximum wavelength spacing of light sources and dispersion compensation precision.

FIG. 7 illustrates the relationship between maximum wavelength spacing ($\Delta\lambda=\lambda_{n-1}-\lambda_n$) of neighboring light sources and dispersion compensation precision (=dispersion value D) when the zero-dispersion wavelength is 1552 nm. The higher the transmission speed, the finer the dispersion compensation precision necessary for the system, i.e., the finer the amount of change in the dispersion value when light sources are changed over between neighboring wavelengths, is required to be. If the zero-dispersion wavelength $\lambda_0$ is 1552 nm and the second-order dispersion of the optical fiber is 0.07 (ps/nm$^2$/km) for a transmission distance of 50 km, the maximum wavelength spacing $\Delta\lambda$ (nm) of the light sources with respect to allowable fluctuation D of dispersion (ps/nm) is as follows based upon Equation (2):

$$\Delta\lambda \text{ (nm)}=D \text{ (ps/nm)}/0.07 \text{ (ps/nm}^2\text{/km)}\cdot 50 \text{ (km)} \qquad (4)$$

so that the wavelength spacing of the light sources can be determined from Equation (4).

Figure 8:
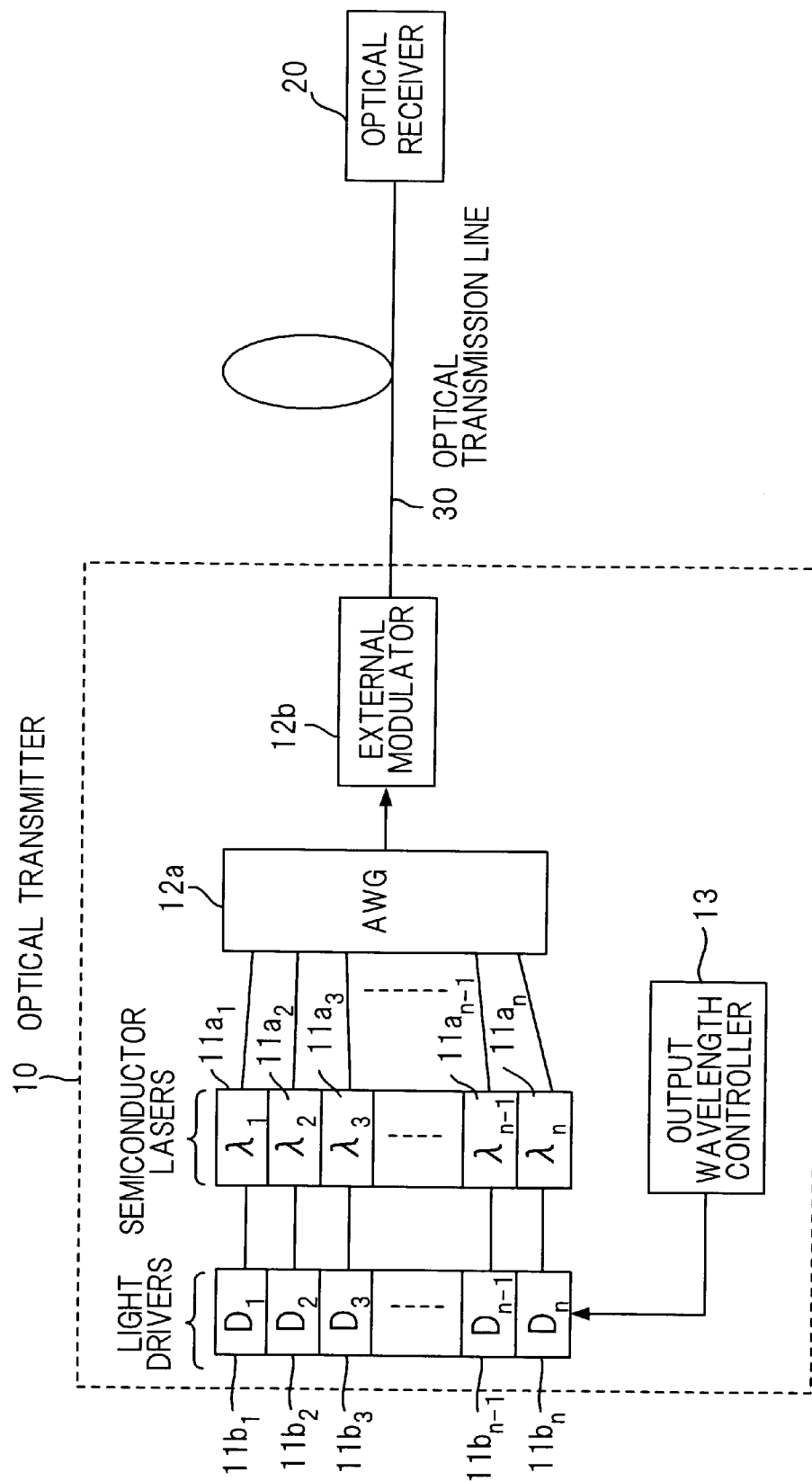
FIG. 8 is a diagram illustrating a first example of the construction of an optical transmitter having a plurality of light sources (in which semiconductor lasers are provided as the light sources and an arrayed waveguide grating is used for multiplexing light)

(C) Embodiments (a) Construction of Transmitter Having Plurality of Light Sources (a-1) First Embodiment of Optical Transmitter FIG. 8 is a diagram illustrating the construction of a first embodiment of an optical transmitter having semiconductor lasers as the plurality of light sources. Shown in FIG. 8 are the optical transmitter 10, the optical receiver 20 and the optical transmission line 30. The optical transmitter 10 includes a plurality of light sources $11a_1$–$11a_n$ having different wavelengths ($\lambda_1$–$\lambda_n$) and formed by a plurality of discrete semiconductor lasers; drivers $11b_1$–$11b_n$ for driving respective ones of the semiconductor lasers; and an arrayed waveguide grating (AWG) 12a for outputting light generated by each light source. The arrayed waveguide grating 12a, which functions as a multiplexer/demultiplexer, multiplexes light of different wavelengths entering from a plurality of waveguides and outputs the light as wavelength-multiplexed light. Conversely, if wavelength-multiplexed light enters in the opposite direction, the arrayed waveguide grating 12a separates the light wavelength by wavelength and outputs the separated light to a respective one of the waveguides. Accordingly, if the arrayed waveguide grating 12a is used as a multiplexer and only a prescribed light source emits light, then the light from the light source can be output.

The optical transmitter 10 further includes an external modulator 12b in which the light output from the arrayed waveguide grating 12a is on/off-modulated by a 40-Gbps signal. By way of example, the external modulator 12b is an LiNbO$_3$ Mach-Zehnder modulator or an EA (electro-absorption) modulator. The optical transmitter 10 further includes an output wavelength controller 13 for causing prescribed ones of the drivers $11b_1$–$11b_n$ to drive the corresponding semiconductor lasers into light emission, thereby changing the wavelength of the light output to the optical transmission line.

Accordingly, if the output wavelength controller 13 acquires the zero-dispersion wavelength of the optical transmission line 30, the controller 13 drives the light source that will generate light having a wavelength nearest to this zero-dispersion wavelength so that this light is output to the optical transmission line to compensate for dispersion.

(a-2) Second Embodiment of Optical Transmitter

FIG. 9 is a diagram illustrating the construction of a second embodiment of an optical transmitter having semiconductor lasers as the plurality of light sources. Components identical with those of the first embodiment shown in FIG. 8 are designated by like reference characters. This embodiment differs from the first embodiment in that a star coupler 12c is used instead of the arrayed waveguide grating 12a for multiplexing light; the two embodiments are exactly the same in other aspects of construction and in terms of operation.

(a-3) Third Embodiment of Optical Transmitter

Figure 10A:
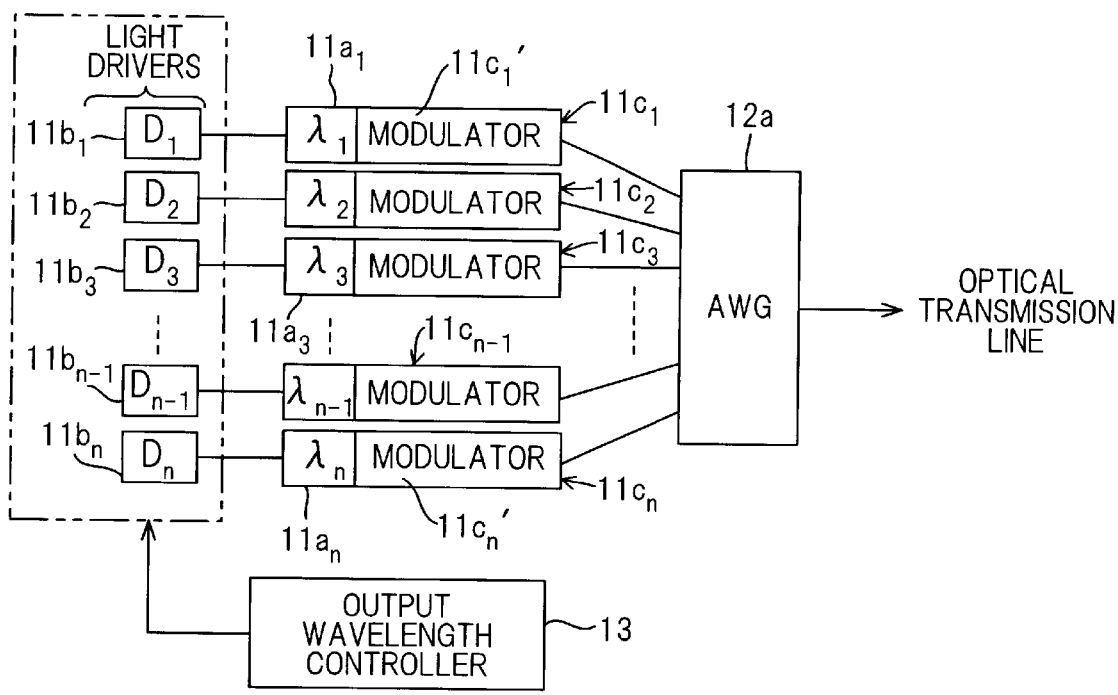
FIGS. 10A and 10B are diagrams illustrating a third example of the construction of an optical transmitter having a plurality of light sources (in which semiconductor lasers are provided as the light sources and MI-DFB-LD-type lasers are used in modulators)
Figure 10B:
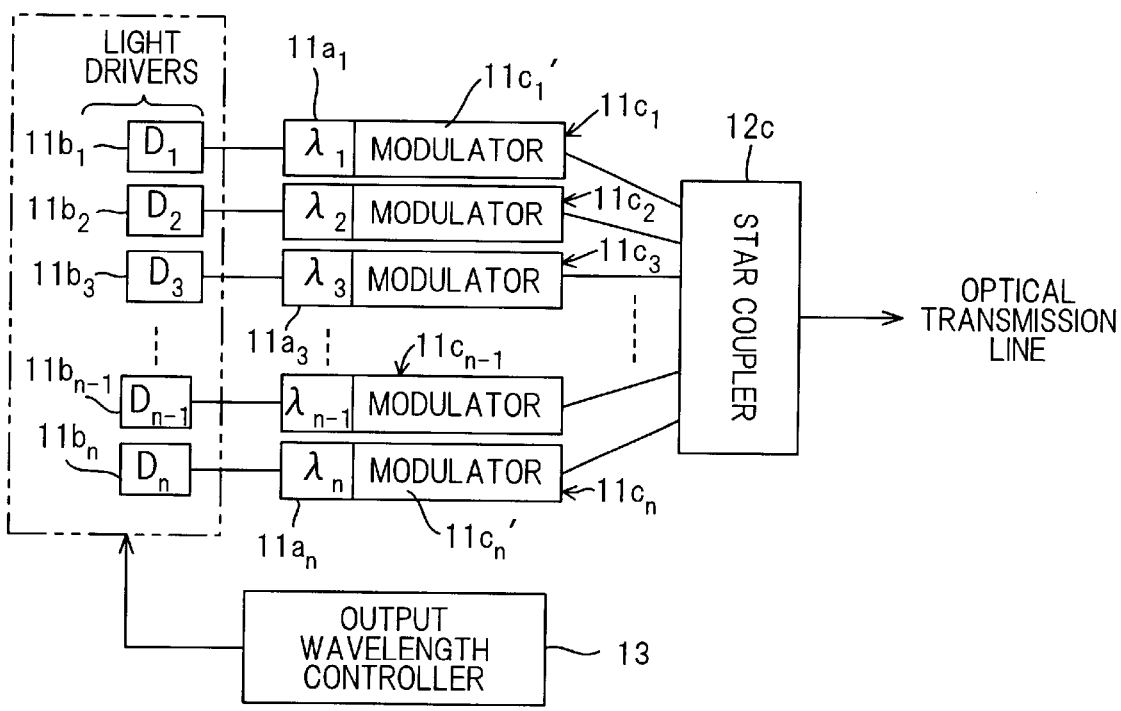

FIGS. 10A and 10B are diagrams showing a third embodiment of an optical transmitter having semiconductor lasers as the plurality of light sources. Components identical with those shown in FIGS. 8 and 9 are designated by like reference characters.

The optical transmitter of FIG. 10A differs from that of FIG. 8 in that lasers (MI-DFB-LD) $11c_1$–$11c_n$ with built-in modulators are used as the semiconductor lasers and the external modulator 12b is omitted. The semiconductor lasers with built-in modulators are obtained by forming semiconductor lasers $11a_1$–$11a_n$ and modulator portions $11c_1'$–$11c_n'$ on the same substrate.

The optical transmitter of FIG. 10B differs from that of FIG. 9 in that lasers (MI-DFB-LD) $11c_1$–$11c_n$ with built-in modulators are used as the semiconductor lasers and the external modulator 12b is omitted.

(a-4) Fourth Embodiment of Optical Transmitter

FIG. 11 is a diagram illustrating the construction of a fourth embodiment of an optical transmitter having a semiconductor array laser as the plurality of light sources. Components identical with those of the first embodiment shown in FIG. 8 are designated by like reference characters. This embodiment differs from the first embodiment in that a semiconductor array laser 11d is used instead of the semiconductor lasers as the plurality of light sources. In accordance with the fourth embodiment, lasers having the required wavelength spacing can be realized on one wafer, thereby lowering cost and reducing size.

(a-5) Fifth Embodiment of Optical Transmitter

FIG. 12 is a diagram illustrating the construction of a fifth embodiment of an optical transmitter having a semiconductor array laser as the plurality of light sources. Components identical with those of the second embodiment shown in FIG. 9 are designated by like reference characters. This embodiment differs from the second embodiment in that the semiconductor array laser 11d is used instead of the semiconductor lasers as the plurality of light sources.

(b) Dispersion Compensation When Optimum Wavelength is Known

If the system is one in which the optimum wavelength (e.g., zero-dispersion wavelength) is already known and a change in wavelength is small in comparison with the dispersion tolerance, light having the optimum wavelength is output to the optical transmission line, thereby making it possible to compensate for waveform degradation caused by dispersion exhibited by the optical transmission line.

FIG. 13 is a diagram showing the construction of a first embodiment of an optical transmission system which performs dispersion compensation when optimum wavelength is known. Shown in FIG. 13 are the optical transmitter 10, the optical receiver 20 and the optical transmission line 30. The optical transmitter 10 includes a plurality of light sources $11_1$–$11_n$ having different wavelengths ($\lambda_1$–$\lambda_n$) and constituted by a plurality of discrete semiconductor lasers or a semiconductor array laser; a multiplexer 12, which can comprise an arrayed waveguide grating, a star coupler or the like; and the external modulator 12b in which the light output from the arrayed waveguide grating 12 is on/off-modulated by a 40-Gbps signal. By way of example, the external modulator 12b is an LiNbO$_3$ Mach-Zehnder modulator or an EA (electro-absorption) modulator. The optical transmitter 10 further includes the output wavelength controller 13 for causing prescribed ones of the light sources to emit light, thereby changing the wavelength of the light output to the optical transmission line.

If the optimum wavelength, e.g., the zero-dispersion wavelength, is set, the output wavelength controller 13 causes light to be emitted only from the light source that generates light having a wavelength nearest to the zero-dispersion wavelength. The multiplexer 12 inputs the light output by this light source to the external modulator 12b, which on/off-modulates the input light by the 40-Gbps signal and outputs the modulated light to the optical transmission line 30.

Figure 14:
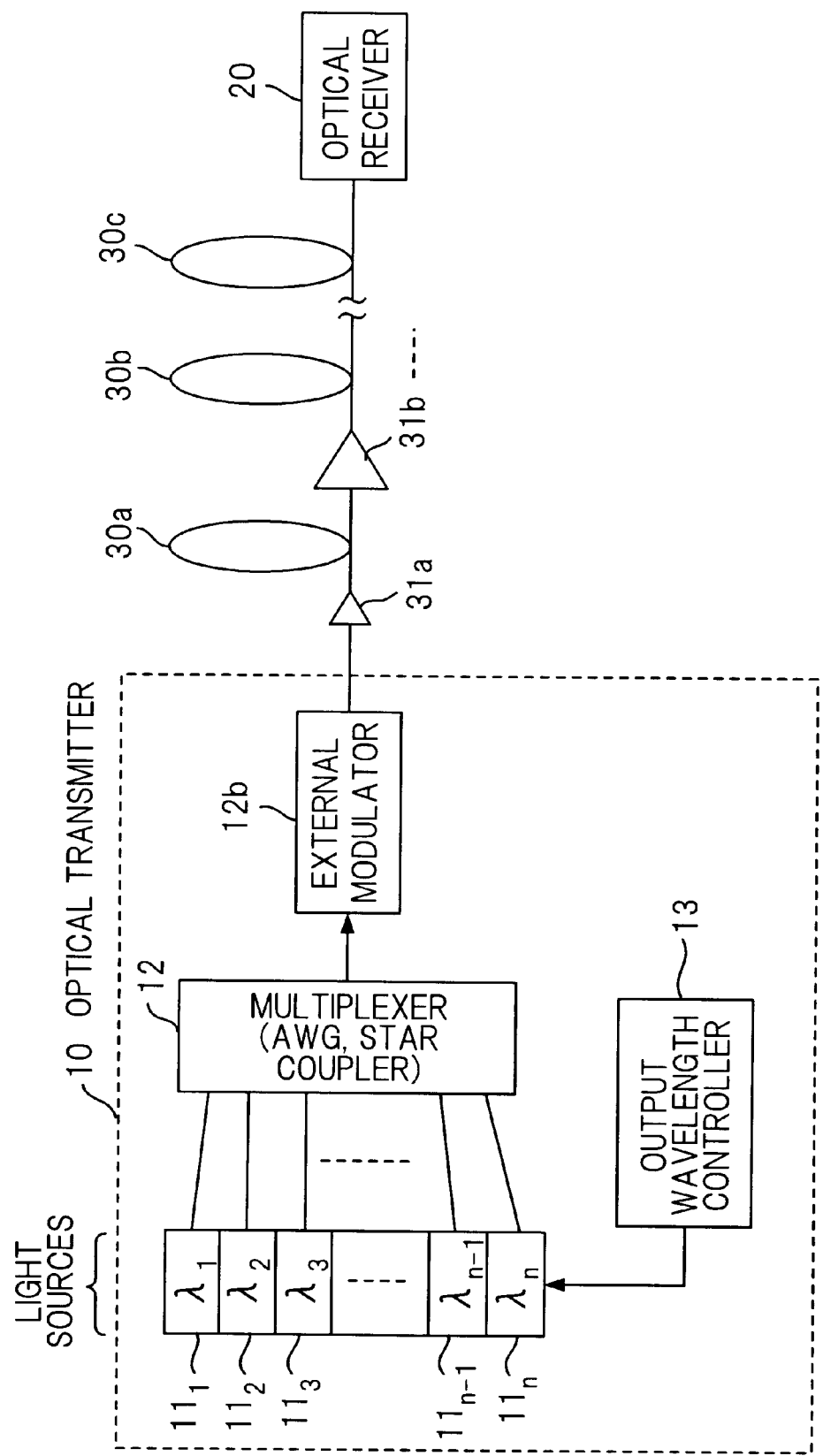
FIG. 14 is a diagram illustrating a modification (multiple-repeater transmission) of an embodiment in which dispersion compensation is performed in a case where optimum wavelength is already known.

FIG. 14 shows a modification of the first embodiment, in which components identical with those of the first embodiment are designated by like reference characters. Whereas the first embodiment shown in FIG. 13 is for a case where transmission is performed without a repeater, the present invention is applicable also to a case where multiple repeaters are used in transmission, as illustrated in FIG. 14. This modification includes optical transmission lines 30a–30n and repeaters 31a, 31b, . . . . Though transmission without repeaters is illustrated in the embodiments that follow, the present invention is applicable also to a case where multiple repeaters are used in transmission.

(c) Dispersion Compensation When Optimum Wavelength is Unknown and Change in Wavelength is Small If the system is one in which the optimum wavelength is unknown and a change in wavelength is small in comparison with the dispersion tolerance, then, (1) before the optical transmission system starts operating, light beams of different wavelengths generated by the plurality of light sources are successively output to the optical transmission line and the optimum wavelength is detected, and (2) when the system is in operation, light generated by the light source having a wavelength nearest to this detected optimum wavelength is output to the optical transmission line.

Figure 15:
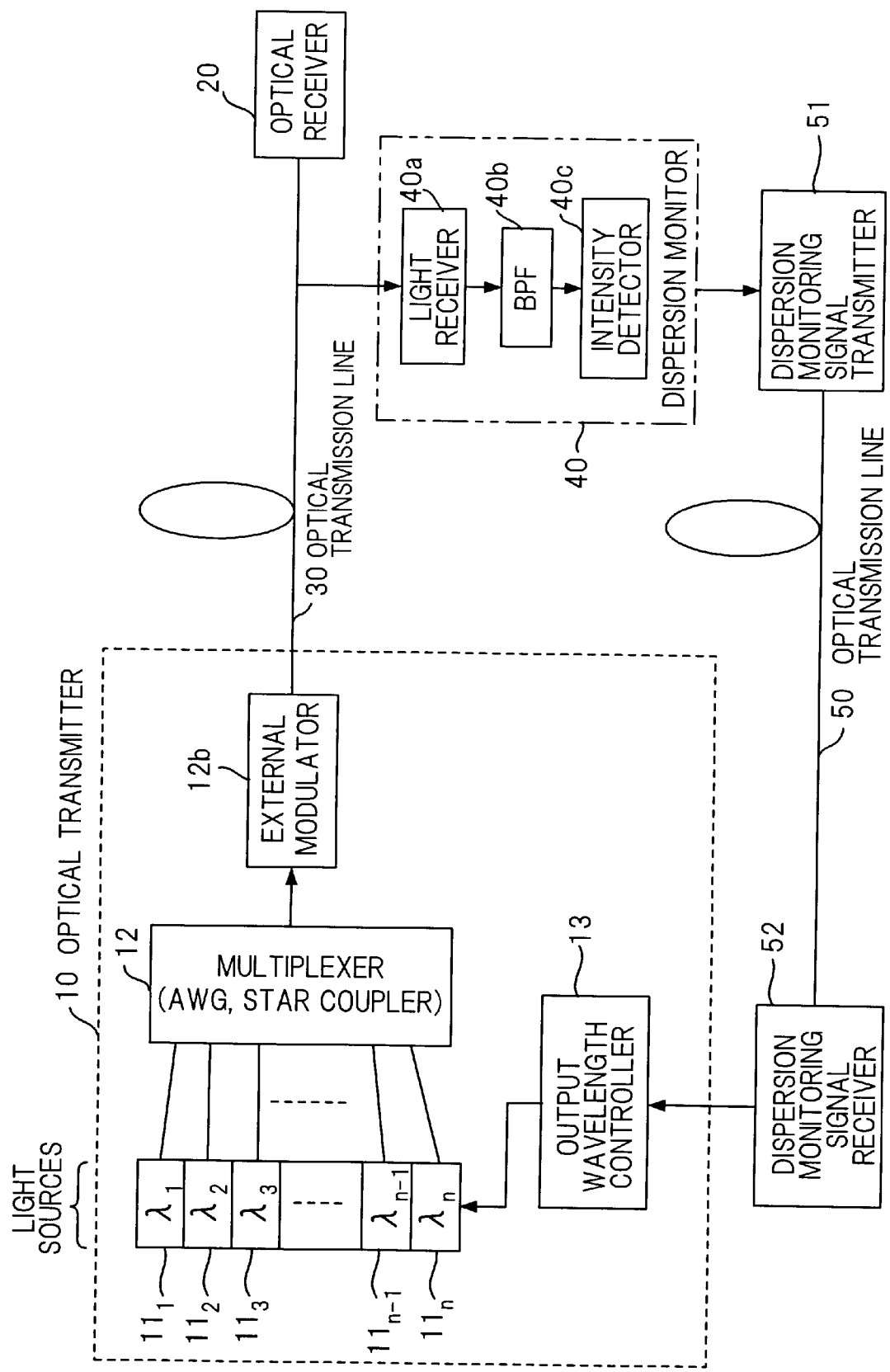
FIG. 15 is a diagram illustrating an embodiment in which dispersion compensation is performed in a case where optimum wavelength is not already known.

FIG. 15 is a diagram showing the construction of an optical transmission system which performs dispersion compensation when optimum wavelength is unknown and change in wavelength is small in comparison with dispersion tolerance. Shown in FIG. 15 are the optical transmitter 10, the optical receiver 20, the outgoing optical transmission line 30, the dispersion monitor (optimum-wavelength detector) 40 for detecting a wavelength (e.g., the zero-dispersion wavelength) whose transmission characteristic is optimum in regard to wavelength dispersion of the optical transmission line, the incoming optical transmission line 50, a dispersion monitoring signal transmitter 51 for transmitting the result of dispersion monitoring, and a dispersion monitoring signal receiver 52 for extracting the result of monitoring and inputting the result to the optical transmitter 10.

The optical transmitter 10 includes the plurality of light sources $11_1$–$11_n$ having different wavelengths ($\lambda_1$–$\lambda_n$) and constituted by a plurality of discrete semiconductor lasers or a semiconductor array laser; the multiplexer 12, which can comprise an arrayed waveguide grating, a star coupler or the like; the external modulator 12b in which the light output from the arrayed waveguide grating 12 is on/off-modulated by a 40-Gbps signal; the output wavelength controller 13 for causing prescribed ones of the light sources $11_1$–$11_n$ to emit light, thereby changing the wavelength of the light output to the optical transmission line, and outputting light of the optimum wavelength to the optical transmission line based upon the result of detection by the dispersion monitor 40.

If the wavelength of the light output to the optical transmission line 30 is equal to the zero-dispersion wavelength of the optical transmission line, the dispersion monitor 40 detects the optimum wavelength by utilizing the fact that the intensity of a specific frequency component of the received baseband spectrum signal is minimum. For example, if a 40-Gbps signal is transmitted, the specific frequency is 40 GHz (see FIGS. 76A–77B). The dispersion monitor 40 includes a light receiver 40a such as a photodiode for converting light, which has been branched from the optical transmission line 30, to an electric signal; a band-pass filter (BPF) 40b having the specific frequency as its center frequency and an intensity detector 40c for detecting the timing at which a specific frequency component, e.g., the 40-GHz component, attains the minimum value.

If the system is one in winch the optimum wavelength is known and a change in wavelength is small in comparison with the dispersion tolerance then, before the optical transmission system starts operating, the output wavelength controller 13 causes the light sources $11_1$–$11_n$ to emit light successively at prescribed intervals. As a result, the light multiplexer 12 successively inputs light of wavelengths $\lambda_1$–$\lambda_n$ generated by the plurality of light sources to the external modulator 12b, winch on/off modulates the input light of the different wavelengths $\lambda_1$–$\lambda_n$ by the 40-Gbps signal and outputs the modulated light to the optical transmission line 30.

The dispersion monitor 40 detects the timing at which the 40-GHz component intensity of the received baseband spectrum signal attained the minimum value and inputs the timing to the dispersion monitoring signal transmitter 51. The latter sends the timing data to the transmitting side via the optical transmission line 50, and the dispersion monitoring signal receiver 52 extracts the monitoring result (the timing data) and inputs this to the output wavelength controller 13. The latter identifies the zero-dispersion wavelength from the wavelength of the light output to the optical transmission line 30 at the timing at which the intensity of the specific frequency component attained the minimum value.

During system operation, the output wavelength controller 13 causes light to be emitted only from the light source that generates light having this zero-dispersion wavelength, so that the light having the zero-dispersion wavelength is output to the optical transmission line 30. As a result, light of a wavelength whose transmission characteristic is optimum in regard to wavelength dispersion of the optical transmission line 30 is output, thereby making it possible to compensate for dispersion.

Figure 16:
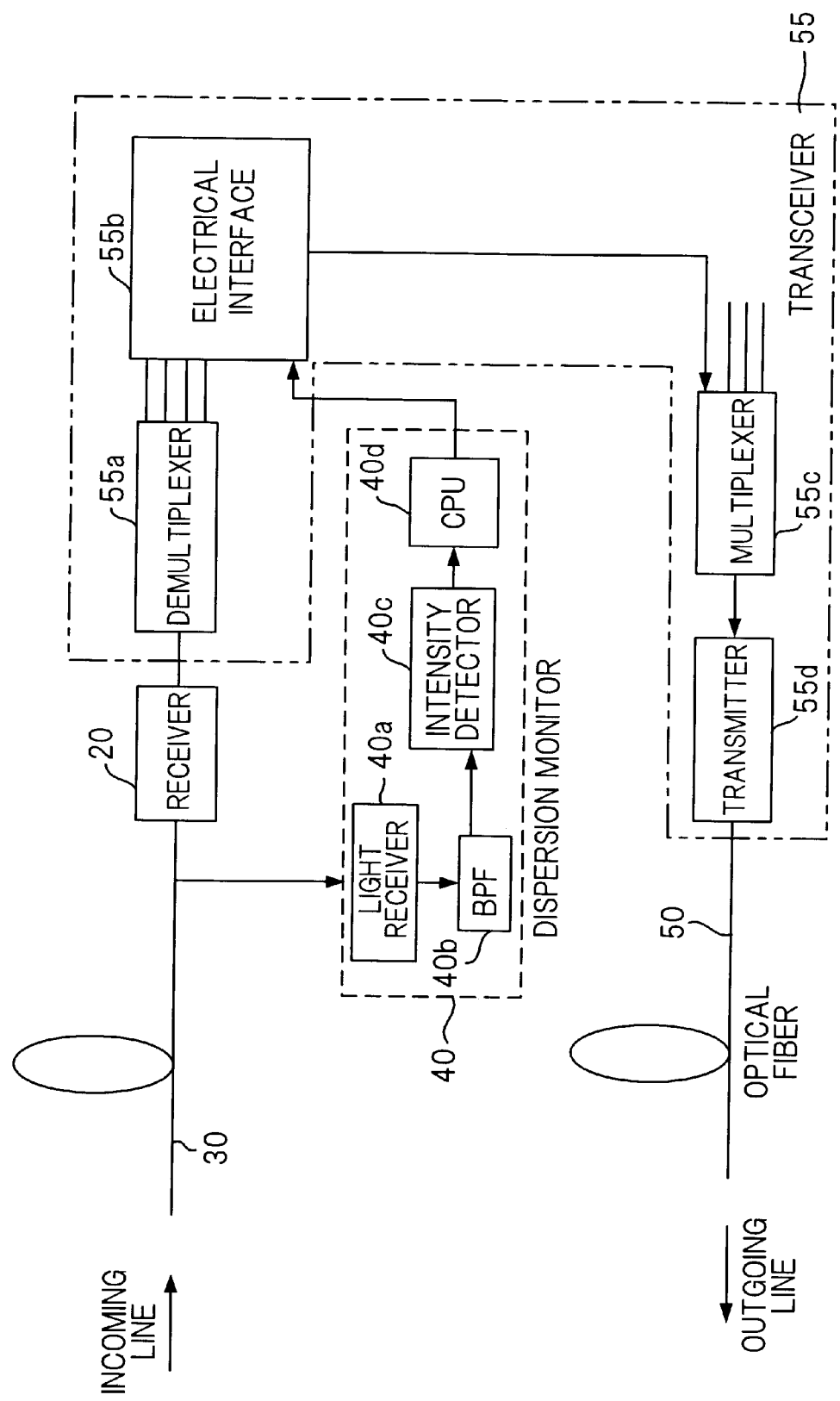
FIG. 16 is a diagram showing the feedback arrangement of a dispersion monitoring signal.

FIG. 16 is a diagram showing the construction of a transceiver 55 equipped with the dispersion monitoring signal transmitter 51 (FIG. 15). Shown in FIG. 16 are a demultiplexer 55a, an electrical interface (signal processor) 55b, a multiplexer 55c and a transmitter 55d. The electrical interface 55b accepts the monitoring result (timing data) that enters from a processor 40d of the dispersion monitor 40, inserts the data into the data section or overhead section of a transmission signal, sends the signal to the outgoing optical transmission line 50 via the multiplexer 55c and transmitter 55d. Thus, the dispersion monitoring signal transmitter 51 of FIG. 15 is implemented by the functions possessed by the electrical interface 55b, multiplexer 55c and transmitter 55d.

Figure 17:
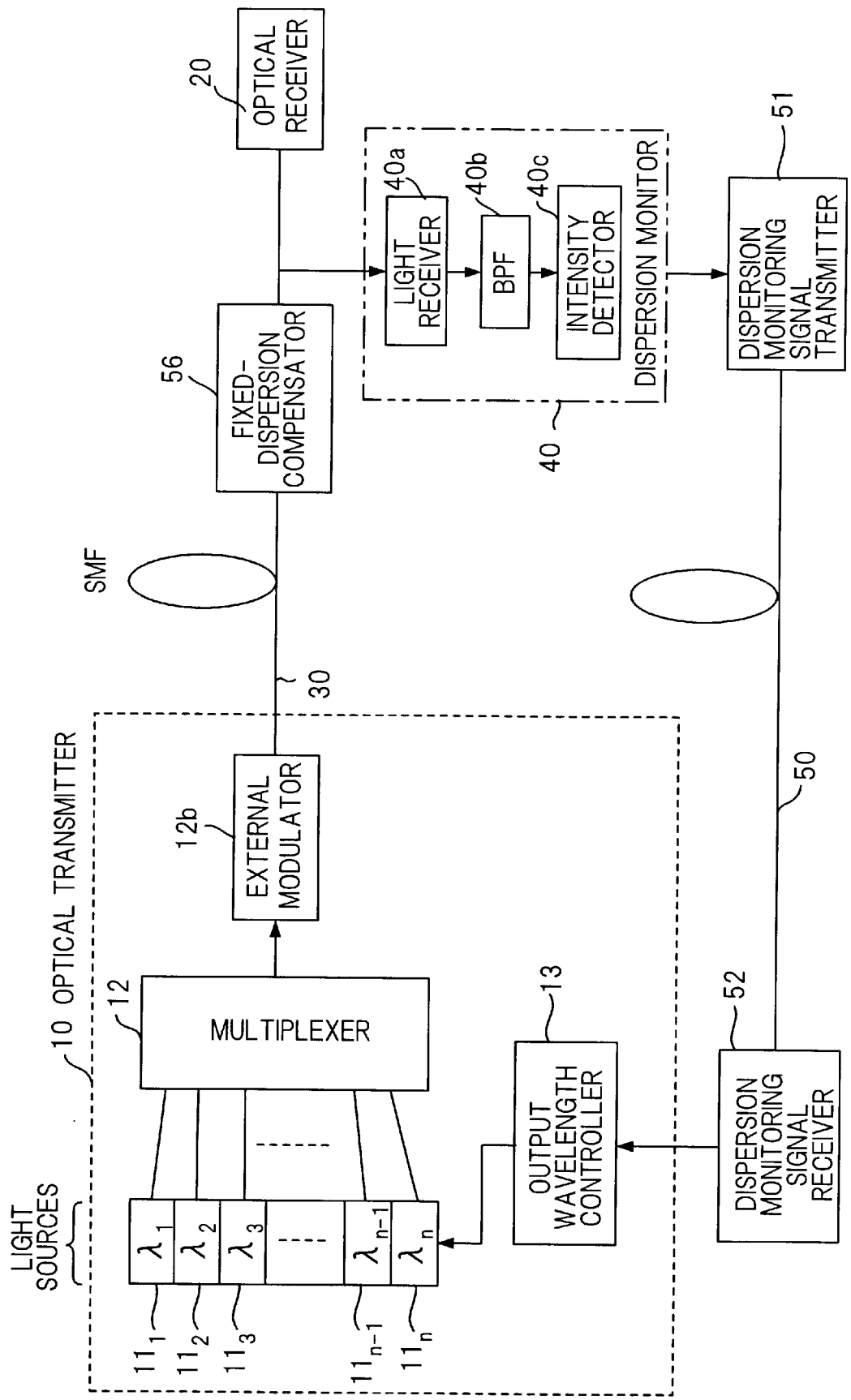
FIG. 17 is a diagram illustrating a modification (in which the transmission line is an SMF) for performing dispersion compensation in a case where a change in wavelength is small when optimum wavelength is unknown.

FIG. 17 is a modification of the embodiment illustrated in FIG. 15. This is an example in winch the dispersion compensation method of FIG. 15 is applied to an optical transmission system, winch has been subjected to approximately 100% dispersion compensation using a fixed-dispersion compensator 56, in a case where the optical transmission line 30 is a high-dispersion single-mode fiber (SMF). Even this 100 dispersion-compensated optical transmission system can be subjected to dispersion compensation by sweeping wavelength via light-source switching and detecting the zero-dispersion wavelength.

In the case of transmission using multiple repeaters, the fixed-dispersion compensator would be placed on the sending side, receiving side and repeater side.

Figure 18:
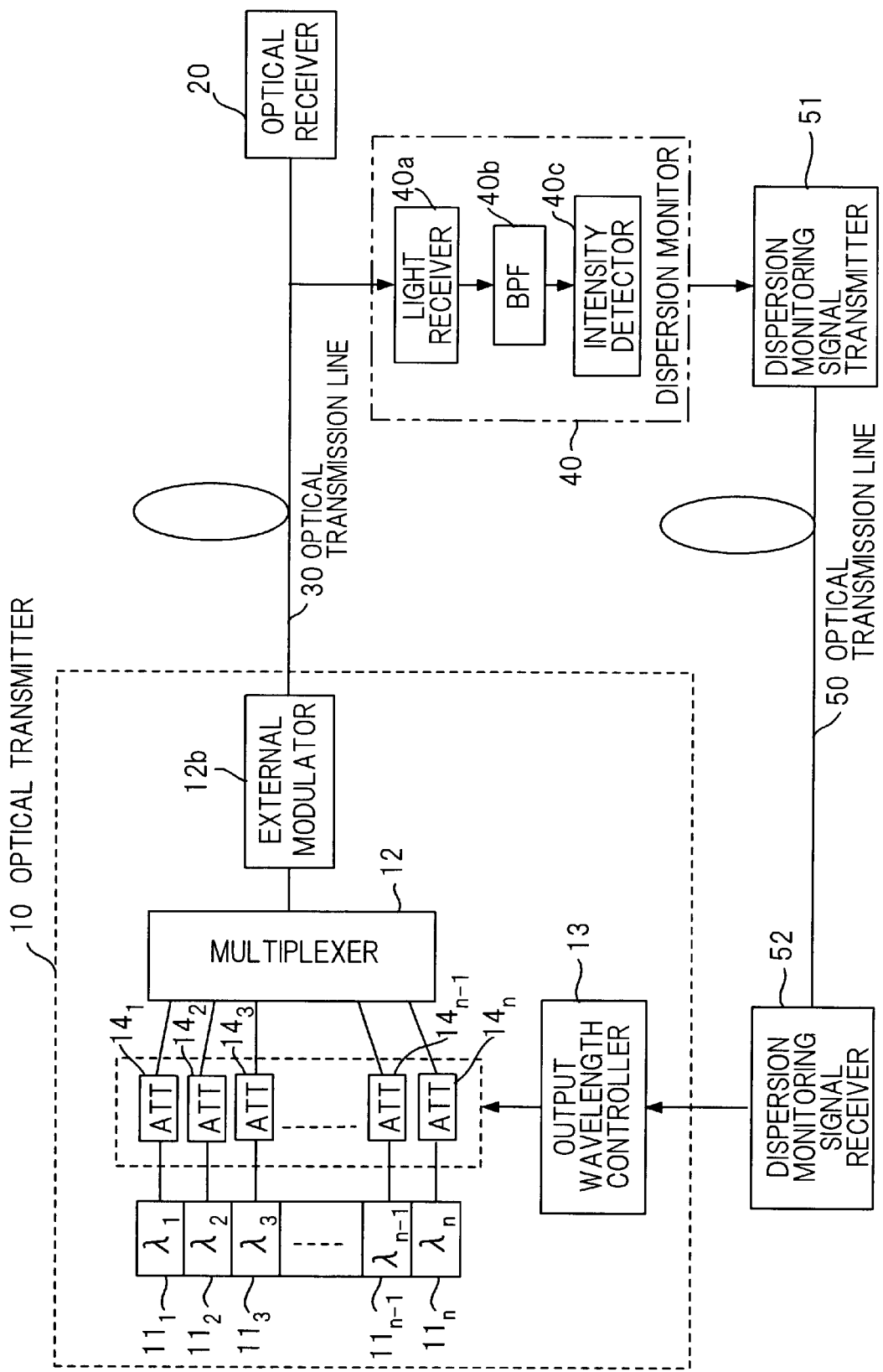
FIG. 18 is a diagram illustrating another embodiment (using light attenuators) for performing dispersion compensation in a case where a change in wavelength is small when optimum wavelength is unknown.

FIG. 18 illustrates the construction of another embodiment of an optical transmission system for performing dispersion compensation in a case where optimum wavelength is unknown and change in wavelength is small in comparison with dispersion tolerance. Components identical with those of the embodiment shown in FIG. 15 are designated by like reference characters. This embodiment differs from the embodiment of FIG. 15 in that:

(1) attenuators (ATT) $14_1$–$14_n$ for attenuating light are provided at the outputs of the light sources $11_1$–$11_n$ and have their outputs applied to the multiplexer 12;
(2) the light sources $11_1$–$11_n$ emit light at all times; and
(3) the light attenuators $14_1$–$14_n$ are turned on and off under the control of the output wavelength controller 13 so that only light from a prescribed light source is input to the optical output unit 12.

Before the system is placed in operation, all of the light sources $11_1$–$11_n$ are made to emit light and all of the light attenuators $14_1$–$14_n$ are turned on to attenuate the light from respective ones of the light sources. Under these conditions the output wavelength controller 13 performs control in such a manner that the light attenuators $14_1$–$14_n$ corresponding to the light sources $11_1$–$11_n$ are turned off successively one at a time (i.e., only one is turned off and the others are turned on) at prescribed time intervals so that light from the light sources $11_1$–$11_n$ enters the multiplexer 12 in successive fashion. As a result, the multiplexer 12 successively inputs, to the external modulator 12b, light of different wavelengths $\lambda_1$–$\lambda_n$ generated by the light sources, and the external modulator 12b on/off-modulates the input light by the 40-Gbps signal and outputs the modulated light of different wavelengths $\lambda_1$–$\lambda_n$ to the optical transmission line 30.

The dispersion monitor 40 detects the timing at which the intensity of the 40-GHz component in the received baseband spectrum signal attains the minimum value, the dispersion monitoring signal transmitter 51 sends this timing data to the side of the transmitter, and the dispersion monitoring signal receiver 52 extracts the monitoring result (timing data) and inputs this data to the output wavelength controller 13. The output wavelength controller 13 identifies the zero-dispersion wavelength from the wavelength of the light output to the optical transmission line 30 at the timing at winch the intensity of the specific frequency component attained the minimum value.

During system operation, the output wavelength controller 13 turns off only the light attenuator corresponding to the light source that generates light having this zero-dispersion wavelength, so that the light having the zero-dispersion wavelength is output to the optical transmission line 30. As a result, light of a wavelength whose transmission characteristic is optimum in regard to wavelength dispersion of the optical transmission line 30 is output, thereby making it possible to compensate for dispersion.

Figure 19:
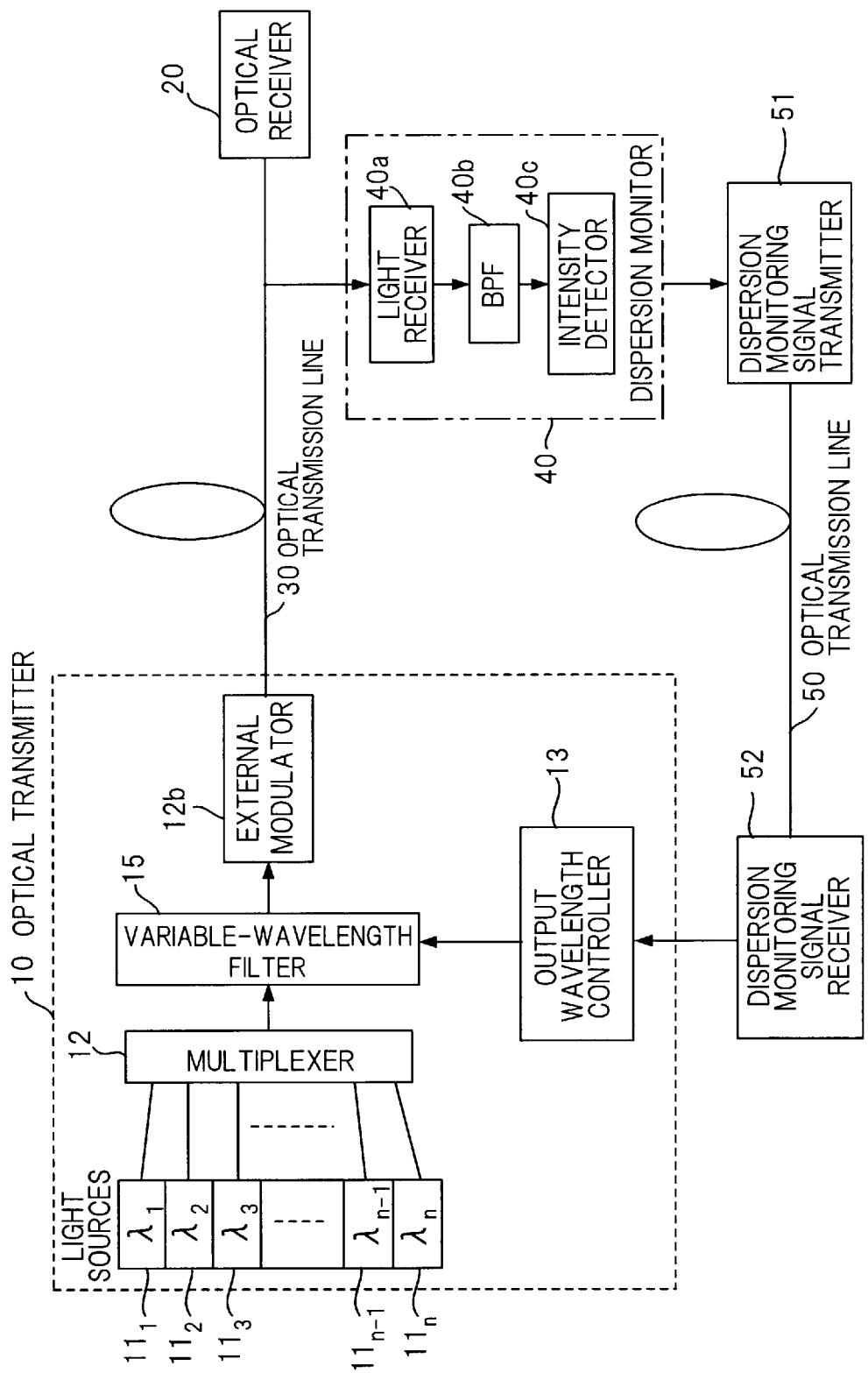
FIG. 19 is a diagram illustrating another embodiment (using a variable-wavelength filter) for performing dispersion compensation in a case where a change in wavelength is small when optimum wavelength is unknown.

FIG. 19 illustrates the construction of another embodiment of an optical transmission system for performing dispersion compensation in a case where optimum wavelength is unknown and change in wavelength is small in comparison with dispersion tolerance. Components identical with those of the embodiment shown in FIG. 15 are designated by like reference characters. This embodiment differs from the embodiment of FIG. 15 in that:

(1) A variable-wavelength filter 15 is provided between the multiplexer 12 and external modulator 12b and passes, i.e., outputs, only light having a designated wavelength;
(2) the light sources $11_1$–$11_n$ emit light at all times;
(3) The multiplexer 12 multiplexes light of different wavelengths $\lambda_1$–$\lambda_n$ generated by the light sources $11_1$–$11_n$, respectively, and inputs the light to the variable-wavelength filter 15; and
(4) the wavelength of the light output by the variable-wavelength filter 15 is controlled by the output wavelength controller 13.

Figure 20:
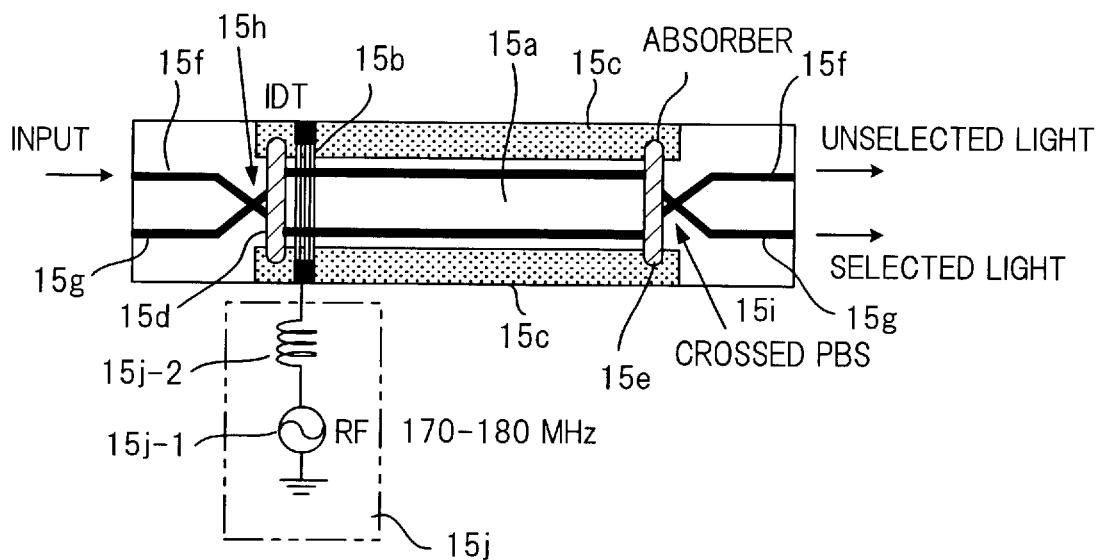
FIG. 20 is a diagram showing the construction of the variable-wavelength filter.

FIG. 20 is a diagram showing the construction of the variable-wavelength filter. As shown in FIG. 20, the filter includes a SAW waveguide 15a formed on a substrate winch exhibits an electro-optical effect, such as a substrate made of LiNbO$_3$ (lithium niobate); an interdigital transducer (IDT) 15b; a SAW clad 15c formed by diffusing titanium so as to clad the SAW waveguide; absorbers 15d, 15e for absorbing surface acoustic waves (SAW); optical waveguides 15f, 15g formed by diffusing titanium; crossed polarization beam splitters (PBS) 15h, 15i, winch are arranged to embrace two linear waveguides, for operating independently of polarization; and a high-frequency signal application unit 15j for applying a high-frequency signal of 170–180 MHz to the interdigital transducer 15b. The high-frequency signal application unit 15j includes a high-frequency generator 15j-1 and an inductance 15j-2, winch is for canceling the input capacitance of the interdigital transducer 15b, connected in series with the high-frequency generator 15j-1. When the high-frequency signal is applied to the interdigital transducer 15b, a surface acoustic wave is generated, winch has the effect of rotating, by 90°, the polarization of a specific wavelength in conformity with this frequency. Accordingly, the polarization beam splitters 15h, 15i are provided on the input and output sides, respectively, to split the polarization, thereby making it possible to realize a variable-wavelength filter. For example, if wavelength-multiplexed light of the TE mode is input to the variable-wavelength filter 15 as input light, only the polarization of the wavelength corresponding to the frequency of the high-frequency signal applied to the interdigital transducer is rotated 90°, whereby TM-mode polarization is obtained. The TM-mode polarized light is output from the optical waveguide 15g.

Figure 21:
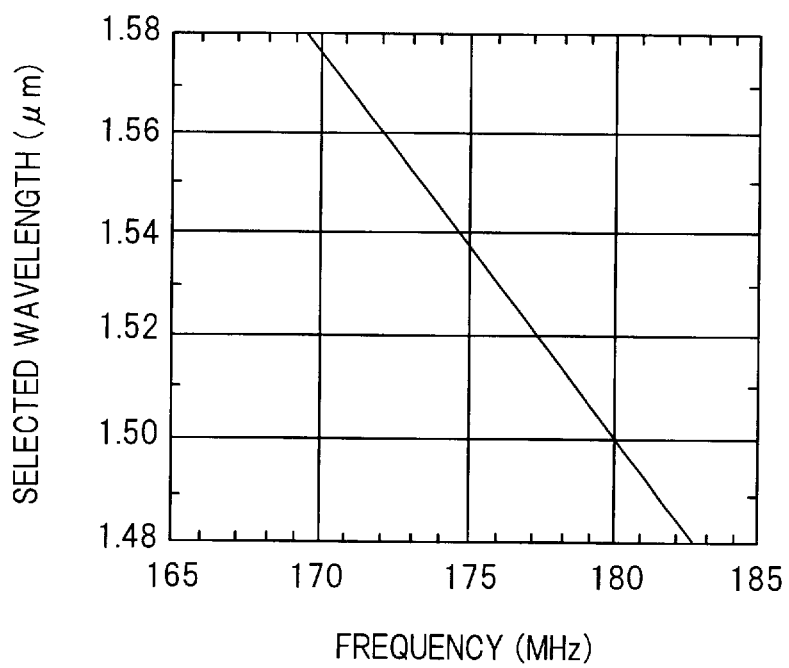
FIG. 21 is a diagram showing the tuning characteristic of the variable-wavelength filter.

FIG. 21 shows the tuning characteristic of the variable-wavelength filter. The frequency of the high-frequency signal is plotted along the horizontal axis and the selected wavelength along the vertical axis. The selected wavelength shortens in inverse proportion to the frequency of the high-frequency signal.

Accordingly, the variable-wavelength filter 15 is capable of selectively outputting, in successive fashion, the wavelengths contained in the input light by sweeping, at prescribed cycles, the frequency of the high-frequency signal output from the high-frequency signal application unit 15$j$ under the control of the output wavelength controller 13.

Prior to the start of system operation, all of the light sources $11_1-11_n$ emit light, the light of the different wavelengths $\lambda_1-\lambda_n$ generated by the respective light sources $11_1-11_n$ is multiplexed by the multiplexer 12 and the multiplexed light is input to the variable-wavelength filter 15. Under these conditions, the output wavelength controller 13 controls the variable-wavelength filter 15 so that the light of the wavelengths $\lambda_1-\lambda_n$ is input to the external modulator 12$b$ in order at predetermined time intervals. The external modulator 12$b$ on/off-modulates the input light of different wavelengths $\lambda_1-\lambda_n$ by the 40-Gbps signal and outputs the modulated light to the optical transmission line 30.

The dispersion monitor 40 detects the timing at which the intensity of the 40-GHz component in the received baseband spectrum signal attains the minimum value, the dispersion monitoring signal transmitter 51 sends this timing data to the side of the transmitter, and the dispersion monitoring signal receiver 52 extracts the monitoring result (timing data) and inputs this data to the output wavelength controller 13. The output wavelength controller 13 identifies the zero-dispersion wavelength from the wavelength of the light output to the optical transmission line 30 at the timing at winch the intensity of the specific frequency component attained the minimum value.

During system operation, the output wavelength controller 13 controls the variable-wavelength filter 15 so as to output the light of the zero-dispersion wavelength to the optical transmission line 30. As a result, light of a wavelength whose transmission characteristic is optimum in regard to wavelength dispersion of the optical transmission line 30 is output, thereby making it possible to compensate for dispersion.

(d) Dispersion Compensation When Optimum Wavelength is Unknown and Change in Wavelength is Large If the system is one in winch the optimum wavelength is unknown and a change in wavelength is large in comparison with the dispersion tolerance then, (1) before the optical transmission system starts operating, light beams of different wavelengths generated by the plurality of light sources are successively output to the optical transmission line and the optimum wavelength is detected, and (2) when the system is in operation, light generated by the light source having a wavelength nearest to this detected optimum wavelength is output to the optical transmission line. (3) Further, during system operation, the wavelength of the light output to the optical transmission line is changed minutely so that the zero-dispersion wavelength can be detected even if it changes owing to aging, and (4) when the zero-dispersion wavelength has changed to a wavelength intermediate the present light source and a neighboring light source owing to aging, the optical transmitter changes over the light source from the present light source to the neighboring light source to thereby change the wavelength of the light output to the optical transmission line. By changing over wavelength at the wavelength intermediate the present light source and the neighboring light source, signal delays before and after the wavelength changeover can be made equal and small, and a discontinuous change in the group delay does not occur before and after the wavelength changeover. This makes it possible to eliminate signal degradation.

Figure 22:
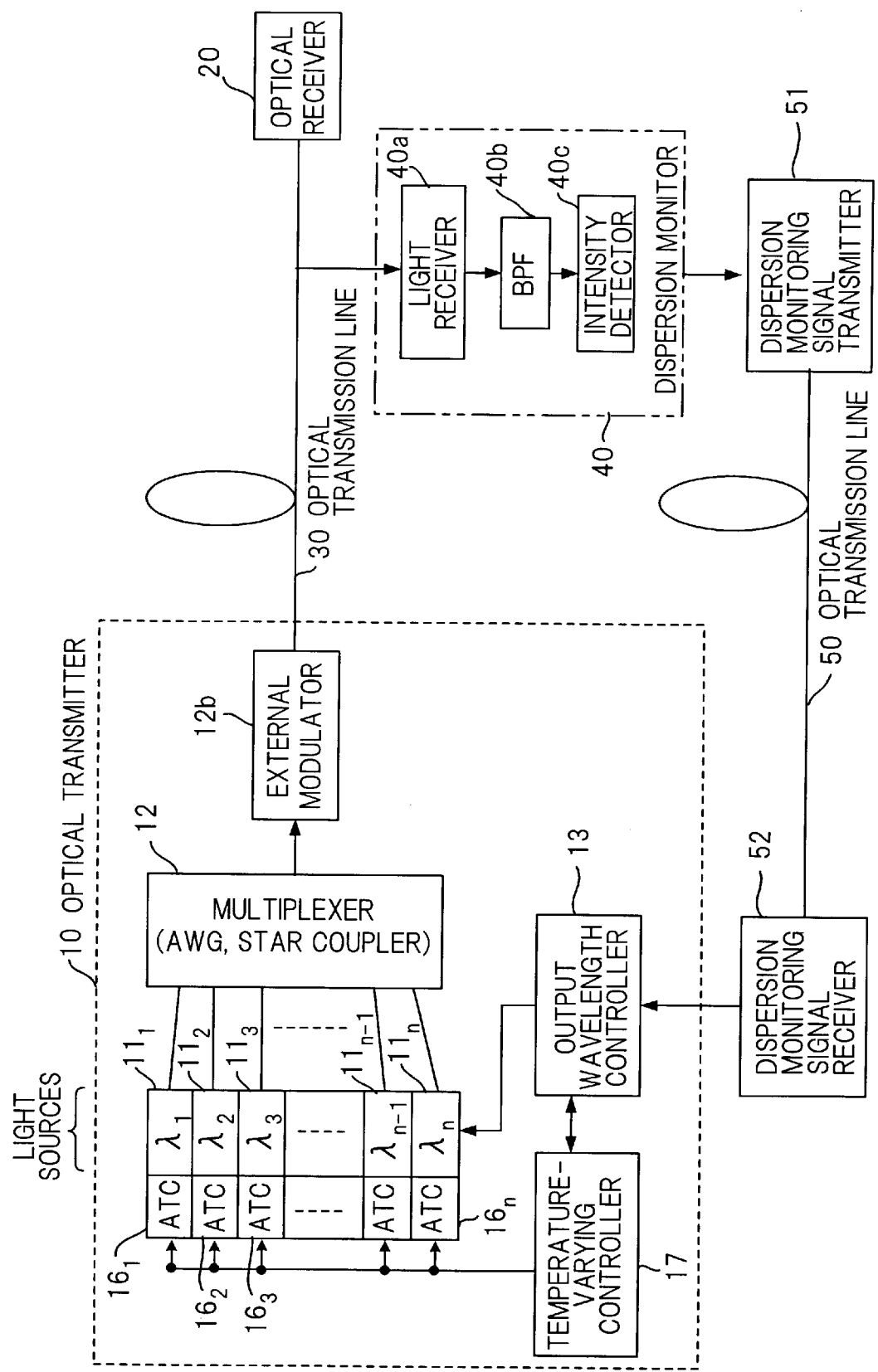
FIG. 22 is a diagram illustrating an embodiment (fluctuating wavelength) for performing dispersion compensation in a case where a change in wavelength is large when optimum wavelength is unknown.

FIG. 22 illustrates the construction of an optical transmission system for performing dispersion compensation in a case where optimum wavelength is unknown and change in wavelength is large in comparison with dispersion tolerance. Components identical with those of the embodiment shown in FIG. 15 are designated by like reference characters. This embodiment differs from the embodiment of FIG. 15 in that:
  (1) the wavelength of light output to the optical transmission line is varied during system operation;
  (2) the light sources (e.g., semiconductor lasers) $11_1-11_n$ are provided with ATC circuits (automatic temperature-control circuits) $16_1-16_n$, respectively, for regulating light-source temperature to a set temperature; and
  (3) a temperature-varying controller 17 for varying the temperature of the light source winch generates the light being output to the optical transmission line, thereby varying the wavelength of the output light.

According to the embodiment of FIG. 22, when the zero-dispersion wavelength of the optical transmission line 30 varies by $\Delta\lambda/2$ (where $\Delta\lambda$ is the light-source wavelength spacing), the light source is switched from the present light source to a neighboring light source. In order to so arrange it that a $\Delta\lambda/2$-change in zero-dispersion wavelength can be detected, it is required that the wavelength of light output to the optical transmission line 30 be varied by $\pm\Delta\lambda/2$ or greater. Since the light sources $11_1-11_n$ are such that the wavelength of output light varies depending upon ambient temperature, the temperature of the semiconductor lasers is controlled in such a manner that the wavelength of output light will vary over a range of $-\lambda'$ to $+\lambda'$ (where $\lambda'>\Delta\lambda/2$ holds).

Figure 23:
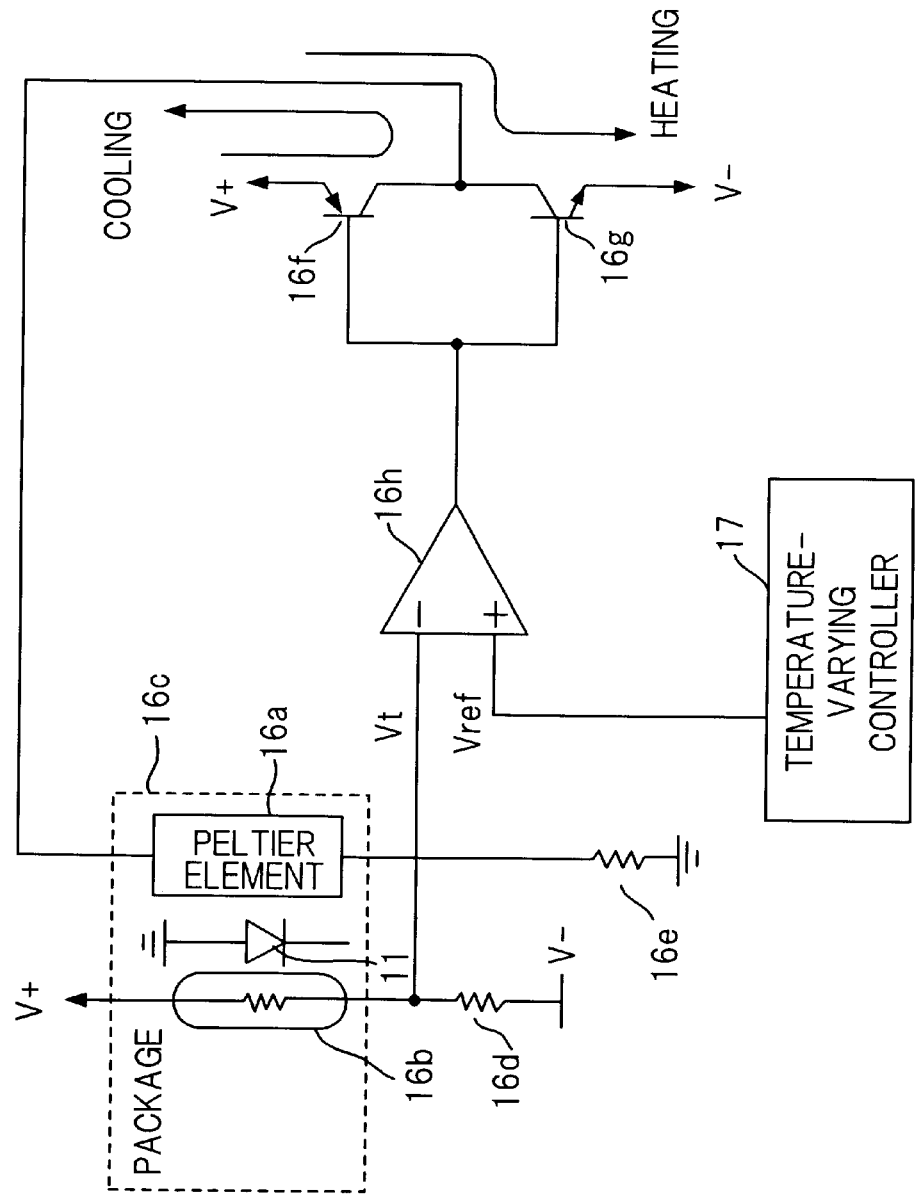
FIG. 23 is a circuit diagram of an ATC circuit.

FIG. 23 illustrates an example of an ATC circuit, in winch numeral 11 denotes a semiconductor laser (LD) serving as a light source. Shown in FIG. 23 are a Peltier element 16$a$ for heating and cooling the LD chip depending upon the direction of current; a thermister 16$b$ having a negative resistance characteristic for detecting the temperature of the LD chip; a package 16$c$ for accommodating the semiconductor laser; the Peltier element and the thermister; resistors 16$d$, 16$e$; PNP and NPN transistors 16$f$, 16$g$, respectively; and a comparator 16$h$ having an inverting terminal to winch a voltage (a voltage conforming to the temperature of the LD) Vt obtained by potential division using the thermister 16$b$ and resistor 16$d$ is applied, a non-inverting terminal to which a reference voltage Vref is applied, and an output terminal connected to the bases of the transistors 16$f$, 16$g$. The emitter of the PNP transistor 16$f$ is connected to V+, the emitter of the NPN transistor 16$g$ is connected to V−, and the collectors of both transistors are connected to the Peltier element 16$a$.

When the temperature of the light source 11 is low, the resistance of the thermister 16$b$ increases, the voltage Vt decreases such that Vt<Vref holds and the output of the comparator 16$h$ becomes positive. As a result, the transistor 16$f$ turns off, the transistor 16$g$ turns on and current flows through the Peltier element in a direction that produces heat, thereby heating the interior of the package and raising the temperature of the LD. When the LD temperature rises, the resistance of the thermister declines, the voltage Vt increases such that Vt>Vref holds and the output of the comparator 16$h$ becomes negative. As a result, the transistor 16$f$ turns on, the transistor 16$g$ turns off and current flows through the Peltier element in a direction that produces cooling, thereby lowering the temperature of the LD. Accordingly, control can be performed in such a manner that the LD temperature becomes a set temperature.

If the optimum wavelength is unknown and the change in wavelength is large in comparison with the dispersion tolerance then, prior to the start of system operation, first the output wavelength controller 13 causes the light sources $11_1$–$11_n$ to emit light successively at predetermined time intervals. As a result, the multiplexer 12 successively inputs, to the external modulator 12b, light of different wavelengths $\lambda_1$–$\lambda_n$ generated by the plurality of light sources, and the external modulator 12b on/off-modulates the input light of different wavelengths $\lambda_1$–$\lambda_n$ by the 40-Gbps signal and outputs the modulated light to the optical transmission line 30.

Figure 24:
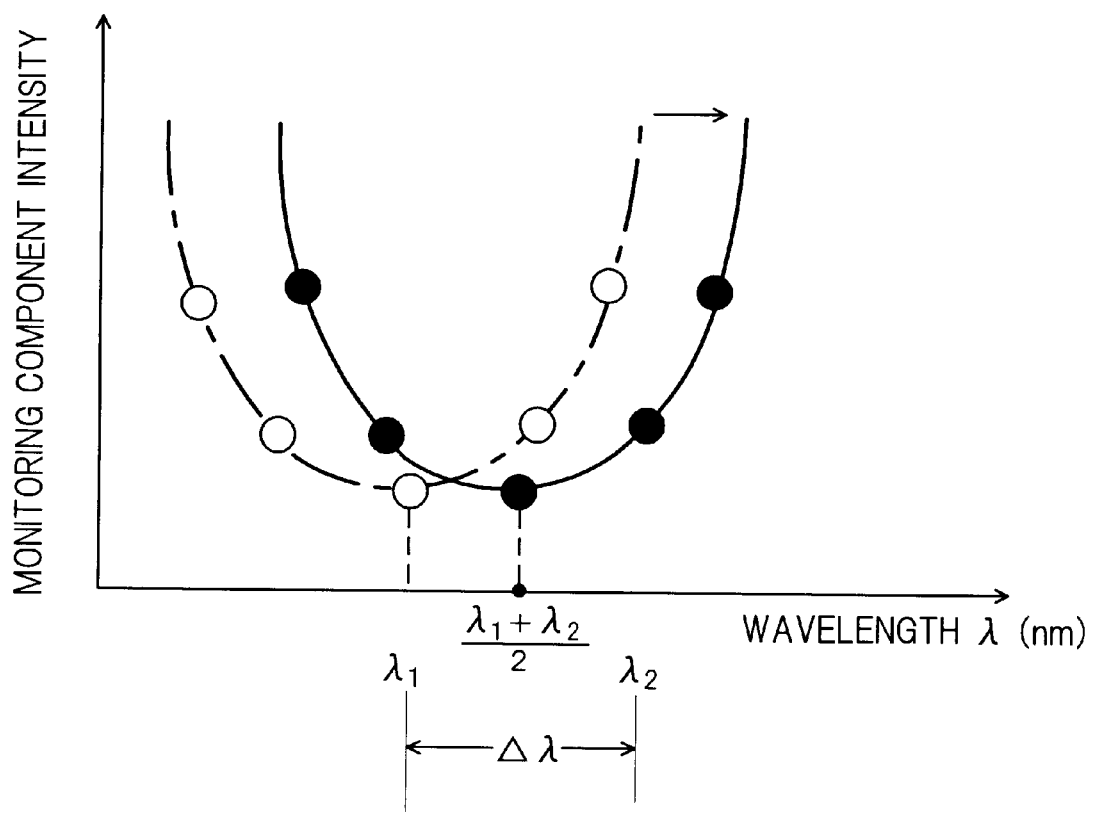
FIG. 24 is a graph showing the relationship between wavelength and monitoring component intensity.

The dispersion monitor 40 detects the timing at which the intensity of the 40-GHz component in the received baseband spectrum signal attains the minimum value and inputs the timing to the dispersion monitoring signal transmitter 51. The relationship between wavelength and monitoring component intensity can be approximated by a curve of second degree, as illustrated in FIG. 24. When the wavelength of output light is equal to the zero-dispersion wavelength, intensity takes on the minimum value. Accordingly, the timing at winch the intensity of the monitoring component attains the minimum value is detected and input to the dispersion monitoring signal transmitter 51.

The dispersion monitoring signal transmitter 51 sends this timing data to the side of the transmitter and the dispersion monitoring signal receiver 52 extracts the monitoring result (timing data) and inputs this data to the output wavelength controller 13. The output wavelength controller 13 identifies $\lambda_1$ as being the zero-dispersion wavelength from the wavelength $\lambda_1$ of the light output to the optical transmission line 30 at the timing at winch the intensity of the specific frequency component attained the minimum value (see the broken line in FIG. 24).

During system operation, the output wavelength controller 13 causes only the light source (referred to as the "present light source") that generates light having the zero-dispersion wavelength $\lambda_1$ to emit light, so that this light is output to the optical transmission line 30. As a result, light of a wavelength whose transmission characteristic is optimum in regard to wavelength dispersion of the optical transmission line 30 is output, thereby making it possible to compensate for dispersion.

Further, during system operation, the temperature-varying controller 17 controls the ATC circuit of the present light source so as to vary the temperature of this light source. That is, the temperature-varying controller 17 varies the wavelength of the output light by successively changing the set temperature at a period of time T necessary to regulate temperature to a constant value.

The dispersion monitor 40 detects the timing at which the intensity of the 40-GHz component in the received baseband spectrum signal attains the minimum value and sends this timing to the output wavelength controller 13. The latter refers to a table (not shown), winch is for converting set temperature to wavelength, based upon the set temperature prevailing at the received timing, thereby obtaining the wavelength $\lambda'$ of the light being output to the optical transmission line 30 and identifying the zero-dispersion wavelength from this wavelength. Next, the output wavelength controller 13 checks to determine whether the zero-dispersion wavelength has changed by one-half [$=\Delta\lambda/2=(\lambda_2-\lambda_1)/2$] of the light-source wavelength spacing $\Delta\lambda$ ($=\lambda_2-\lambda_1$), winch can be caused by aging of the optical transmission line. If the change is less than $\Delta\lambda/2$, the light source is not changed over. However, if the change is equal to or greater than $\Delta\lambda/2$, then the light source is changed over from the present light source to the neighboring light source, as indicated by the solid line in FIG. 24.

Figure 25:
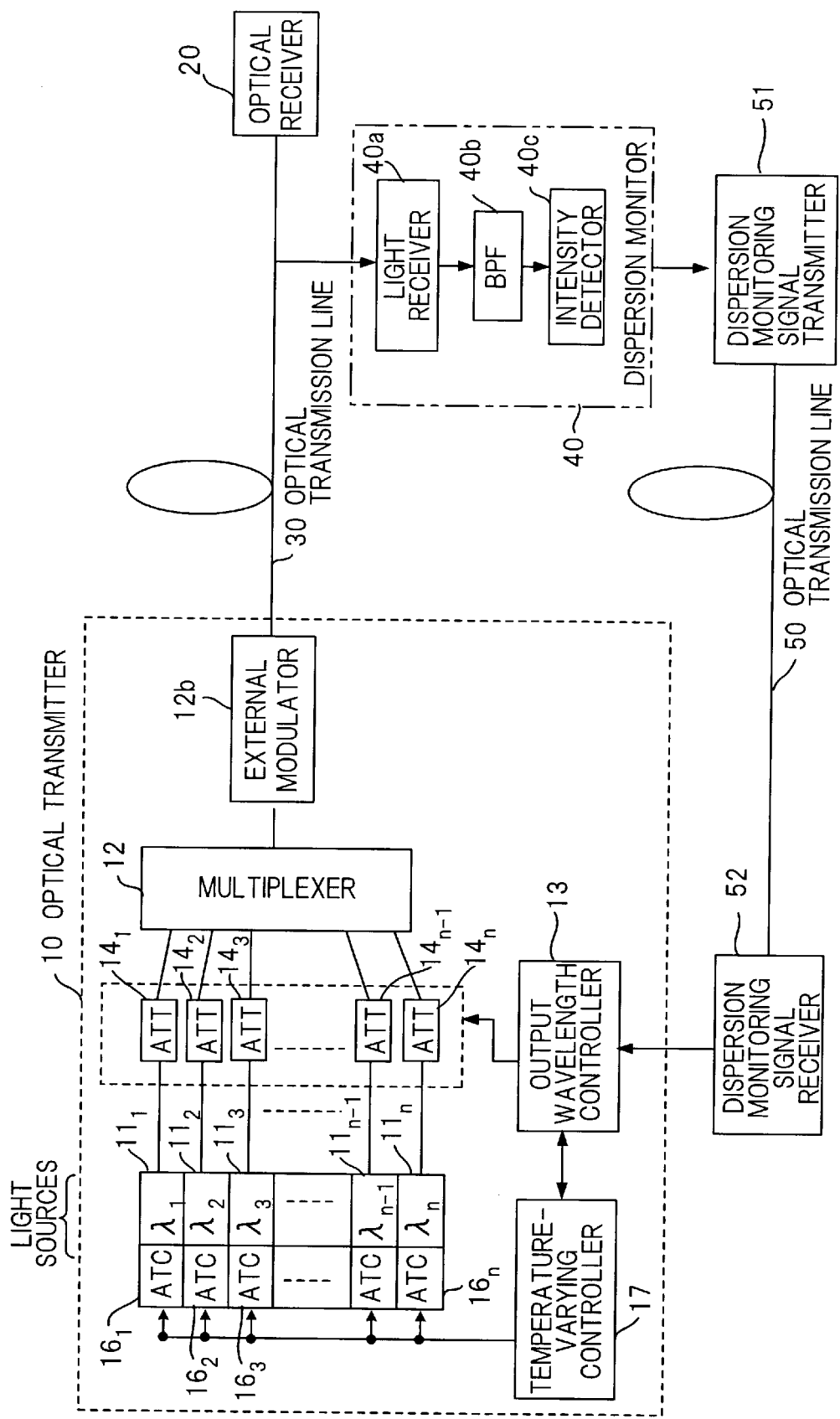
FIG. 25 is a diagram illustrating an embodiment (with fluctuating wavelength and using a light attenuator) for performing dispersion compensation in a case where a change in wavelength is large when optimum wavelength is unknown.
Figure 26:
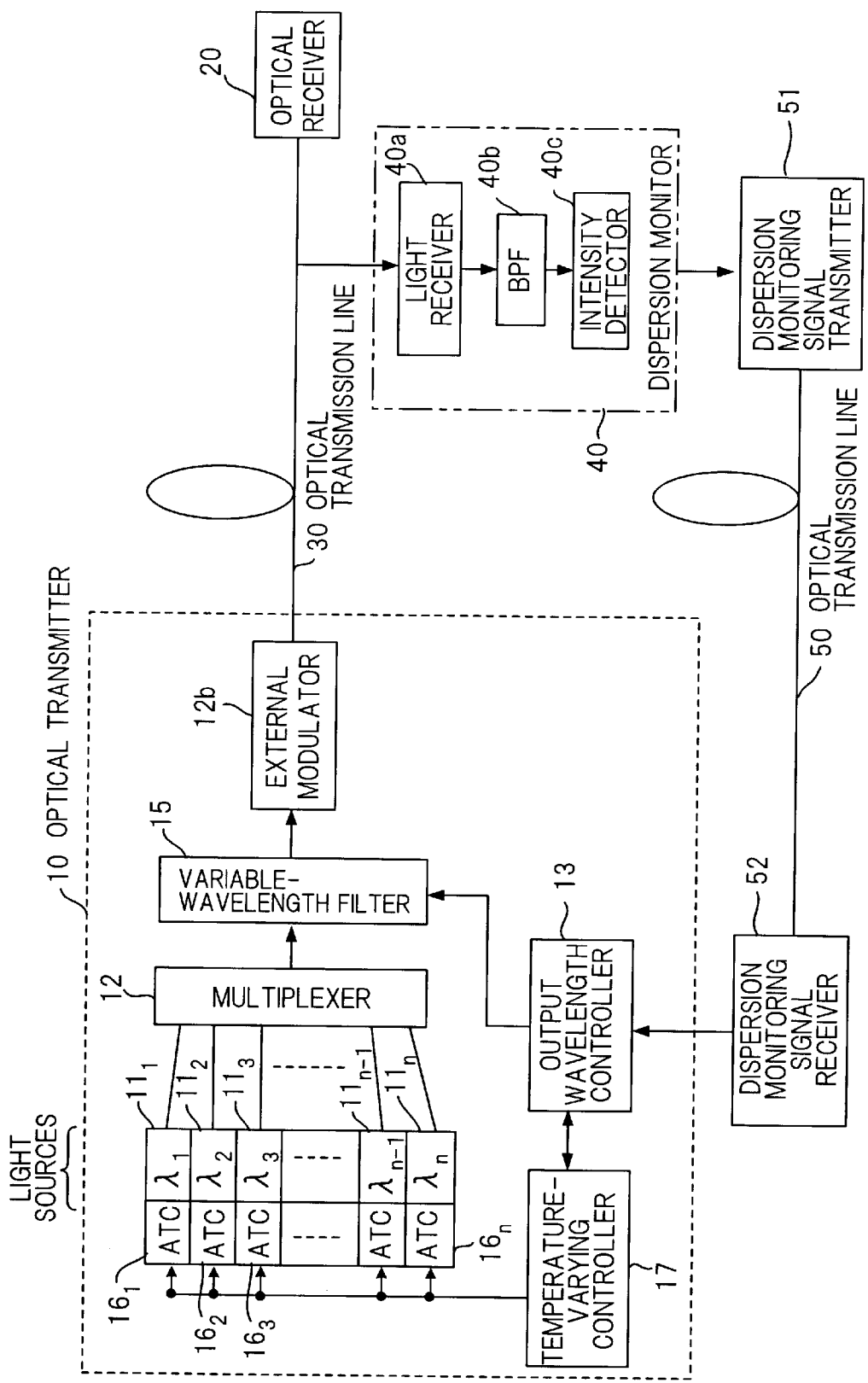
FIG. 26 is a diagram illustrating an embodiment (with fluctuating wavelength and using a variable-wavelength filter) for performing dispersion compensation in a case where a change in wavelength is large when optimum wavelength is unknown.

In the foregoing a case is described in winch the present invention is applied to an optical transmitter in winch only one light source emits light. However, as shown in FIG. 25, the present invention can be applied also to a transmitter in winch the light attenuators $14_1$–$14_n$ are provided between the respective light sources $11_1$–$11_n$ and the multiplexer 12, all of the light sources are made to emit light constantly and only a prescribed light attenuator is turned off, whereby light from the light source corresponding to this attenuator is output to the optical transmission line 30. Further, as shown in FIG. 26, the present invention can be applied also to a transmitter in winch the variable-wavelength filter 15 is provided, all of the light sources are made to emit light constantly and light having a desired wavelength is output to the optical transmission line by the variable-wavelength filter 15.

(e) Other Example of Dispersion Compensation When Optimum Wavelength is Unknown and Change in Wavelength is Large If the system is one in winch the optimum wavelength is unknown and a change in wavelength is large in comparison with the dispersion tolerance then, (1) before the optical transmission system starts operating, light beams of different wavelengths generated by the plurality of light sources are successively output to the optical transmission line and the optimum wavelength is detected, and (2) when the system is in operation, light generated by the light source having a wavelength nearest to this detected optimum wavelength is output to the optical transmission line as main-signal light. (3) Further, during system operation, monitoring light is multiplexed with the main-signal light and is output to the optical transmission line so that direction and amount of fluctuation of the optimum wavelength (zero-dispersion wavelength) due to aging can be detected, and (4) when the zero-dispersion wavelength changes to a wavelength intermediate the present light source and the neighboring light source owing to aging, the optical transmitter changes over the light source from the present light source to the neighboring light source to thereby change the wavelength of the light output to the optical transmission line. By changing over wavelength at the wavelength intermediate the present light source and the neighboring light source, signal delays before and after the wavelength changeover can be made equal and small, and a discontinuous change in the group delay does not occur before and after the wavelength changeover. This makes it possible to eliminate signal degradation.

Figure 27A:
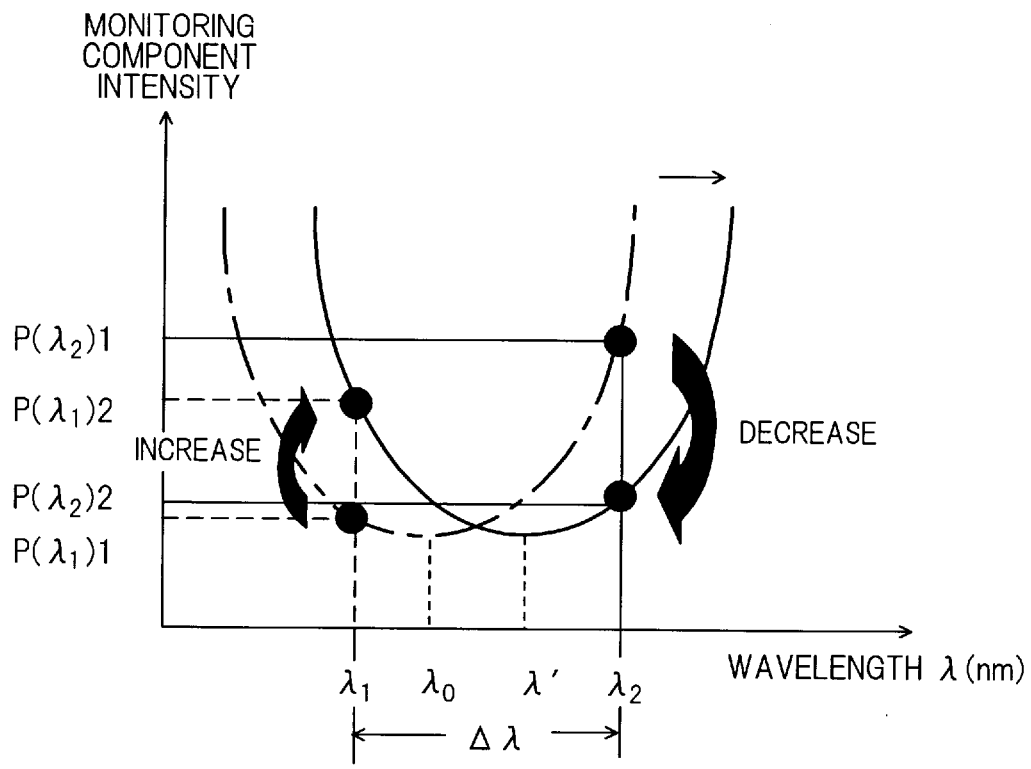
FIGS. 27A and 27B are diagrams useful in describing the principle of detection of, e.g., the direction in which a zero-dispersion wavelength fluctuates.
Figure 27B:
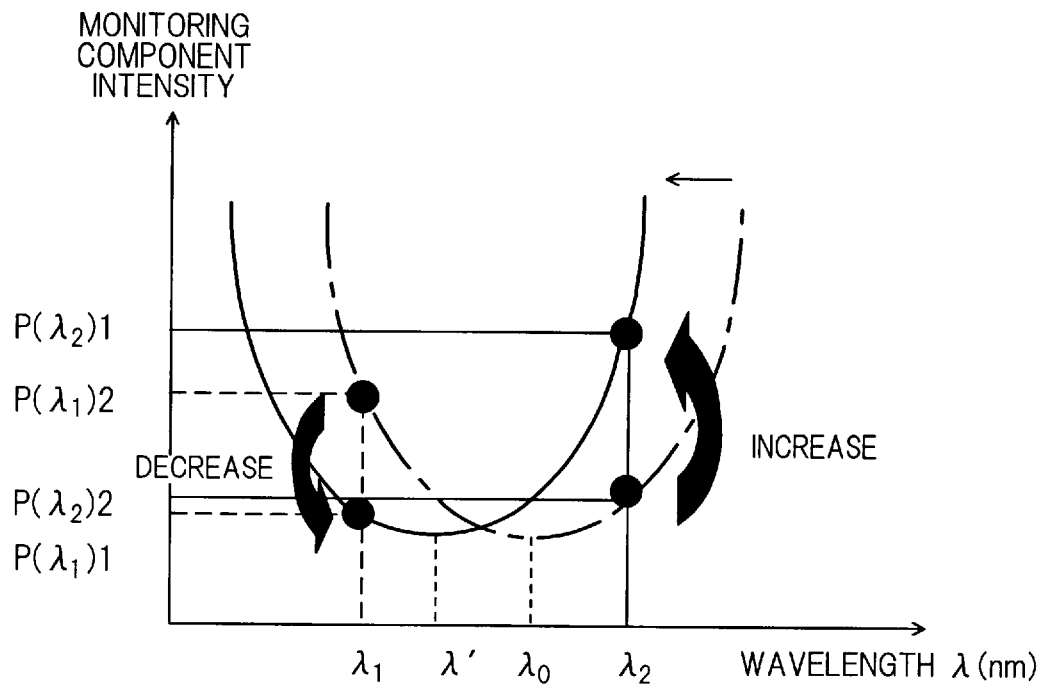

FIGS. 27A and 27B are diagrams useful in describing the principle through winch the direction of a change in zero-dispersion wavelength and the fact that the zero-dispersion wavelength has changed to a wavelength intermediate the wavelengths of the present light source and neighboring light source are detected using the main-signal light and the monitoring light. As shown in FIGS. 27A, 27B, the relationship between wavelength and intensity of the monitoring component (the 40-GHz component) can be approximated by a curve of second degree. Intensity takes on the minimum value when the wavelength of output light is the zero-dispersion wavelength. When the zero-dispersion wavelength $\lambda$ of the optical transmission line is $\lambda_0$ ($\lambda=\lambda_0$), the wavelength of the main-signal light output from a prescribed light source is $\lambda_1$ and the wavelength of the monitoring light output by the neighboring light source is $\lambda_2$, the relationship between wavelength and intensity of the monitoring component takes on a characteristic indicated by the broken line in FIG. 27A. Here the monitoring signal intensity at wavelength $\lambda_1$ is $P(\lambda_1)1$ and the monitoring signal intensity at wavelength $\lambda_2$ is $P(\lambda_2)1$. If the zero-dispersion wavelength fluctuates from this state toward the side of long wavelength ($\lambda=\lambda'$), the relationship between wavelength and monitoring component intensity changes to a characteristic indicated by the solid line in FIG. 27A. Consequently, the monitoring signal intensity at wavelength $\lambda_1$ becomes $P(\lambda_1)2$ and the monitoring signal intensity at wavelength $\lambda_2$ becomes $P(\lambda_2)2$. In other words, if the zero-dispersion wavelength $\lambda$ fluctuates toward the side of longer wavelength, the intensity of the monitoring component of the main-signal light wavelength ($\lambda_1$) increases and the intensity of the monitoring component of the monitoring light wavelength ($\lambda_2$) decreases.

On the other hand, if the zero-dispersion wavelength fluctuates from the state indicated by the dot-and-dash line of FIG. 27B toward the side of short wavelength ($\lambda=\lambda'$), the relationship between wavelength and monitoring component intensity changes to a characteristic indicated by the solid line in FIG. 27B. Consequently, the monitoring signal intensity at wavelength $\lambda_1$ decreases and the monitoring signal intensity at wavelength $\lambda_2$ increases. In other words, if the zero-dispersion wavelength $\lambda$ fluctuates toward the side of shorter wavelength, the intensity of the monitoring component of the main-signal light wavelength ($\lambda_1$) decreases and the intensity of the monitoring component of the monitoring light wavelength ($\lambda_2$) increases.

Thus, the direction in winch the zero-dispersion wavelength fluctuates can be detected from the direction of increase/decrease of the intensity of the monitoring component (the 40-GHz component) at the wavelength ($\lambda_1$) of the main-signal light and at the wavelength ($\lambda_2$) of the monitoring light. Further, when the zero-dispersion wavelength has changed to a wavelength intermediate the wavelength $\lambda_1$ of the main-signal light and the wavelength $\lambda_2$ of the monitoring light (namely a wavelength intermediate the wavelength of the present light source and the wavelength of the neighboring light source), the monitoring component intensity at the wavelength $\lambda_1$ and the monitoring component intensity at the wavelength $\lambda_2$ become equal owing to the symmetry of the curve of second degree. In other words, by detecting the fact that the monitoring component intensities at the wavelengths $\lambda_1$, $\lambda_2$ have become equal, the fact that the zero-dispersion wavelength has changed to a wavelength intermediate the wavelengths of the present light source and neighboring light source can be detected. It should be noted that if the zero-dispersion wavelength $\lambda$ fluctuates and becomes less than the wavelength of the main-signal light or greater than the wavelength of the main-signal light, the monitoring component intensities at the wavelength ($\lambda_1$) of the main-signal light and at the wavelength ($\lambda_2$) of the monitoring light both increase or both decrease before and after the fluctuation.

Figure 28:
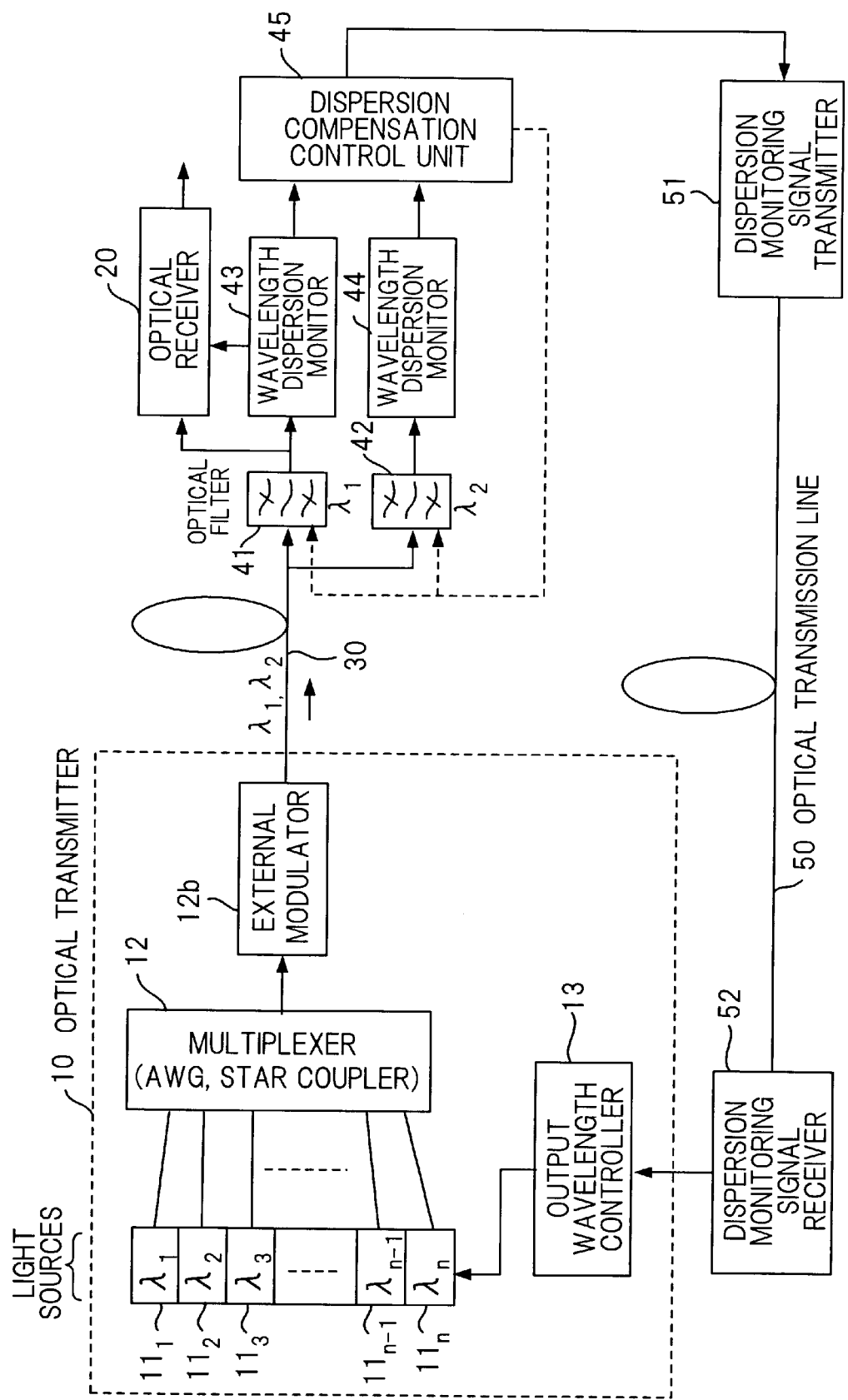
FIG. 28 is a diagram illustrating an embodiment (using monitoring light) for performing dispersion compensation in a case where a change in wavelength is large when optimum wavelength is unknown.

FIG. 28 illustrates the construction of an optical transmission system for performing dispersion compensation in a case where optimum wavelength is unknown and change in wavelength is large in comparison with dispersion tolerance. Shown in FIG. 28 are the optical transmitter 10, the optical receiver 20, the outgoing optical transmission line 30, a first variable-wavelength optical filter 41 for passing main-signal light, a second variable-wavelength optical filter 42 for passing monitoring light, and wavelength dispersion monitors 43, 44 having a construction identical with that of the wavelength dispersion monitor 40 in the foregoing embodiments.

The wavelength dispersion monitor 43 monitors the 40-GHz component contained in the main-signal light of wavelength $\lambda_1$ and outputs the monitoring component intensity, and the wavelength dispersion monitor 44 monitors the 40-GHz component contained in the monitoring light of wavelength $\lambda_2$ ($>\lambda_1$) and outputs the monitoring component intensity. On the basis of the monitoring component intensities that enter from the wavelength dispersion monitors 43 and 44, the dispersion compensation control unit 45 determines (1) the direction of a change in zero-dispersion wavelength, (2) the fact that the zero-dispersion wavelength has changed to a wavelength intermediate the wavelengths of the present light source and neighboring light source, and (3) that the zero-dispersion wavelength is less than the wavelength of the main-signal light or greater than the wavelength of the main-signal light, and, on the basis of the results of the determinations made, controls the wavelength setting of the optical filters 41, 42 and controls the switching of the light sources. Also shown in FIG. 28 are the incoming optical transmission line 50, the dispersion monitoring signal transmitter 51 for transmitting the signal (result of monitoring, a light-source changeover command, etc.) that enters from the dispersion compensation control unit 45, and the dispersion monitoring signal receiver 52 for extracting the result of monitoring and the light-source changeover command and inputting the same to the optical transmitter 10.

The optical transmitter 10 includes the plurality of light sources $11_1$–$11_n$ having different wavelengths ($\lambda_1$–$\lambda_n$) and constituted by a plurality of discrete semiconductor lasers or a semiconductor array laser; the multiplexer 12, winch can comprise an arrayed waveguide grating, a star coupler or the like; the external modulator 12b in winch the light output from the arrayed waveguide grating 12 is on/off-modulated by a 40-Gbps signal; the output wavelength controller 13 for causing prescribed ones of the light sources $11_1$–$11_n$ to emit light, thereby changing the wavelength of the light output to the optical transmission line and, when the system is operating, outputting light of the optimum wavelength to the optical transmission line as main-signal light, multiplexing monitoring light with the main-signal light and outputting the result to the optical transmission line.

If the optimum wavelength is unknown and the change in wavelength is large in comparison with the dispersion tolerance then, before the optical transmission system starts operating, light of all wavelengths enters the wavelength dispersion monitor 43. Under these conditions, the output wavelength controller 13 causes the light sources $11_1$–$11_n$ to successively emit light at predetermined time intervals. As a result, the light multiplexer 12 successively inputs light of different wavelengths $\lambda_1$–$\lambda_n$ generated by the plurality of light sources to the external modulator 12b, winch modulates the input light of he different wavelengths $\lambda_1$–$\lambda_n$ by the 40-Gbps signal and outputs the modulated light to the optical transmission line 30.

The dispersion monitor 43 detects the timing at which the 40-GHz component intensity of the received baseband spectrum signal attained the minimum value and inputs the timing to the dispersion compensation control unit 45. The latter sends this timing to the transmitting side via the dispersion monitoring signal transmitter 51. The dispersion monitoring signal receiver 52 extracts the monitoring result (the timing data) and inputs this to the output wavelength controller 13. The latter identifies wavelength $\lambda$, which was being output to the optical transmission line 30 at the timing at winch the monitoring component intensity attained the minimum value, as the zero-dispersion wavelength. Of the light-source wavelengths $\lambda_1$, $\lambda_2$ bracketing the zero-dispersion wavelength $\lambda$, the wavelength $\lambda_1$ nearest the zero-dispersion wavelength $\lambda$ is adopted as the wavelength of the main-signal light, and $\lambda_2$ is adopted as the wavelength of the monitoring light. From this point onward, wavelength-dispersion compensation control at the time of system operation is executed in accordance with the flowchart shown in FIG. 29.

Figure 29:
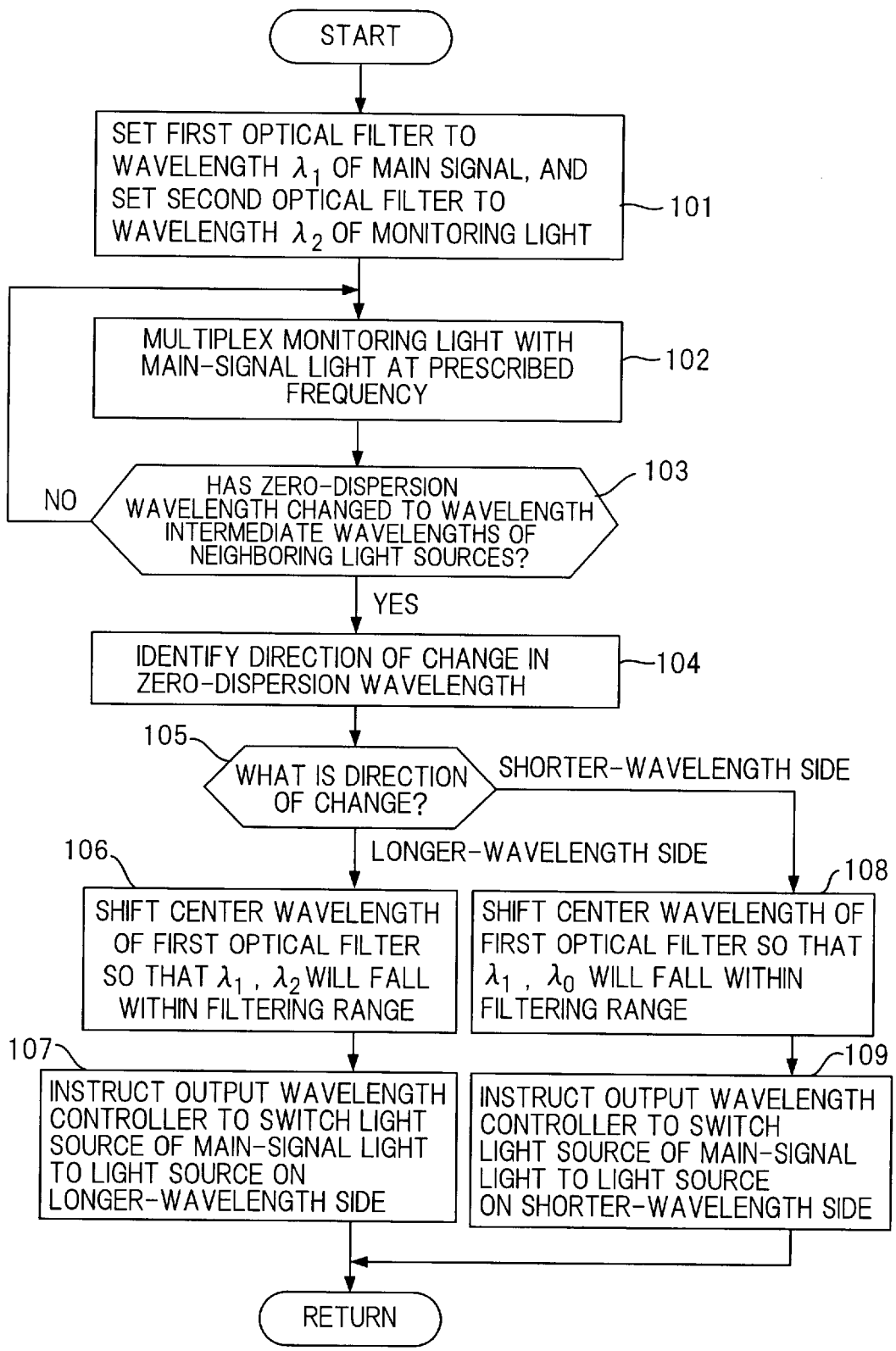
FIG. 29 is a flowchart of processing for wavelength-dispersion compensation at the time of system operation.

It should be noted that if the optimum wavelength is known and the change in wavelength is large in comparison with dispersion tolerance then wavelength-dispersion compensation control at the time of system operation is executed immediately in accordance with the flowchart shown in FIG. 29 using the wavelength $\lambda_1$ nearest the zero-dispersion wavelength $\lambda$ as the wavelength of the main-signal light and the wavelength $\lambda_2$ as the wavelength of the monitoring light, where the light-source wavelengths $\lambda_1, \lambda_2$ bracket the zero-dispersion wavelength $\lambda$.

When the system is in operation, the dispersion compensation control unit 45 sets the wavelength $\lambda_1$ of the main-signal light as the center wavelength of the first optical filter 41 and sets the wavelength $\lambda_2$ of the monitoring light as the center wavelength of the second optical filter 42 (step 101). Further, the output wavelength controller 13 causes the light source of the main-signal light to emit light so that this light is output to the optical transmission line 30. As a result, light of a wavelength whose transmission characteristic is optimum in regard to wavelength dispersion of the optical transmission line 30 is output, thereby making it possible to compensate for dispersion.

Further, during system operation, the output wavelength controller 13 causes the monitoring light source to emit light so that the monitoring light of wavelength $\lambda_2$ will be multiplexed with the main-signal light (step 102).

On the basis of the wavelength ($\lambda_1$) of the main-signal light that enters from the wavelength dispersion monitors 43, 44 and the monitoring component intensity (the 40-GHz component) at the monitoring light wavelength ($\lambda_2$), the dispersion compensation control unit 45 checks to determine whether the zero-dispersion wavelength $\lambda$ has changed to a wavelength intermediate the wavelength of the present light source and the wavelength of the neighboring light source (step 103). If the zero-dispersion wavelength has not changed to the intermediate wavelength, the processing of step 102 is executed. If the zero-dispersion wavelength has changed to the intermediate wavelength, however, the dispersion compensation control unit 45 identifies the direction in which the zero-dispersion wavelength $\lambda$ changed (step 104, 105). If the zero-dispersion wavelength $\lambda$ changed toward the side of longer wavelength, the dispersion compensation control unit 45 performs control in such a manner that the center wavelength of the first optical filter 41 is shifted so that the wavelengths $\lambda_1, \lambda_2$ will fall within the range of the filter (step 106). Next, the dispersion compensation control unit 45 instructs the output wavelength controller 13 to switch the light source of the main-signal light to the neighboring light source on the side of longer wavelength. In response, the output wavelength controller 13 causes the light source of wavelength $\lambda_2$ to emit light in addition to the light source of $\lambda_1$ and subsequently extinguishes the light source of wavelength $\lambda_1$ (step 107). As a result, the wavelength of the main-signal light can be changed over to the side of longer wavelength without any interruption in light.

If the zero-dispersion wavelength changed toward the side of shorter wavelength such that $\lambda_0 < \lambda < \lambda_1$ holds, the dispersion compensation control unit 45 sets $\lambda_0$ in the second optical filter 42 as the center wavelength. Further, at this time the dispersion compensation control unit 45 instructs the output wavelength controller 13 to cause the light source of monitoring light of wavelength $\lambda_0$ to emit light instead of the light source of wavelength $\lambda_2$. Dispersion compensation control is thenceforth carried out within the range $\lambda_0 < \lambda < \lambda_1$. If the zero-dispersion wavelength fluctuates toward the side of shorter wavelength and changes to a wavelength that is intermediate $\lambda_0$ and $\lambda_1$, then the dispersion compensation control unit 45 performs control in such a manner that the center wavelength of the first optical filter 41 is shifted so that the wavelengths $\lambda_0, \lambda_1$ will fall within the range of the filter (step 108). Next, the dispersion compensation control unit 45 instructs the output wavelength controller 13 to switch the light source of the main-signal light to the neighboring light source on the side of shorter wavelength. In response, the output wavelength controller 13 causes the light source of wavelength $\lambda_0$ to emit light in addition to the light source of $\lambda_1$ and subsequently extinguishes the light source of wavelength $\lambda_1$ (step 109). As a result, the wavelength of the main-signal light can be changed over to side of shorter wavelength without any interruption in light.

Figure 30:
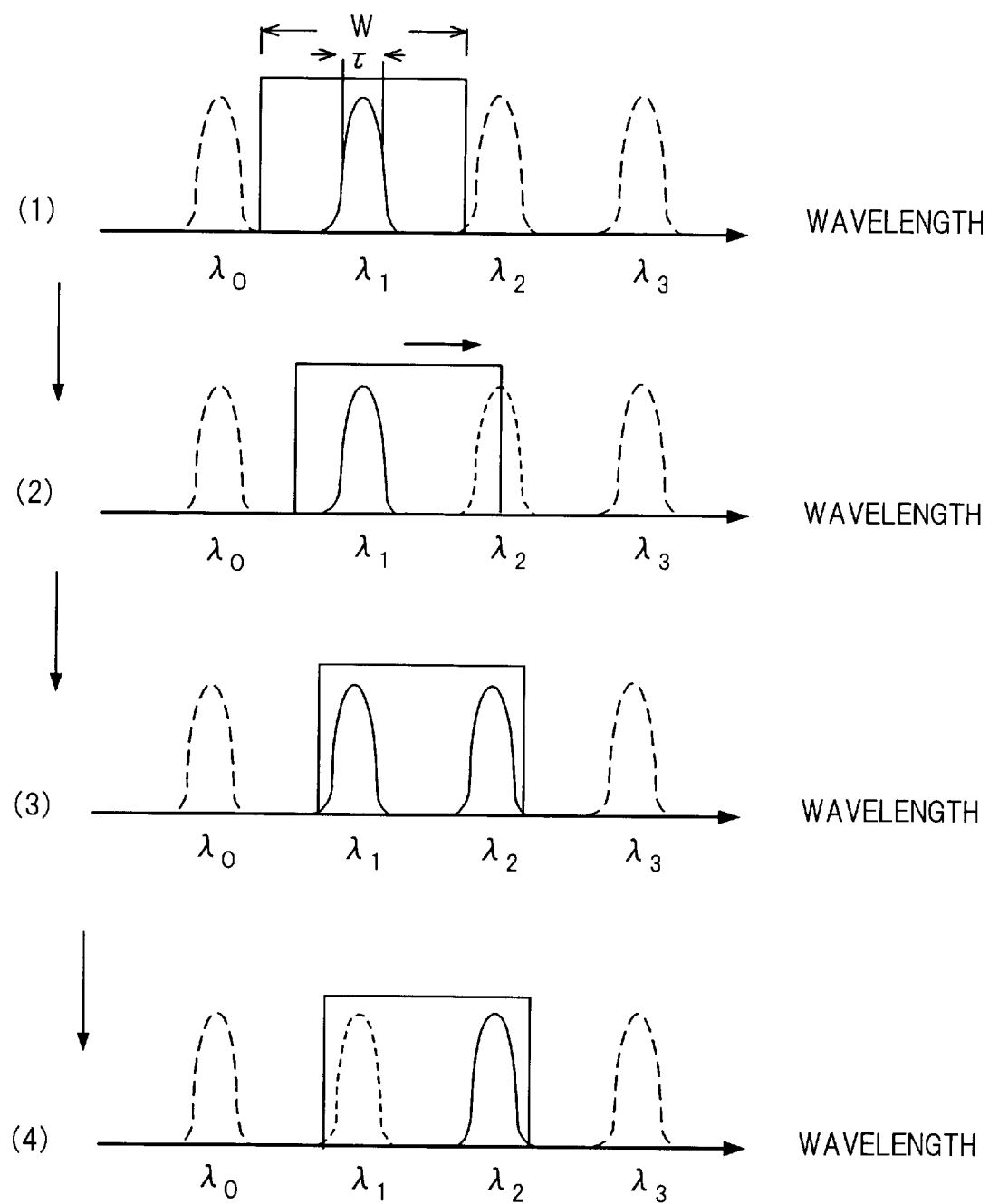
FIG. 30 is a diagram useful in describing control for switching wavelength to the long-wavelength side.

FIG. 30 is a diagram useful in describing control for changing over wavelength when the wavelength of the main-signal light is changed over to the side of longer wavelength. In FIG. 30, W represents the wavelength filtering width of the first optical filter 41. If the zero-dispersion wavelength fluctuates toward the side of longer wavelength and changes to a wavelength intermediate the wavelength of the present light source and the wavelength of the neighboring light source, control is performed in such a manner that the center wavelength of the first optical filter 41 is shifted so that the wavelengths $\lambda_1, \lambda_2$ will fall within the filtering width W [(1)→(2)→(3) in FIG. 30]. Next, the light source of wavelength $\lambda_2$ also emits light in addition to the light source of $\lambda_1$ and then the light source of $\lambda_1$ is extinguished [(3)→(4)]. As a result, the wavelength of the main-signal light can be changed over to the side of longer wavelength without any interruption in light.

Figure 31:
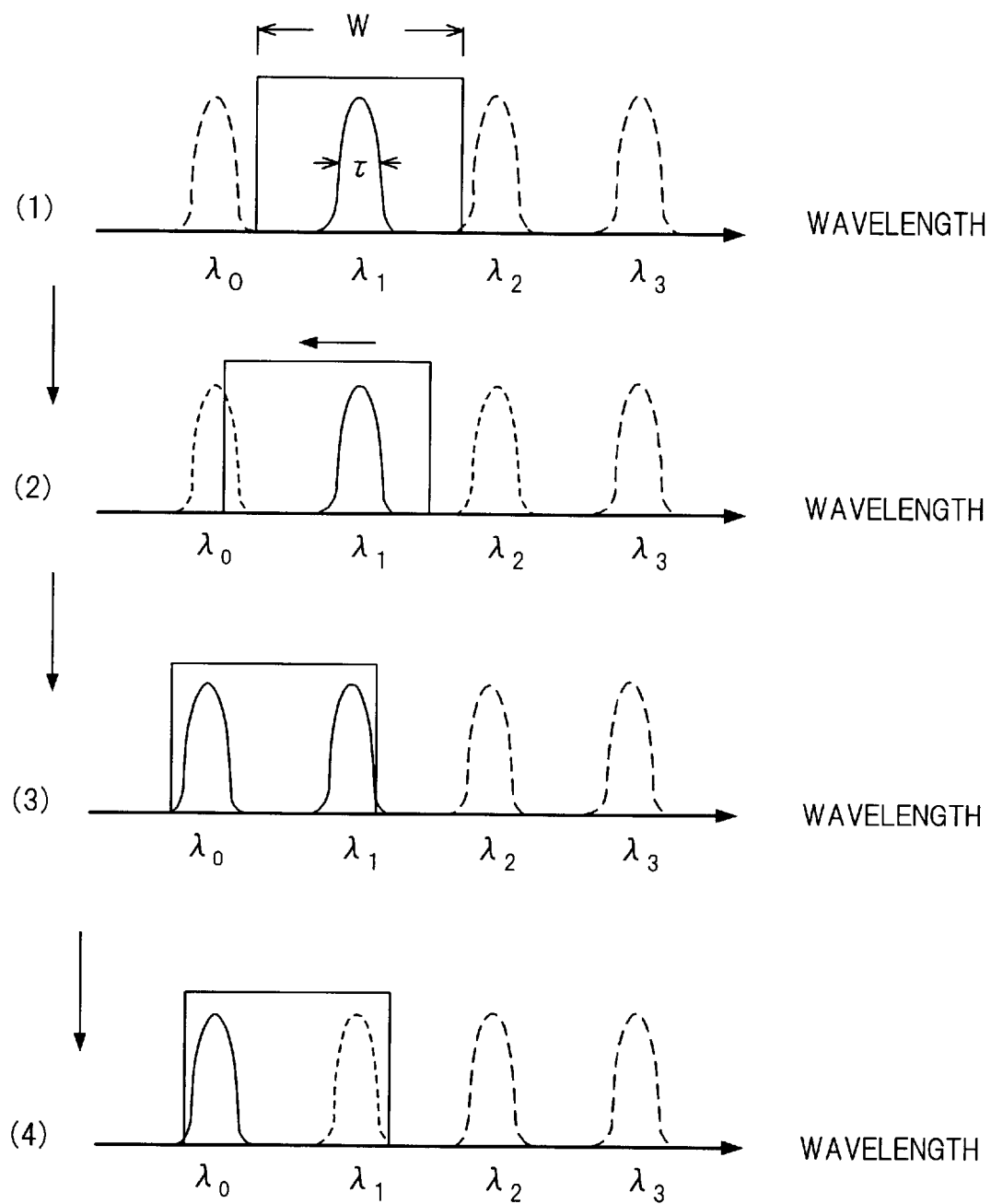
FIG. 31 is a diagram useful in describing control for switching wavelength to the short-wavelength side.

FIG. 31 is a diagram useful in describing control for changing over wavelength when the wavelength of the main-signal light is changed over to the side of shorter wavelength. In FIG. 31, W represents the wavelength filtering width of the first optical filter 41. If the zero-dispersion wavelength fluctuates toward the side of shorter wavelength and changes to a wavelength intermediate the wavelength of the present light source and the wavelength of the neighboring light source, control is performed in such a manner that the center wavelength of the first optical filter 41 is shifted so that the wavelengths $\lambda_0, \lambda_1$ will fall within the filtering width W [(1)→(2)→(3) in FIG. 31]. Next, the light source of wavelength $\lambda_0$ also emits light in addition to the light source of $\lambda_1$ and then the light source of $\lambda_1$ is extinguished [(3)→(4)]. As a result, the wavelength of the main-signal light can be changed over to side of shorter wavelength without any interruption in light.

Figure 32:
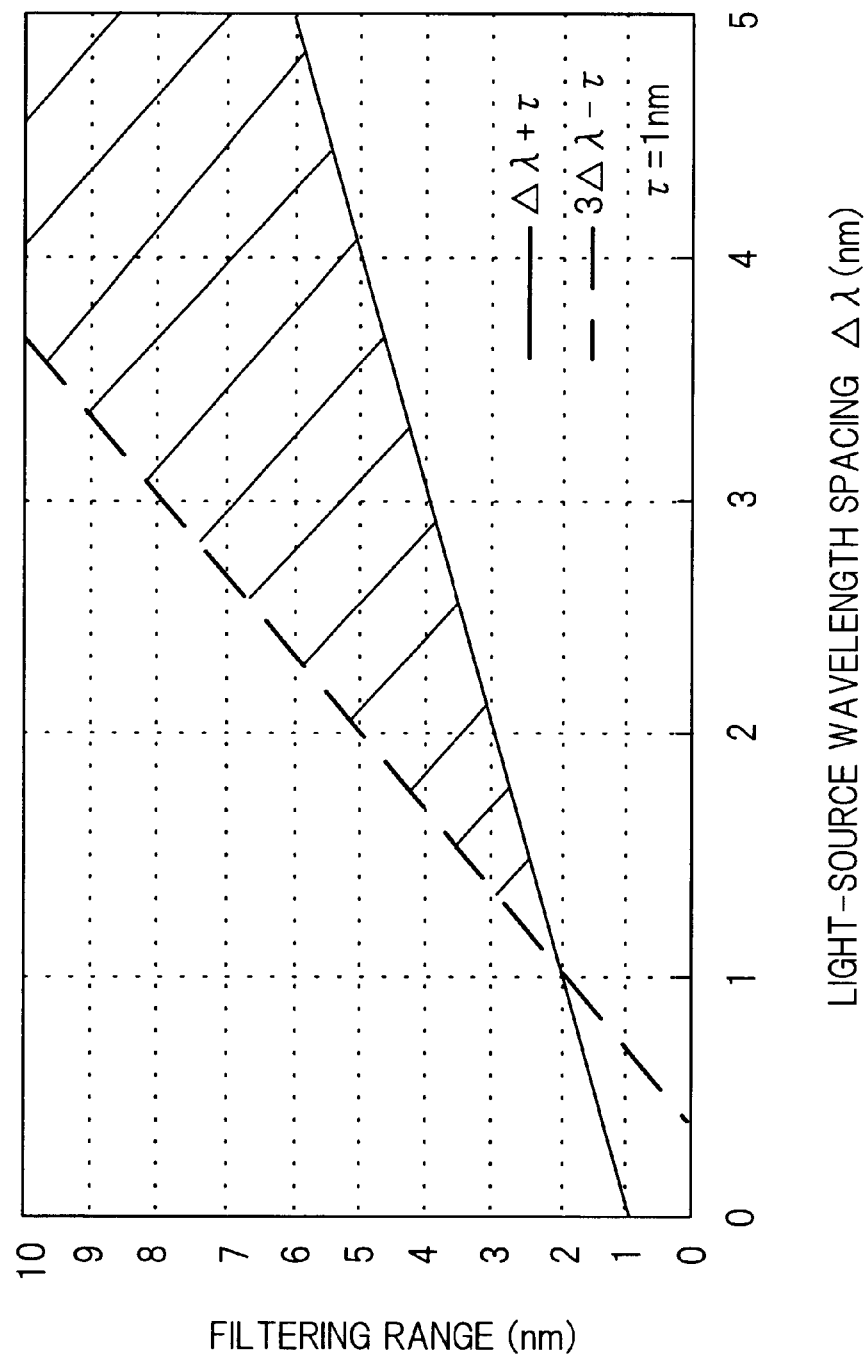
FIG. 32 is a diagram useful in describing range of filtering width.

FIG. 32 is a diagram useful in describing the range of filtering width of the first optical filter 41. The filtering width W is a range winch satisfies the following equation, where $\Delta\lambda$ represents the wavelength spacing of the light sources, $\tau$ represents the spectrum width and four-wave mixing is taken into account:

$$\Delta\lambda + \tau < W < 3\Delta\lambda - \tau \tag{5}$$

where $\Delta\lambda > \tau$

If this range is illustrated diagrammatically, it will be the hatched range bounded by the straight lines in FIG. 32. This is the range of filtering width when the spectrum width is equal to 1 nm (signal light 40 Gbps×3=120 G−1 nm).

Figure 33A:
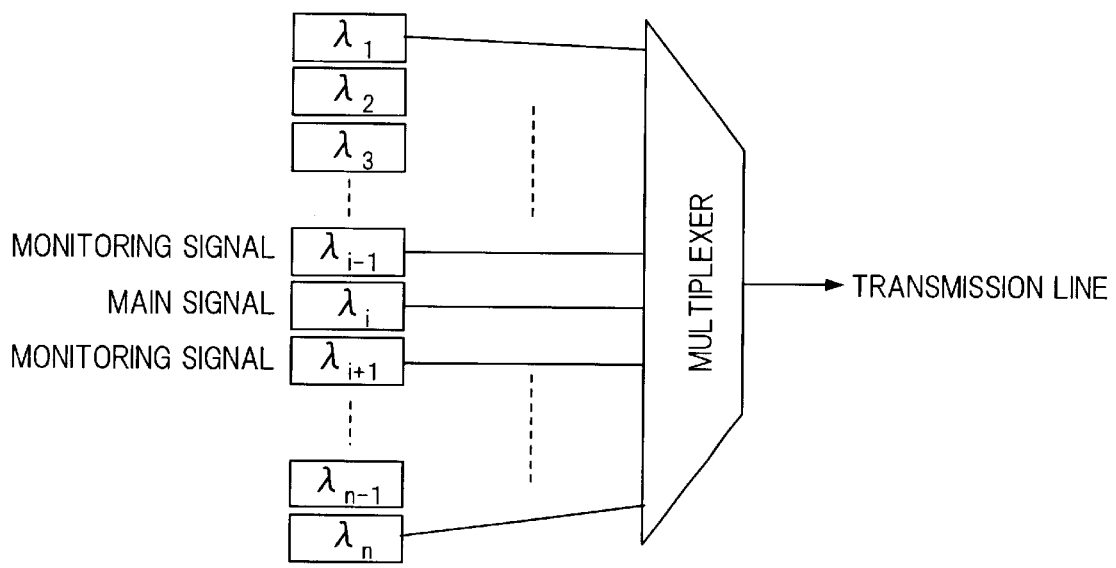
FIGS. 33A and 33B are diagrams useful in describing wavelength relationship between monitoring light and main-signal light.
Figure 33B:
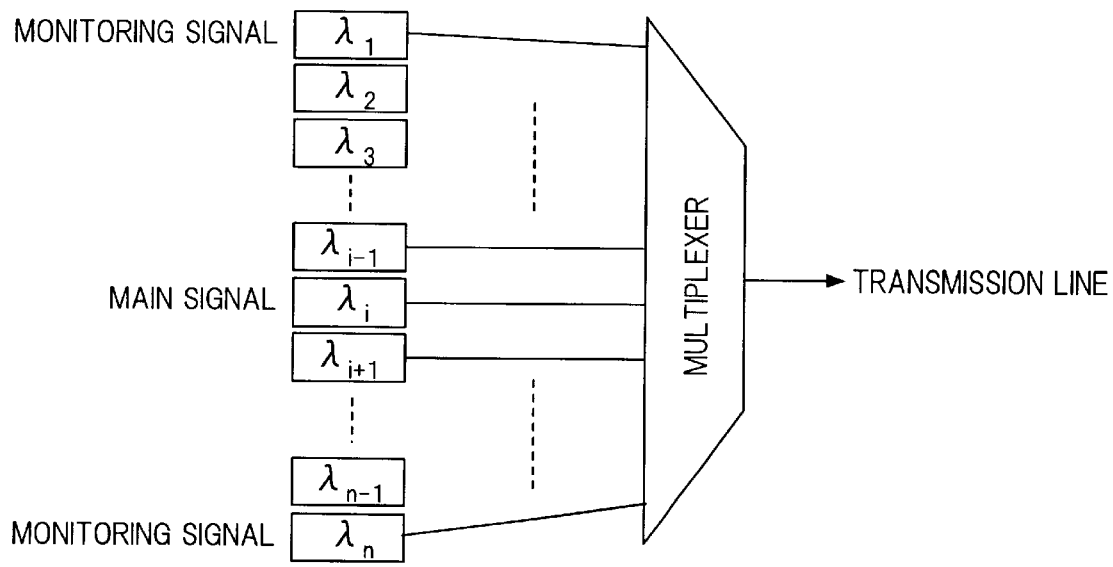

FIGS. 33A and 33B are diagrams useful in describing wavelength relationship between monitoring light and main-signal light. In the embodiment of FIG. 28, the main-signal light and the monitoring light is described as being light generated by three neighboring light sources (see FIG. 33A). However, the wavelengths of the main-signal light and monitoring light need not be adjacent, for light from light sources spaced apart from the light source of the main-signal light can also be used as monitoring light, as shown in FIG. 33B. Further, wavelengths of light spaced sufficiently away from the wavelength of the main-signal light can be used as the wavelengths of the monitoring light in such a manner that four-wave mixing will not take place. In this case, however, the direction of fluctuation of the zero-dispersion wavelength cannot be detected according to the principle described in conjunction with FIGS. 27A and 27B. The amount of wavelength dispersion, therefore, is calculated by a different method. It should be noted that four-wave mixing is a phenomenon in which light having a frequency different from that of the input light is produced.

Figure 34:
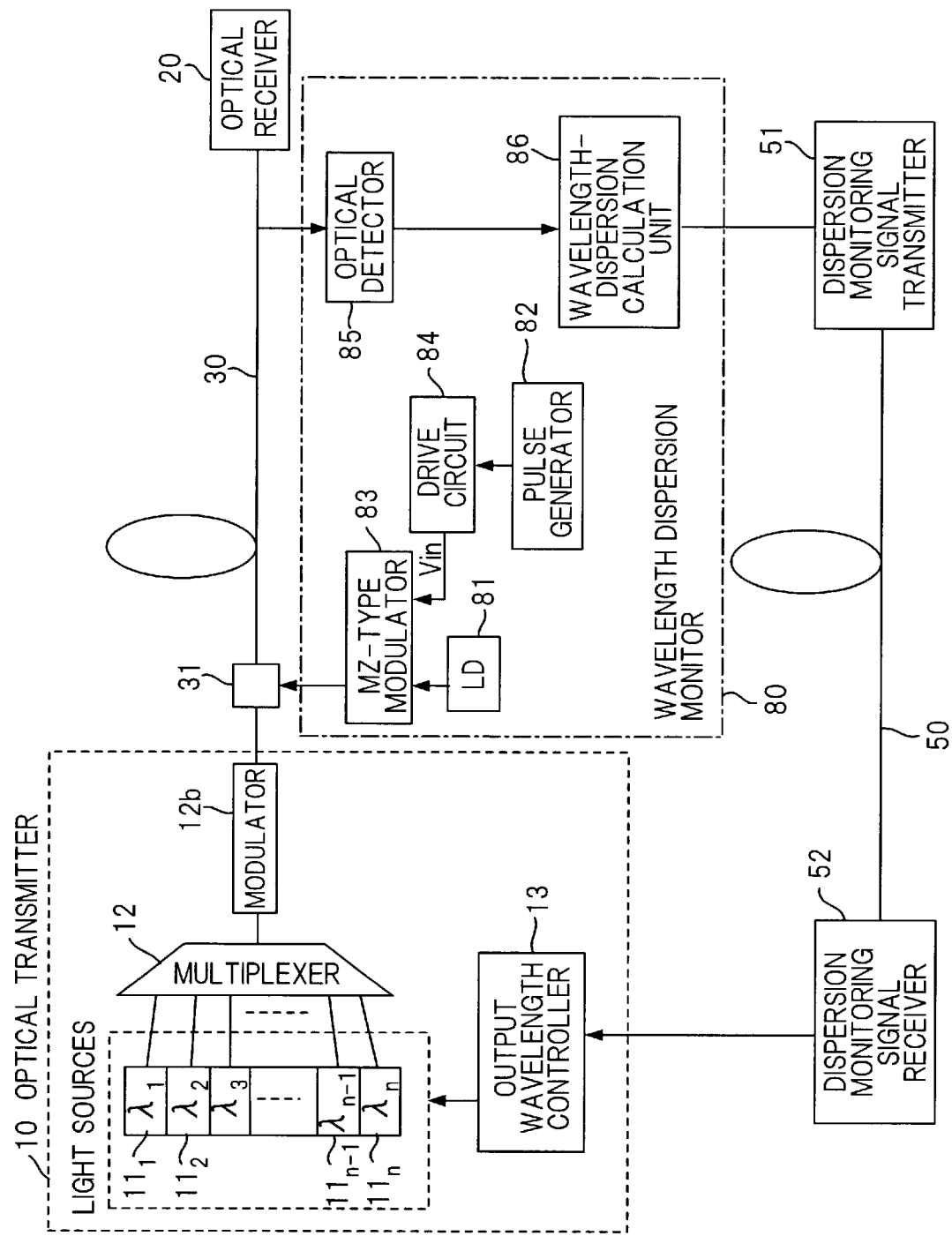
FIG. 34 is a diagram showing an embodiment using a wavelength-dispersion monitor for calculating amount of wavelength dispersion from a pulse interval.
Figure 35C:
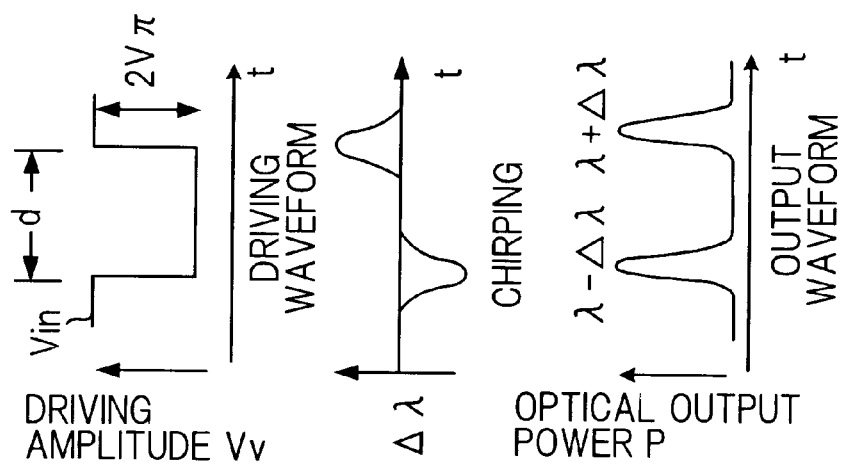
FIGS. 35A, 35B and 35C are diagrams useful in describing the principle for calculating amount of wavelength dispersion.
Figure 35B:
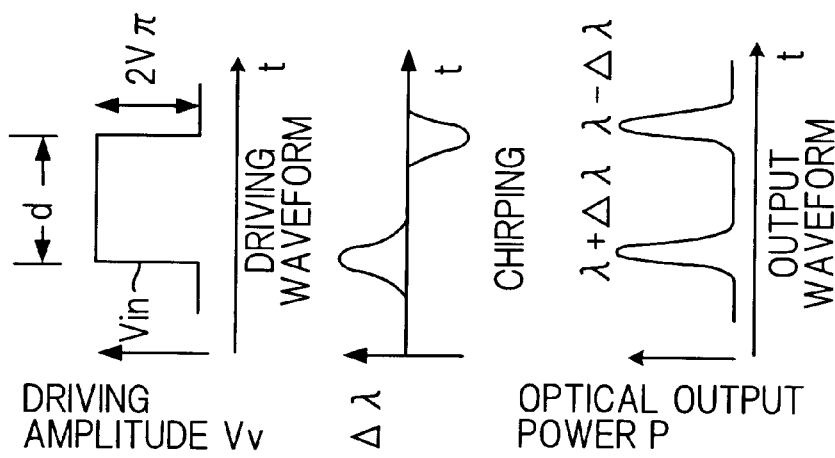
Figure 35A:
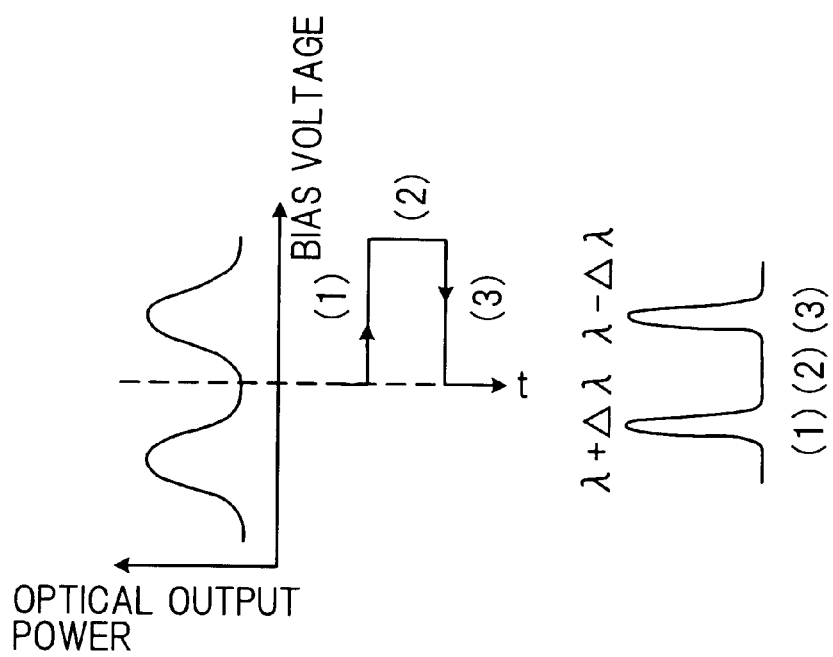

FIG. 34 is a diagram showing the construction of an optical transmission system in winch dispersion compensation is controlled by measuring the amount of wavelength dispersion using light of a wavelength sufficiently remote from the wavelength of the main-signal light, and FIGS. 35A to 35C are diagrams useful in describing the fundamentals for calculating amount of wavelength dispersion. Shown in FIG. 34 are the optical transmitter 10, the optical receiver 20, the outgoing optical transmission line 30, a light multiplexer 31, a dispersion monitor 80 for detecting the wavelength (zero-dispersion wavelength) for the transmission characteristic is optimum in regard to the wavelength dispersion exhibited by the optical transmission line, the incoming optical transmission line 50, the dispersion monitoring signal transmitter 51 for transmitting the result of dispersion monitoring, and the dispersion monitoring signal receiver 52 for extracting the result of monitoring and inputting the result to the optical transmitter 10.

The optical transmitter 10 includes the plurality of light sources $11_1$–$11_n$ having different wavelengths ($\lambda_1$–$\lambda_n$), the multiplexer 12, the external modulator 12b, and the output wavelength controller 13 for causing prescribed ones of the light sources $11_1$–$11_n$ to emit light, thereby changing the wavelength of the light output to the optical transmission line, and outputting light of the optimum wavelength to the optical transmission line based upon the result of detection by the dispersion monitor 80.

The dispersion monitor 80 includes a semiconductor laser for generating light of wavelength λ; a pulse generator 82 for generating pulses of pulse width d; a Mach-Zehnder modulator 83; a driver 84 for applying a drive voltage of 2Vπ across both electrodes of the Mach-Zehnder modulator 83 for the duration of the pulse width d; an optical detector 85 for detecting light of wavelength λ±Δλ; and a calculation unit 86 for calculating amount of wavelength dispersion. The zero-dispersion wavelength can be obtained from the amount of wavelength dispersion.

The Mach-Zehnder modulator 83 ordinarily performs data modulation by a drive voltage Vπ. However, by performing modulation by the drive voltage 2Vπ, winch is twice as large, short pulses can be generated at the rising edge [(1) in FIG. 35A] of the driving waveform and at the falling edge [(3) in FIG. 35A] of the driving waveform. Further, with the Mach-Zehnder modulator 83, chirping (wavelength fluctuation) Δλ is proportional to the value of the differential of drive voltage Vin. Consequently, the sign of chirping at the rising edge [(1) in FIG. 35A] of the driving waveform is the opposite of that at the falling edge [(3) in FIG. 35A], and the two short pulses that are generated have different wavelengths, namely λ+Δλ and λ−Δλ, respectively. If the Mach-Zehnder modulator 83 is driven by the driving drive signal Vin having the wavelength shown in FIG. 35B, the wavelength of the generated pulse on the side of the rising edge can be set to λ+Δλ (where λ represents the center wavelength of the light source) and the wavelength of the generated pulse on the side of the falling edge can be set to λ−Δλ. If the Mach-Zehnder modulator 83 is driven by the driving drive signal Vin having the wavelength shown in FIG. 35C, the wavelength of the generated pulse on the side of the falling edge can be set to λ−Δλ and the wavelength of the generated pulse on the side of the rising edge can be set to λ+Δλ.

Thus, since the two short pulses generated by the semiconductor laser 81 and Mach-Zehnder modulator 83 have mutually different wavelengths, a spread Δd (d→d+Δd) is produced in the pulse interval after transmission owing to the group delay difference. Accordingly, it is possible to ascertain the value of dispersion exhibited by the optical transmission line by detecting the spread Δd. The spread Δd is represented by the following equation:

$$\Delta d(\text{ps}) = [\text{wavelength dispersion } D(\text{ps/nm/km}) \text{ of transmission line}] \times [\text{transmission distance } L \text{ (km)}] \times \Delta\lambda c(\text{nm}) \quad (6)$$

(where Δλc: Δλ of pulse peak portion)

If the spread Δd is found, the wavelength dispersion D of the transmission line can be calculated from the above equation and the zero-dispersion wavelength can be obtained from the wavelength dispersion D.

The dispersion monitoring signal transmitter 51 sends this zero-dispersion wavelength to the optical transmitter and the output wavelength controller 13 changes over the light source of the main-signal light when the zero-dispersion wavelength becomes equal to a wavelength intermediate the wavelengths of the neighboring light sources.

Figure 36:
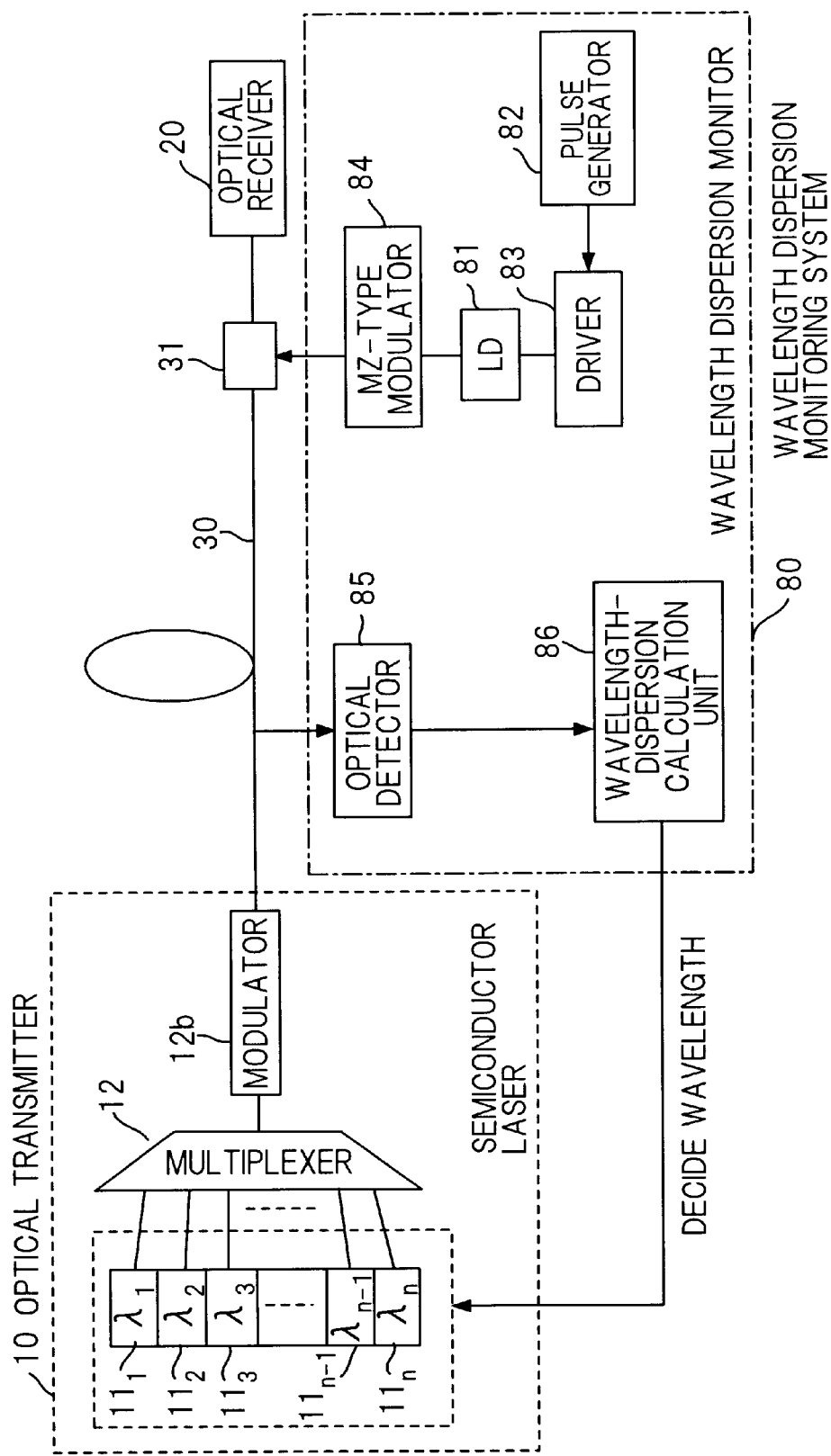
FIG. 36 is a diagram showing an embodiment using a wavelength-dispersion monitor for calculating amount of wavelength dispersion from a pulse interval.

In the embodiment shown in FIG. 34, the receiver is provided with the unit 86 for calculating the amount of wavelength dispersion. However, as shown in FIG. 36, it is possible to adopt an arrangement in winch the transmitting side is provided with the calculation unit 86, two short pulses of different wavelengths are sent from the receiving side to the transmitting side, and wavelength dispersion D and zero-dispersion wavelength are calculated on the transmitting side.

Figure 37:
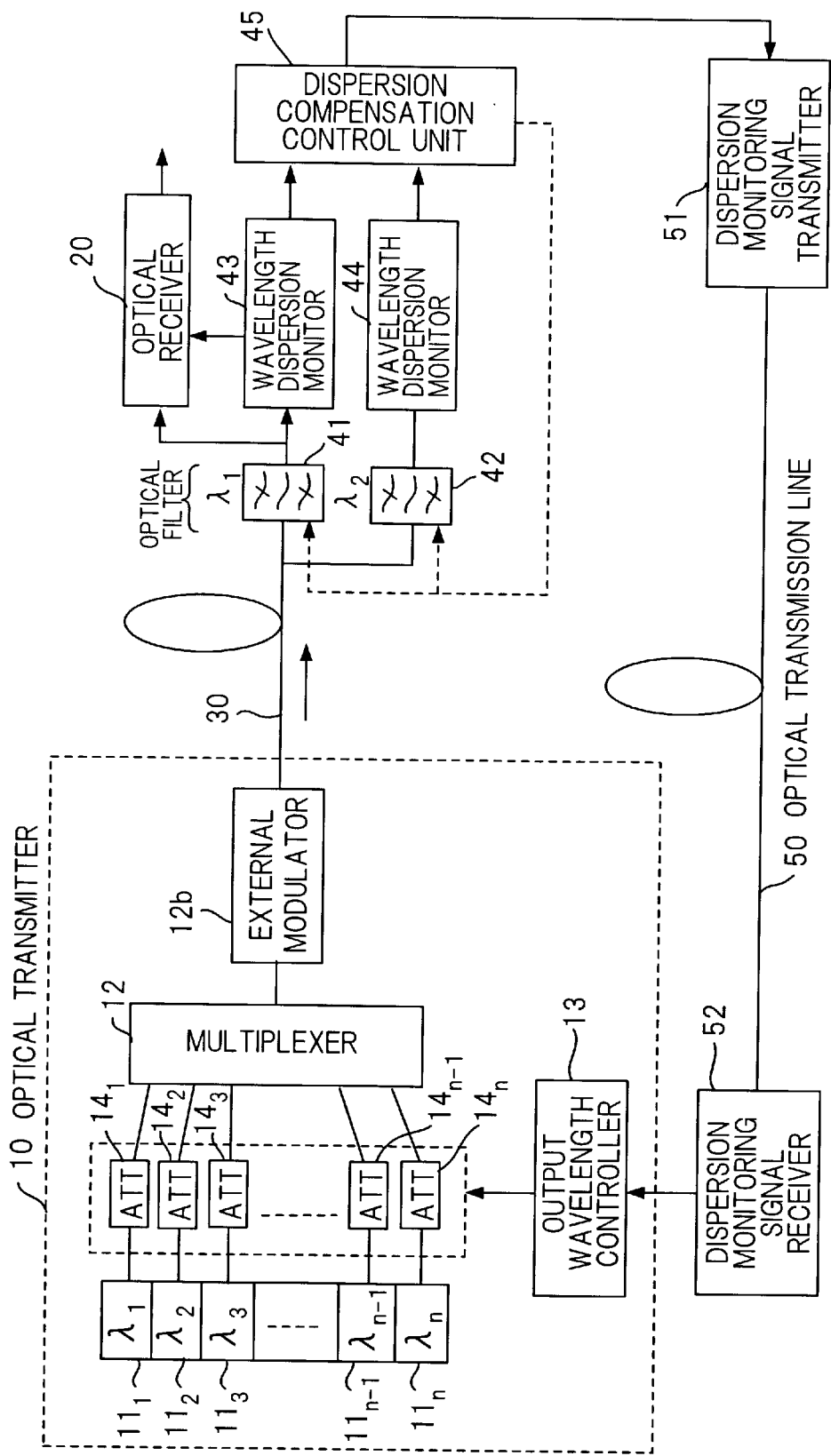
FIG. 37 is a diagram illustrating an embodiment (using monitoring light and light attenuators) for performing dispersion compensation in a case where a change in wavelength is large when optimum wavelength is unknown.

The embodiment of FIG. 28 is for a case where use is made of an optical transmitter in winch light is emitted solely from the necessary light source. However, it is also possible to use a transmitter in which all light sources emit light constantly and light having a desired wavelength is output to the optical transmission line through use of a light attenuator. FIG. 37 is a diagram showing the construction of such an arrangement using light attenuators. By turning off light attenuators $14_1$–$14_n$ provided between the light sources $11_1$–$11_n$ and multiplexer 12, light from a light source corresponding to a light attenuator that has been turned off can be output to the optical transmission line 30. Accordingly, by normally turning off the light attenuator of a light source that generates main-signal light, suitably turning off the light attenuator of a light source that generates monitoring light, multiplexing the light from these light sources and outputting the multiplexed light to the optical transmission line, dispersion compensation can be carried out by changing over the wavelength of the output light in a manner similar to that of FIG. 28.

Figure 38:
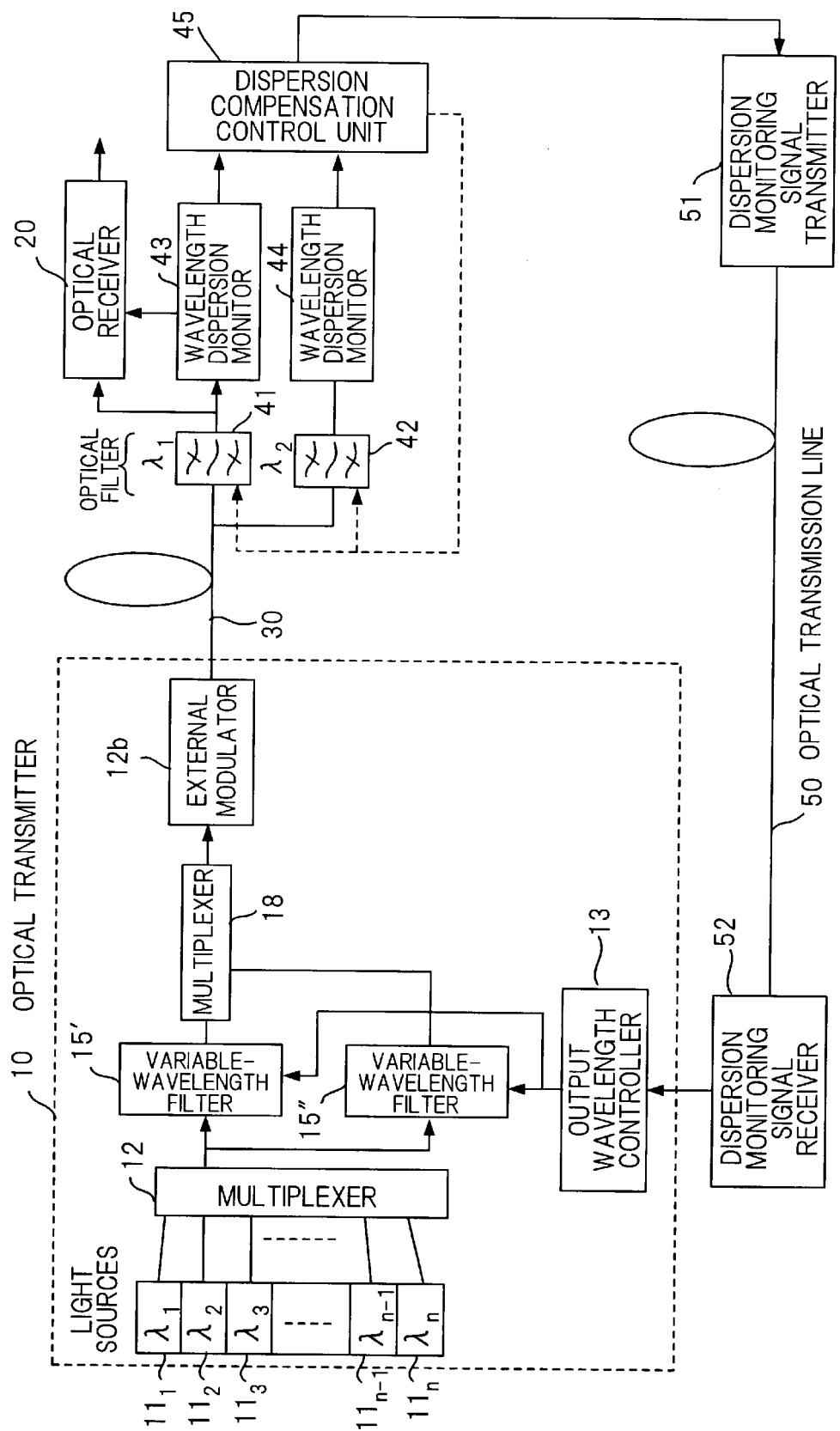
FIG. 38 is a diagram illustrating an embodiment (using monitoring light and a variable-wavelength filters) for performing dispersion compensation in a case where a change in wavelength is large when optimum wavelength is unknown.

Further, it is possible to use a transmitter in which all light sources normally emit light and light of a desired wavelength is output to the optical transmission line by a variable-wavelength filter. FIG. 38 is a diagram showing the construction of such an arrangement using variable-wavelength filters. By passing main-signal light and monitoring light via variable-wavelength filters 15', 15", respectively, provided at the output of the multiplexer 12, dispersion compensation can be carried out by changing over the wavelength of the output light in a manner similar to that of FIG. 28.

There are cases where beats are produced between light signals of mutually adjacent wavelengths, such as between main-signal light and monitoring light, as a result of winch wavelength dispersion monitoring cannot be performed correctly on the receiving side owing to the influence of beat. Accordingly, if the polarizations of the two transmitted optical signals (the main-signal light and monitoring light) are made orthogonal, the occurrence of beat can be prevented and the precision of wavelength-dispersion monitoring can be improved.

Figure 39:
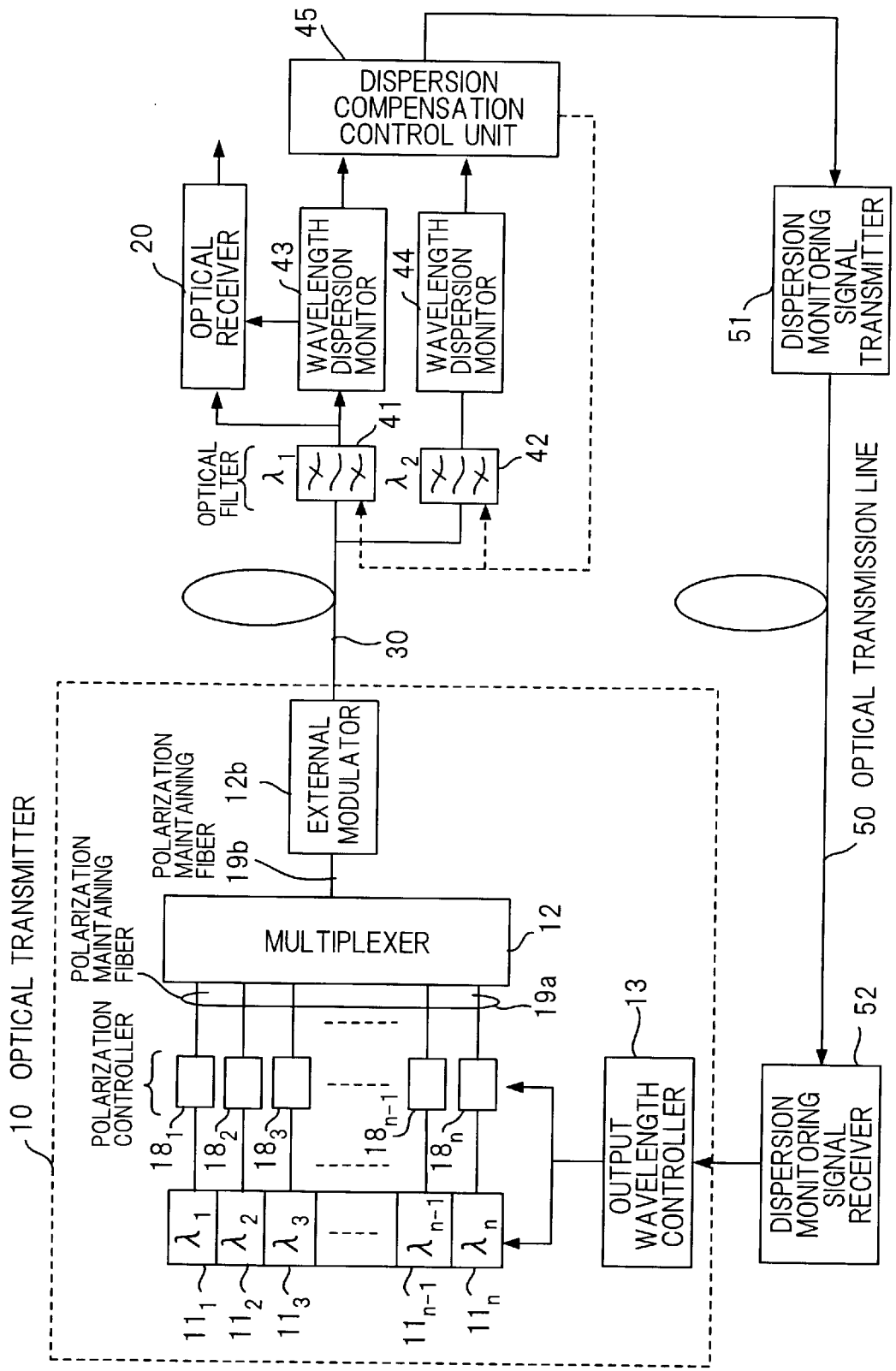
FIG. 39 is a diagram showing an embodiment in which main-signal light and monitoring light are rendered orthogonal.

FIG. 39 is a diagram showing an embodiment in winch main-signal light and monitoring light are rendered orthogonal. Components identical with those of the embodiment shown in FIG. 28 are designated by like reference characters. This embodiment differs in terms of the construction of the optical transmitter 10. The optical transmitter 10 includes the plurality of light sources $11_1$–$11_n$ (discrete semiconductor lasers or semiconductor array laser) of different wavelengths ($\lambda_1$–$\lambda_n$) the multiplexer 12, the external modulator 12b and the output wavelength controller 13. (1) Before the optical transmission system starts operating, the output wavelength controller 13 causes prescribed light sources $11_1$–$11_n$ to emit light, thereby changing the wavelength of light output to the optical transmission line. (2) When the system is in operation, the output wavelength controller 13 causes main-signal light and monitoring light to be output to the optical transmission line based upon the result of monitoring dispersion. (3) When the system is in operation, the output wavelength controller 13 causes the polarizations of the main-signal light and monitoring light to become orthogonal. Polarization controllers $18_1$–$18_n$ control directions of polarization of light output from the corresponding light sources in accordance with a command from the output wavelength controller 13. Polarization maintaining fibers 19a–19b maintain the polarization of light applied thereto.

The output wavelength controller 13 causes light to be emitted from the light source of the main-signal light and the light source of the monitoring light and instructs the polarization controllers corresponding to these light sources to render the polarizations of the main-signal light and monitoring light orthogonal. As a result, the polarization controllers perform an adjustment in such a manner that the polarizations of the main-signal light and monitoring light are rendered orthogonal. These light beams are transmitted to the optical transmission line via the polarization maintaining fibers 19a, multiplexer 12, polarization maintaining fiber 19b and external modulator 12b. Since the polarizations are orthogonal, beat products are not produced and the precision of wavelength-dispersion monitoring can be improved. The system is effective as a short-distance transmission system in winch the transmission line has a length of tens of kilometers.

(f) Embodiment in Winch Wavelength Dispersion is Compensated for Using Monitoring Light FIGS. 27A, 27B illustrate a case where a characteristic in winch the intensity of a specific frequency component versus wavelength is approximated by a curve of second degree. Owing to the symmetry of the curve of second degree, the fact that zero-dispersion wavelength has changed to a wavelength intermediate the wavelength $\lambda_1$ of the main-signal light and the wavelength $\lambda_2$ of the monitoring light is detected when the intensity of a specific frequency component at wavelength $\lambda_1$ and the intensity of the specific frequency component at wavelength $\lambda_2$ have become equal.

Figure 40:
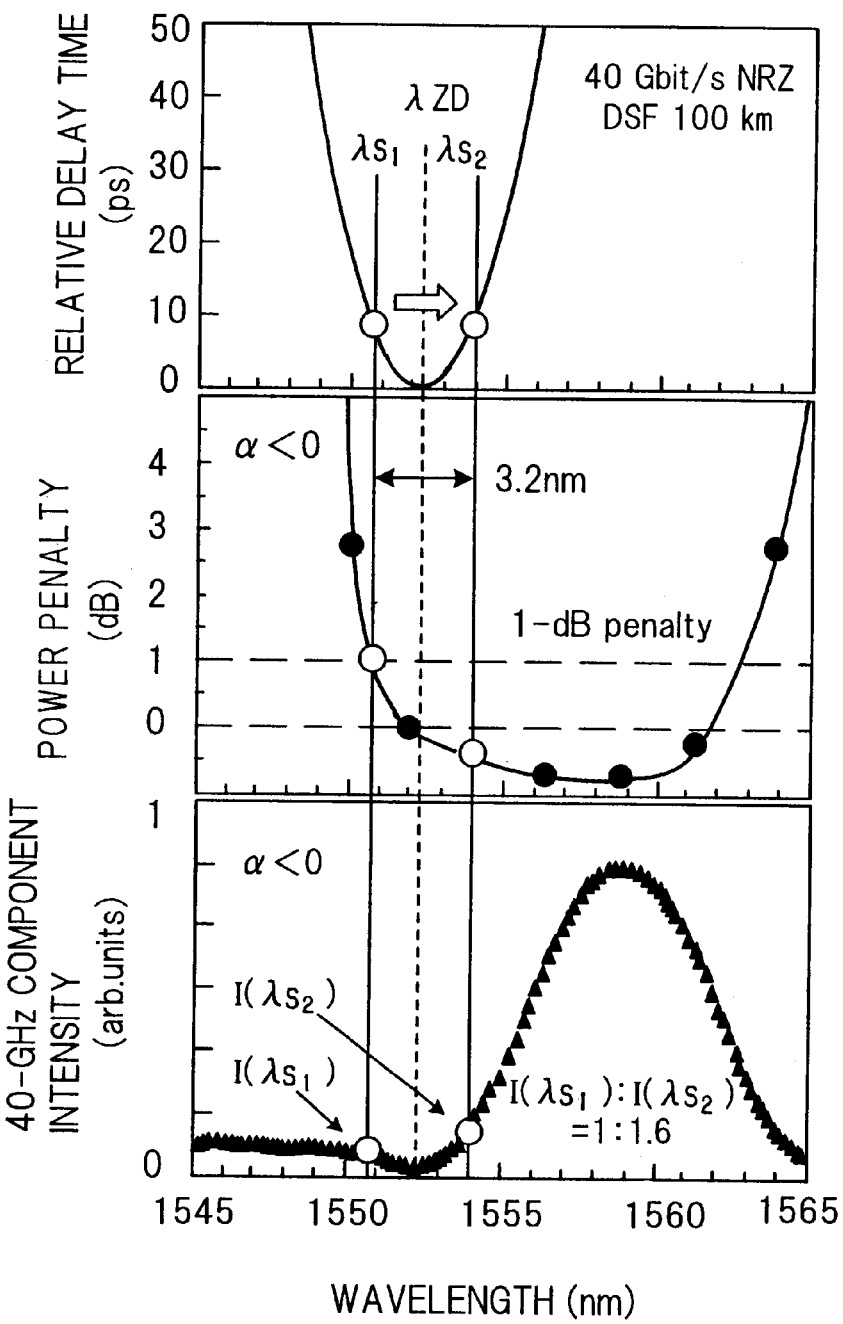
FIGS. 40A, 40B and 40C are diagrams useful in describing detection of wavelength changeover point.

However, there are instances where the characteristic of the intensity of a specific frequency component cannot be approximated by a curve of second degree. If the optical modulation scheme is NRZ modulation, for example, the characteristic of 40-GHz component intensity does not have left-right symmetry with respect to the zero-dispersion wavelength. Consequently, if $\lambda s_1$ and $\lambda s_2$ represent the wavelengths of the main-signal light and monitoring light, respectively, the monitoring component intensities $I(\lambda s_1)$, $I(\lambda s_2)$ at the wavelengths $\lambda s_1$, $\lambda s_2$ will have a certain ratio and will not be equal, as shown in FIG. 40C, even if the zero-dispersion wavelength is moved to the two wavelength centers. For example, when the light-source wavelength spacing is 3.2 nm (=$\lambda s_2$–$\lambda s_1$) after transmission over an NRZ DSF of 100 km, the monitoring-component intensity ratio $I(\lambda s_1):I(\lambda s_2)$ is 1:1.6, where the a parameter is equal to –0.7. If the a parameter is equal to +0.7, then $I(\lambda s_1):I(\lambda s_2)=$ 1.6:1 will hold. Thus, in a case where the characteristic of the intensity of a specific frequency component cannot be approximated by a curve of second degree, the intensity ratio $I(\lambda s_1):I(\lambda s_2)$ is detected and set by control software or is set from a control terminal. Thereafter, fluctuation of the monitored value at the wavelengths $\lambda s_1$, $\lambda s_2$ with the passage of time is sensed and the fact that the intensity ratio $I(\lambda s_1):I(\lambda s_2)$ has become equal to the above-mentioned set intensity ratio is detected. If the two become equal, then the zero-dispersion wavelength is $(\lambda s_2+\lambda s_1)/2$. At the moment the two become equal, the monitoring light is changed over to the main-signal light and the main-signal light to the monitoring light.

FIG. 40A shows a relative delay-time characteristic, and FIG. 40B illustrates a power-penalty characteristic. It is necessary to decide the light-source wavelength spacing $\lambda s_2$–$\lambda s_1$ in such a manner that the power penalty falls below 1 dB within the range $\lambda s_1$ to $\lambda s_2$.

Figure 41:
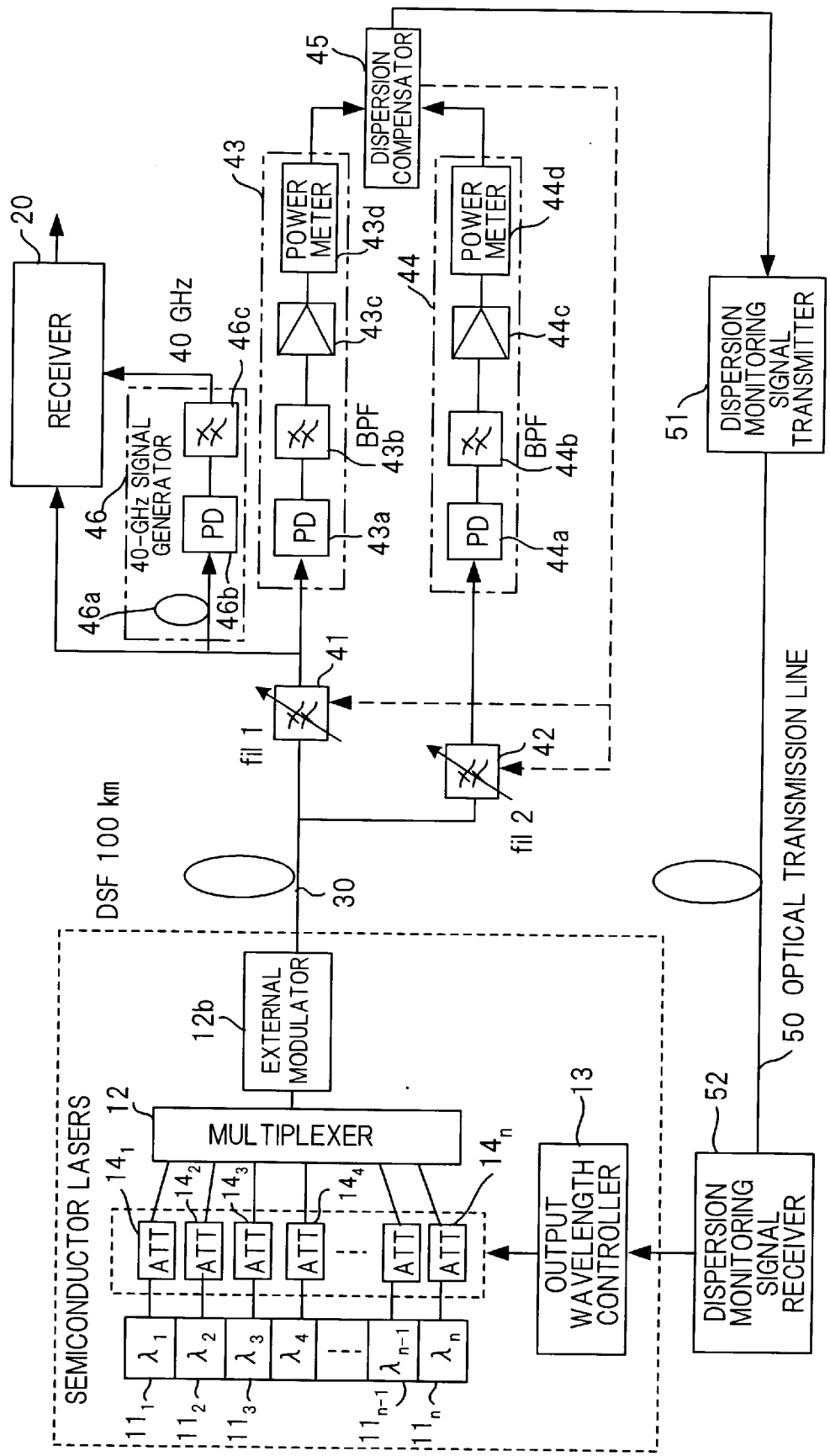
FIG. 41 is a diagram showing the configuration of an optical transmission system.

FIG. 41 is a diagram showing the configuration of an optical transmission system according to this embodiment. Components in FIG. 41 identical with those shown in FIG. 28 are designated by like reference characters. This arrangement differs from that of FIG. 23 in the following respects:

(1) light attenuators $14_1$–$14_n$ are provided between the light sources $11_1$–$11_n$ and multiplexer 12 and prescribed ones thereof are turned on and off, whereby light from a light source corresponding to a light attenuator that has been turned off can be output to the optical transmission line 30 via the multiplexer 12 and external modulator 12b;

(2) the structure of wavelength-dispersion monitors 43, 44 is clearly shown; and (3) a 40-GHz signal generator 46 is added on for generating a 40-GHz synchronized to the bit rate required for the optical receiver 20.

By providing the light attenuators $14_1$–$14_n$, the light attenuator of the light source that generates the main-signal light can be turned off at all times, the light attenuator of the light source that generates the monitoring light can be turned off when appropriate and the light from these light sources can be combined and output to the optical transmission line 30. In other words, by turning off a prescribed light attenuator, the wavelengths of the main-signal light and monitoring light can be changed over to control dispersion compensation. The wavelength-dispersion monitors 43, 44 respectively includes light-receiving devices 43a, 44a such as photodiodes for converting light, winch has been branched from the optical transmission line 30, to electric signals; band-pass filters (BPF) 43b, 44b having a specific frequency (40 GHz) as their center frequencies; amplifiers 43c, 44c, and power meters 43d, 44d for detecting the power of the specific frequency component (40-GHz component). The 40-GHz signal generator 46 has a dispersion add-on unit 46a for dispersing the wavelength of light output by the filter 41 and outputting light that contains the 40-GHz component, a light-receiving device 46b such as a photodiode for converting light, winch is output by the dispersion add-on unit 46a, to an electric signal, and a band-pass filter (BPF) 460c having 40 GHz as the center frequency.

Figure 43A:
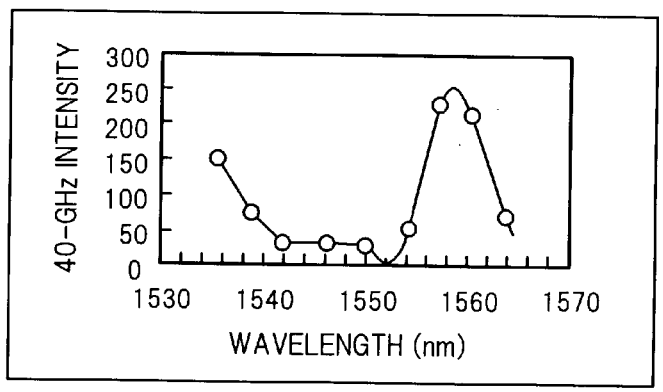
FIGS. 43A, 43B, 43C and 43D are diagrams useful in describing dispersion compensation processing in a case where zero-dispersion wavelength moves toward the long-wavelength side.

FIG. 42 shows the flow of processing for wavelength dispersion compensation (initial setting) before the start of system operation. Before the system is started up, the output wavelength controller 13 opens and closes the light attenuators $14_1$–$14_n$ in order. The dispersion compensation control unit 45 controls the wavelength of the optical filter 41 and reads in the 40-GHz component intensity, winch is the measured value from the power meter 43d, while being operated in association with the opening and closing of the attenuators (step 201). The dispersion compensation control unit 45 plots the characteristic of the 40-GHz component intensity using this measured value (FIG. 43A; step 202). From the characteristic of the 40-GHz component intensity, the dispersion compensation control unit 45 obtains the wavelengths $\lambda_2$, $\lambda_3$ of two light sources bracketing the zero-dispersion wavelength $\lambda$ for which the 40-GHz component intensity is minimized (step 203). It is assumed that the 40-GHz component intensity at wavelength $\lambda_2$ is smaller than that at wavelength $\lambda_3$.

Next, in accordance with a command from the dispersion compensation control unit 45, the output wavelength controller 13 opens the light attenuators $14_2$, $14_3$ corresponding to the wavelengths $\lambda_2$, $\lambda_3$, and the dispersion compensation control unit 45 sets the wavelength $\lambda_2$ as the center wavelength of the first optical filter 41 and the wavelength $\lambda_3$ as the center wavelength of the second optical filter 42 (step 204).

Thus, the light of wavelength $\lambda_2$ nearest the zero-dispersion wavelength becomes the main-signal light and the light of wavelength $\lambda^3$ becomes the monitoring light, where the wavelengths $\lambda_2$, $\lambda_3$ ($\lambda_2 < \lambda_3$) bracket the zero-dispersion wavelength.

Figure 44:
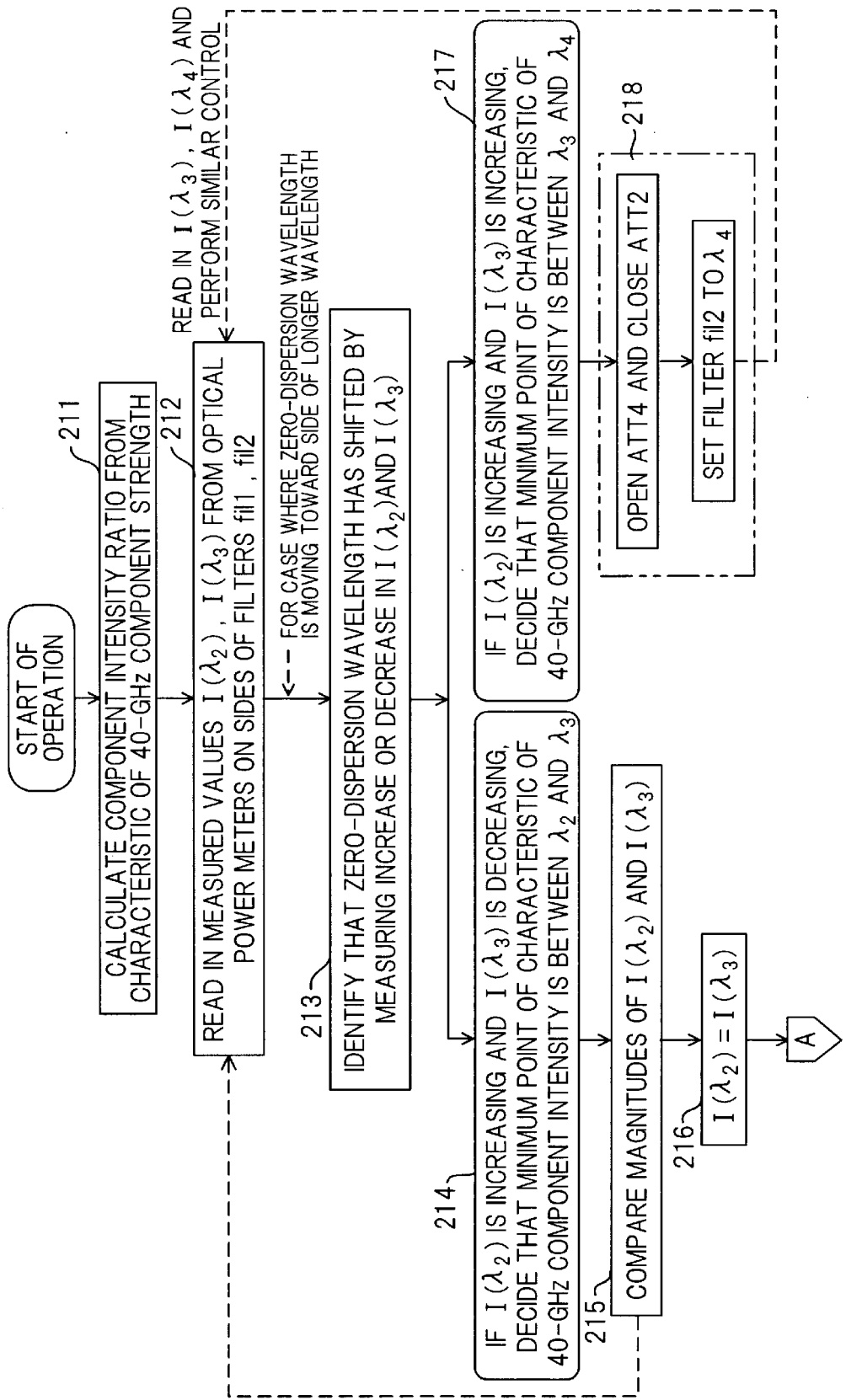
FIG. 44 shows the flow of processing for wavelength dispersion compensation in a case where zero-dispersion wavelength moves toward the long-wavelength side (where changeover of monitoring light and changeover of main wavelength are indicated)

FIG. 44 shows the flow of processing for wavelength dispersion compensation in a case where zero-dispersion wavelength moves toward the long-wavelength side. Before the system starts operating, the dispersion compensation control unit 45 obtains, from the characteristic of the 40-GHz component intensity, the 40-GHz component intensity ratio $I(\lambda_2):I(\lambda_3)$ for changing over the main-signal light (step 211). The intensity ratio is assumed to be 1:1.6.

Next, during system operation, the dispersion compensation control unit 45 reads in the 40-GHz component intensities $I(\lambda_2)$, $I(\lambda_3)$ of the wavelengths $\lambda_2$, $\lambda_3$ from the power meters 43d, 44d (step 212), checks the increase or decrease in the 40-GHz component intensities $I(\lambda_2)$, $I(\lambda_3)$ from one sampling earlier and identifies movement of the zero-dispersion wavelength (step 213).

Figure 43B:
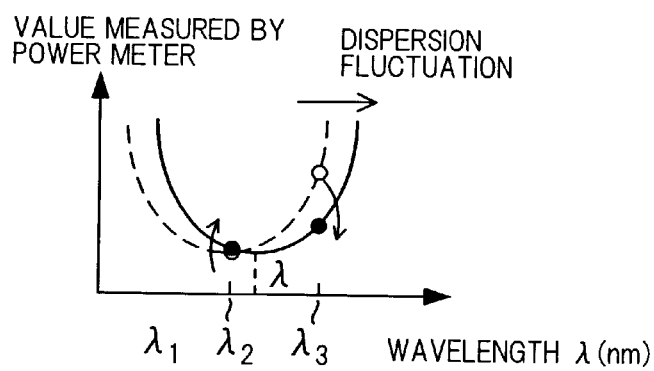

If $I(\lambda_2)$ is increasing and $I(\lambda_3)$ decreasing in case of movement (see FIG. 43B), it is judged that the zero-dispersion wavelength $\lambda$ is between $\lambda_2$ and $\lambda_3$ and is moving toward the side of longer wavelength (step 214). Next, $I(\lambda_2)$ is multiplied by 1.6 to effect a correction $[I(\lambda_2) \times 1.6 \rightarrow I(\lambda_2)]$, and $I(\lambda_2)$ after correction is compared with $I(\lambda_3)$ in terms of magnitude (step 215).

If $I(\lambda_2) < I(\lambda_3)$ holds, then processing from step 212 onward is repeated. If $I(\lambda_2) = I(\lambda_3)$ holds (step 216), the main-signal light is changed over. That is, the monitoring light of wavelength $\lambda_3$ is changed over to the main-signal light and the main-signal light of wavelength $\lambda_2$ is changed over to the monitoring light. The procedure for making this change is described below.

Figure 43C:
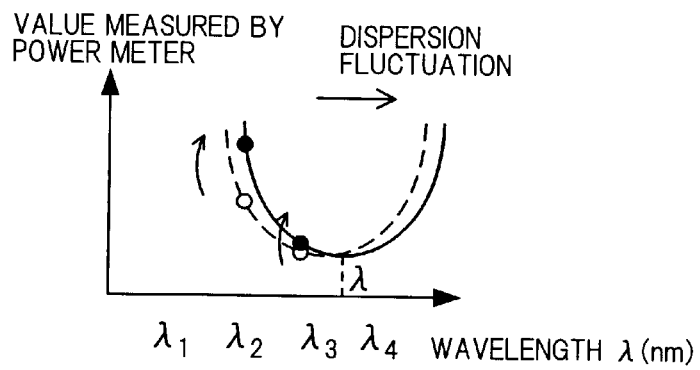
Figure 43D:
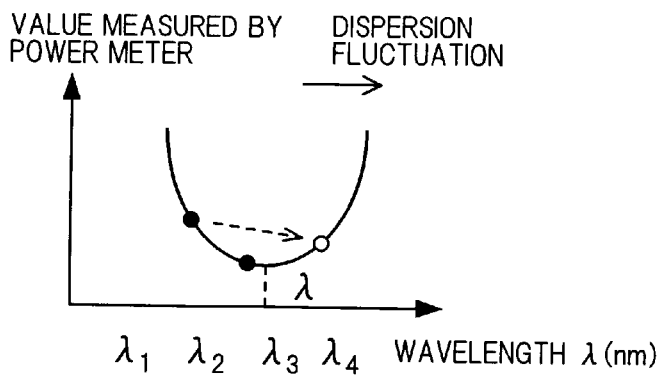

If, after the main-signal light is changed, the zero-dispersion wavelength $\lambda$ moves further toward the side of longer wavelength, $I(\lambda_2)$ increases and so does $I(\lambda_3)$, then the zero-dispersion wavelength $\lambda$ becomes longer than the wavelength $\lambda_3$ of the main-signal light and the relation $\lambda_3 < \lambda < \lambda_4$ is established (see FIG. 43C; step 217). If $\lambda_3 < \lambda < \lambda_4$ holds, then the light of light-source wavelength $\lambda_4$ is changed over to the monitoring light (see FIG. 43D; step 218). Processing from step 212 onward is then repeated. When the monitoring light is changed over, the light attenuator 141 is opened and the light attenuator $14_3$ is closed to set the wavelength $\lambda_4$ as the center wavelength of the second optical filter 42.

Figure 45:
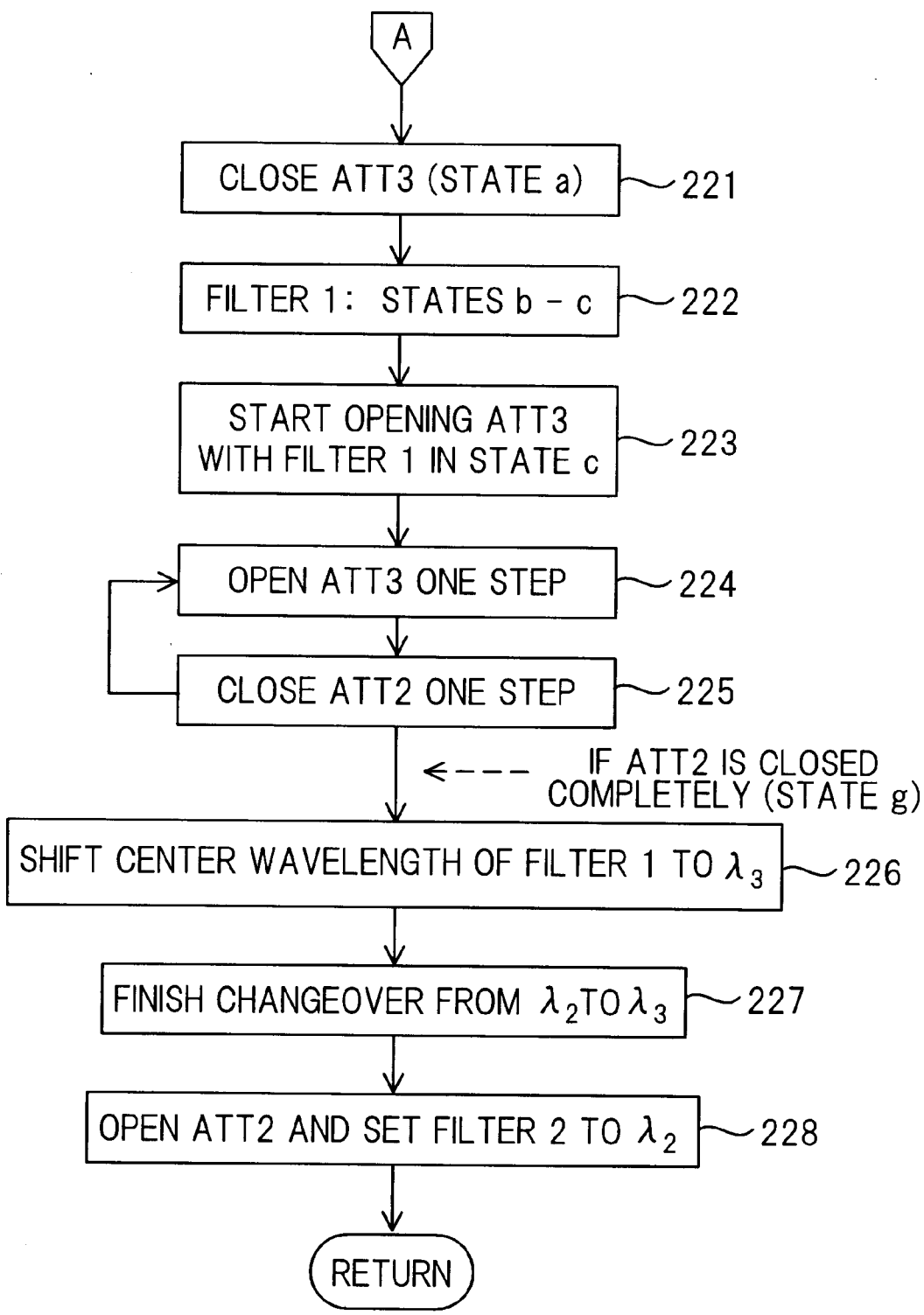
FIG. 45 shows the flow of processing for wavelength dispersion compensation in a case where zero-dispersion wavelength moves toward the long-wavelength side (control of main-wavelength changeover)
Figure 46:
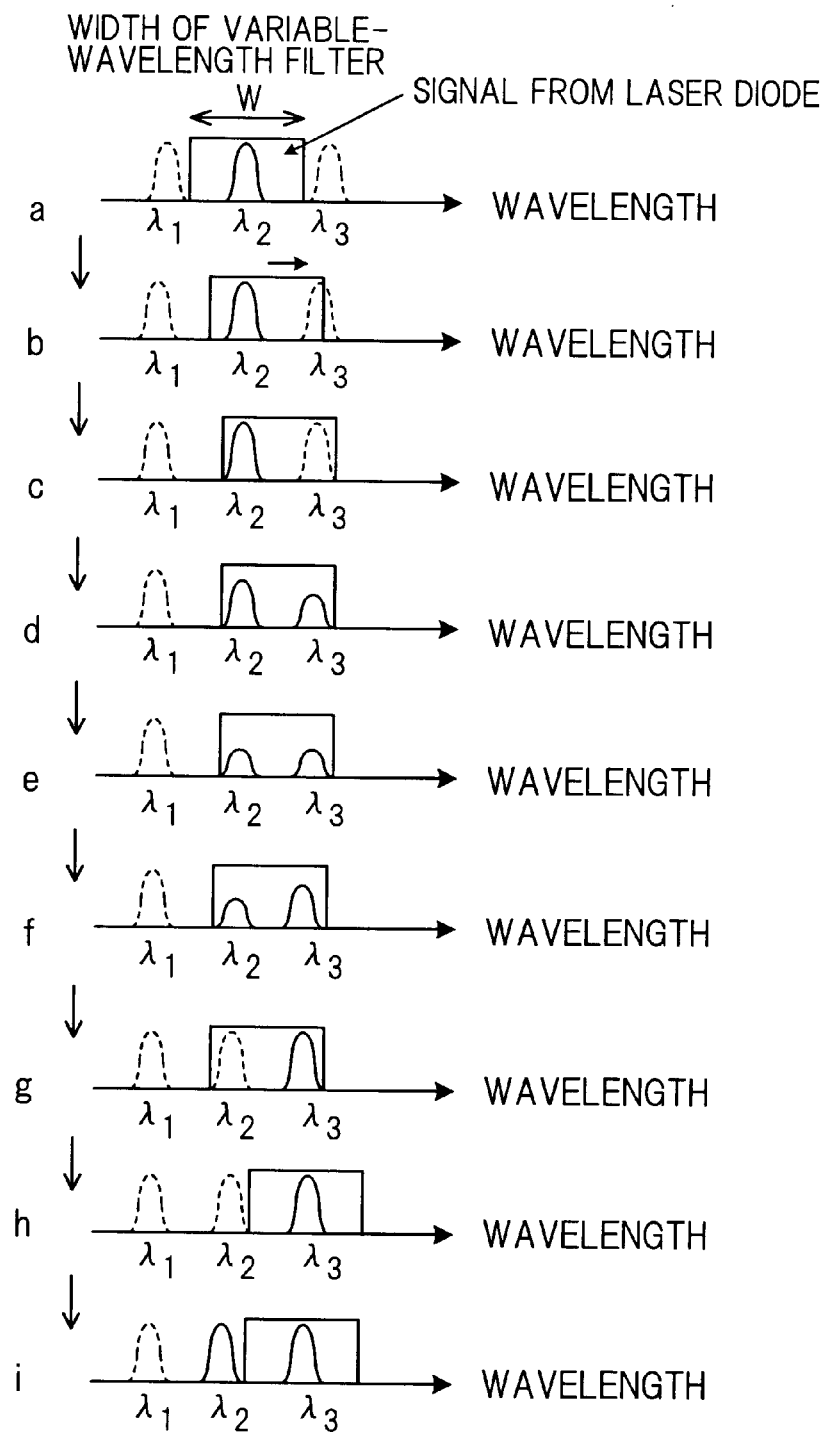
FIG. 46 is a diagram useful in describing control of changeover of main-signal light.

FIG. 45 shows the flow of processing for controlling changeover of the main-signal light, and FIG. 46 is a diagram useful in describing control for changing over the main-signal light.

If $I(\lambda_2) = I(\lambda_3)$ holds (step 216 in FIG. 44), the monitoring light of wavelength $\lambda_3$ is changed over to main-signal light and the main-signal light of wavelength $\lambda_2$ is changed over to monitoring light.

First, the light attenuator $14_3$ is closed (step 221; state a in FIG. 44). Next, the center wavelength of the first optical filter 41 is shifted toward the side of longer wavelength and control is performed in such a manner that the wavelengths $\lambda_2$, $\lambda_3$ fall within the filter range W (step 222, states b, c). In state c, the light attenuator $14_3$ is opened gradually and then the light attenuator $14_2$ is closed gradually in order to prevent instantaneous interruption of signal (steps 223–225; states d–f). It is important that the light attenuator $14_3$ is first opened. If the light attenuator $14_2$ is first closed, there is the danger that instantaneous interruption of light will occur. If the light attenuator $14_2$ is closed fully (state g), the center wavelength of the first optical filter 41 is shifted to $\lambda_3$ (step 226; state h). This completes changeover of the main-signal light (step 227). Finally, the light attenuator $14_2$ is opened and $\lambda_2$ is set as the center wavelength of the second optical filter 42 (step 228; state i). Thus, the main-signal light can be changed over while the power of the light is held constant.

Figures 47A, 47B, 47C:
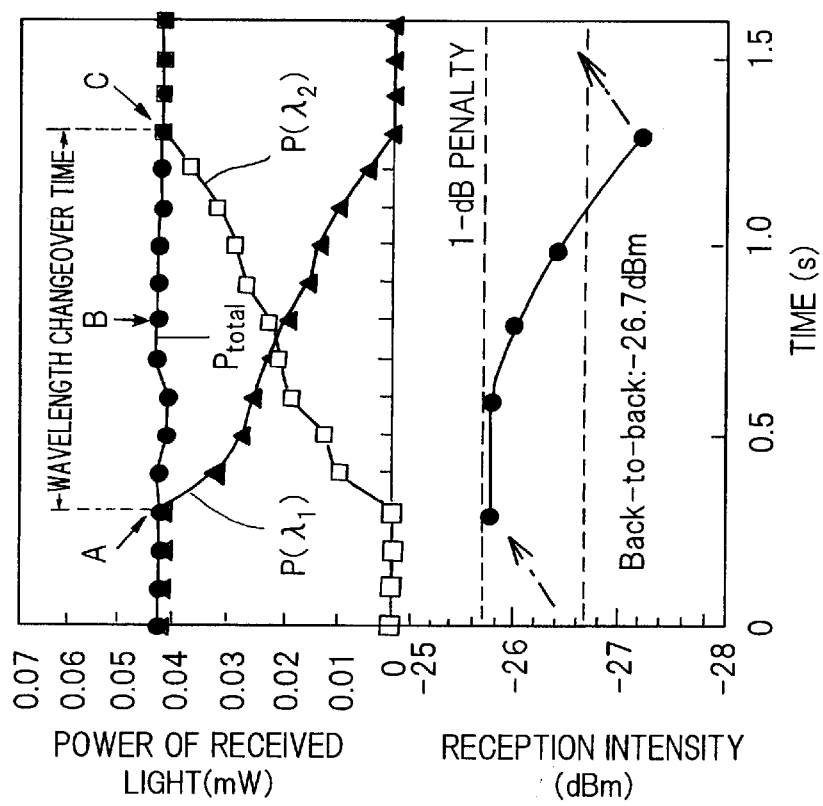
FIGS. 47A, 47B and 47C show the results of experimentation in a case where two waves are used in detection of optimum wavelength.

FIGS. 47A to 47C are diagrams useful in describing the results of experiments in a case where monitoring light of wavelength $\lambda_2$ is changed over to main-signal light and main-signal light of wavelength $\lambda_1$ is changed over to monitoring light. FIG. 47A illustrates the characteristics of received-light powers $P(\lambda_1)$, $P(\lambda_2)$ of wavelengths $\lambda_1$, $\lambda_2$ and the characteristic of total power $P_{total}$, as well as the characteristic of reception sensitivity. FIG. 47B illustrates eye patterns at the start of changeover (A), during changeover (B) and after changeover (C). FIG. 47C shows characteristics of light intensity versus wavelength at the start of changeover (A), during changeover (B) and after changeover (C). It will be understood from FIG. 47A that changeover of the main-signal light can be performed by holding the penalty below 1 dB, and it will be appreciated from FIG. 47B that changeover of the main-signal light can be performed without degradation of the eye patterns.

Figure 48:
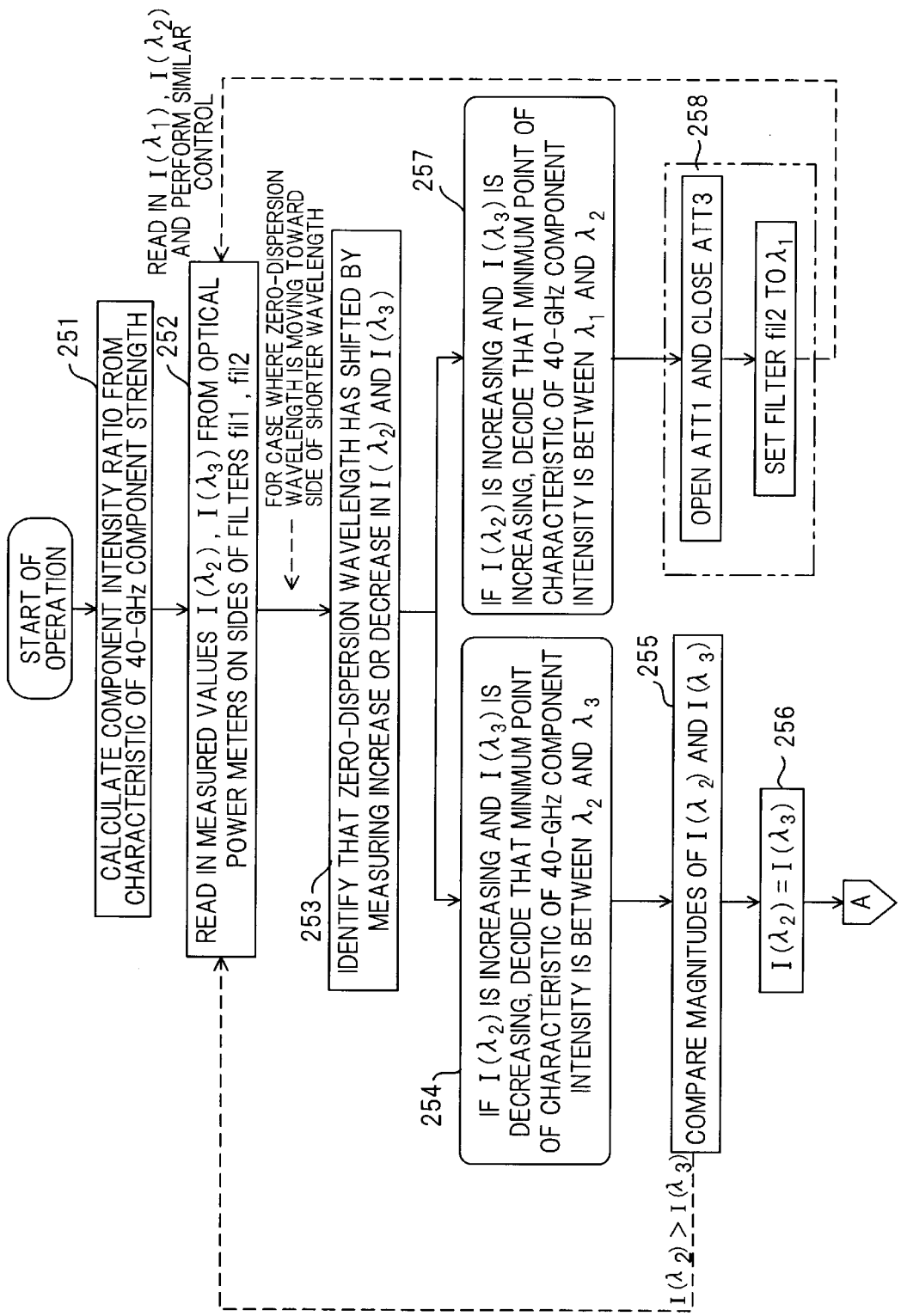
FIG. 48 shows the flow of processing for wavelength dispersion compensation in a case where zero-dispersion wavelength moves toward the short-wavelength side (where changeover of monitoring light and changeover of main wavelength are indicated)

FIG. 48 shows the flow of processing for wavelength dispersion compensation in a case where zero-dispersion wavelength moves toward the short-wavelength side, and FIGS. 49A to 49D are views useful in describing this processing.

Prior to the start of system operation, the light of wavelength $\lambda_3$ nearest the zero-dispersion wavelength is set to the main-signal light and the light of wavelength $\lambda_2$ is set to the monitoring light by the initial setting processing of FIG. 42, where the wavelengths $\lambda_2$, $\lambda_3$ ($\lambda_2 < \lambda_3$) bracket the zero-dispersion wavelength.

Prior to system operation, the dispersion compensation control unit 45 obtains, from the characteristic of the 40-GHz component intensity (see FIG. 49A), the 40-GHz component intensity ratio $I(\lambda_2):I(\lambda_3)$ for changing over the main-signal light (step 251). The intensity ratio is assumed to be 1:1.6.

Next, during system operation, the dispersion compensation control unit 45 reads in the 40-GHz component intensities $I(\lambda_2)$, $I(\lambda_3)$ of the wavelengths $\lambda_2$ $\lambda_3$ from the power meters 43d, 44d (step 252), checks the increase or decrease in the 40-GHz component intensities $I(\lambda_2)$, $I(\lambda_3)$ from one sampling earlier and identifies movement of the zero-dispersion wavelength (step 253).

If $I(\lambda_2)$ is decreasing and $I(\lambda_3)$ increasing in case of movement (see FIG. 49B), it is judged that the zero-dispersion wavelength $\lambda$ is between $\lambda_2$ and $\lambda_3$ and is moving toward the side of shorter wavelength (step 254). Next, $I(\lambda_2)$ is multiplied by 1.6 to effect a correction $[I(\lambda_2) \times 1.6 \rightarrow I(\lambda_2)]$, and $I(\lambda_2)$ after correction is compared with $I(\lambda_3)$ in terms of magnitude (step 255).

If $I(\lambda_2) > I(\lambda_3)$ holds, then processing from step 252 onward is repeated. If $I(\lambda_2) = I(\lambda_3)$ holds (step 256), the main-signal light is changed over. That is, the monitoring light of wavelength $\lambda_2$ is changed to the main-signal light and the main-signal light of wavelength $\lambda_3$ is change to the monitoring light. The procedure for making this change is described below.

Figure 49A:
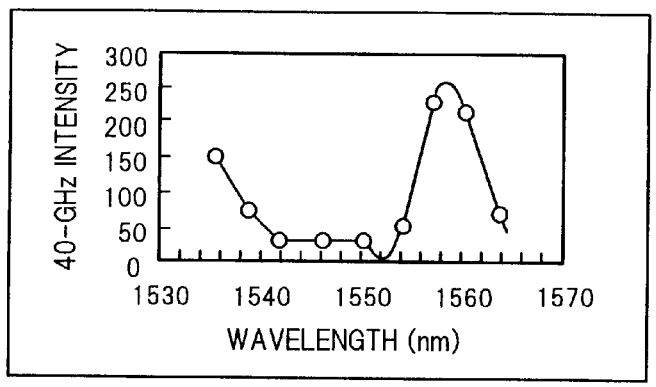
FIGS. 49A, 49B, 49C and 49D are diagrams useful in describing a case where zero-dispersion wavelength moves toward the short-wavelength side.
Figure 49B:
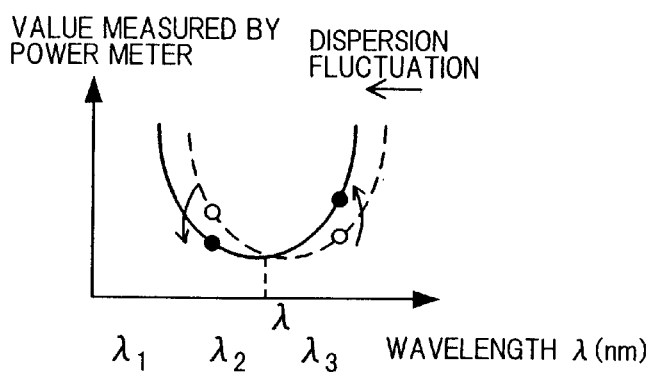
Figure 49C:
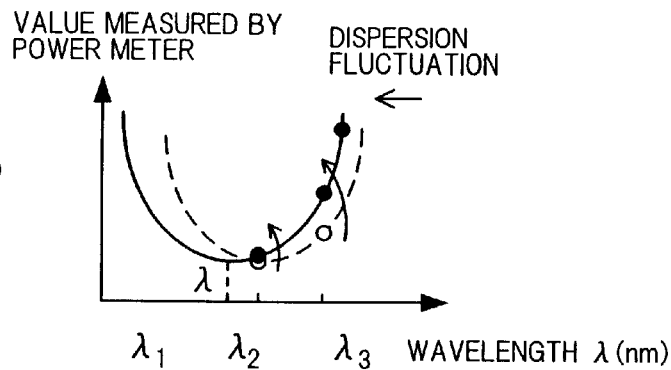
Figure 49D:
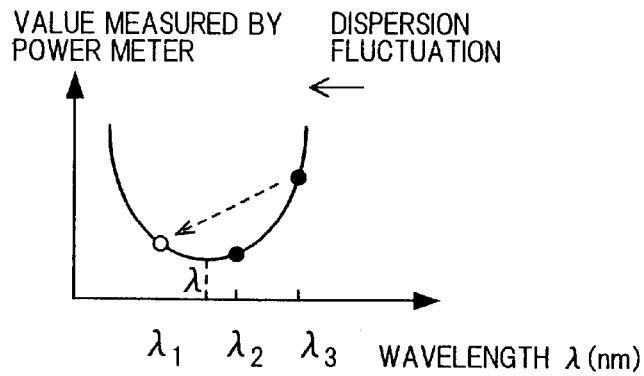

If, after the main-signal light is changed, the zero-dispersion wavelength $\lambda$ moves further toward the side of shorter wavelength, $I(\lambda_2)$ increases and so does $I(\lambda_3)$, then the zero-dispersion wavelength $\lambda$ becomes shorter than the wavelength $\lambda_2$ of the main-signal light and the relation $\lambda_1 < \lambda < \lambda_2$ is established (see FIG. 49C; step 257). If $\lambda_1 < \lambda < \lambda_2$ holds, then the light of light-source wavelength $\lambda_1$ is changed over to the monitoring light (see FIG. 49D; step 258). Processing from step 252 onward is then repeated. When the monitoring light is changed over, the light attenuator $14_1$ is opened and the light attenuator $14_3$ is closed to set the wavelength $\lambda_1$ as the center wavelength of the second optical filter 42.

Figure 50:
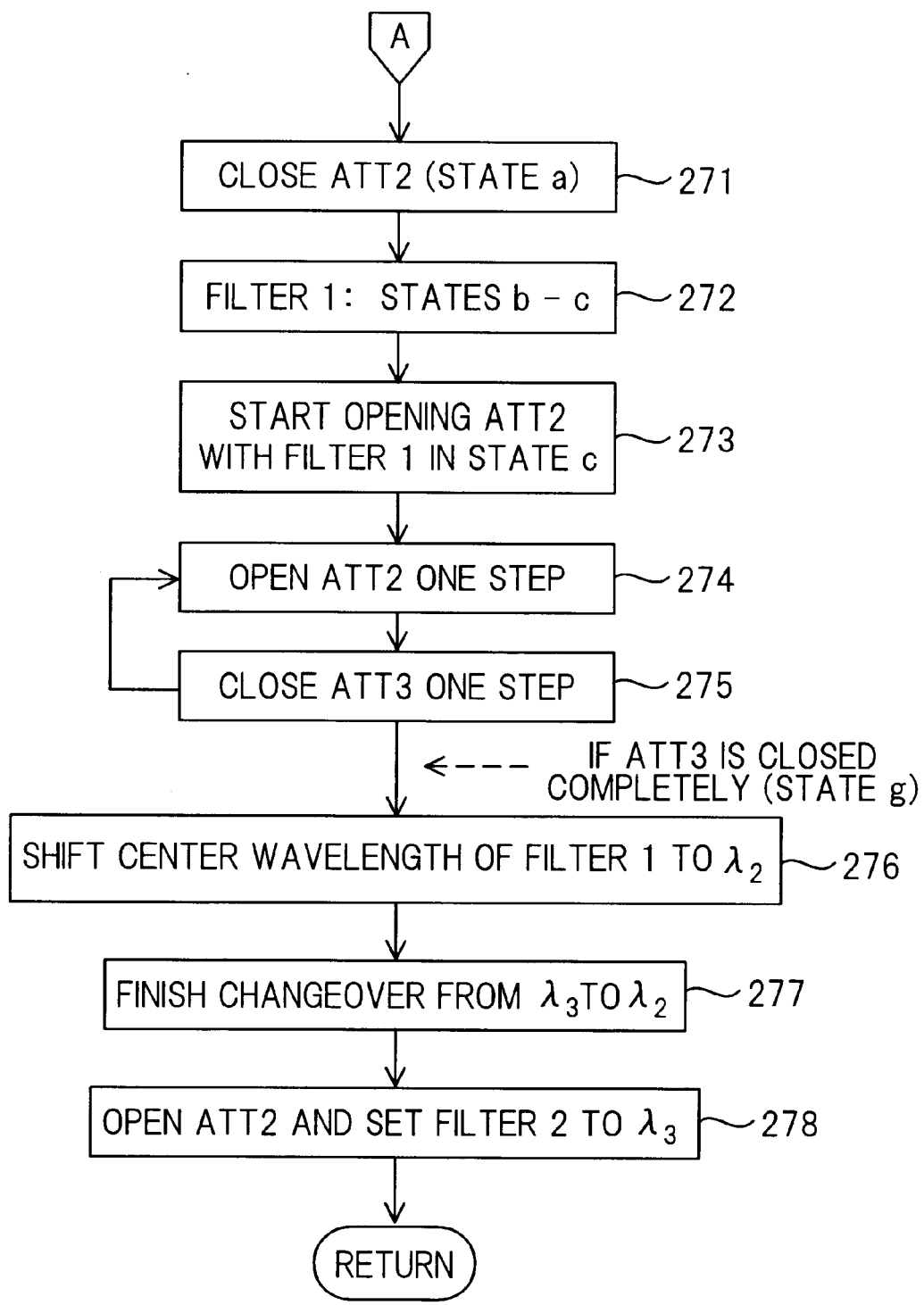
FIG. 50 shows the flow of processing for wavelength dispersion compensation in a case where zero-dispersion wavelength moves toward the short-wavelength side (control of main-wavelength changeover)
Figure 51:
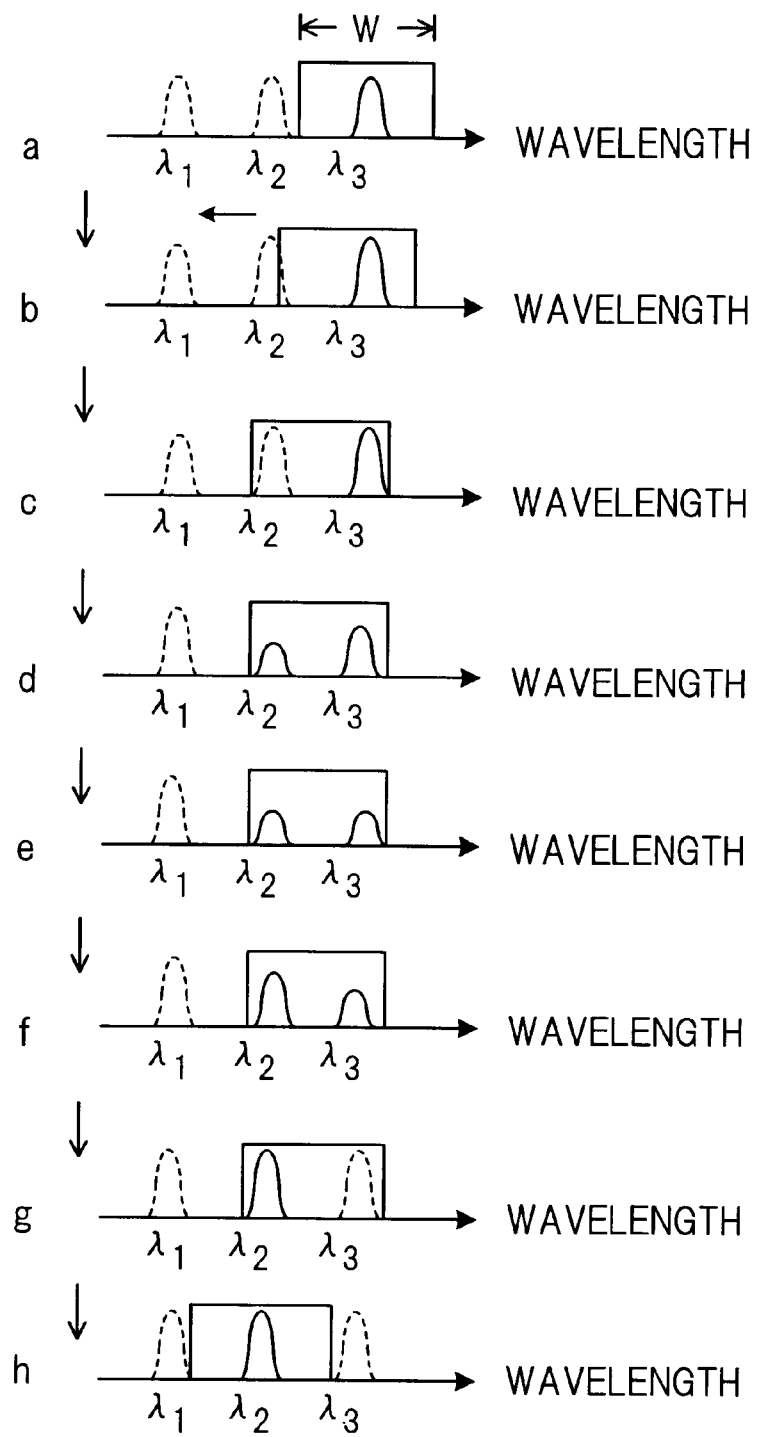
FIG. 51 is a diagram useful in describing control of changeover of main-signal light.

FIG. 50 shows the flow of processing for controlling changeover of main-signal light in a case where zero-dispersion wavelength is moving toward the short-wavelength side, and FIG. 51 is a diagram useful in describing control for changing over the main-signal light.

If $I(\lambda_2) = I(\lambda_3)$ holds (step 256 in FIG. 48), the monitoring light of wavelength $\lambda_2$ is changed over to main-signal light and the main-signal light of wavelength $\lambda_3$ is changed over to monitoring light.

First, the light attenuator $14_2$ is closed (step 271; state a in FIG. 51). Next, the center wavelength of the first optical filter 41 is shifted toward the side of shorter wavelength and control is performed in such a manner that the wavelengths $\lambda_2$, $\lambda_3$ fall within the filter range W (step 272, states b, c). In state c, the light attenuator $14_2$ is opened gradually and then the light attenuator $14_3$ is closed gradually in order to prevent instantaneous interruption of signal (steps 273–275; stated d–f). If the light attenuator $14_3$ is closed fully (state g), the center wavelength of the first optical filter 41 is shifted to $\lambda_2$ (step 276; state h). This completes changeover of the main-signal light (step 277). Finally, the light attenuator $14_3$ is opened and $\lambda_3$ is set as the center wavelength of the second optical filter 42 (step 278). Thus, the main-signal light can be changed over while the power of the light is held constant.

Figure 52A:
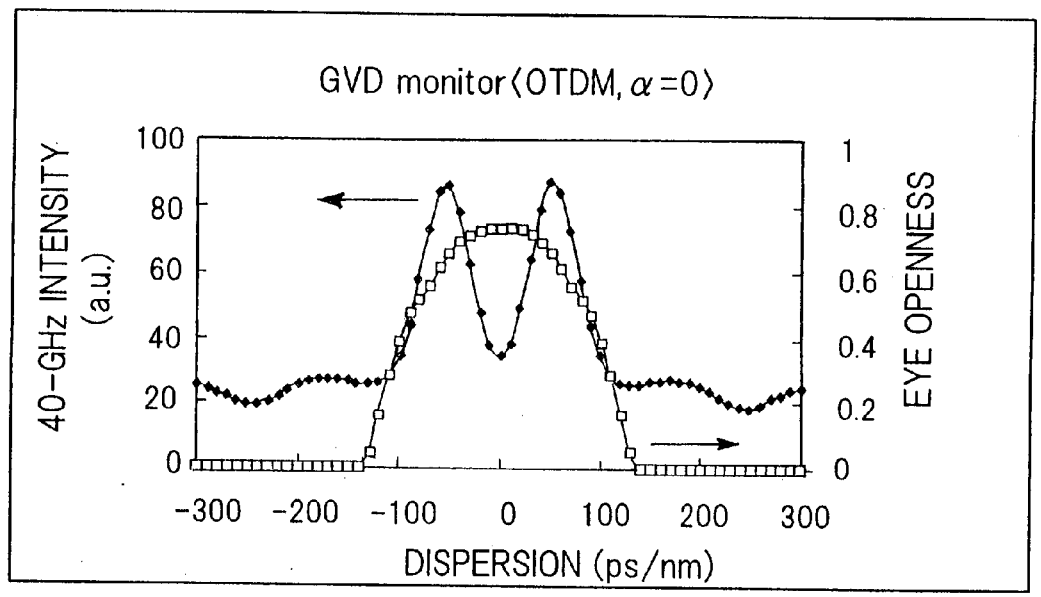
FIGS. 52A and 52B are diagrams of component intensity characteristics for respective types of modulation.
Figure 52B:
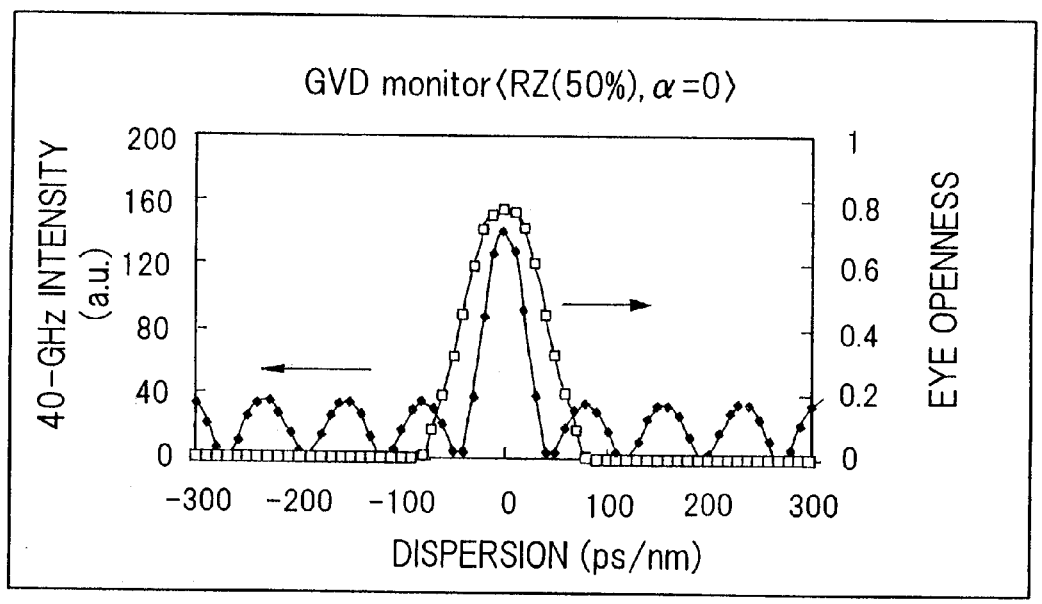

FIGS. 52A and 52B are diagrams of 40-GHz component intensity characteristics for respective modulation schemes when modulation has been performed by 40-GHz data, in winch FIG. 52A is a characteristic diagram for OTDM modulation and FIG. 52B a characteristic diagram for RZ modulation. In case of OTDM modulation, the zero-dispersion wavelength is one where the characteristic indicates a minimum value at the center of two peaks. The characteristic in the vicinity of the zero-dispersion wavelength can be approximated by a curve of second degree whose summit is indicated at the zero-dispersion wavelength. Owing to the symmetry of the curve of second degree, the fact that zero-dispersion wavelength has changed to a wavelength intermediate the wavelength $\lambda_1$ of the main-signal light and the wavelength $\lambda_2$ of the monitoring light can be detected when the intensity of the 40-GHz component at wavelength $\lambda_1$ and the intensity of the 40-GHz component at wavelength $\lambda_2$ have become equal.

In case of RZ modulation, the zero-dispersion wavelength is one where the characteristic indicates a maximum value. The characteristic in the vicinity of the zero-dispersion wavelength can be approximated by a curve a second degree whose summit is indicated at the zero-dispersion wavelength. Owing to the symmetry of the curve of second degree, the fact that zero-dispersion wavelength has changed to a wavelength intermediate the wavelength $\lambda_1$ of the main-signal light and the wavelength $\lambda_2$ Of the monitoring light can be detected when the intensity of the 40-GHz component at wavelength $\lambda_1$ and the intensity of the 40-GHz component at wavelength $\lambda_2$ have become equal.

(g) First Embodiment for Controlling Main-signal Light by Detecting a Wavelength for Which the Intensity of a Specific Frequency Component Indicates the Maximum Value In the case described above, the zero-dispersion wavelength for winch the intensity of a specific frequency component indicates the minimum value is detected and wavelength dispersion is controlled by using, as main-signal light and monitoring light, two light-source wavelengths bracketing the zero-dispersion wavelength. It should be noted that the power penalty can be made less than 1 dB even if the wavelength of light sent to the optical transmission line is decided such that the intensity of a specific frequency component (the 40-GHz component) takes on the maximum value, as evident from FIG. 53. Accordingly, this embodiment obtains two light-source wavelengths $\lambda_2$, $\lambda_3$ ($\lambda_2 < \lambda_3$) bracketing a wavelength for winch the intensity of the 40-GHz component is maximized, adopts the wavelength of light for winch the intensity of the 40-GHz component is larger as the main-signal light and adopts the light of the other wavelength as the monitoring light.

The characteristic in the vicinity of the wavelength for winch intensity is maximized can be approximated by a curve of second degree. Owing to the symmetry of the curve of second degree, the fact that wavelength for winch intensity is maximized has changed to a wavelength intermediate the wavelength $\lambda_2$ of the main-signal light and the wavelength $\lambda_3$ of the monitoring light can be detected when the intensity of the 40-GHz component contained in the light of wavelength $\lambda_2$ and the intensity of the 40-GHz component contained in the light of wavelength $\lambda_3$ have become equal.

The direction in winch the zero-dispersion wavelength fluctuates, i.e., the direction of fluctuation of the wavelength for winch intensity is maximized, can be obtained based upon the increase or decrease in the intensities $I(\lambda_2)$, $I(\lambda_3)$ at the light-source wavelengths $\lambda_2$, $\lambda_3$, respectively. More specifically, (1) when the wavelength $\lambda_m$ for winch intensity is maximum fluctuates toward the side of longer wavelength, the monitoring component intensity $I(\lambda_2)$ of the wavelength $\lambda_2$ of main-signal light decreases and the monitoring component intensity $I(\lambda_3)$ of the wavelength $\lambda_3$ of monitoring light increases, as shown in FIG. 54A. (2) When the wavelength $\lambda_m$ for which intensity is maximum fluctuates further toward the side of longer wavelength and exceeds the wavelength $\lambda_3$, both $I(\lambda_2)$ and $I(\lambda_3)$ decrease, as shown in FIG. 54B. (3) When the wavelength $\lambda_m$ for winch intensity is maximum fluctuates toward the side of shorter wavelength, on the other hand, the monitoring component intensity $I(\lambda_2)$ of the wavelength $\lambda_2$ of monitoring light increases and the monitoring component intensity $I(\lambda_3)$ of the wavelength $\lambda_3$ of main-signal light decreases, as shown in FIG. 54D. When the wavelength $\lambda_m$ for winch intensity is maximum fluctuates further toward the side of shorter wavelength and becomes shorter than the wavelength $\lambda_2$, both $I(\lambda_2)$ and $I(\lambda_3)$ decrease, as shown in FIG. 54E.

Control When Wavelength for Which Intensity is Maximum Fluctuates Toward Side of Longer Wavelength In the optical transmission system of FIG. 41, control is such that prior to system operation, the two light-source wavelengths $\lambda_2$, $\lambda_3$ ($\lambda_2<\lambda_3$) that bracket the wavelength $\lambda_m$ for winch the monitoring component intensity is maximized are obtained, the light of wavelength $\lambda_2$ for winch the monitoring component intensity is larger is adopted as main-signal light and the light of wavelength $\lambda_3$ is adopted as monitoring light. If, during system operation, the wavelength of maximum intensity fluctuates toward the side of longer wavelength and the relation $I(\lambda_2)=I(\lambda_3)$ is established, then the monitoring light of wavelength $\lambda_3$ is changed over to the main-signal light and the main-signal light of wavelength $\lambda_2$ is changed over to the monitoring light. If the wavelength of maximum intensity fluctuates further toward the side of longer wavelength and both $I(\lambda_2)$ and $I(\lambda_3)$ decrease (see FIG. 54B), then the light of wavelength $\lambda_4$ instead of wavelength $\lambda_2$ is made the monitoring light (see FIG. 54C).

Control When Wavelength for Which Intensity is Maximum Fluctuates Toward Side of Shorter Wavelength In the optical transmission system of FIG. 41, the two light-source wavelengths $\lambda_2$, $\lambda_3$ ($\lambda_2<\lambda_3$) that bracket the wavelength Am for winch the monitoring component intensity is maximized are obtained, the light of wavelength $\lambda_3$ for winch the monitoring component intensity is larger is adopted as main-signal light and the light of wavelength $\lambda_2$ is adopted as monitoring light. If, during system operation, the wavelength of maximum intensity fluctuates toward the side of shorter wavelength and the relation $I(\lambda_2)=I(\lambda_3)$ is established, then the monitoring light of wavelength $\lambda_2$ is changed over to the main-signal light and the main-signal light of wavelength $\lambda_3$ is changed over to the monitoring light. If the wavelength of maximum intensity fluctuates further toward the side of shorter wavelength and both $I(\lambda_2)$ and $I(\lambda_3)$ decrease (see FIG. 54E), then the light of wavelength $\lambda_4$ instead of wavelength $\lambda_3$ is made the monitoring light (see FIG. 54F).

Figure 55:
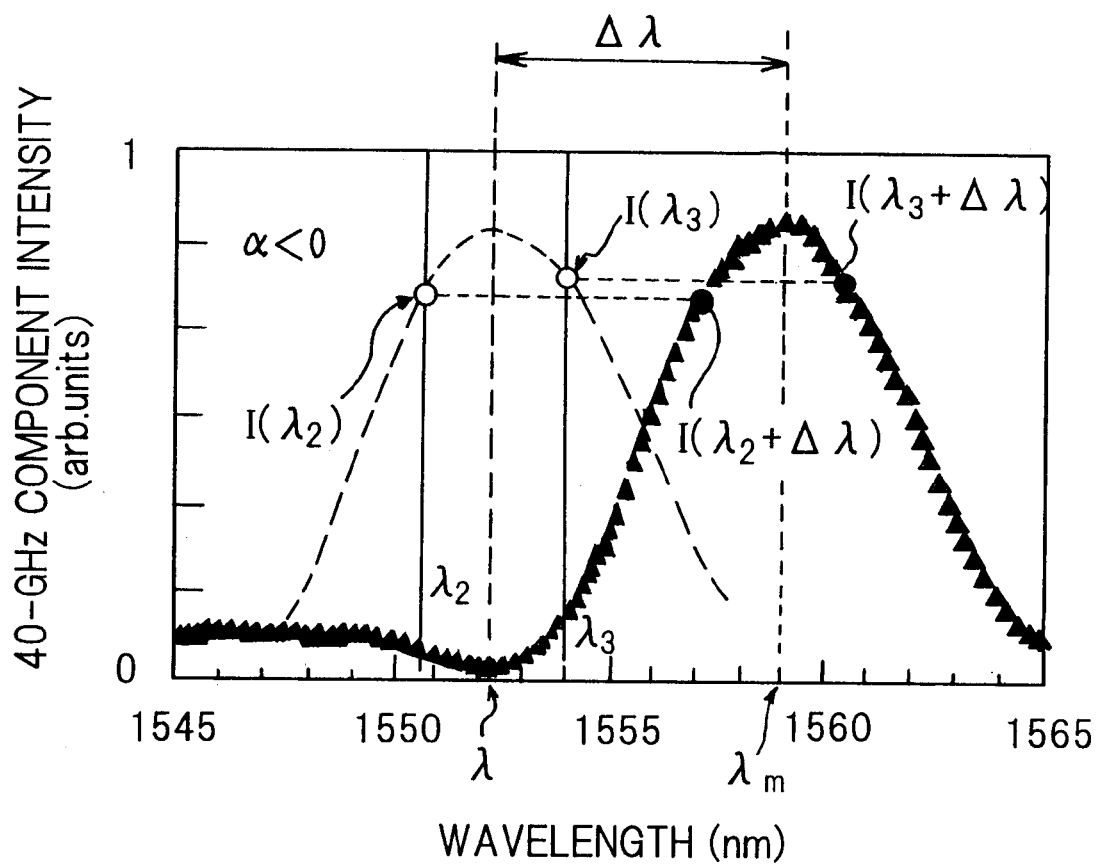
FIG. 55 is a diagram useful in describing fundamentals in a case where use is made of two wavelengths employing the peak of an intensity component.

(h) Second Embodiment for Controlling Main-signal Light by Detecting a Wavelength for Which the Intensity of a Specific Frequency Component Indicates the Maximum Value In the first embodiment described above, the zero-dispersion wavelength for winch the intensity of a specific frequency component indicates the maximum value is detected and wavelength dispersion is controlled by using, as main-signal light and monitoring light, two light-source wavelengths bracketing the zero-dispersion wavelength. As shown in FIG. 55, let $\Delta\lambda$ represent the difference in wavelength between the wavelength $\lambda_m$ for which the intensity of a specific frequency component indicates the maximum value and the zero-dispersion wavelength $\lambda$ for winch the intensity of the specific frequency component indicates the minimum value. If the characteristic of the specific frequency component is shifted leftward by $\Delta\lambda$, the result will be as indicated by the dotted line in FIG. 55. In accordance with the shifted characteristic, the wavelength indicating the wavelength of maximum intensity is the zero-dispersion wavelength. Since the characteristic in the vicinity of the zero-dispersion wavelength is a curve of second degree, wavelength dispersion can be compensated for in accurate fashion.

According to the second embodiment, therefore, control is carried out in such a manner that the wavelength for winch the intensity of a specific frequency component indicates the maximum value is detected and light of the zero-dispersion wavelength is sent to the optical transmission line.

Figure 56:
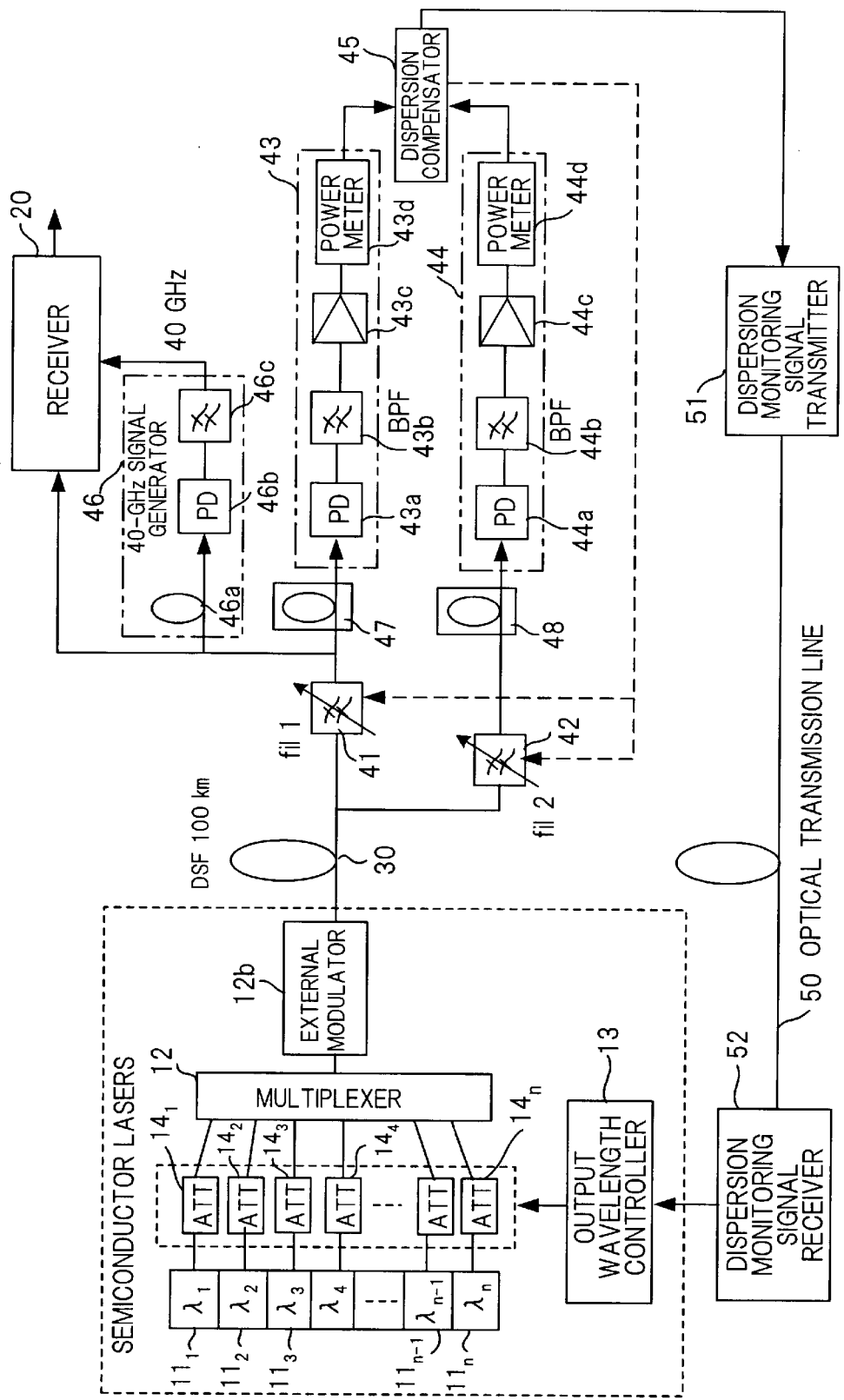
FIG. 56 is a diagram showing the configuration of an optical transmission system in which changeover of main-signal light is controlled upon detecting a wavelength of for which intensity is maximum.

FIG. 56 is a diagram showing the configuration of an optical transmission system in which main-signal light is changed over by detecting a wavelength for which intensity is maximum. Components in FIG. 56 identical with those of the optical transmission system shown in FIG. 41 are designated by like reference characters. This arrangement differs from that of FIG. 41 in that dispersion-add on units 47, 48, winch furnish received light with wavelength dispersion conforming to the wavelength difference $\Delta\lambda$ between the wavelength $\lambda_m$ for winch intensity is maximum and the zero-dispersion wavelength, are provided on the output sides of the first and second optical filters 41, 42, respectively. By virtue of the dispersion-add on units 47, 48, the wavelength of light output by the first optical filter 41 set to the wavelength $\lambda_2$ of main-signal light becomes ($\lambda_2+\Delta\lambda$), the wavelength of light output by the second optical filter 42 set to the wavelength $\lambda_3$ of monitoring light becomes ($\lambda_3\times+\Delta\lambda$) and the wavelength $\lambda_m$ of maximum intensity resides between these two wavelengths.

Control When Wavelength for Which Intensity is Maximum Fluctuates Toward Side of Longer Wavelength Control is such that prior to system operation, the wavelength $\lambda_m$ for winch the monitoring component intensity is maximized is detected, the two light-source wavelengths $\lambda_2$, $\lambda_3$ ($\lambda_2<\lambda_3$) that bracket the zero-dispersion wavelength ($\lambda_m-\Delta\lambda$) are obtained, the light of wavelength $\lambda_2$ for winch the monitoring component intensity is smaller is adopted as main-signal light and the light of wavelength $\lambda_3$ is adopted as monitoring light. If, during system operation, the zero-dispersion wavelength fluctuates toward the side of longer wavelength and the relation $I(\lambda_2+\Delta\lambda)=I(\lambda_3+\Delta\lambda)$ is established, then the monitoring light of wavelength $\lambda_3$ is changed over to the main-signal light and the main-signal light of wavelength $\lambda_2$ is changed over to the monitoring light. If the zero-dispersion wavelength fluctuates further toward the side of longer wavelength and both $I(\lambda_2+\Delta\lambda)$ and $I(\lambda_3+\Delta\lambda)$ decrease, then the light of wavelength $\lambda_4$ instead of wavelength $\lambda_2$ is made the monitoring light.

Control When Wavelength for Which Intensity is Maximum Fluctuates Toward Side of Shorter Wavelength Control is such that prior to system operation, the wavelength $\lambda_m$ for winch the monitoring component intensity is maximized is detected, the two light-source wavelengths $\lambda_2$, $\lambda_3$ ($\lambda_2<\lambda_3$) that bracket the zero-dispersion wavelength ($\lambda_m-\Delta\lambda$) are obtained, the light of wavelength $\lambda_3$ for winch the monitoring component intensity is smaller is adopted as main-signal light and the light of wavelength $\lambda_2$ is adopted as monitoring light. If, during system operation, the zero-dispersion wavelength fluctuates toward the side of shorter wavelength and the relation $I(\lambda_2+\Delta\lambda)=I(\lambda_3+\Delta\lambda)$ is established, then the monitoring light of wavelength $\lambda_2$ is changed over to the main-signal light and the main-signal light of wavelength $\lambda_3$ is changed over to the monitoring light. If the zero-dispersion wavelength fluctuates further toward the side of shorter wavelength and both $I(\lambda_2+\Delta\lambda)$ and $I(\lambda_3+\Delta\lambda)$ decrease, then the light of wavelength $\lambda_1$ instead of wavelength $\lambda_3$ is made the monitoring light.

Figure 57:
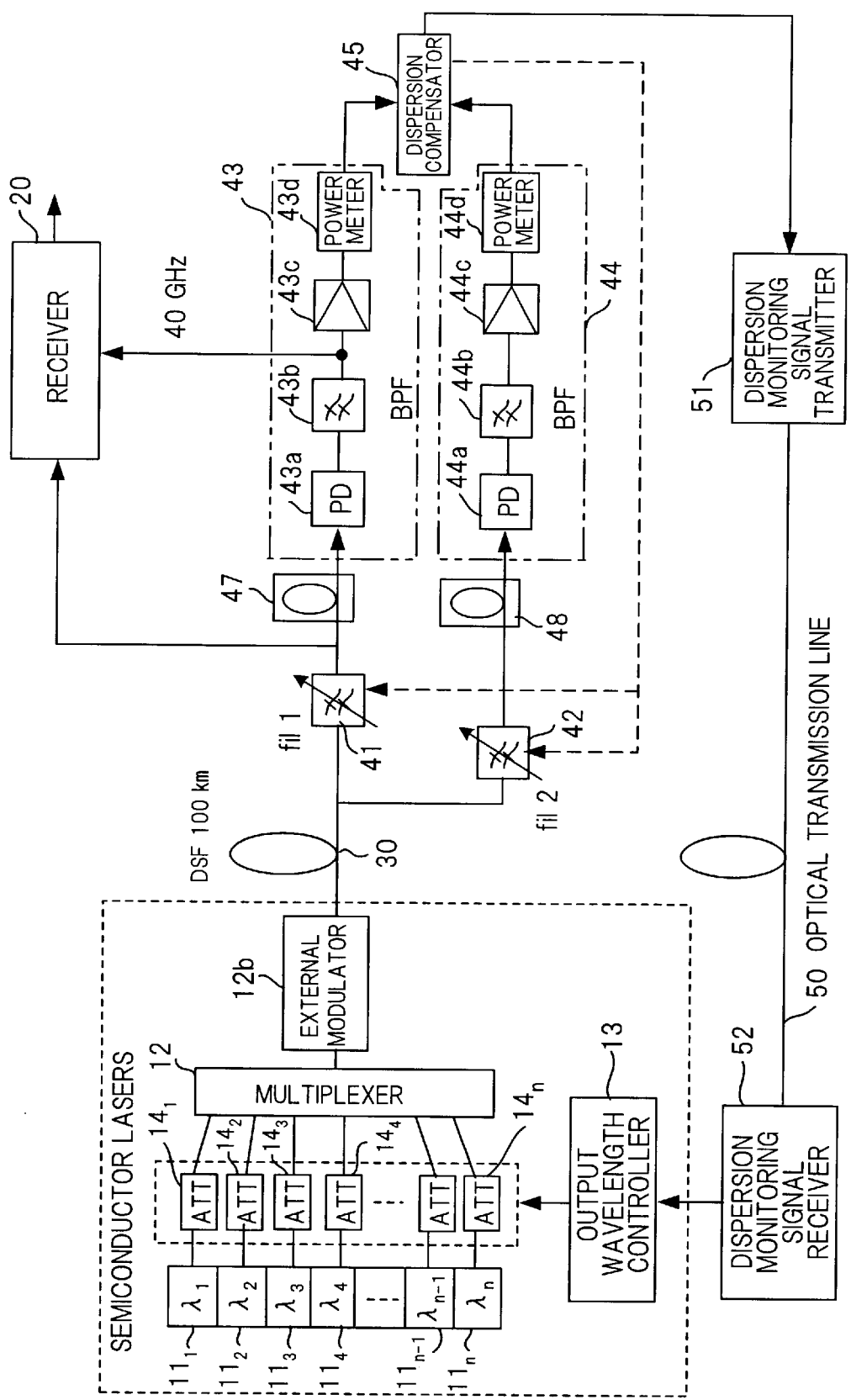
FIG. 57 is a diagram showing a modification of the optical transmission system in which changeover of main-signal light is controlled upon detecting a wavelength of for which intensity is maximum.

FIG. 57 is a diagram showing another configuration of an optical transmission system in winch main-signal light is changed over by detecting a wavelength for which intensity is maximum. Components in FIG. 57 identical with those of the optical transmission system shown in FIG. 56 are designated by like reference characters. This arrangement differs from that of FIG. 56 in that the 40 -GHz signal generator 46 is eliminated and the 40 -GHz signal is input to the optical receiver 20 from the bandpass filter 43b.

Figure 53:
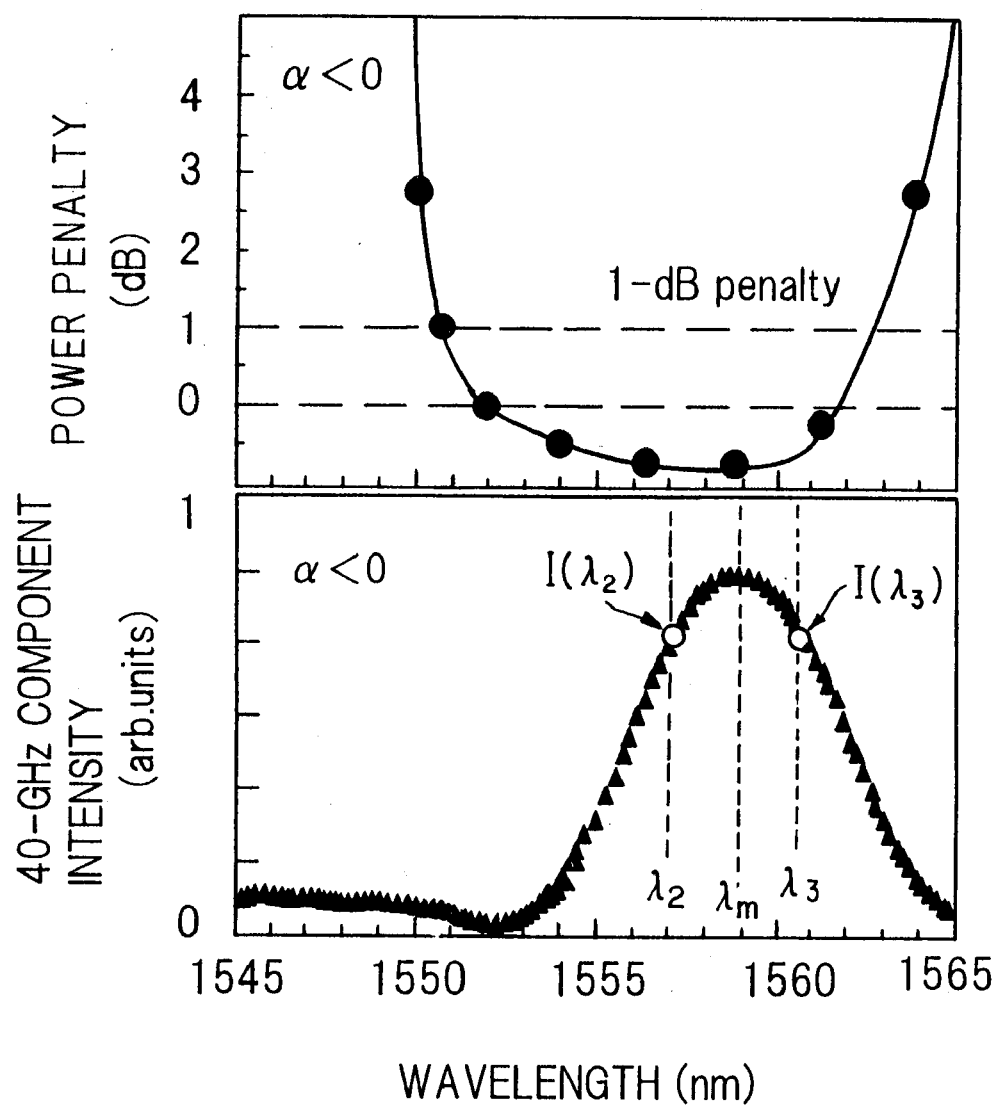
FIG. 53 is a diagram useful in describing an embodiment in which main-signal light is controlled in such a manner that the intensity of a specific frequency component takes on the maximum value.
Figure 58:
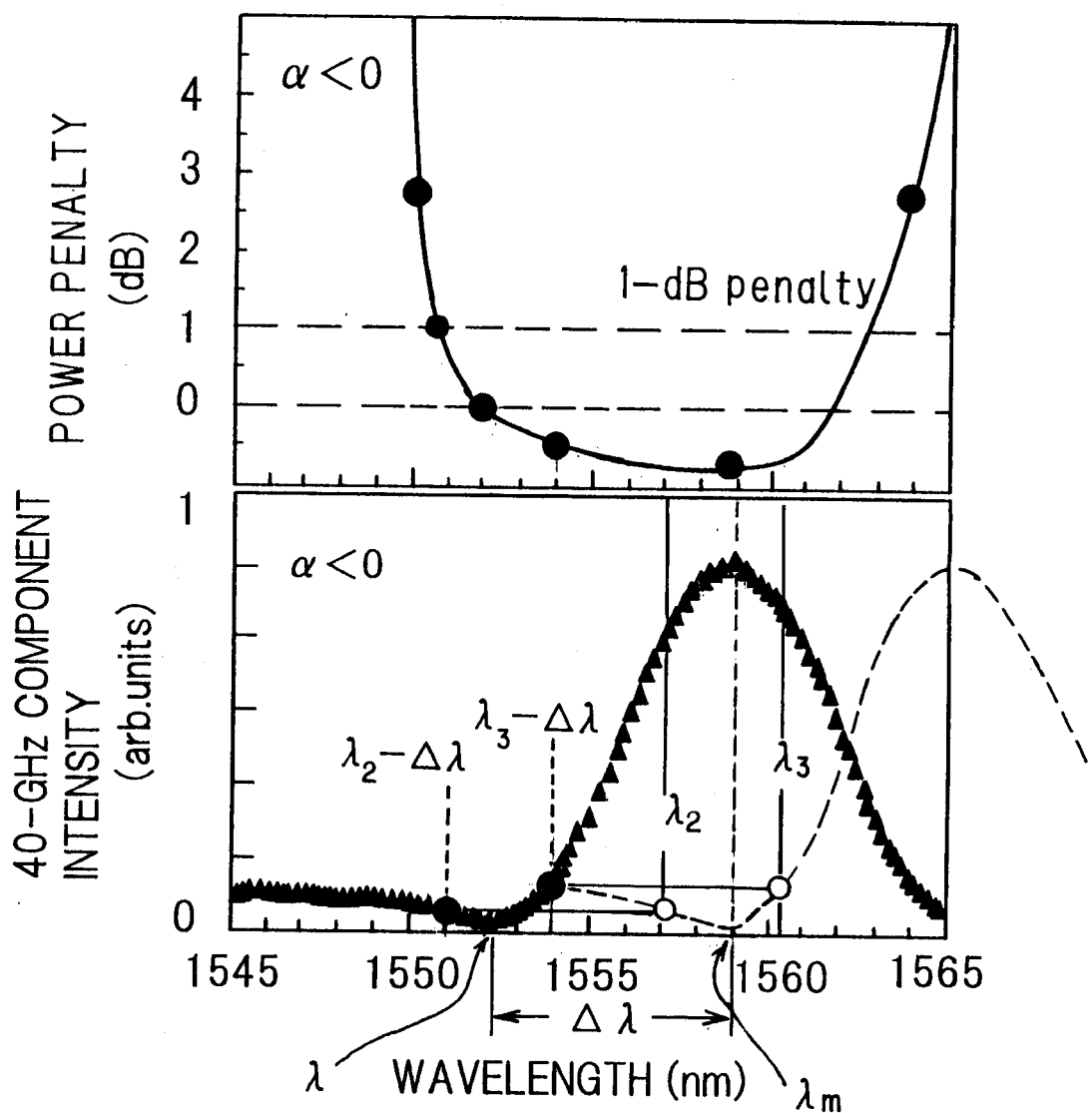
FIG. 58 is a diagram useful in describing a case where a wavelength for which the intensity of a specific frequency component indicates the minimum value is detected and main-signal light for which the intensity of a specific frequency component is maximized is sent to an optical transmission line.

(i) Embodiment for Detecting a Wavelength for Which the Intensity of a Specific Frequency Component Indicates the Minimum Value and Sending an Optical Transmission Line Main-signal Light for Which the Intensity of the Specific Frequency Component is Maximized In the embodiment of FIG. 53, the wavelength $\lambda_m$ for which the intensity of the specific frequency component is maximized is detected and light having the light-source wavelength for winch the intensity of the specific frequency component is maximized is sent to the optical transmission line as the main-signal light. As shown in FIG. 58, let $\Delta\lambda$ represent the difference in wavelength between the wavelength $\lambda_m$ for winch the intensity of a specific frequency component indicates the maximum value and the zero-dispersion wavelength $\lambda$ for winch the intensity of the specific frequency component indicates the minimum value. If the characteristic of the specific frequency component is shifted rightward by $\Delta\lambda$, the result will be as indicated by the dotted line in FIG. 55. In accordance with the shifted characteristic, the zero-dispersion wavelength is the wavelength of maximum intensity that prevailed prior to the shift.

According to this embodiment, therefore, control is carried out in such a manner that the zero-dispersion wavelength for winch the intensity of a specific frequency component indicates the minimum value is detected and light of the wavelength $\lambda_m$ of maximum intensity is sent to the optical transmission line. The configuration shown in FIG. 56 can be employed as the optical transmission system of this embodiment. However, the dispersion add-on units 47, 48 provide the output light of optical filters 41, 42 with wavelength dispersion conforming to $-\Delta\lambda$. As a result, the wavelength $\lambda_2$ of the main-signal light output by the first filter 41 becomes ($\lambda_2-\Delta\lambda$), the wavelength $\lambda_3$ of light output by the second optical filter 42 set to the wavelength $\lambda_3$ of monitoring light becomes ($\lambda_3-\Delta\lambda$) and the zero-dispersion wavelength resides between these two wavelengths.

Control When Zero-dispersion Wavelength Fluctuates Toward Side of Longer Wavelength Control is such that prior to system operation, the zero-dispersion wavelength $\lambda$ for winch the monitoring component intensity is minimized is detected, the two light-source wavelengths $\lambda_2$, $\lambda_3$ ($\lambda_2<\lambda_3$) that bracket the wavelength ($\lambda+\Delta\lambda$) of maximum intensity are obtained, the light of wavelength $\lambda_2$ for which the monitoring component intensity is larger is adopted as main-signal light and the light of wavelength $\lambda_3$ is adopted as monitoring light. If, during system operation, the wavelength for maximum intensity fluctuates toward the side of longer wavelength and the relation $I(\lambda_2-\Delta\lambda)=I(\lambda_3-\Delta\lambda)$ is established, then the monitoring light of wavelength $\lambda_3$ is changed over to the main-signal light and the main-signal light of wavelength $\lambda_2$ is changed over to the monitoring light. If the zero-dispersion wavelength fluctuates further toward the side of longer wavelength and both $I(\lambda_2-\Delta\lambda)$ and $I(\lambda_3-\Delta\lambda)$ increase, then the light of wavelength $\lambda_4$ instead of wavelength $\lambda_2$ is made the monitoring light.

Control when wavelength of maximum intensity fluctuates toward side of shorter wavelength Control is such that prior to system operation, the zero-dispersion wavelength $\lambda$ for winch the monitoring component intensity is minimized is detected, the two light-source wavelengths $\lambda_2$, $\lambda_3$ ($\lambda_2<\lambda_3$) that bracket the wavelength ($\lambda+\Delta\lambda$) of maximum intensity are obtained, the light of wavelength $\lambda_3$ for which the monitoring component intensity is larger is adopted as main-signal light and the light of wavelength $\lambda_2$ is adopted as monitoring light. If, during system operation, the wavelength for maximum intensity fluctuates toward the side of shorter wavelength and the relation $I(\lambda_2-\Delta\lambda)=I(\lambda_3-\Delta\lambda)$ is established, then the monitoring light of wavelength $\lambda_2$ is changed over to the main-signal light and the main-signal light of wavelength $\lambda_3$ is changed over to the monitoring light. If the wavelength for which intensity is maximum fluctuates further toward the side of shorter wavelength and both $I(\lambda_2-\Delta\lambda)$ and $I(\lambda_3-\Delta\lambda)$ increase, then the light of wavelength $\lambda_1$ instead of wavelength $\lambda_3$ is made the monitoring light.

(j) Embodiment in a Case Where Two Waves are Used as Monitoring Light

The foregoing is for a case where zero-dispersion wavelength is detected using two waves, namely main-signal light and monitoring light, and control is performed to change over main-signal light and monitoring light. In this embodiment, however, detection of zero-dispersion wavelength and control for changing over main-signal light and monitoring light are carried out using three waves, namely main-signal light and two monitoring light beams. FIGS. 59A to 59D are diagrams useful in describing the principle of detection of zero-dispersion wavelength and control for changing over main-signal light and monitoring light using three waves.

Let $\lambda_1, \lambda_2, \lambda_3$ ($\lambda_1<\lambda_2<\lambda_3$) represent the wavelengths of the three waves of main-signal light and two monitoring light beams.

(1) If the zero-dispersion wavelength $\lambda$ moves toward the size of longer wavelength so that $\lambda>\lambda_3$ holds (See FIG. 59A), the wavelength of the monitoring light is switched from $\lambda_1$ to $\lambda_4$.

(2) If the zero-dispersion wavelength $\lambda$ falls within the range $\lambda_2<\lambda<\lambda_3$ (see FIG. 59B) and becomes equal to ($\lambda_3-\lambda_2$)/2, the monitoring light is changed over to the main-signal light and the main-signal light is changed over to the monitoring light. For example, if the zero-dispersion wavelength $\lambda$ moves toward the side of longer wavelength and becomes equal to ($\lambda_3-\lambda_2$)/2, the monitoring light of wavelength $\lambda_3$ is changed over to the main-signal light and the main-signal light of wavelength $\lambda_2$ is changed over to the monitoring light. If the zero-dispersion wavelength $\lambda$ moves toward the side of shorter wavelength and becomes equal to $(\lambda_3-\lambda_2)/2$, the monitoring light of wavelength $\lambda_2$ is changed over to the main-signal light and the main-signal light of wavelength $\lambda_3$ is changed over to the monitoring light.

(3) Similarly, if the zero-dispersion wavelength $\lambda$ falls within the range $\lambda_1<\lambda<\lambda_2$ (see FIG. 59C) and becomes equal to $(\lambda_2-\lambda_1)/2$, the monitoring light is changed over to the main-signal light and the main-signal light is changed over to the monitoring light. For example, if the zero-dispersion wavelength $\lambda$ moves toward the side of longer wavelength and becomes equal to $(\lambda_2-\lambda_1)/2$, the monitoring light of wavelength $\lambda_2$ is changed over to the main-signal light and the main-signal light of wavelength $\lambda_1$ is changed over to the monitoring light. If the zero-dispersion wavelength $\lambda$ moves toward the side of shorter wavelength and becomes equal to $(\lambda_2-\lambda_1)/2$, the monitoring light of wavelength $\lambda_1$ is changed over to the main-signal light and the main-signal light of wavelength $\lambda_2$ is changed over to the monitoring light.

(4) If the zero-dispersion wavelength $\lambda$ moves toward the side of shorter wavelength so that $\lambda<\lambda_1$ holds (see FIG. 59D), the wavelength of the monitoring light is changed over from $\lambda_4$ to $\lambda_1$.

Figure 60:
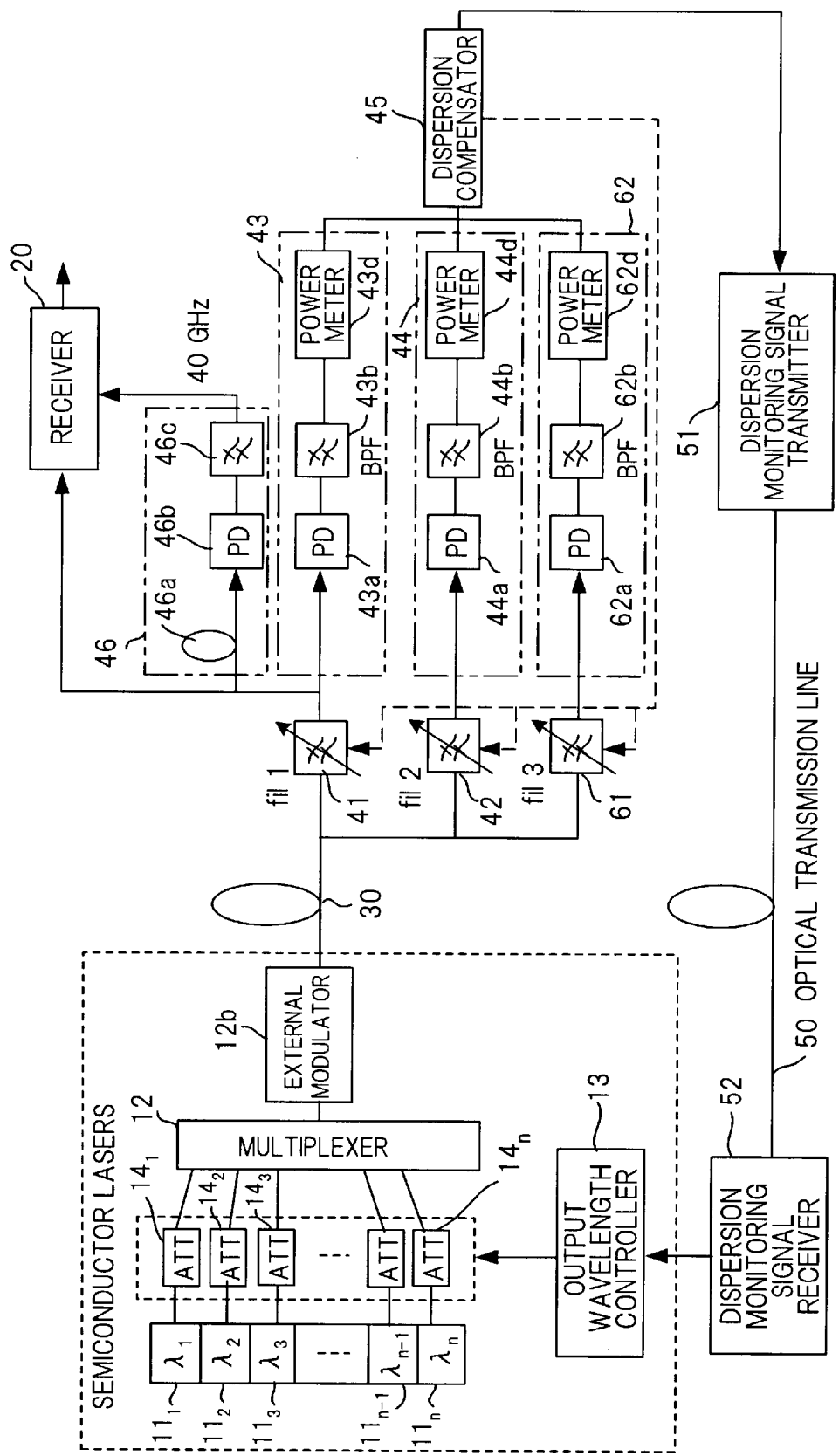
FIG. 60 is a diagram showing the configuration of an optical transmission system in which wavelength dispersion is compensated for using three waves, namely main-signal light and two monitoring light beams.

FIG. 60 is a diagram showing the configuration of an optical transmission system in which wavelength dispersion is compensated for using three waves, namely main-signal light and two monitoring light beams. Components in FIG. 60 identical with those of the optical transmission system shown in FIG. 41 are designated by like reference characters. This arrangement differs from that of FIG. 41 in the following respects:

(1) three light attenuators are opened so that main-signal light and two beams of monitoring light from three adjacent light sources are combined and sent to the optical transmission line;

(2) a third optical filter 61 is provided and the wavelength of the second monitoring light is set as the center wavelength of this optical filter;

(3) a third dispersion monitor 62 is provided and measures the intensity of the 40 -GHz: component contained in the second monitoring light; and (4) the dispersion compensation control unit 45 controls changeover of the main-signal light and changeover of the monitoring light based upon the intensities of the 40 -GHz component contained in the three waves, namely in the main-signal light and first and second monitoring light.

Figure 61:
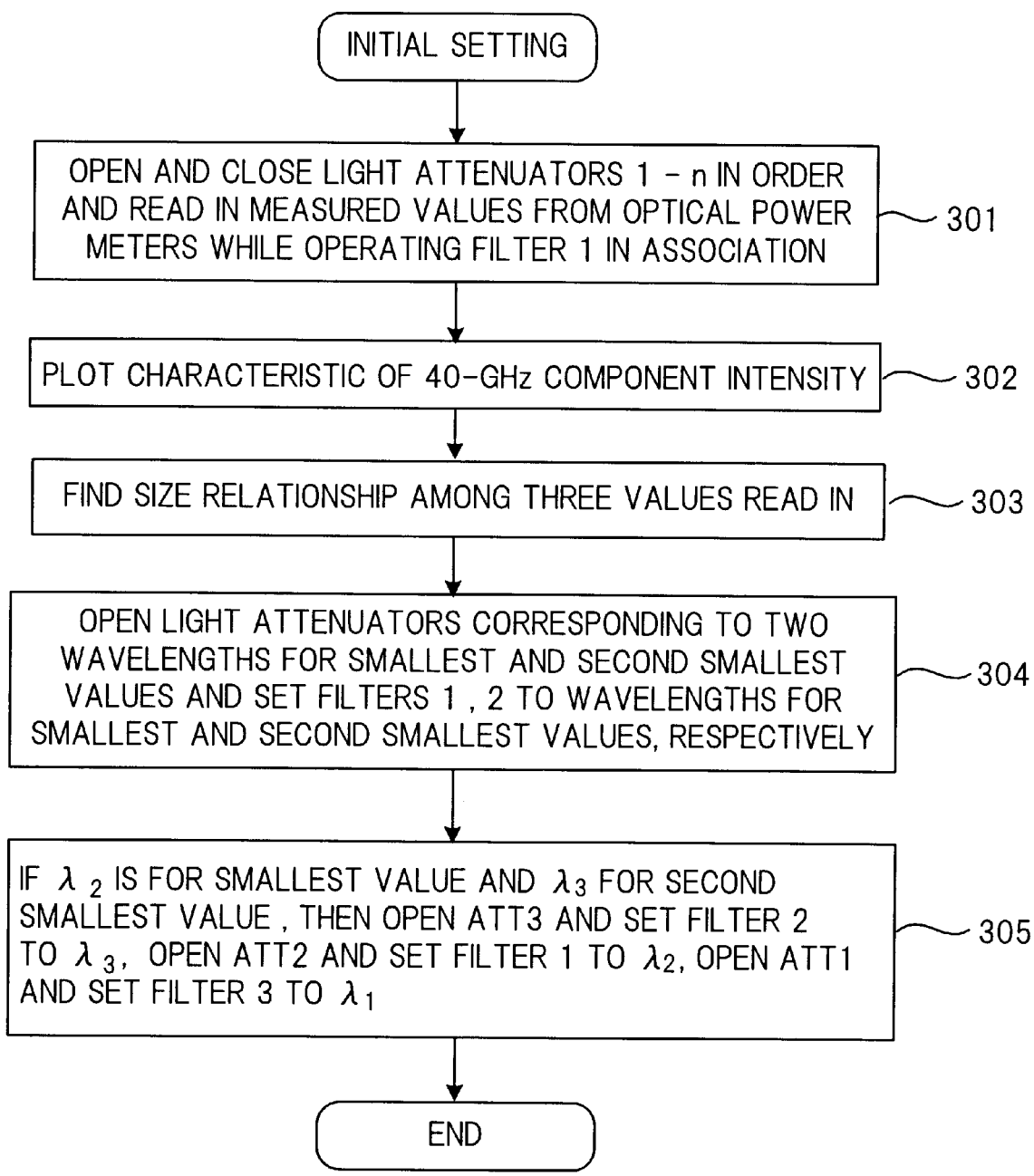
FIG. 61 shows the flow of processing for wavelength dispersion compensation in a case where three waves are used (initial setting)

FIG. 61 shows the flow of processing for wavelength dispersion compensation (initial setting) prior to system operation in a case where three waves are used. Before the system is started up, the output wavelength controller 13 opens and closes the light attenuators $14_1$–$14_n$ in order. The dispersion compensation control unit 45 controls the wavelength of the optical filter 41 and reads in the 40 -GHz component intensity, which is the measurement value from the power meter 43d, while being operated in association with the opening and closing of the attenuators (step 201). The dispersion compensation control unit 45 plots the characteristic of the 40 -GHz component intensity using this measured value (step 302). The dispersion compensation control unit 45 then obtains the two light-source wavelengths $\lambda_2$ and $\lambda_3$, which bracket the zero-dispersion wavelength $\lambda$ for which the intensity of the 40 -GHz component is minimized, and the wavelength $\lambda_1$ for which the intensity of the 40 -GHz component is small, reads in the intensities of the 40 -GHz components of the three wavelengths $\lambda_1$ to $\lambda_3$ and compares the magnitudes of three read intensities of the 40 -GHz components (step 303).

Next, in accordance with a command from the dispersion compensation control unit 45, the output wavelength controller 13 opens the two light attenuators that correspond to the wavelength $(\lambda_2)$ for which the 40 -GHz component intensity is smallest and the wavelength $(\lambda_3)$ for which the 40 -GHz component intensity is the second smallest, sets the wavelength $\lambda_2$ of the smallest value as the center wavelength of the first optical filter 41 and sets the wavelength $\lambda_3$ of the second smallest value as the center wavelength of the second optical filter 42 (step 304).

The output wavelength controller 13 opens the light attenuator corresponding to the wavelength $\lambda_1$ and sets the wavelength $\lambda_1$ as the center wavelength of the third optical filter 43 (step 305).

Figure 62:
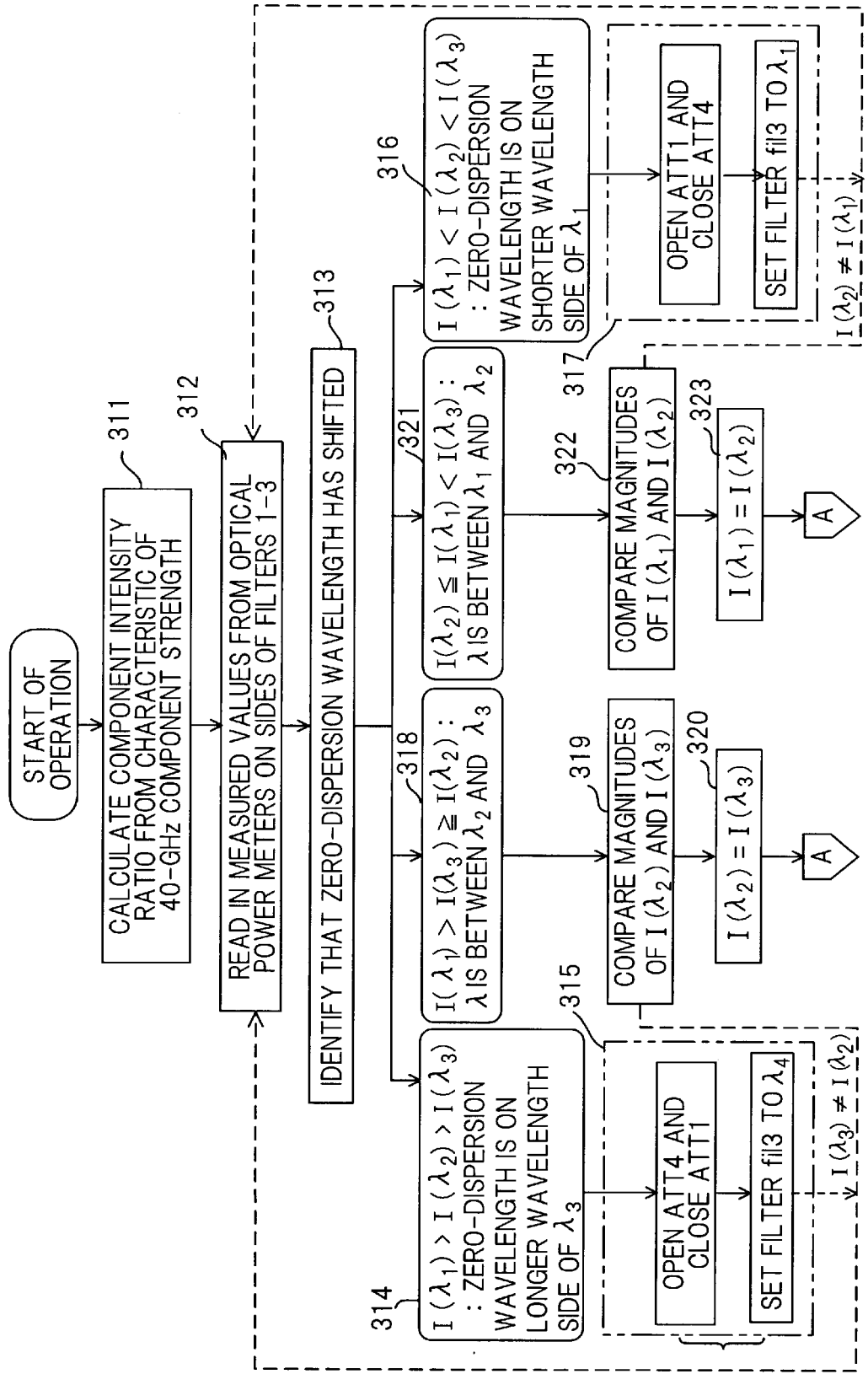
FIG. 62 shows the flow of processing for wavelength dispersion compensation in a case where three waves are used (where changeover of monitoring light and changeover of main wavelength are indicated)

FIG. 62 shows the flow of processing for wavelength dispersion compensation after the start of system operation in a case where three waves are used. Before the system starts operating, the dispersion compensation control unit 45 obtains, from the characteristic of the 40 -GHz component intensity, the 40 -GHz component intensity ratio $I(\lambda_2):I(\lambda_3)$ for changing over the main-signal light (step 311). The intensity ratio is assumed to be 1:1.6.

Next, the dispersion compensation control unit 45 reads in the 40 -GHz component intensities $I(\lambda_1)$, $I(\lambda_2)$, $I(\lambda_3)$ of the wavelengths $\lambda_1, \lambda_2, \lambda_3$ from the power meters 43d, 44d, 62d, respectively (step 312), compares these intensities in terms of magnitude and identifies movement of the zero-dispersion wavelength (step 313).

If the zero-dispersion wavelength $\lambda$ moves toward the side of longer wavelength so that $I(\lambda_1)>I(\lambda_2)>I(\lambda_3)$ holds, then $\lambda>\lambda_3$ holds [FIG. 59 (a); step 314). In such case the monitoring light is changed over from the light of light-source wavelength $\lambda_1$ to the light of light-source wavelength $\lambda_4$ (step 315). Processing from step 312 onward is then repeated. When the monitoring light is changed over, the light attenuator $14_4$ is opened and the light attenuator $14_1$ is closed to set the wavelength $\lambda_4$ as the center wavelength of the second optical filter 42.

Figure 59A:
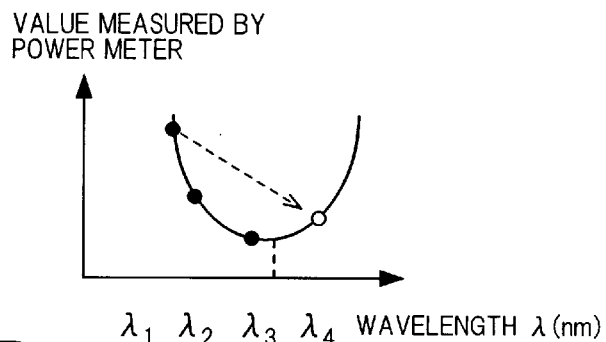
FIGS. 59A, 59B, 59C and 59D are diagrams useful in describing a case where three waves are used in detection of optimum wavelength.
Figure 59B:
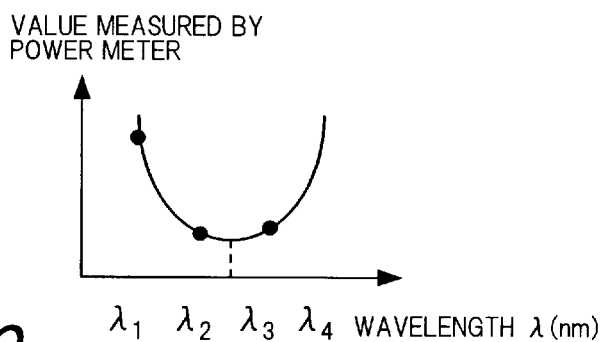
Figure 59C:
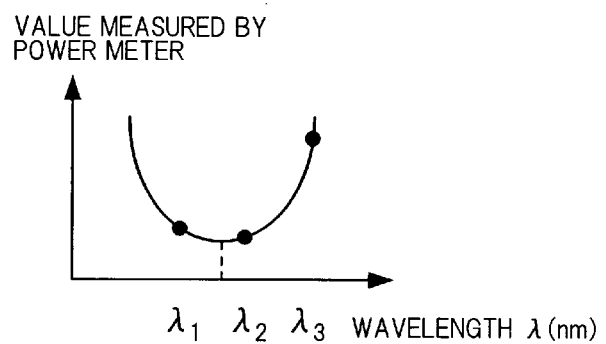
Figure 59D:
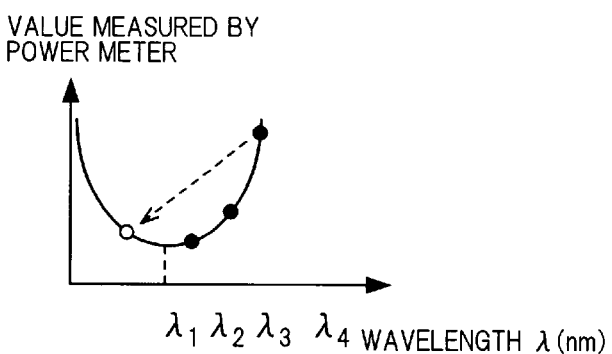

If the zero-dispersion wavelength $\lambda$ moves toward the side of shorter wavelength so that $I(\lambda_1)<I(\lambda_2)<I(\lambda_3)$ holds, then $\lambda<\lambda_1$ holds [FIG. 59(d); step 316). In such case the monitoring light is changed over from the light of light-source wavelength $\lambda_4$ to the light of light-source wavelength $\lambda_1$ (step 317). Processing from step 312 onward is then repeated. When the monitoring light is changed over, the light attenuator $14_4$ is opened and the light attenuator $14_1$ is closed to set the wavelength $\lambda_4$ as the center wavelength of the second optical filter 42.

If $I(\lambda_1)>I(\lambda_3)\geqq I(\lambda_2)$ holds, on the other hand [see FIG. 59(b)], then the zero-dispersion wavelength $\lambda$ satisfies the relation $\lambda_2<\lambda<\lambda_3$ (step 318). If the zero-dispersion wavelength is between $\lambda_2$ and $\lambda_3$, then $I(\lambda_2)$ is multiplied by 1.6 to effect a correction $[I(\lambda_2)\times 1.6\rightarrow I(\lambda_2)]$, and $I(\lambda_2))$ after correction is compared with $I(\lambda_3)$ in terms of magnitude (step 319).

If $I(\lambda_3)\neq I(\lambda_2)$ holds, processing from step 212 onward is repeated. If $I(\lambda_2)=I(\lambda_3)$ holds (step 320), then the main-signal light is changed over. That is, the monitoring light is changed over to the main-signal light and the main-signal light is changed over to the monitoring light. The procedure for making this change is described below.

If $I(\lambda 2)\leqq I(\lambda_1)\leqq I(\lambda_3)$ holds [see FIG. 59(c)], then the zero-dispersion wavelength $\lambda$ satisfies the relation $\lambda_1<\lambda<\lambda_2$ (step 321). If the zero-dispersion wavelength $\lambda$ is between $\lambda_1$ and $\lambda_2$, then $I(\lambda_1)$ is multiplied by 1.6 to effect a correction $[I(\lambda_1)\times 1.6\rightarrow I(\lambda_1)]$, and $I(\lambda_1)$ after correction is compared with $I(\lambda_2)$ in terms of magnitude (step 322).

If $I(\lambda_2) \neq I(\lambda_1)$ holds, processing from step 312 onward is repeated. If $I(\lambda_2)=I(\lambda_1)$ holds (step 323), then the main-signal light is changed over. That is, the monitoring light of wavelength $\lambda_2$ is changed over to the main-signal light and the main-signal light of wavelength $\lambda_1$ is changed over to the monitoring light.

The foregoing is for a case where the zero-dispersion wavelength has moved toward the side of longer wavelength. If the zero-dispersion wavelength moves toward the side of shorter wavelength, the main-signal light and monitoring light can be changed over in similar fashion.

Figure 63:
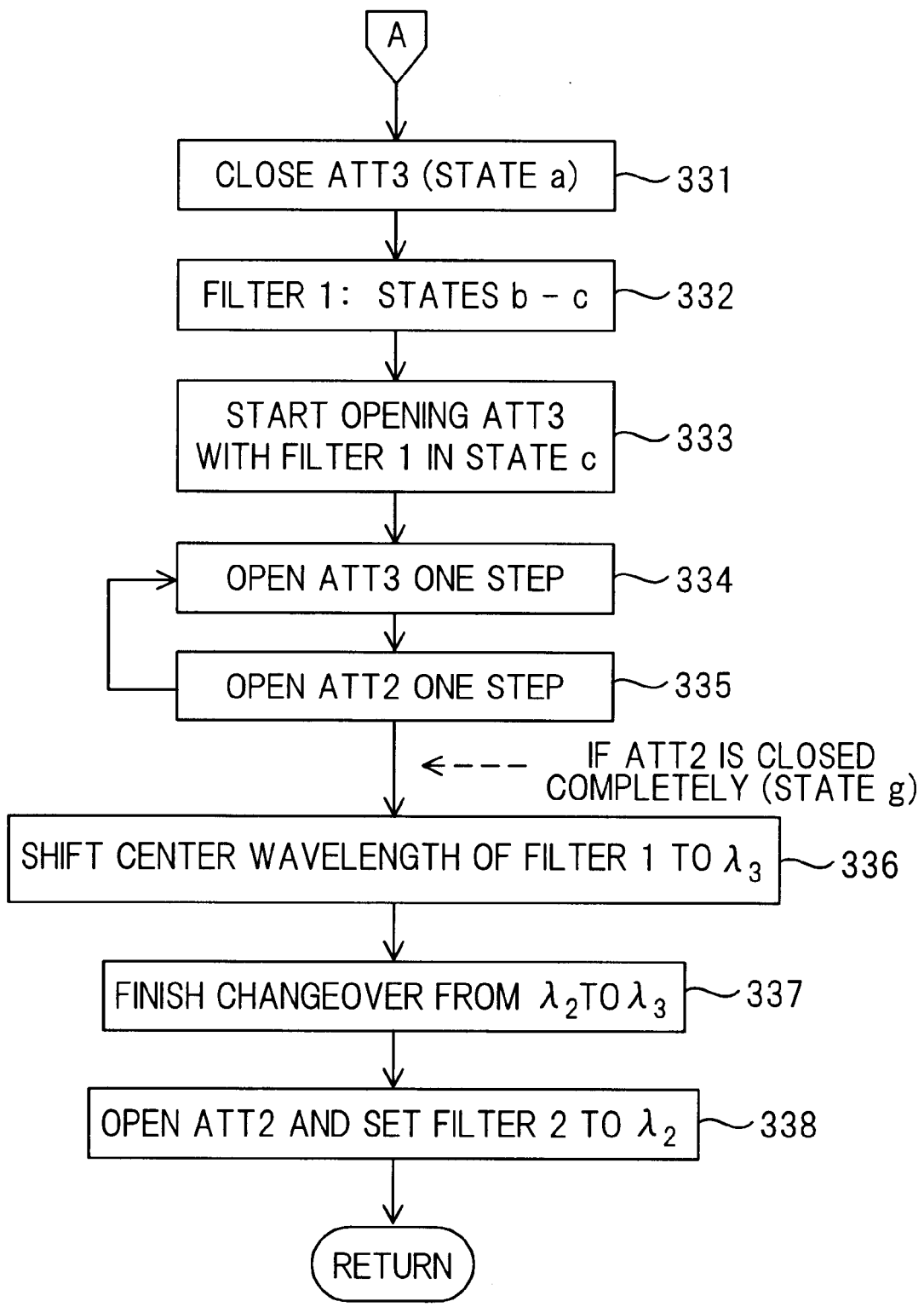
FIG. 63 shows the flow of processing for wavelength dispersion compensation in a case where three waves are used (control of main-wavelength changeover)
Figure 64:
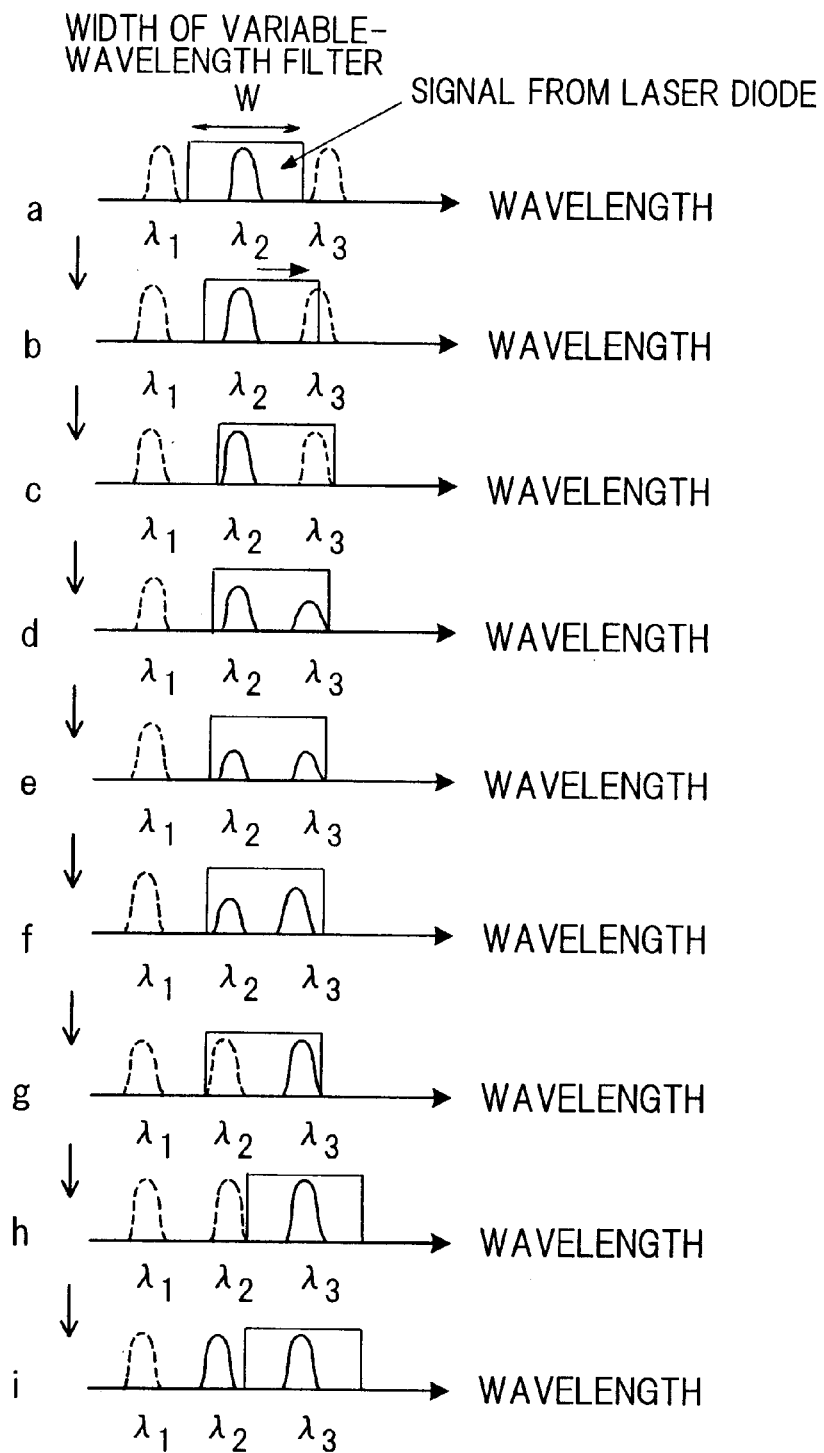
FIG. 64 is a diagram useful in describing control of changeover of main-signal light.

FIG. 63 shows the flow of processing for controlling changeover of the main-signal light in a case where three waves are used, and FIG. 64 is a diagram useful in describing control for changing over the main-signal light.

If $I(\lambda_2)=I(\lambda_3)$ holds (step 320 in FIG. 62), the monitoring light of wavelength $\lambda_3$ is changed over to main-signal light and the main-signal light of wavelength $\lambda_2$ is changed over to monitoring light.

First, the light attenuators $14_3$, $14_1$ are closed (step 331; state a in FIG. 64). Next, the center wavelength of the first optical filter 41 is shifted toward the side of longer wavelength and control is performed in such a manner that the wavelengths $\lambda_2$, $\lambda_3$ fall within the filter range W (step 332, states b, c). In state, the light attenuator $14_3$ is opened gradually and the light attenuator $14_2$ is closed gradually (steps 333–335; states d–f). If the light attenuator $14_2$ is closed fully (state g), the center wavelength of the first optical filter 41 is shifted to $\lambda_3$ (step 336; state h). This completes changeover of the main-signal light (step 337). Finally, the light attenuators $14_1$, $14_2$ are opened and $\lambda_2$ is set as the center wavelength of the second optical filter 42 (step 338; state i). Thus, the main-signal light can be changed over while the power of the light is held constant.

Figure 65:
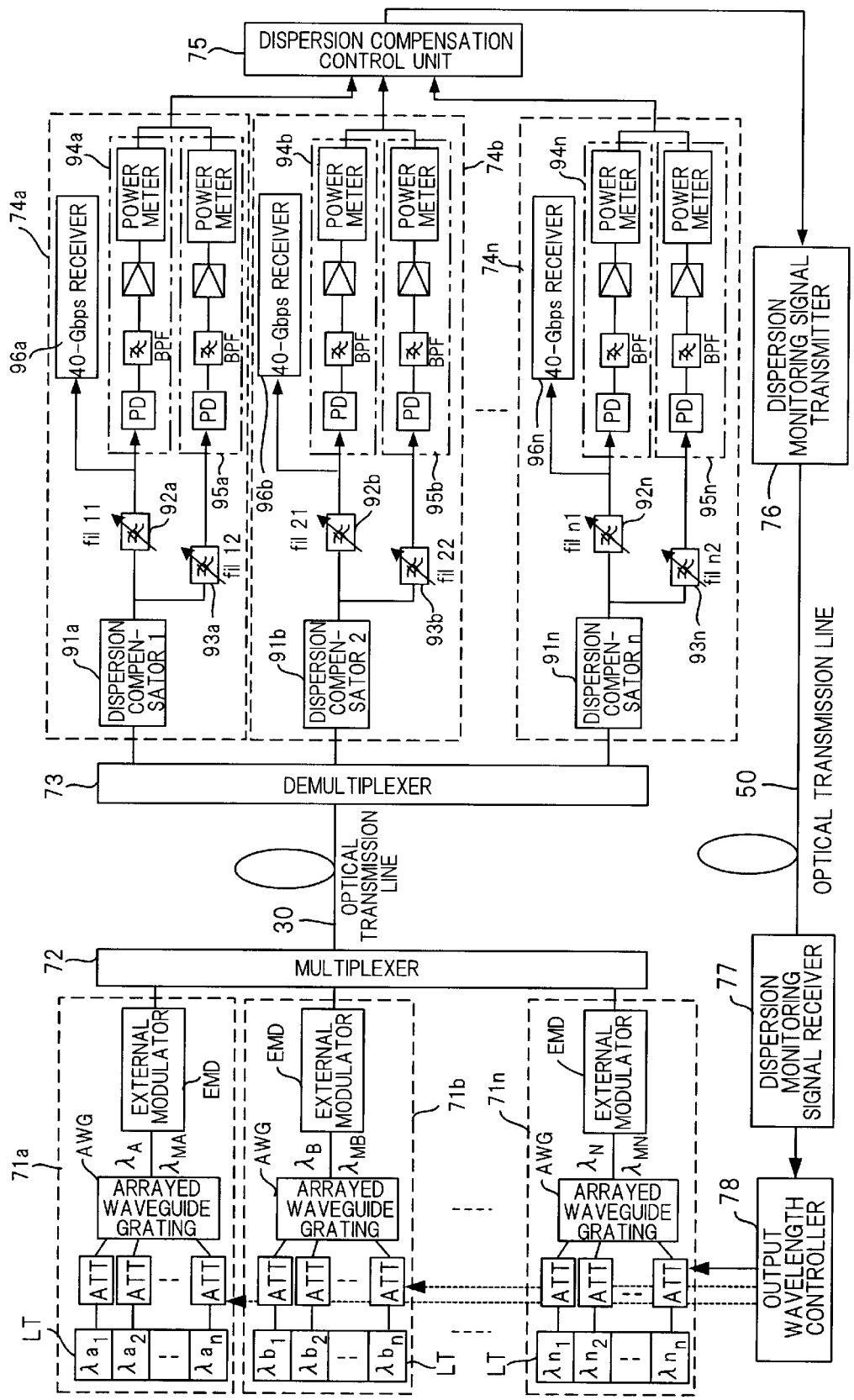
FIG. 65 is a diagram showing the configuration of a wavelength multiplexing optical transmission system (n-wavelength multiplexing)

(k) Wavelength Multiplexing Embodiment (k-1) First Embodiment of Wavelength Multiplexing FIG. 65 is a diagram in which a wavelength multiplexing optical transmission system is provided with a wavelength-dispersion compensating function. This system includes a plurality of data transmitters 71a–71n; a multiplexer 72 for combining light of different wavelengths output by the data transmitters and sending the resulting light to the optical transmission line 30; a demultiplexer 73 for separating light, which has been received from the optical transmission line, according to wavelength; a plurality of receivers 74a–74n for identifying the data from the light of each of the wavelengths; a dispersion compensation control unit 75 for separately performing dispersion compensation control of each of the multiplexed wavelengths; a dispersion monitoring signal transmitter 76; dispersion monitoring signal receiver 77; and an output wavelength controller 78 which, on the basis of the results of monitoring, controls changeover of main-signal light and monitoring light from each of the transmitters 71a–71n.

The transmitters 71a–71n each have a plurality of light sources LT for generating light of mutually different wavelengths $\lambda a_1-\lambda a_n$, $\lambda b_1-\lambda b_n$, ... $\lambda n_1-\lambda n_n$; light attenuators ATT for adopting light of prescribed wavelengths $\lambda_A, \lambda_B, \ldots \lambda_N$ as main-signal light and light of wavelengths $\lambda_{MA}, \lambda_{MB}, \ldots \lambda_{MN}$ as monitoring light, where the light is generated by the plurality of light sources; an arrayed waveguide grating AWG for combining the main-signal light and monitoring light; and an external modulator EMD for modulating light by 40 -Gbps data.

The receivers 74a–74n respectively includes dispersion compensators 91a–91n which compensate for dispersions $\Delta d1-\Delta dn$ produced by wavelength differences between a reference wavelength (e.g., the zero-dispersion wavelength) and prescribed light-source wavelengths of the corresponding transmitters 71a–71n; first optical filters 92a–92n to which the wavelength of the dispersion-compensated main-signal light is set as the center wavelength; second optical filters 93a–93n to which the wavelength of the dispersion-compensated monitoring light is set as the center wavelength; first wavelength-dispersion monitors 94a–94n for detecting and outputting the intensity of a specific frequency component (the intensity of the 40 -GHz component) contained in the dispersion-compensated main-signal light; second wavelength-dispersion monitors 95a–95n for detecting and outputting the intensity of a specific frequency component (the intensity of the 40 -GHz component) contained in the dispersion-compensated monitoring light; and 40 -Gbps receivers 96a–96n.

Figure 66:
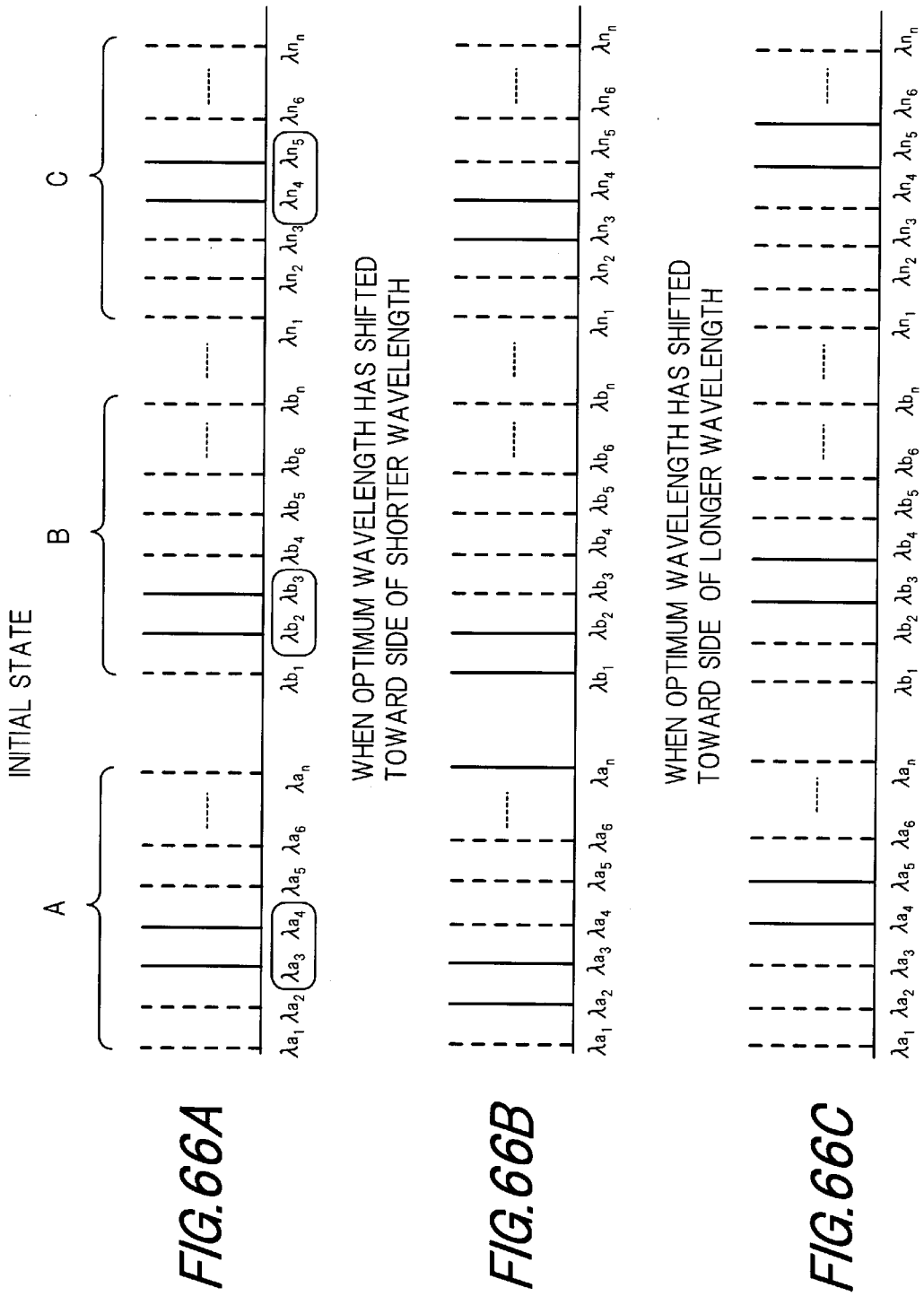

The dispersion compensation control unit 75 (1) performs dispersion compensation control separately for each of the multiplexed wavelengths and (2), on the basis of the results of control, instructs the output wavelength controller 78 to change over the main-signal light and monitoring light of each transmitter and changes the center wavelengths of the first and second optical filters in each of the receivers. In accordance with the command from the dispersion compensation control unit 75, the output wavelength controller 78 changes over the main-signal light and monitoring light separately on a per-transmitter basis, as shown in FIGS. 66A to 66C. It should be noted that dispersion compensation control by the dispersion compensation control unit 75 is carried out in accordance with the method described above in conjunction with FIGS. 41 to 51.

To summarize the foregoing, each of the transmitters 71a–71n outputs, to the optical transmission line as main-signal light, light having a prescribed wavelength from the light generated by the plurality of light sources and, in order to detect a wavelength for which the transmission characteristic is optimum in regard to the wavelength dispersion of the optical transmission line 30, combines, as monitoring light, light generated from a light source neighboring the light source of the main-signal light with the main-signal light. The receivers 74a–74n respectively include the dispersion compensators 91a–91n which compensate for dispersions produced by wavelength differences between the reference wavelength (e.g., the zero-dispersion wavelength) and prescribed light-source wavelengths. The dispersion compensation control unit 75 detects that the ratio between the intensities of the specific frequency component contained in the main-signal light and monitoring light output by the dispersion compensators has attained a predetermined value and instructs the output wavelength controller 78 to changeover the main-signal light and monitoring light. Thus, a wavelength multiplexing optical transmission system can be provided with a dispersion compensation function for every multiplexed wavelength.

FIG. 65 deals with an example in which control of dispersion compensation for every wavelength is performed using two waves, namely the main-signal light and the monitoring light. However, control of dispersion compensation for every wavelength can also be performed using three waves, namely the main-signal light and two beams of monitoring light. That is, each of the transmitters 71a–71n outputs, to the optical transmission line as main-signal light, light having a prescribed wavelength from the light generated by the plurality of light sources and, in order to detect a wavelength for which the transmission characteristic is optimum in regard to the wavelength dispersion of the optical transmission line 30, combines, as monitoring light, light generated from two light sources neighboring the light source of the main-signal light with the main-signal light. The receivers 74a–74n respectively includes dispersion compensators which compensate for dispersions produced by wavelength differences between the reference wavelength (e.g., the zero-dispersion wavelength) and prescribed light-source wavelengths. The dispersion compensation control unit 75 compares the intensities of the specific frequency component contained in the main-signal light and two beams of monitoring light output by the dispersion compensators, detects, based upon the results of comparison, a range of wavelengths in which the optimum wavelength is contained, and instructs the output wavelength controller 78 to change over the main-signal light and monitoring light when the intensity ratio of the two wavelengths that bracket the optimum wavelength attains a predetermined value. This arrangement also makes it possible to provide a wavelength multiplexing optical transmission system with a dispersion compensation function for every multiplexed wavelength.

(k-2) Second Embodiment of Wavelength Multiplexing

Figure 67:
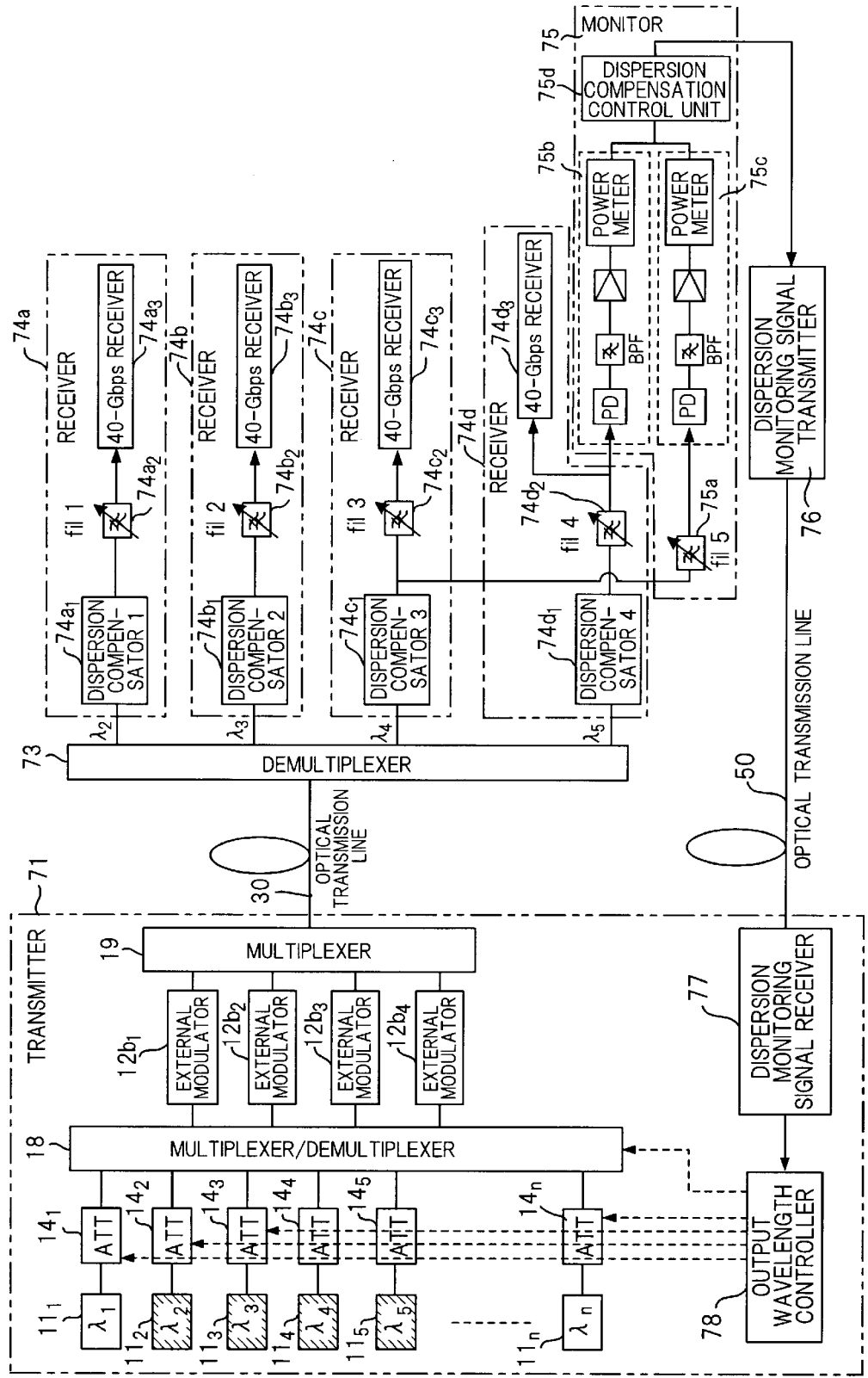
FIG. 67 is a diagram showing a system configuration when four waves are multiplexed.

FIG. 67 is a diagram of an optical transmission system according to a second embodiment, in which four-wave multiplexed transmission is performed. This system includes one consolidated transmitter 71 and receivers 74a–74d, provided for respective ones of multiplexed wavelengths, for identifying data from light of the respective wavelengths. The system further includes the demultiplexer 73 for separating light, which has been received from the optical transmission line 30, according to wavelength, one monitor 75 provided for all multiplexed wavelengths, and the dispersion monitoring signal transmitter 76 for transmitting monitoring signal (the result of dispersion monitoring).

The transmitter has the plurality of light sources $11_1$–$11_n$ for generating light having different wavelengths $\lambda_1$–$\lambda_n$; the light attenuators $14_1$–$14_n$ for outputting n-number (e.g., four) of light beams as main-signal light (one of which serves as also as monitoring light) from the light generated by the plurality of light sources; a multiplexer/demultiplexer 18 for combining the four main-signal light beams and separating each of the main-signal light beams; external modulators $12b_1$–$12b_4$ for on/off-modulating main-signal light, which is output by the multiplexer/demultiplexer 18, by 40 -Gbps data; and a multiplexer 19 for combining the light output by the external modulators and sending the resulting light to the optical transmission line 30. Further, the transmitter 71 has the dispersion monitoring signal receiver 77, which receives the result of monitoring sent from the dispersion monitoring signal transmitter 76, and the output wavelength controller 78 which, on the basis of the results of monitoring, controls changeover of the four main-signal light beams (monitoring light).

The receivers 74a–74d respectively includes dispersion compensators $74a_1$–$74d_1$ which compensate for dispersions conforming to wavelength differences $\Delta d_1$–$\Delta d_4$ between the zero-dispersion wavelength and the wavelengths $\lambda_2$–$\lambda_5$ of the main-signal light produced by the four light sources; optical filters $74a_2$–$74d_2$ set to the wavelengths $\lambda_2$–$\lambda_5$ of the dispersion-compensated main-signal light as their center frequencies; and 40 -Gbps receivers $74a_3$–$74d_3$.

The monitor 75, which is for carrying out control of dispersion compensation using, say, light of wavelength $\lambda_5$ as main-signal light and light of wavelength $\lambda_4$ as monitoring light, has an optical filter 75a, first and second wavelength-dispersion monitors 75b, 75c, and a dispersion compensation control unit 75d. The wavelength $\lambda_4$ of the dispersion-compensated monitoring light is set as the center frequency of the optical filter 75a. The first wavelength-dispersion monitor 75b detects and outputs the intensity of the 40 -GHz component contained in the dispersion-compensated main-signal light, and the second wavelength-dispersion monitor 75c detects and outputs the intensity of the 40 -GHz component contained in the dispersion-compensated monitoring light. The dispersion compensation control unit 75d controls dispersion compensation using the intensity of the 40 -GHz component contained in the main-signal light and monitoring light and, based upon the result of control, instructs the output wavelength controller 78 to change over the main-signal light (monitoring light) and changes the center wavelengths of the optical filters $74a_2$–$74d_2$ in the respective receivers and the center wavelength of the optical filter 75a in the monitor 75. It should be noted that the dispersion compensation control unit 75 controls dispersion compensation in accordance with the method described above in conjunction with FIGS. 41 to 51.

Figure 68:
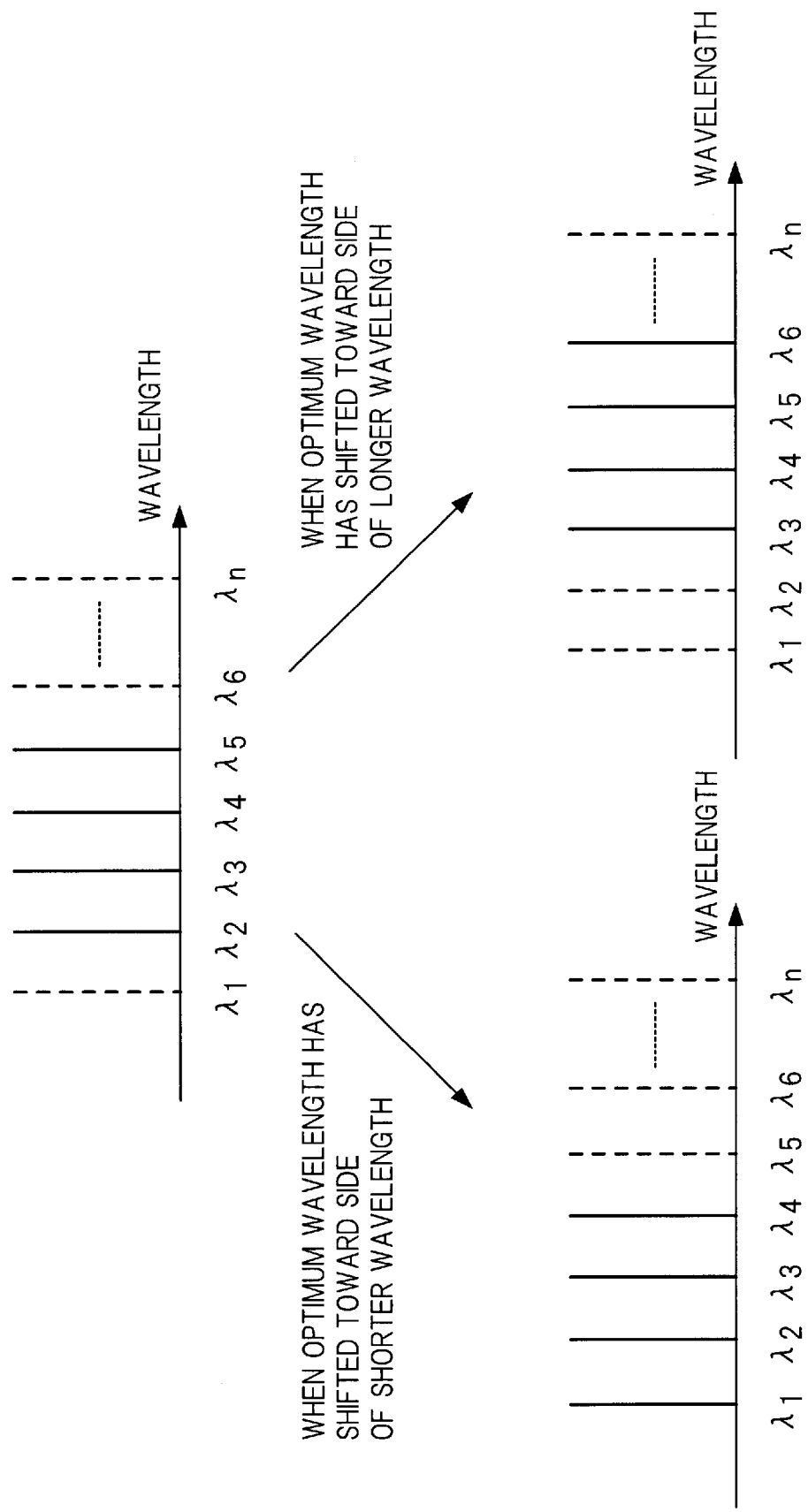
FIG. 68 is a diagram useful in describing a case where four waves are multiplexed.

In accordance with the command from the dispersion compensation control unit 75d, the output wavelength controller 78 changes over the main-signal light and monitoring light by shifting all of the four beams of main-signal light one wavelength spacing each toward the side of shorter or longer wavelength, as shown in FIG. 68. This arrangement make it possible to control wavelength dispersion without the addition of a light source exclusively for monitoring.

It should be noted that dispersion compensation can be controlled using any two adjacent light beams as monitoring light and main-signal light.

(k-3) First Modification of Second Embodiment

Figure 69:
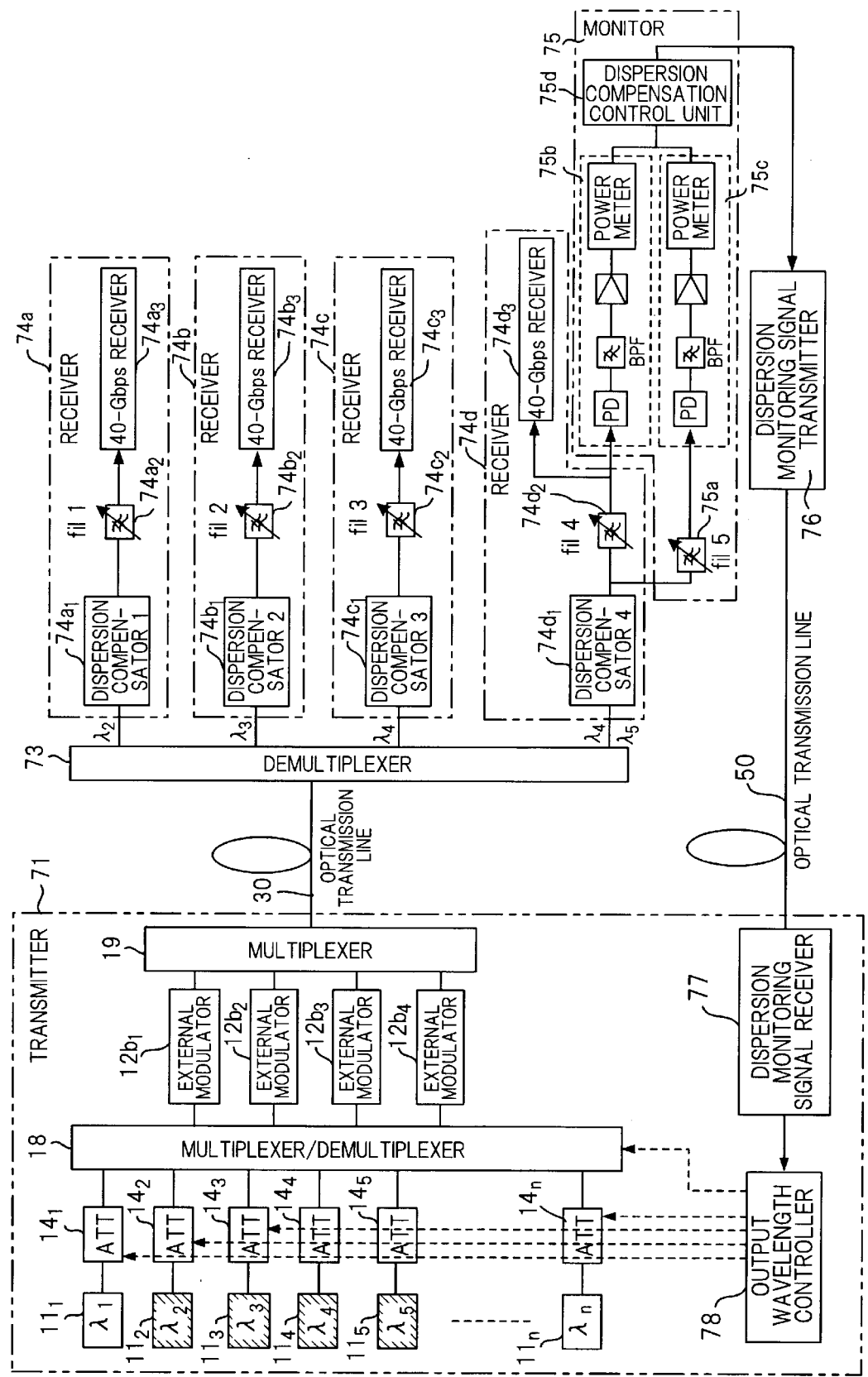
FIG. 69 is a diagram showing a system configuration when four waves are multiplexed.

The demultiplexer 63 in FIG. 67 demultiplexes only main-signal light of wavelength $\lambda_5$ to the receiver 74d. However, the demultiplexer 73 is capable also of demultiplexing both monitoring light and main-signal light to the receiver 74d. In such case the optical transmission system would be configured as shown in FIG. 69.

(k-4) Second Modification of Second Embodiment

FIG. 67 deals with a case where dispersion compensation is controlled using two waves, namely main-signal light and monitoring light. However, it is also possible to control wavelength dispersion using three waves, namely main-signal light and two beams of monitoring light. In such case the monitor 75 would use light from three adjacent light sources as the main-signal light and two beams of monitoring light. More specifically, the monitor 75 would detect a range of wavelengths in which the optimum wavelength is contained by comparing the intensities of the specific frequency component contained in the light output from the three adjacent dispersion compensators, and detect the timing of changeover of the main-signal light when the intensity ratio of two wavelengths bracketing the optimum wavelength has attained a set value. In response to the changeover command from the monitor 75, the output wavelength controller 78 would change over the main-signal light in such a manner that the all four beams of the main-signal light would be shifted by one wavelength spacing toward the side of shorter or longer wavelength.

(k-5) Third Modification of Second Embodiment

Figure 70:
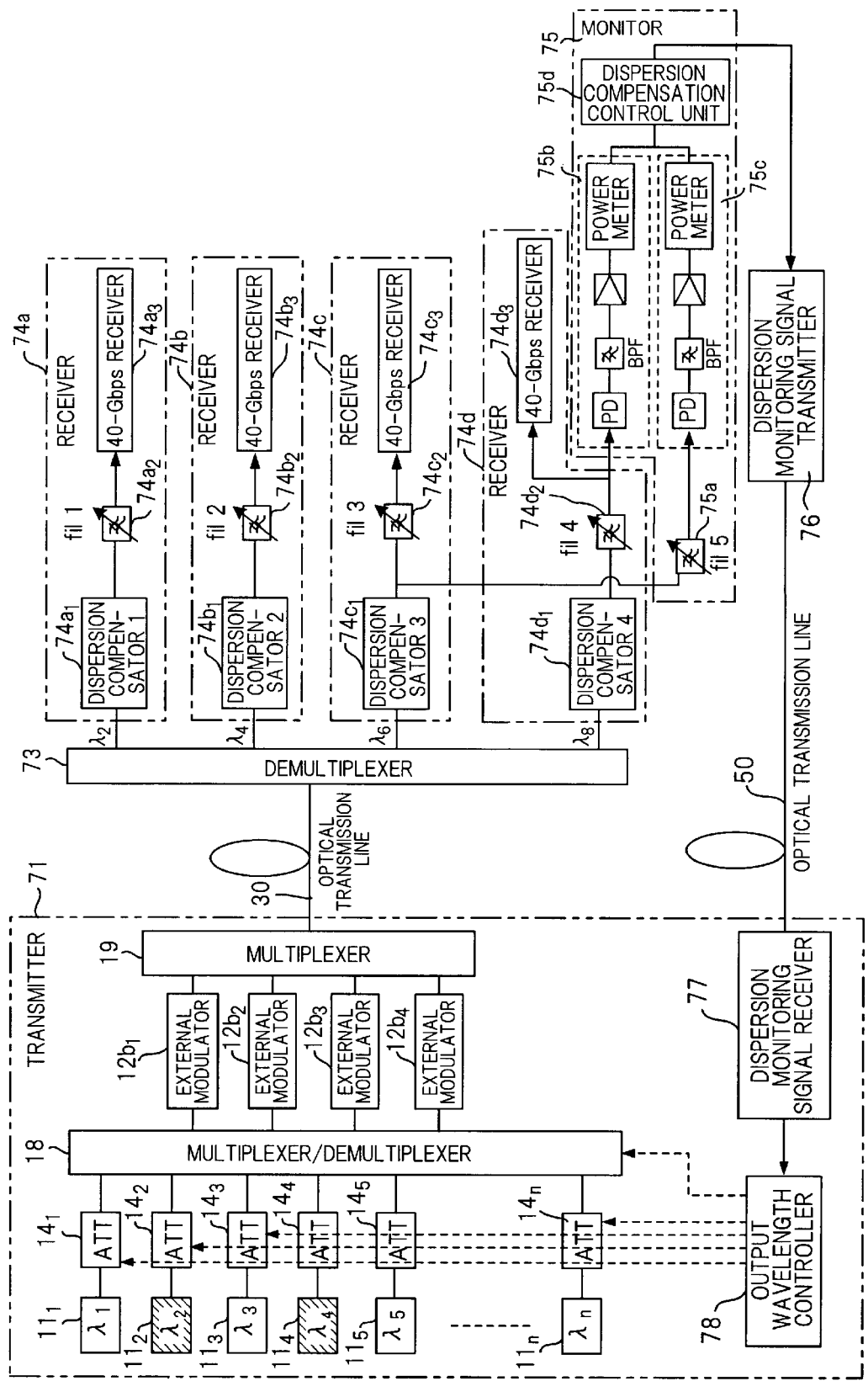
FIG. 70 is a diagram showing a system configuration when four waves are multiplexed.
Figure 71:
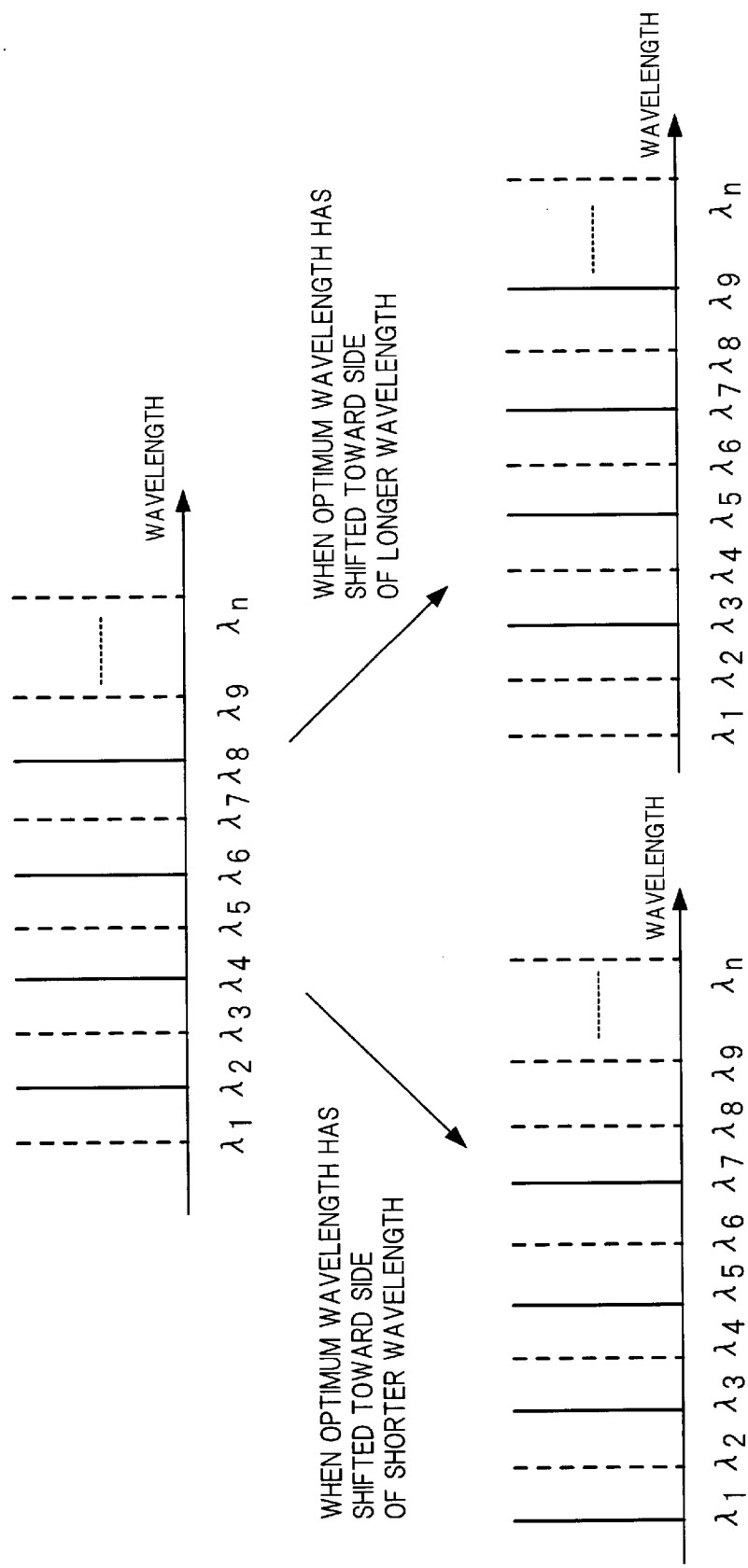
FIG. 71 is a diagram for describing four-wave multiplexing.

According to the second embodiment of wavelength multiplexing, light generated from four adjacent light sources is used as four beams of main-signal light. However, light generated from four light sources that are not adjacent but are staggered or spaced apart by one light source each can be used as the fourth light sources (see FIG. 70, in which the light is output from the shaded light sources). If this arrangement is adopted, it is possible to change over all four of the beams of main-signal light by shifting of four beams of the main-signal light collectively to neighboring unused wavelengths on the side of shorter or longer wavelength, as depicted in FIG. 71. With the third modification, control of changeover is facilitated because the changeover is to wavelengths not being used in signal transmission.

(k-6) Third Embodiment of Wavelength Multiplexing

Figure 72:
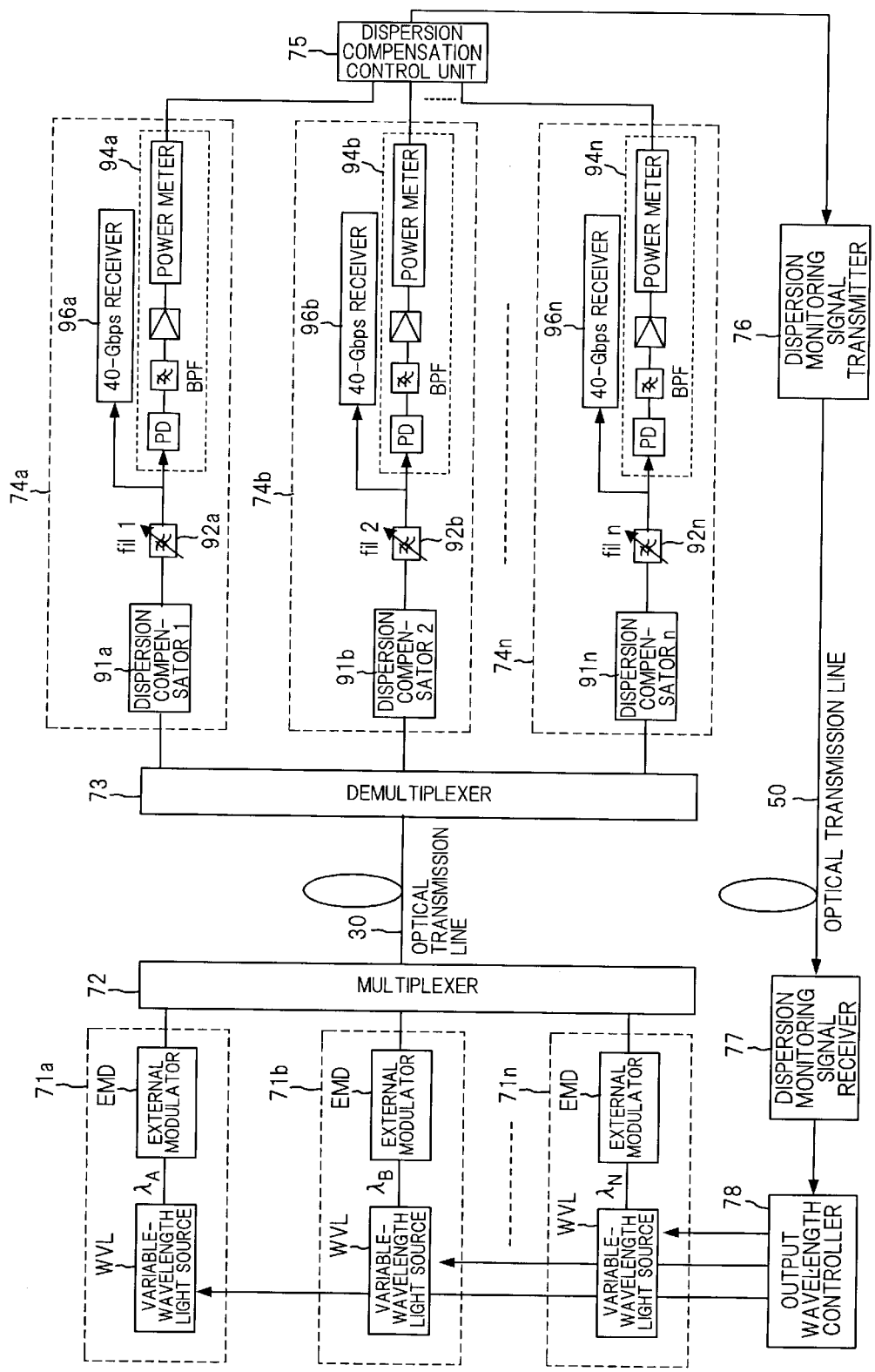
FIG. 72 is a diagram showing the configuration of wavelength multiplexing in a case where variable-wavelength light sources are used.

FIG. 72 is diagram illustrating an optical transmission system according to a third embodiment in which variable-wavelength light sources are used as transmitter light sources. This system includes the plurality of data transmitters 71a–71n; the multiplexer 72 for combining light of different wavelengths output by the data transmitters and sending the resulting light to the optical transmission line 30; the demultiplexer 73 for separating light, which has been received from the optical transmission line, according to wavelength; the plurality of receivers 74a–74n for identifying the data from the light of each of the wavelengths; the dispersion compensation control unit 75 for separately performing dispersion compensation control of each of the multiplexed wavelengths; the dispersion monitoring signal transmitter 76; the dispersion monitoring signal receiver 77; and the output wavelength controller 78 which, on the basis of the results of monitoring, controls the wavelength of the light output from the transmitters 71a–71n.

The transmitters 71a–71n each have a variable-wavelength light source WVL for outputting light of a variable wavelength, and the external modulator EMD for modulating light by 40 -Gbps data.

The receivers 74a–74n respectively includes the dispersion compensators 91a–91n which compensate for dispersions $\Delta d1-\Delta dn$ produced by wavelength differences $\Delta\lambda_1-\Delta\lambda_n$ between a reference wavelength (e.g., the zero-dispersion wavelength) and wavelengths $\lambda_A-\lambda_N$ of light output from the variable-wavelength light sources WVL of the corresponding transmitters 71a–71n; the optical filters 92a–92n to which the wavelengths $\lambda_A-\lambda_N$ of the dispersion-compensated light are set as the center wavelengths; the wavelength-dispersion monitors 94a–94n for detecting and outputting the intensity of a specific frequency component (the intensity of the 40 -GHz component) contained in the dispersion-compensated light; and the 40 -Gbps receivers 96a–96n. The wavelength-dispersion monitors 94a–94n are each constituted by a photodiode (PD), bandpass filter (BPF), amplifier and power meter.

The dispersion compensation control unit 75 (1) performs dispersion compensation control separately for each of the multiplexed wavelengths $\lambda_A-\lambda_N$ and (2), on the basis of the results of control, instructs the output wavelength controller 78 of the wavelengths of light output from the transmitters 71a–71n and changes the center wavelengths of the optical filters 92a–92n in each of the receivers. By way of example, the dispersion compensation control unit 75 changes the wavelength of light from the variable-wavelength light sources WVL separately on a per-transmitter basis via the output wavelength controller 78, detects the optimum wavelength for which the intensity of a specific frequency component, which is contained in the baseband spectrum signal of the received light, indicates the minimum value, and instructs the output wavelength controller 78 to change over wavelength in such a manner that light of the optimum wavelength will be output. In response to being so instructed by the dispersion compensation control unit 75, the output wavelength controller 78 controls the wavelength of the light from the variable-wavelength light sources WVL individually on a per-transmitter basis.

Figure 73:
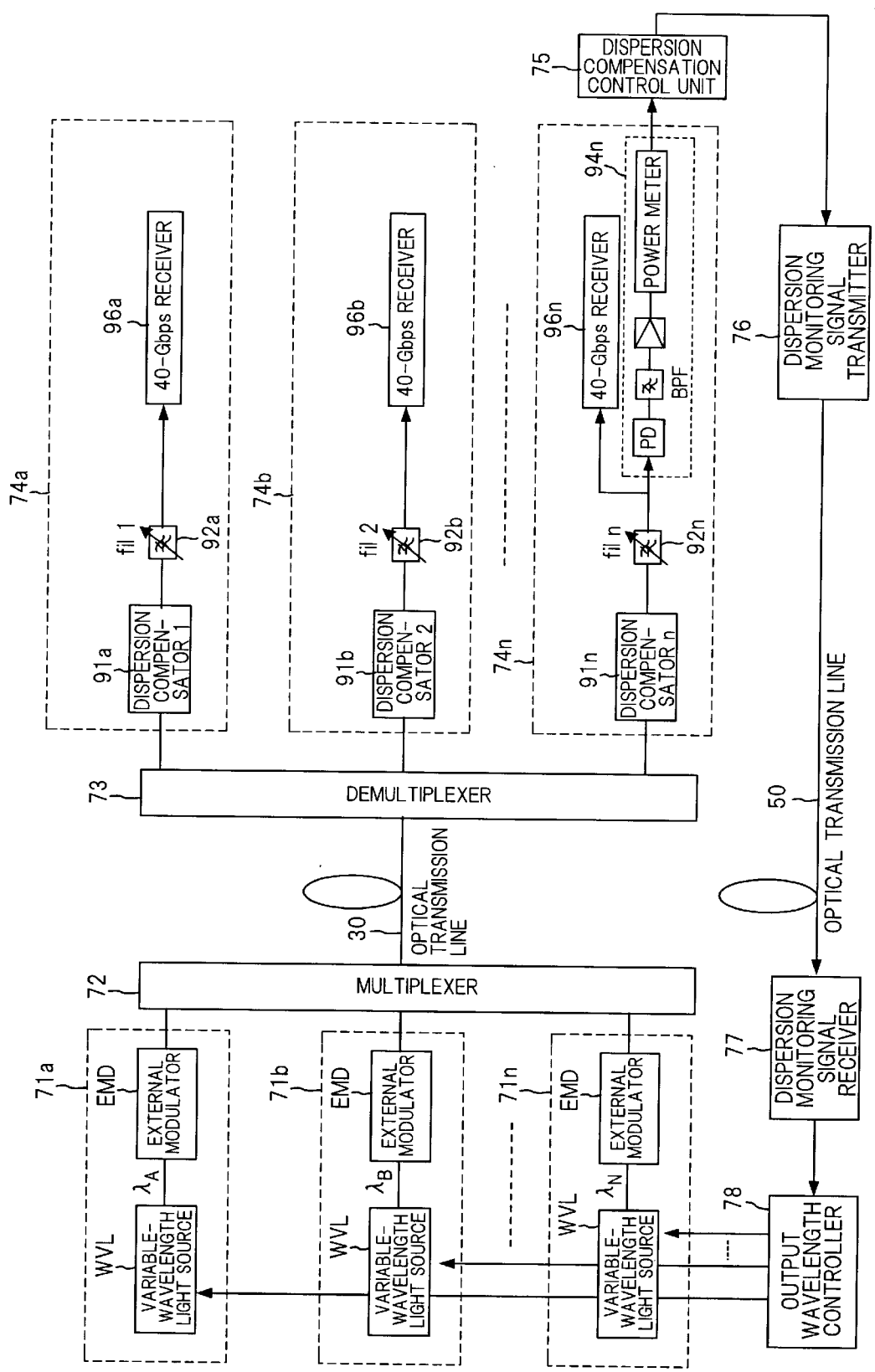
FIG. 73 is a diagram showing the modification of wavelength multiplexing in a case where variable-wavelength light sources are used.
Figure 74A:
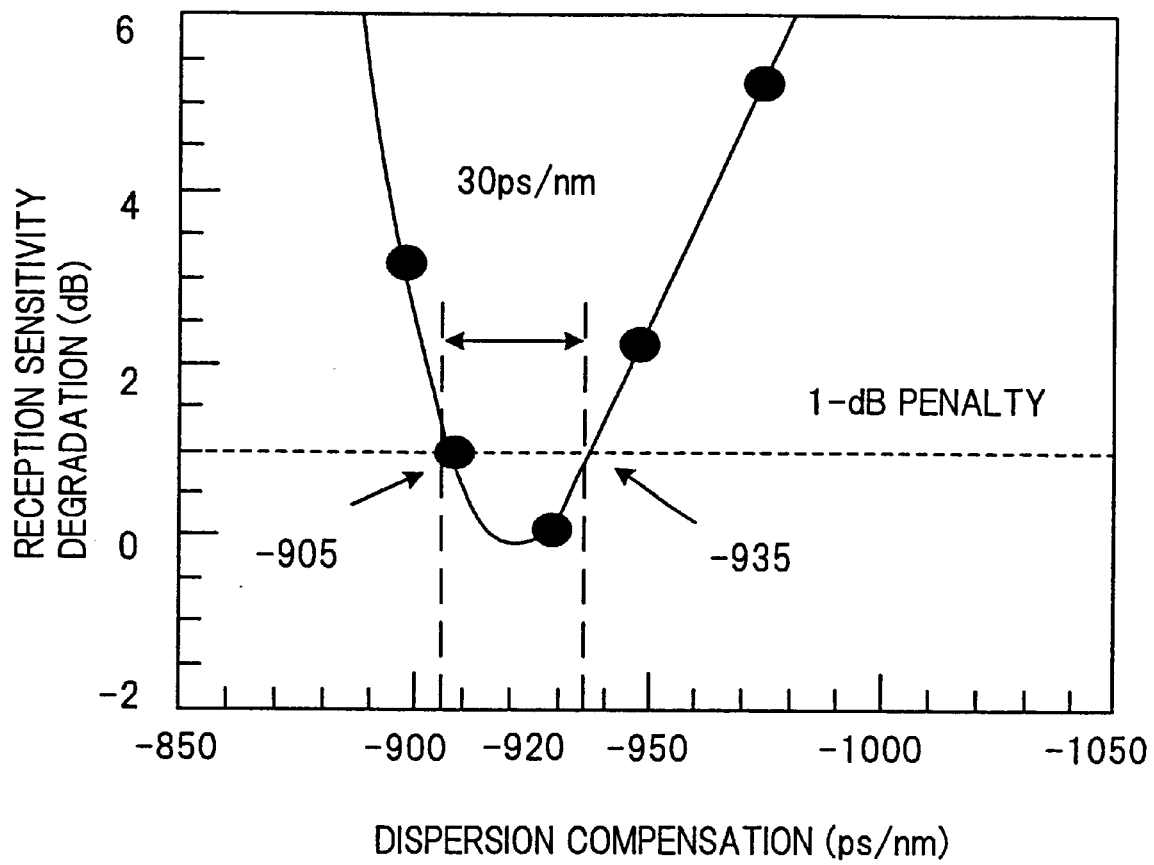
FIGS. 74A and 74B are diagrams useful in describing the relationship between amount of dispersion compensation and power penalty, as well as a measurement system, based upon a transmission experiment using 40-Gbps OTDM (optical time division multiplexing), 1.3-$\mu$m zero-dispersion SMF having a length of 50 km.
Figure 74B:
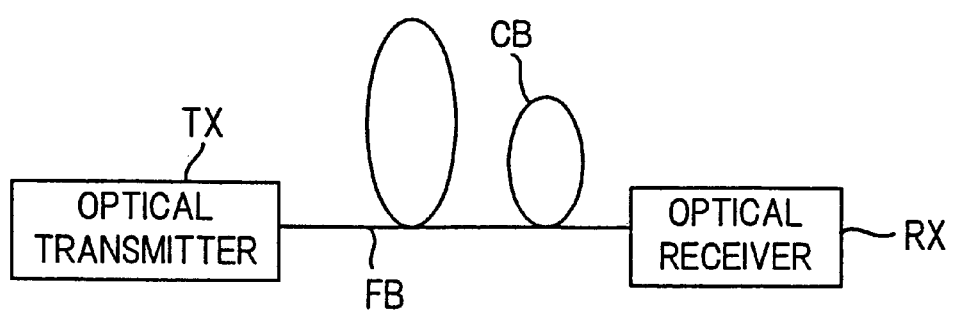
Figure 75:
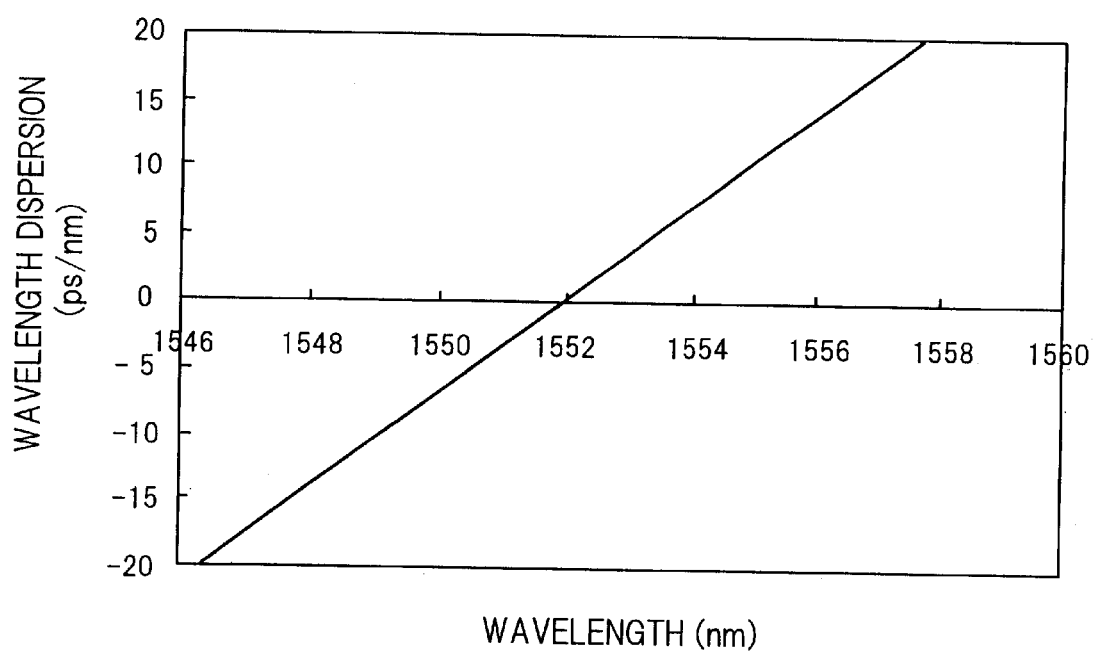
FIG. 75 is a characteristic diagram of wavelength dispersion.
Figure 76A:
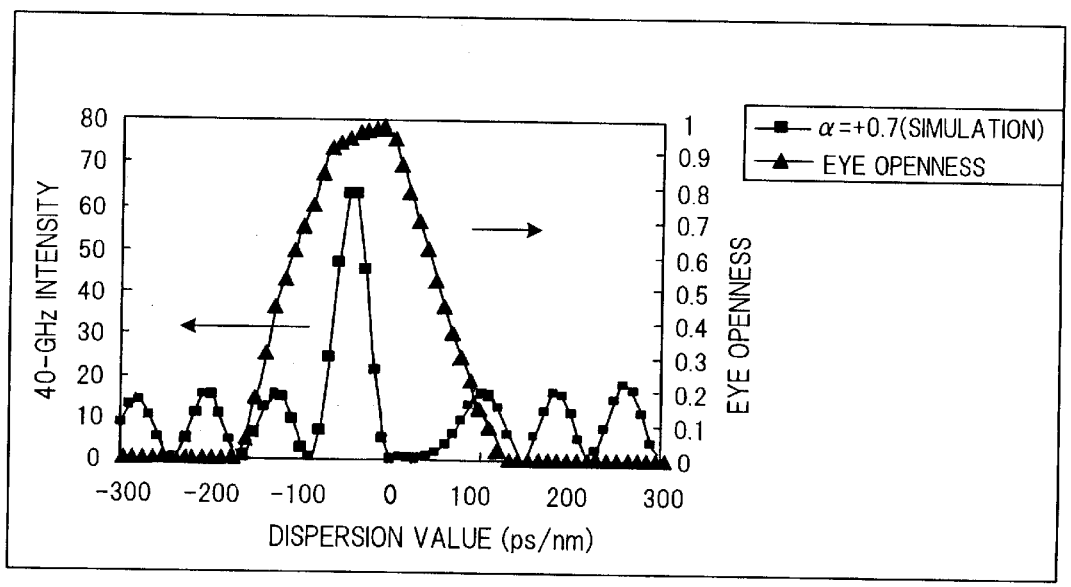
FIGS. 76A and 76B illustrate the results of simulations of 40-GHz component intensity and eye openness in case of an NRZ signal.
Figure 76B:
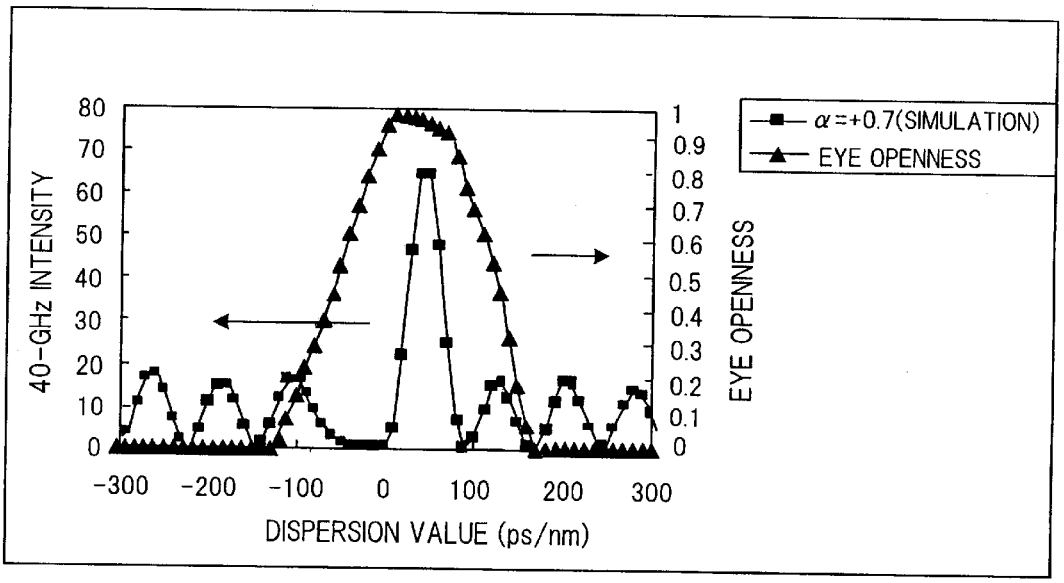
Figure 77A:
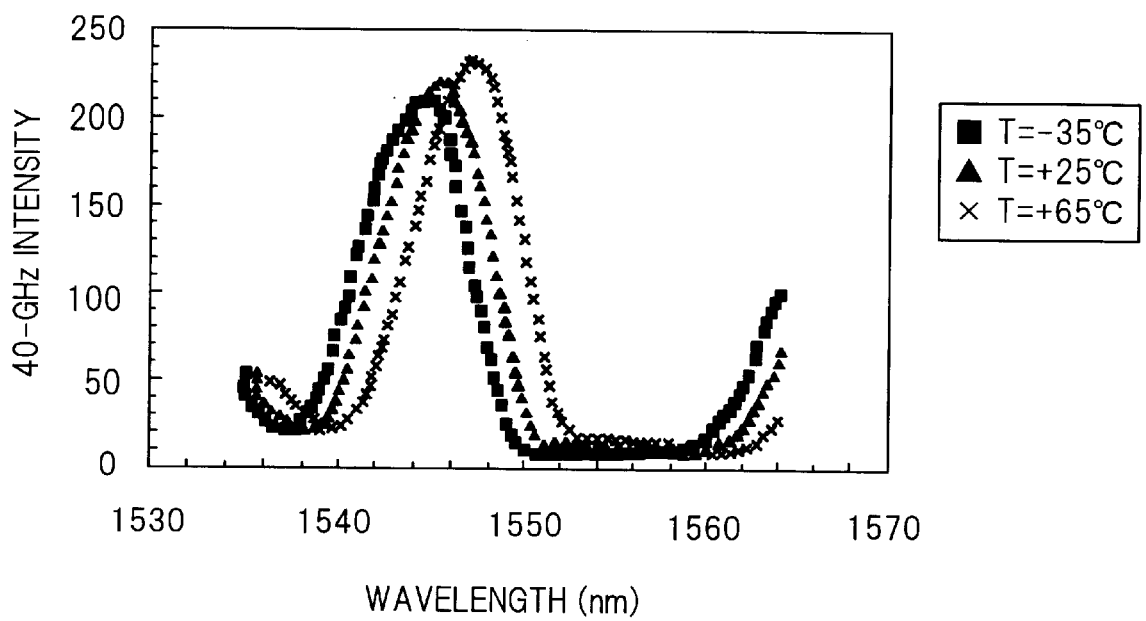
FIGS. 77A and 77B illustrate the temperature characteristic (experimental values) of wavelength vs. 40-GHz component intensity in the case of the 40-Gbps NRZ signal.
Figure 77B:
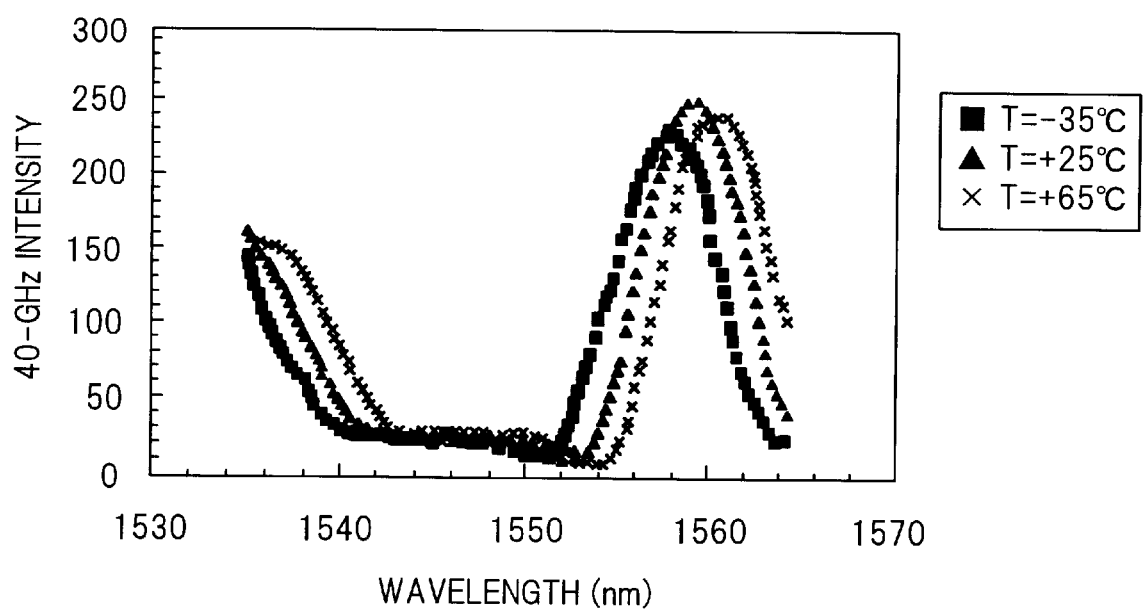

The foregoing is for a case where the receivers 74a–74n are respectively provided with the wavelength-dispersion monitors 94a–94n, and the dispersion compensation control unit 75 controls the wavelengths of the transmitters 71a–71n individually. However, an arrangement can be adopted in which a wavelength-dispersion monitor is provided in only one receiver and controls the wavelengths of all of the transmitters 71a–71n. FIG. 73 is a diagram of an optical transmission system representing such a modification. Here only the receiver 74n is provided with a wavelength-dispersion monitor, which is monitor 94n.

The dispersion compensation control unit 75 changes the wavelength of light from the variable-wavelength light source WVL of transmitter 71n via the output wavelength controller 78, detects the optimum wavelength for which the intensity of a specific frequency component, which is contained in the baseband spectrum signal of the received light, indicates the minimum value, calculates the difference $\Delta\lambda$ between this and the optimum wavelength thus far, and instructs the output wavelength controller 78 to change the wavelength of light, which is output from each of transmitters 71a–71n, by an amount equivalent to $\Delta\lambda$. In response to being so instructed by the dispersion compensation control unit 75, the output wavelength controller 78 performs control so as to change, by $\Delta\lambda$, the wavelength of the light from the variable-wavelength light sources WVL of the respective transmitters.

Thus, in accordance with the present invention, it is possible to compensate for wavelength dispersion by outputting, to an optical transmission line which exhibits wavelength dispersion, light having a wavelength for which the transmission characteristic is optimum for this wavelength dispersion, this being accomplished without using a tunable laser.

In accordance with the present invention, it is possible to arrange it so that neither signal interruption nor signal degradation occurs at the time of wavelength switching even if a plurality of light sources having different wavelengths are used, as when use is made of a semiconductor array laser or a plurality of discrete semiconductor lasers.

In accordance with the present invention, it is possible to compensate for wavelength dispersion by using an arrayed waveguide grating (AWG), a star coupler, a variable-wavelength filter or a light attenuator to change, in a simple manner, the wavelength of light output to an optical transmission line.

In accordance with the present invention, it is possible to so arrange it that dispersion compensation can be carried out accurately by detecting zero-dispersion wavelength even in a case where a plurality of light sources having different wavelengths are used.

In accordance with the present invention, the light source of light output to an optical transmission line is changed over when zero-dispersion wavelength takes on a value intermediate the wavelengths of neighboring light sources, in a case where a plurality of light sources of different wavelengths are used. As a result, it is possible to eliminate or reduce signal delay before and after wavelength changeover and to prevent signal degradation.

In accordance with the present invention, the wavelength of output light is minutely changed, thereby obtaining zero-dispersion wavelength and making it possible to compensate for wavelength dispersion caused by aging.

In accordance with the present invention, monitoring light is multiplexed with main-signal light, whereby it is possible to readily detect whether zero-dispersion wavelength has shifted in the direction of long wavelength or short wavelength and whether zero-dispersion wavelength has become an intermediate wavelength between wavelengths of neighboring light sources.

In accordance with the present invention, the wavelength of monitoring light is made sufficiently distant from the wavelength of main-signal light. As a result, four-wave mixing can be prevented from occurring.

In accordance with the present invention, the polarizations of main-signal light and monitoring light are made orthogonal in a case where the monitoring light is multiplexed with the main-signal light and then transmitted. As a result, it is possible to improve detection precision of, e.g., the direction of fluctuation of zero-dispersion wavelength.

In accordance with the present invention, dispersion compensation is controlled using three waves, namely main-signal light and two beams of monitoring light. As a result, it is unnecessary to constantly monitor an increase or decrease in the intensity of a specific component of each wavelength; it will suffice merely to compare the absolute values of the intensities of specific components of three waves at a certain time. This facilitates control of dispersion compensation.

In accordance with the present invention, regardless of the fact that the characteristic of the intensity of the specific frequency component differs depending upon whether the optical modulation scheme is NRZ modulation, OTDM modulation or RZ modulation, wavelength dispersion can be controlled in the case of NRZ modulation by detecting the minimum at the foot of the peak of the characteristic of the intensity of the specific frequency component, in the case of OTDM modulation by detecting the valley between two peaks and in the case of RZ modulation by detecting a maximum value.

In accordance with the present invention, dispersion compensation can be controlled at the time of wavelength multiplexing transmission.

As many apparently widely different embodiments of the present invention can be made without departing from the spirit and scope thereof, it is to be understood that the invention is not limited to the specific embodiments thereof except as defined in the appended claims.

What is claimed is:

1. An optical transmitter having a wavelength dispersion compensating function, comprising:

a plurality of light sources to output light having wavelengths that differ from one another;

optical output means for outputting, to an optical transmission line, light of a wavelength whose transmission characteristic is optimum with regard to wavelength dispersion exhibited by this optical transmission line, the output light being obtained from light output by said plurality of light sources;

wavelength varying means for changing over the light generated by said light sources and outputting this light to the optical transmission line, thereby changing the wavelength of light output to the optical transmission line; and wavelength detection means for detecting the wavelength whose transmission characteristic is optimum with regard to wavelength dispersion exhibited by the optical transmission line;

wherein the wavelength of light output to the optical transmission line is changed, before start of operation of an optical transmission system, in order to detect a wavelength whose transmission characteristic is optimum with regard to the wavelength dispersion exhibited by this optical transmission line, the optimum wavelength is detected by said wavelength detection means based upon the intensity of a specific frequency component contained in a received baseband spectrum signal, and the light having the detected optimum wavelength is output to the optical transmission line during system operation.

2. An optical transmitter having a wavelength dispersion compensating function, comprising:

a plurality of light sources to output light having wavelengths that differ from one another;

light attenuators disposed on an output side of respective ones of said light sources;

optical output means for outputting, to an optical transmission line, light of a wavelength whose transmission characteristic is optimum with regard to wavelength dispersion exhibited by this optical transmission line, the output light being obtained from light output by said plurality of light sources; and wavelength varying means for changing over the light generated by said light sources by controlling amount of light attenuation of each of said light attenuators and outputting this light to the optical transmission line, thereby changing the wavelength of light output to the optical transmission line;

wherein the wavelength of light output to the optical transmission line is changed, before start of operation of an optical transmission system, in order to detect a wavelength whose transmission characteristic is optimum with regard to the wavelength dispersion exhibited by this optical transmission line, and the light having the detected optimum wavelength is output to the optical transmission line during system operation.

3. An optical transmitter having a wavelength dispersion compensating function, comprising:

a plurality of light sources to output light having wavelengths that differ from one another;

optical output means for outputting, to an optical transmission line, light of a wavelength whose transmission characteristic is optimum with regard to wavelength dispersion exhibited by this optical transmission line, the output light being obtained from light output by said plurality of light sources;

first wavelength varying means for varying the wavelength of the light output to the optical transmission line in order to detect a wavelength whose transmission characteristic is optimum with regard to wavelength dispersion exhibited by this optical transmission line; and second wavelength varying means for changing over the light generated by said light sources and outputting this light to the optical transmission line, thereby changing the wavelength of light output to the optical transmission line;

wherein the wavelength of light output to the optical transmission line is changed by the second wavelength varying means, before start of operation of an optical transmission system, in order to decide a wavelength whose transmission characteristic is optimum with regard to the wavelength dispersion exhibited by the optical transmission line, and the light having the optimum wavelength is output to the optical transmission line and the wavelength of the light is varied by the first wavelength varying means during system operation.

4. An optical transmitter having a wavelength dispersion compensating function, comprising:

a plurality of light sources to output light having wavelengths that differ from one another;

optical output means for outputting, to an optical transmission line, light of a wavelength whose transmission characteristic is optimum with regard to wavelength dispersion exhibited by this optical transmission line, the output light being obtained from light output by said plurality of light sources;

wavelength varying means for varying the wavelength of the light output to the optical transmission line in order to detect a wavelength whose transmission characteristic is optimum with regard to wavelength dispersion exhibited by this optical transmission line; and wavelength detection means for detecting the wavelength whose transmission characteristic is optimum with regard to wavelength dispersion exhibited by the optical transmission line; wherein said wavelength detection means detects the optimum wavelength based upon intensity of a specific frequency component contained in a received baseband spectrum signal and the light having the optimum wavelength is output to the optical transmission line during operation of the optical transmission system.

5. An optical transmitter having a wavelength dispersion compensating function, comprising:

a plurality of light sources to output light having wavelengths that differ from one another;

optical output means for outputting, to an optical transmission line, light of a wavelength whose transmission characteristic is optimum with regard to wavelength dispersion exhibited by this optical transmission line, the output light being obtained from light output by said plurality of light sources; and first wavelength varying means for varying the wavelength of the light output to the optical transmission line in order to detect a wavelength whose transmission characteristic is optimum with regard to wavelength dispersion exhibited by this optical transmission line;

wherein the optimum wavelength is zero-dispersion wavelength of the optical transmission line, and said optical output means outputs to the optical transmission line light having a wavelength nearest to the zero-dispersion wavelength, the output light being obtained from light output by said plurality of light sources, and when the zero-dispersion wavelength has shifted to a wavelength intermediate the wavelength of a light source that generates light output to the optical transmission line and the wavelength of a light source neighboring this light source, said optical output means changes over the light output to the optical transmission line from a present light source to the neighboring light source without instantaneous interruption of light.

6. An optical transmission system having a wavelength dispersion compensating function, comprising:

a plurality of light sources for generating light having wavelengths that differ from one another;

optical output means for outputting, to an optical transmission line, prescribed light obtained from light generated by said plurality of light sources;

wavelength varying means for controlling said optical output means to change over the light generated by said light sources, thereby changing the wavelength of light output to the optical transmission line; and optimum-wavelength detecting means for detecting a wavelength whose transmission characteristic is optimum with regard to wavelength dispersion exhibited by the optical transmission line, based upon intensity of a specific frequency component contained in a baseband spectrum signal of received light;

wherein before start of operation of the optical transmission system, said wavelength varying means changes the wavelength of light output to the optical transmission line by controlling changeover of light generated by said light sources, and said optimum-wavelength detecting means detects, as optimum wavelength; and during system operation, the light of the detected optimum wavelength is output to the optical transmission line.

7. An optical transmitter having a wavelength dispersion compensating function, comprising:

a plurality of light sources to output light having wavelengths that differ from one another;

optical output means for outputting, to an optical transmission line, light of a wavelength whose transmission characteristic is optimum with regard to wavelength dispersion exhibited by this optical transmission line, the output light being obtained from light output by said plurality of light sources;

wavelength varying means for changing over the light generated by said light sources and outputting this light to the optical transmission line, thereby changing the wavelength of light output to the optical transmission line; and wavelength detection means for detecting the wavelength whose transmission characteristic is optimum with regard to wavelength dispersion exhibited by the optical transmission line, wherein the wavelength of light output to the optical transmission line is changed, before start of operation of an optical transmission system, in order to detect a wavelength whose transmission characteristic is optimum with regard to the wavelength dispersion exhibited by this optical transmission line, and the light having the detected optimum wavelength is output to the optical transmission line during system operation, wherein light having the optimum wavelength detected by said wavelength detection means is output to the optical transmission line, and wherein said wavelength detection means detects the optimum wavelength based upon intensity of a specific frequency component contained in a received baseband spectrum signal.

8. The optical transmitter according to claim 7, wherein the specific frequency is a data bit-rate frequency.

9. An optical transmitter having a wavelength dispersion compensating function, comprising:

a plurality of light sources to output light having wavelengths that differ from one another;

optical output means for outputting, to an optical transmission line, light of a wavelength whose transmission characteristic is optimum with regard to wavelength dispersion exhibited by this optical transmission line, the output light being obtained from light output by said plurality of light sources;

wavelength varying means for changing over the light generated by said light sources and outputting this light to the optical transmission line, thereby changing the wavelength of light output to the optical transmission line; and light attenuators disposed on an output side of respective ones of said light sources, wherein the wavelength of light output to the optical transmission line is changed, before start of operation of an optical transmission system, in order to detect a wavelength whose transmission characteristic is optimum with regard to the wavelength dispersion exhibited by this optical transmission line, and the light having the detected optimum wavelength is output to the optical transmission line during system operation, and wherein said wavelength varying means changes the wavelength of light output to the optical transmission line by controlling amount of light attenuation of each of said light attenuators.

10. The optical transmitter according to claim 7, wherein said optical output means includes:

multiplexing means for multiplexing light generated by each of said light sources; and a variable-wavelength filter for selecting and outputting a desired wavelength;

wherein said wavelength varying means changes the wavelength of light output to the optical transmission line by controlling said variable-wavelength filter.

11. An optical transmission system having a wavelength dispersion compensating function, comprising:

a plurality of light sources for generating light having wavelengths that differ from one another;

optical output means for outputting, to an optical transmission line, prescribed light obtained from among light generated by said plurality of light sources;

wavelength varying means for controlling said optical output means to change over the light generated by said light sources, thereby changing the wavelength of light output to the optical transmission line; and optimum-wavelength detecting means for detecting a wavelength whose transmission characteristic is optimum with regard to wavelength dispersion exhibited by the optical transmission line, based upon intensity of a specific frequency component contained in a baseband spectrum signal of received light;

wherein before start of operation of the optical transmission system, said wavelength varying means changes the wavelength of light output to the optical transmission line by changing over light generated by said light sources, and said optimum-wavelength detecting means detects, as optimum wavelength, a wavelength for which the intensity of the specific frequency component contained in the baseband spectrum signal of received light is maximum; and during system operation, the light of the detected optimum wavelength is output to the optical transmission line.

12. An optical transmitter having a wavelength dispersion compensating function, comprising:

a plurality of light sources for outputting light having wavelengths that differ from one another;

optical output means for changing wavelength of light, which is output to an optical transmission line, by changing over light generated by said plurality of light sources, and selecting and outputting light of a wavelength whose transmission characteristic is optimum with regard to wavelength dispersion exhibited by this optical transmission line; and a modulator for modulating the light, which is output from said optical output means, by transmitted data, and sending the modulated light to the optical transmission line;

said modulator modulating the light in such a manner that intensity of a specific frequency component contained in a received baseband spectrum signal on the receiving side indicates an extreme value at zero-dispersion wavelength; and said optical output means changes the wavelength of light output to the optical transmission line in order to detect the zero-dispersion wavelength or a wavelength of a light source closest to the zero-dispersion wavelength before start of operation of an optical transmission system, and outputs light having the zero-dispersion wavelength or the wavelength closest to the zero-dispersion wavelength as main-signal light during system operation.

13. The optical transmitter according to claim 12, wherein when light of the zero-dispersion wavelength is modulated, said modulator modulates the light in such a manner that the intensity of the specific frequency component contained in a received baseband spectrum signal on the receiving side becomes a minimum value.

14. The optical transmitter according to claim 12, wherein when light of the zero-dispersion wavelength is modulated, said modulator modulates the light in such a manner that the intensity of the specific frequency component contained in a received baseband spectrum signal on the receiving side becomes a maximum value.

15. An optical transmission system having a wavelength dispersion compensating function, comprising:

a plurality of light sources for generating light having wavelengths that differ from one another;

optical output means for outputting, to an optical transmission line, prescribed light obtained from among light generated by said plurality of light sources;

wavelength varying means for controlling said optical output means to change over the light generated by said light sources, thereby changing the wavelength of light output to the optical transmission line;

optimum-wavelength detecting means for detecting a wavelength whose transmission characteristic is optimum with regard to wavelength dispersion exhibited by the optical transmission line, based upon intensity of a specific frequency component contained in a baseband spectrum signal of received light; and dispersion add-on means, which is provided in front, of said optimum-wavelength detecting means, for furnishing received light with dispersion conforming to a wavelength difference between a wavelength for which the intensity of the specific frequency component is maximized and a wavelength for which the intensity of the specific frequency component is minimized;

wherein before start of operation of the optical transmission system, said wavelength varying means changes the wavelength of light output to the optical transmission line by changing over light generated by said light sources, and said optimum-wavelength detecting means detects a wavelength $\lambda_{min}$ for which the intensity of the specific frequency component contained in the baseband spectrum signal of received light, which enters via said dispersion add-on means, is minimum; and during system operation, light is output to the optical transmission line so that the wavelength of light that enters said optimum-wavelength detecting means via said dispersion add-on means becomes λm.

16. An optical transmitter having a wavelength dispersion compensating function, comprising:

a plurality of light sources to output light having wavelengths that differ from one another;

optical output means for outputting, to an optical transmission line, light of a wavelength whose transmission characteristic is optimum with regard to wavelength dispersion exhibited by this optical transmission line, the output light being obtained from light output by said plurality of light sources;

first wavelength varying means for varying the wavelength of the light output to the optical transmission line in order to detect a wavelength whose transmission characteristic is optimum with regard to wavelength dispersion exhibited by this optical transmission line; and second wavelength varying means for changing over the light generated by said light sources and outputting this light to the optical transmission line, thereby changing the wavelength of light output to the optical transmission line, wherein the light having the optimum wavelength detected during operation of the optical transmission system is output to the optical transmission line, and wherein the wavelength of light output to the optical transmission line is changed by the second wavelength varying means, before start of operation of an optical transmission system, in order to decide a wavelength whose transmission characteristic is optimum with regard to the wavelength dispersion exhibited by the optical transmission line, and the light having the optimum wavelength is output to the optical transmission line and the wavelength of the light is varied by the first wavelength varying means during system operation.

17. The optical transmitter according to claim 16, wherein said optical output means includes:

multiplexing means for multiplexing light generated by each of said light sources; and a variable-wavelength filter for selecting and outputting a desired wavelength;

wherein said second wavelength varying means changes the wavelength of light output to the optical transmission line by controlling said variable-wavelength filter.

18. An optical transmitter having a wavelength dispersion compensating function, comprising:

a plurality of light sources to output light having wavelengths that differ from one another;

optical output means for outputting, to an optical transmission line, light of a wavelength whose transmission characteristic is optimum with regard to wavelength dispersion exhibited by this optical transmission line, the output light being obtained from light output by said plurality of light sources;

wavelength varying means for varying the wavelength of the light output to the optical transmission line in order to detect a wavelength whose transmission characteristic is optimum with regard to wavelength dispersion exhibited by this optical transmission line; and wavelength detection means for detecting the wavelength whose transmission characteristic is optimum with regard to wavelength dispersion exhibited by the optical transmission line, wherein the light having the optimum wavelength detected during operation of the optical transmission system is output to the optical transmission line, wherein light having the optimum wavelength detected by said wavelength detection means is output to the optical transmission line, and wherein said wavelength detection means detects the optimum wavelength based upon intensity of a specific frequency component contained in a received baseband spectrum signal.

19. An optical transmitter having a wavelength dispersion compensating function, comprising:

a plurality of light sources to output light having wavelengths that differ from one another;

optical output means for outputting, to an optical transmission line, light of a wavelength whose transmission characteristic is optimum with regard to wavelength dispersion exhibited by this optical transmission line, the output light being obtained from light output by said plurality of light sources;

first wavelength varying means for varying the wavelength of the light output to the optical transmission line in order to detect a wavelength whose transmission characteristic is optimum with regard to wavelength dispersion exhibited by this optical transmission line;

second wavelength varying means for changing over the light generated by said light sources and outputting this light to the optical transmission line, thereby changing the wavelength of light output to the optical transmission line; and light attenuators disposed on an output side of respective ones of said light sources, wherein the light having the optimum wavelength detected during operation of the optical transmission system is output to the optical transmission line, wherein the wavelength of light output to the optical transmission line is changed by the second wavelength varying means, before start of operation of an optical transmission system, in order to decide a wavelength whose transmission characteristic is optimum with regard to the wavelength dispersion exhibited by the optical transmission line, and the light having the optimum wavelength is output to the optical transmission line and the wavelength of the light is varied by the first wavelength varying means during system operation, and wherein said second wavelength varying means changes the wavelength of light output to the optical transmission line by controlling amount of light attenuation of each of said light attenuators.

20. An optical transmitter having a wavelength dispersion compensating function, comprising:

a plurality of light sources to output light having wavelengths that differ from one another;

optical output means for outputting, to an optical transmission line, light of a wavelength whose transmission characteristic is optimum with regard to wavelength dispersion exhibited by this optical transmission line, the output light being obtained from light output by said plurality of light sources;

wavelength varying means for varying the wavelength of the light output to the optical transmission line in order to detect a wavelength whose transmission characteristic is optimum with regard to wavelength dispersion exhibited by this optical transmission line, and light-source changeover means which, when the zero-dispersion wavelength has shifted to a wavelength intermediate the wavelength of a light source that generates light output to the optical transmission line and the wavelength of a light source neighboring this light source, is for changing over the light output to the optical transmission line from a present light source to the neighboring light source without instantaneous interruption of light, wherein the light having the optimum wavelength detected during operation of the optical transmission system is output to the optical transmission line, and wherein the optimum wavelength is zero-dispersion wavelength of the optical transmission line, and said optical output means outputs to the optical transmission line light having a wavelength nearest to the zero-dispersion wavelength, the output light being obtained from light output by said plurality of light sources.

21. An optical transmitter having a wavelength dispersion compensating function, comprising:

a plurality of light sources to output light having wavelengths that differ from one another;

optical output means for outputting, to an optical transmission line, light of a wavelength whose transmission characteristic is optimum with regard to wavelength dispersion exhibited by this optical transmission line, the output light being obtained from light output by said plurality of light sources;

first wavelength varying means for varying the wavelength of the light output to the optical transmission line in order to detect a wavelength whose transmission characteristic is optimum with regard to wavelength dispersion exhibited by this optical transmission line, and light-source changeover means which, when the zero-dispersion wavelength has shifted to a wavelength intermediate the wavelength of a light source that generates light output to the optical transmission line and the wavelength of a light source neighboring this light source, is for changing over the light output to the optical transmission line from a present light source to the neighboring light source without instantaneous interruption of light, wherein the light having the optimum wavelength detected during operation of the optical transmission system is output to the optical transmission line, wherein the optimum wavelength is zero-dispersion wavelength of the optical transmission line, and said optical output means outputs to the optical transmission line light having a wavelength nearest to the zero-dispersion wavelength, the output light being obtained from light output by said plurality of light sources, and wherein light output to the optical transmission line is changed over without instantaneous interruption by gradually reducing amount of current injected into the present light source and gradually increasing amount of current injected into the neighboring light source.

22. An optical transmitter having a wavelength dispersion compensating function, comprising:

a plurality of light sources to output light having wavelengths that differ from one another;

optical output means for outputting, to an optical transmission line, light of a wavelength whose transmission characteristic is optimum with regard to wavelength dispersion exhibited by this optical transmission line, the output light being obtained from light output by said plurality of light sources;

first wavelength varying means for varying the wavelength of the light output to the optical transmission line in order to detect a wavelength whose transmission characteristic is optimum with regard to wavelength dispersion exhibited by this optical transmission line, and light-source changeover means which, when the zero-dispersion wavelength has shifted to a wavelength intermediate the wavelength of a light source that generates light output to the optical transmission line and the wavelength of a light source neighboring this light source, is for changing over the light output to the optical transmission line from a present light source to the neighboring light source without instantaneous interruption of light, wherein the light having the optimum wavelength detected during operation of the optical transmission system is output to the optical transmission line, wherein the optimum wavelength is zero-dispersion wavelength of the optical transmission line, and said optical output means outputs to the optical transmission line light having a wavelength nearest to the zero-dispersion wavelength, the output light being obtained from light output by said plurality of light sources, and wherein when light output to the optical transmission line is changed over from the present light source to the neighboring light source, light from the present light source and light from the neighboring light source is output to the optical transmission line simultaneously and then the output of light to the optical transmission line from the present light source is halted.

23. An optical transmission system having a wavelength dispersion compensating function, comprising:

a plurality of light sources for generating light having wavelengths that differ from one another;

optical output means for outputting, to an optical transmission line, prescribed light obtained from among light generated by said plurality of light sources;

wavelength varying means for controlling said optical output means to change over the light generated by said light sources, thereby changing the wavelength of light output to the optical transmission line;

optimum-wavelength detecting means for detecting a wavelength whose transmission characteristic is optimum with regard to wavelength dispersion exhibited by the optical transmission line, based upon intensity of a specific frequency component contained in a baseband spectrum signal of received light; and dispersion add-on means, which is provided in front of said optimum-wavelength detecting means, for furnishing received light with dispersion conforming to a wavelength difference between a wavelength for which the intensity of the specific frequency component is maximized and a wavelength for which the intensity of the specific frequency component is minimized;

wherein before start of operation of the optical transmission system, said wavelength varying means changes the wavelength of light output to the optical transmission line by changing over light generated by said light sources, and said optimum-wavelength detecting means detects a wavelength $\lambda_m$ for which the intensity of the specific frequency component contained in the baseband spectrum signal of received light, which enters via said dispersion add-on means, is maximum; and during system operation, light is output to the optical transmission line so that the wavelength of light that enters said optimum-wavelength detecting means via said dispersion add-on means becomes $\lambda_m$.

24. The system according to claim 23, wherein a bit-rate frequency signal necessary for receiving data is generated from an output side of said dispersion add-on means.

25. An optical transmission system having a wavelength dispersion compensating function, comprising:

a plurality of light sources for generating light having wavelengths that differ from one another;

optical output means for outputting, to an optical transmission line, prescribed light obtained from among light generated by said plurality of light sources;

first wavelength varying means for changing over the light generated by said light sources and outputting this light to the optical transmission line, thereby changing the wavelength of light output to the optical transmission line;

second wavelength varying means for varying the wavelength of the light output to the optical transmission line in order to detect a wavelength whose transmission characteristic is optimum with regard to wavelength dispersion exhibited by this optical transmission line; and wavelength detection means for detecting the wavelength whose transmission characteristic is optimum with regard to wavelength dispersion exhibited by the optical transmission line;

wherein, before start of operation of the system, light generated by the light sources is changed over to change the wavelength of light output to the optical transmission line, and wavelength for which the transmission characteristic is optimum is detected; and during system operation, the light having the detected optimum wavelength is output to the optical transmission line, the wavelength of this light is varied by the second wavelength varying means to detect variation of the optimum wavelength, and the light having the detected optimum wavelength is output to the optical transmission line.

26. The system according to claim 25, wherein the optimum wavelength is zero-dispersion wavelength, and said optical output means outputs to the optical transmission line light having a wavelength nearest to the zero-dispersion wavelength, the output light being obtained from light output by said plurality of light sources.

* * * * *

UNITED STATES PATENT AND TRADEMARK OFFICE
CERTIFICATE OF CORRECTION

PATENT NO. : 6,661,974 B1
DATED : December 9, 2003
INVENTOR(S) : Yuichi Akiyama et al.

It is certified that error appears in the above-identified patent and that said Letters Patent is hereby corrected as shown below:

<u>Column 54,</u>
Line 8, delete "; and", insert -- , a wavelength for which the intensity of the specific frequency component contained in the baseband spectrum signal of received light is minimum; and --

Signed and Sealed this

Sixth Day of April, 2004

JON W. DUDAS
*Acting Director of the United States Patent and Trademark Office*